US012467786B2

(12) United States Patent
Endo et al.

(10) Patent No.: US 12,467,786 B2
(45) Date of Patent: Nov. 11, 2025

(54) MEASUREMENT DEVICE, SYNTHESIZED LIGHT APPLYING METHOD, OPTICAL MEASURING METHOD, SERVICE PROVIDING SYSTEM, AND SERVICE PROVIDING METHOD

(71) Applicant: Japan Cell Co., Ltd., Machida (JP)

(72) Inventors: Yuki Endo, Machida (JP); Hideo Ando, Machida (JP); Satoshi Hayata, Machida (JP)

(73) Assignee: JAPAN CELL CO., LTD., Tokyo (JP)

( * ) Notice: Subject to any disclaimer, the term of this patent is extended or adjusted under 35 U.S.C. 154(b) by 63 days.

(21) Appl. No.: 18/341,902

(22) Filed: Jun. 27, 2023

(65) Prior Publication Data

US 2023/0341263 A1 Oct. 26, 2023

Related U.S. Application Data

(63) Continuation of application No. PCT/JP2022/001156, filed on Jan. 14, 2022.

(30) Foreign Application Priority Data

Feb. 22, 2021 (WO) .................. PCT/JP2021/006685

(51) Int. Cl.
*G01J 3/10* (2006.01)
*G01N 21/27* (2006.01)
(Continued)

(52) U.S. Cl.
CPC ................ *G01J 3/10* (2013.01); *G01N 21/27* (2013.01); *G01N 21/41* (2013.01); *G01J 3/0218* (2013.01); *G01N 21/64* (2013.01)

(58) Field of Classification Search
CPC .......... G01J 3/10; G01J 3/0218; G01N 21/27; G01N 21/41; G01N 21/64; G02B 6/00; G02B 27/10; G02B 27/42; G02B 6/34
See application file for complete search history.

(56) References Cited

U.S. PATENT DOCUMENTS 5,804,451 A 9/1998 Wang et al.
6,169,634 B1 1/2001 Sirat
(Continued)

FOREIGN PATENT DOCUMENTS

CN 108717236 A * 10/2018
JP S57-188165 U 11/1982
(Continued)

OTHER PUBLICATIONS

Max Born, et al., "Principles of Optics—Electromagnetic Theory of Propagation, Interference and Diffraction of Light", Tokai University Press, Nov. 14, 1975, 32 pages.
(Continued)

*Primary Examiner* — Abdullahi Nur
(74) *Attorney, Agent, or Firm* — XSENSUS LLP

(57) ABSTRACT

According to one embodiment of a method of generating synthesized light, a light emitter emits a first light element and a second light element, the synthesized light includes the first light element and the second light element, the first light element passing through a first optical path propagates toward a first direction, the second light element passing through a second optical path propagates toward a second direction, the first optical path has a first optical path length, the second optical path has a second optical path length, the first optical path length is different from the second optical path length, and the first direction is different from the second direction.

6 Claims, 100 Drawing Sheets

(51) Int. Cl.

| | |
|---|---|
| ***G01N 21/41*** | (2006.01) |
| *G01J 3/02* | (2006.01) |
| *G01N 21/64* | (2006.01) |

(56) References Cited

U.S. PATENT DOCUMENTS

| | | | |
|---|---|---|---|
| 6,754,515 B1 | 6/2004 | Pologe | |
| 7,773,655 B2 * | 8/2010 | Chuyanov | H01S 5/405 372/50.23 |
| 7,978,312 B2 * | 7/2011 | Scott | G01S 7/4818 356/3.01 |
| 10,660,523 B2 | 5/2020 | Ando et al. | |
| 10,918,284 B2 | 2/2021 | Ando et al. | |
| 2003/0117618 A1 | 6/2003 | Itoh et al. | |
| 2003/0181796 A1 | 9/2003 | Pologe | |
| 2007/0019909 A1 * | 1/2007 | Yamauchi | G02B 27/1046 385/37 |
| 2008/0055567 A1 * | 3/2008 | Sumiyama | G03B 21/2026 359/275 |
| 2009/0068742 A1 | 3/2009 | Yamanaka | |
| 2010/0062422 A1 | 3/2010 | Ausserre | |
| 2011/0169944 A1 | 7/2011 | Zhao et al. | |
| 2012/0155079 A1 * | 6/2012 | Miura | H04N 9/3161 362/235 |
| 2013/0265566 A1 | 10/2013 | Smith et al. | |
| 2017/0122806 A1 | 5/2017 | Capelle et al. | |
| 2019/0008388 A1 | 1/2019 | Ando et al. | |
| 2023/0341263 A1 | 10/2023 | Endo et al. | |
| 2024/0295297 A1 | 9/2024 | Hayata et al. | |

FOREIGN PATENT DOCUMENTS

| | | | |
|---|---|---|---|
| JP | H01-292821 | A | 11/1989 |
| JP | H02-240545 | A | 9/1990 |
| JP | H06-167640 | A | 6/1994 |
| JP | H11-23819 | A | 1/1999 |
| JP | 2000-206449 | A | 7/2000 |
| JP | 2001-100104 | A | 4/2001 |
| JP | 2002-005823 | A | 1/2002 |
| JP | 2003-500255 | A | 1/2003 |
| JP | 2008-180650 | A | 8/2008 |
| JP | 2008-256784 | A | 10/2008 |
| JP | 5098028 | B2 | 12/2012 |
| JP | 2013-44727 | A | 3/2013 |
| JP | 2013-122443 | A | 6/2013 |
| JP | 2013-533502 | A | 8/2013 |
| JP | 2014-013833 | A | 1/2014 |
| JP | 2014-170014 | A | 9/2014 |
| JP | 2014-222239 | A | 11/2014 |
| JP | 2016-004005 | A | 1/2016 |
| JP | 2019-15709 | A | 1/2019 |
| JP | 2020-159973 | A | 10/2020 |
| JP | 2022-123119 | A | 8/2022 |
| WO | 00/73041 | A1 | 12/2000 |
| WO | 2007/069666 | A1 | 6/2007 |
| WO | 2011/146351 | A1 | 11/2011 |
| WO | 2018/124299 | A1 | 7/2018 |
| WO | 2018/211704 | A1 | 11/2018 |
| WO | 2022/176208 | A1 | 8/2022 |

OTHER PUBLICATIONS

Groningen F. Zernike, "The concept of degree of coherence and its application to optical problems", Physica, vol. 5, No. 8, 1938, 6 pages. (DOI: 10.1016/S0031-8914(38)80203-2).

International Search Report mailed on May 18, 2021, received for PCT Application PCT/JP2021/006685, filed on Feb. 22, 2021, 7 pages including English Translation.

Ando et al., "Spectral noise reduction and temporal coherence control using a phase unsynchronized wave synthesizing method", Optics Express, vol. 29, No. 23, 2021, pp. 38691-38719.

Torres-Company et al., "Controllable generation of partially coherent light pulses with direct space-to-time pulse shaper", Optics Letters, vol. 32, No. 12, Jun. 15, 2007, pp. 1608-1610.

Yukihiro Ozaki and Satoshi Kawada (Eds.), "Near Infrared Spectroscopy",Gakkai Shuppan Center, 1996, p. 211.

International Search Report and Written Opinion mailed on Apr. 5, 2022, received for PCT Application PCT/JP2022/001156, filed on Jan. 14, 2022, 9 pages including English Translation.

Office Action issued Aug. 27, 2024 in Japanese Patent Application No. 2023-500635, 10 pages.

Office Action issued Nov. 19, 2024, in Japanese Patent Application No. 2023-500635, 8 pages.

International Search Report and Written Opinion mailed on Nov. 1, 2022, received for PCT Application PCT/JP2022/031122, filed on Aug. 17, 2022, 9 pages including English Translation.

Keith Delahoussaye, Ruyan Guo, and Amar Bhalla "Homodyne and heterodyne optical interferometry for frequency dependent piezoelectric displacement measurement", Proc. SPIE 9200, Photonic Fiber and Crystal Devices: Advances in Materials and Innovations in Device Applications VIII, 92001M (2014) (Year: 2014), 13 pages.

* cited by examiner

100 | 102

| Optical application field | Optical characteristic items respectively required by different optical application fields |
|---|---|
| Optical communication | High-speed response, high emission intensity, Tolerance to optical disturbance noise |
| Optical recording/playback | High-speed response, high emission intensity, Stability of emitted light intensity (low laser mode hopping noise) |
| Display | High emission intensity, color display accuracy, Linearity of emitted light intensity, Stability of emitted light intensity, Reduction of speckle noise |
| Inspection/analysis | Detection accuracy (optical S/N ratio), Stability of irradiation light intensity over time, Spatial uniformity of irradiation light intensity, Reduction of speckle noise |
| Surveillance/management | Detection accuracy (optical S/N ratio), Spatial uniformity of irradiation light intensity |
| Optical control (including optical excitation) | High emission intensity, Stability of emitted light intensity, Spatial uniformity of irradiation light intensity |
| Optical measurement | Measurement accuracy (optical S/N ratio), Reduction of speckle noise |
| Illumination | Illuminance time stability, Illuminance uniformity |

FIG. 3

| Control item (250) | Category (260) | Example of optical characteristic converting component (270) |
|---|---|---|
| Optical characteristics to be controlled (252) | Light intensity profile control | Slit/pinhole to vary optical transmittance/reflectance |
| | | Transmissible/reflective gradation providing optical component |
| | | Others |
| | Optical phase profile (wavefront profile) control | Diffuser |
| | | Diffraction grating/hologram |
| | | Various wave aberration generating components |
| | | Plate having different surface levels |
| | | Others |
| | Optical phase synchronizing control | Optical path length converting component |
| Location of optical characteristic converting component (258) | Light converging plane/image pattern forming plane or near field area thereof (170) | |
| | Far field area: Distant from light converging plane/ image pattern forming plane (including light before and after passing lens) (180) | |

FIG. 5

250 260 280 290

| Control item | Category | Controllable parameters | Symbols |
|---|---|---|---|
| Optical characteristics to be controlled (252) | Light intensity profile control | Pitch, slit width, pinhole size | 01 |
| | | Gradation characteristics, intra-waveguide mode (light intensity distribution) | 02 |
| | | Control values regarding transmitted/reflected light intensity distribution | 03 |
| | Optical phase profile (wavefront profile) control | Averaged roughness, averaged pitch, positive/negative pitches of prescribed Fourier element, vertical amplitude and pitch ratio of prescribed Fourier element | 11 |
| | | Pitch, duty, number of planar stage surfaces | 12 |
| | | Converging lens characteristics, flat plate thickness/tilt angle, angle between planes in non-parallel plates | 13 |
| | | Prescribed surface level difference (level difference of flat plate thickness) | 14 |
| | | Wavefront profile control value regarding transmitted/reflected light | 15 |
| | Optical phase synchronizing control | Optical path length difference (magnitude relation to coherence length) | 21 |
| Location of optical characteristic converting component (258) | Light converging plane/image pattern forming plane or near field area thereof (170) | | N |
| | Far field area: Distant from light converging plane/ image pattern forming plane (including light before and after passing lens) (180) | | F |

FIG. 6

| | 1 | 2 | 3 | 4 | 5 | 6 | 7 | 8 | 9 | 10 | 11 | 12 | 13 |
|---|---|---|---|---|---|---|---|---|---|---|---|---|---|
| Peak position (Wavelength/nm) | 2456 | | 2404 | | 2336 | | 2280 | | 2112 | | 1916 | | 1792 |
| | | 2440 | | 2368 | | 2308 | | 2144 | | 2068 | | 1836 | |

| | 14 | 15 | 16 | 17 | 18 | 19 | 20 | 21 | 22 | 23 | 24 | 25 |
|---|---|---|---|---|---|---|---|---|---|---|---|---|
| Peak position (Wavelength/nm) | | 1712 | | 1576 | | 1492 | | 1264 | | | | |
| | 1744 | | 1600 | | 1524 | | 1372 | | 1196 | | | |

1020 1022 1024 290

| Category | Abstracts of extracted information | Example | Symbol |
|---|---|---|---|
| Redundant optical phenomena | Optical phenomenon within measured object | Light absorption of other constituents | $\alpha a1$ |
| | | Light scattering characteristics | $\alpha a2$ |
| | | Light interference/reflection characteristics | $\alpha a3$ |
| | Optical phenomenon on measured object surface | Refraction (surface inclination) ⇒ shift in image formation position | $\alpha b1$ |
| | | Diffraction/interference (surface roughness) | $\alpha b2$ |
| | Optical phenomenon at middle of light propagation path | Stray light contamination | $\alpha c1$ |
| | | Light interference | $\alpha c2$ |
| | | Light absorption | $\alpha c3$ |
| Shape/position of measured object | Contour information/feature information of shape | Blank area information ⇒ non-extraction of information | $\beta 1$ |
| | | Area division for each constituent | $\beta 2$ |
| | | Position information of feature portion | $\beta 3$ |
| | | Center-of-gravity position information | $\beta 4$ |

F I G. 47

| 1020 Category | 1022 Abstracts of extracted information | 1024 Example | 290 Symbol |
|---|---|---|---|
| Detection of moving object in measured object | Moving object area | Range of moving object area | $\gamma 1$ |
| | | Moving speed of center-of-gravity of moving object | $\gamma 2$ |
| | | Shape change of moving object | $\gamma 3$ |
| Content ratio of constituent part | Constituent material analysis in solid | Discrimination of organic substance/inorganic substance | $\delta a1$ |
| | | Discrimination of animal/plant/artificial object | $\delta a2$ |
| | | Water content ratio | $\delta a3$ |
| | | Discrimination of sugar/lipid/protein | $\delta a4$ |
| | | Protein structure/amino acid having base residue | $\delta a5$ |
| | | Degree of non-saturation of fatty acid | $\delta a6$ |
| | Content ratio of constituent part in liquid | Content ratio of sugar constituent in blood | $\delta b1$ |
| | | Content ratio of prescribed constituent in blood | $\delta b2$ |
| Time dependent action | Biological action | Pulse rate and respiration rate | $\varepsilon 1$ |
| | | Muscle contraction | $\varepsilon 2$ |
| | | Nerve impulse signal/ion pumping signal in nerve system | $\varepsilon 3$ |
| | | Chemical signal transmissions within/between cells | $\varepsilon 4$ |

F I G. 48

| Measured area (1032) | Disturbance noise type (1034) | Disturbance noise mechanism (1036) | Disturbance noise reduction method (1038) | Symbol (290) |
|---|---|---|---|---|
| Overall characteristics of entire measured object | Optical disturbance noise | Optical interference noise | Average (smooth) interference noise elements | L1 |
| | | | Reduce degree of coherence | L2 |
| | | Intrusion of other optical phenomena | Perform arithmetic processing between different signals | L3 |
| | Electric disturbance noise | Shot noise, thermal noise, electromagnetic induction noise | Restrict bandwidth<br>⇒ Extract detected signals with narrow bandwidth | E1 |
| Local characteristics in measured object | | | Perform lock-in amplifier<br>⇒ Set frequency and phase from the first extracted information | E2 |
| | | | Perform error correction of digitized signals (PRML etc.) | E3 |
| | Optical disturbance noise | Optical interference noise | Average (smooth) interference noise elements | L1 |
| | | | Reduce degree of coherence | L2 |
| | | Intrusion of other optical phenomena | Perform arithmetic processing between different signals | L3 |
| | | Intrusion of disturbance light from outside | Shield redundant disturbance light<br>(obtained from different depth position) | L4 |

F I G. 49

| Symbol (290) | Analytical models of optical interaction (292) | Light intensity loss formulae having variable of wavelength (298) |
|---|---|---|
| $\alpha a3/\alpha b2$ | Optical phase difference distribution after each part of detection light passes each different path | $E_0\{1-\mathrm{sinc}^2(\pi\Delta\chi_0/\lambda_0)\}$<br>$\lambda_0$: Measurement wavelength<br>$\Delta\chi_0$: Generated phase difference range |
| $\alpha a3$ | Interference between inner reflected light and straight traveling light | $A_0\{1-\cos(2\pi\chi_0/\lambda_0)\}$<br>$\chi_0$: Phase difference between interference light |
| $\alpha a2$ | Rayleigh scattering characteristics | $S_0\lambda_0^{-4}$ |

F I G. 85

| | | | |
|---|---|---|---|
| 288 | Interaction range in measured object | Optical interaction occurs uniformly in measured object (Optical interaction changes optical transfer function profile) | Optical interaction locally occurs in measured object (interaction probability varies at different locations in measured object) |
| 294 | Spectral profile correction | Division in linear scale corresponding to subtraction in logarithmic scale | Division in linear scale |
| 296 | Profile correction procedure | Subtract correction curve values from "corresponding values of spectral loss profile obtained from measured object" in logarithmic scale | Subtract correction curve values from "corresponding values of spectral loss profile obtained from measured object" in linear scale |

F I G. 86

PCLN: Phosphatidylcholine, SMLN: Sphingomyelin, GD1a: Ganglioside type D1a,
PSRN: Phosphatidylserine, PEAM: Phosphatidylethanolamine, PINT: Phosphatidylinositol

| | 1332 Data format type | 1334 Description of data format |
|---|---|---|
| 1342 | Existing format representing color pixel image | Express each constituent by "red density", "green density", or "blue density" according to its content ratio<br>"Gray concentration" may be layered depending on water content ratio<br>⇒Transferable by same format as conventional color image signals (moving image signals) |
| 1344 | Multiplexing format including significant information | Multiplex information obtained by analyzing spectral profile (spectral signal)<br>⇒For example, as standardized in MPEG, conventional image information is placed in "video pack" and information obtained after analysis is placed in "pack" and multiplexed<br>⇒Unique pack may be defined as "pack" for storing information obtained after analysis, or information may be stored in "sub-picture pack" as in DVD |
| 1346 | Hypertext format | Information obtained after above analysis is described in "hypertext format"<br>Conventional images are defined in predetermined file format and linked from within hypertext |

F I G. 116

MEASUREMENT DEVICE, SYNTHESIZED LIGHT APPLYING METHOD, OPTICAL MEASURING METHOD, SERVICE PROVIDING SYSTEM, AND SERVICE PROVIDING METHOD

CROSS-REFERENCE TO RELATED APPLICATIONS

This application is a Continuation application of PCT Application No. PCT/JP2022/001156, filed Jan. 14, 2022 and based upon and claiming the benefit of priority from PCT Application No. PCT/JP2021/006685, filed Feb. 22, 2021, the entire contents of all of which are incorporated herein by reference.

FIELD

Embodiments described herein relate generally to a technical field of controlling characteristics of light itself, an application field using light, or a service providing field applying light.

BACKGROUND

It is known that light itself has not only wavelength characteristics, intensity distribution characteristics, and profile of optical phase differences (including wavefront profile), but also various attributes such as directivity and coherence.

Also, as application fields using light, there are known application fields that utilize an imaging technique, in which an imaging sensor is placed at an imaging pattern forming position of an object, and a spectral profile measuring technique of an object to be measured. Furthermore, application fields such as imaging spectrum, which is a combination of the above imaging technique and spectral profile measuring technique, have recently been developed. In addition to this, there are other application fields that utilize measurement results of the amount of light reflected, transmitted, absorbed, and scattered, or their temporal changes.

Furthermore, as a service providing field utilizing light, a technical field is known in which services are provided to users by utilizing information obtained in the above application fields using light. In addition to this, there are known service providing methods utilizing light as means for providing services to users, such as visualization displays and laser processing.

Embodiments described herein aim to provide a method for generating synthesized light having desirable or relatively appropriate characteristics in various application fields and service providing fields using light. Alternatively, not limited to this, an application method or a service method utilizing the synthesized light may also be provided.

Furthermore, it is also possible to provide an optical characteristic converting component that is utilized to generate light having desirable or relatively appropriate characteristics in various application fields using light, or to provide a light source, a measurer, a measurement device, a synthesized light application device, and a service providing system using the optical characteristic converting component.

Also, it is possible to provide an imaging method, spectroscopic measurement, and optical measurement/measurement method utilizing the above synthesized light, or to provide a measurement device using these methods.

BRIEF DESCRIPTION OF THE DRAWINGS

FIG. 3 is an explanatory diagram of the relationship of (desirable) optical characteristics required in various application fields.

FIG. 5 is an explanatory diagram showing the optical characteristics to be controlled and control locations thereof according to the present embodiment.

FIG. 6 is an explanatory diagram showing the optical characteristics to be controlled and control locations thereof according to the present embodiment.

FIG. 47 is a classification explanatory diagram showing information contents extracted in the present embodiment.

FIG. 48 is a classification explanatory diagram showing information contents extracted in the present embodiment.

FIG. 49 shows a disturbance noise reduction method for each measurement location/content within a measured object.

FIG. 85 is an explanatory diagram summarizing wavelength dependence characteristics for each interaction with light inside the measured object.

FIG. 86 is an explanatory diagram of a baseline correction method for a light intensity spectral loss profile obtained from the measured object.

FIG. 116 is an explanatory diagram of an example of a transfer format of the data cube information in the present embodiment.

DETAILED DESCRIPTION

Figure 1:
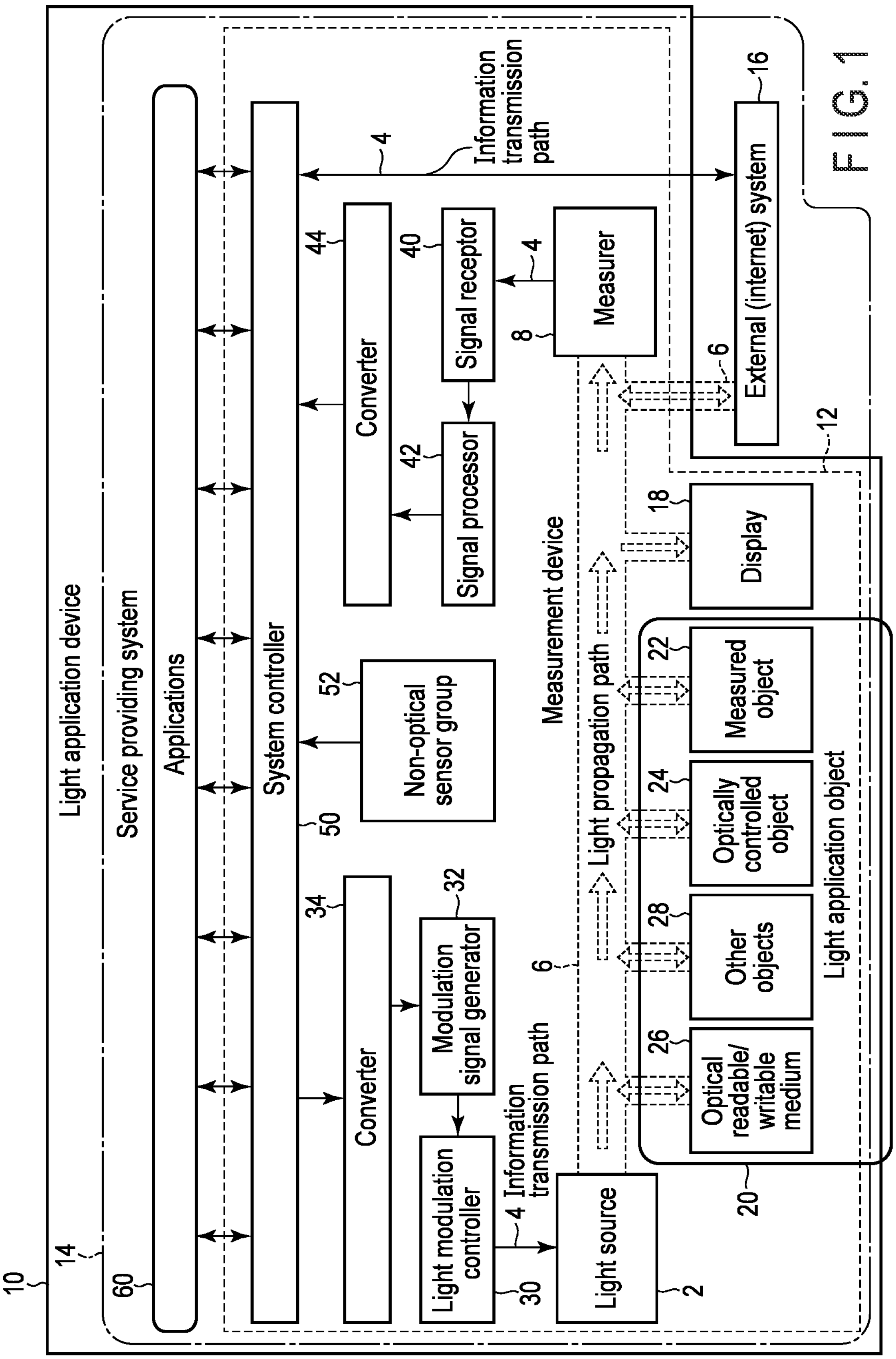
FIG. 1 is a configuration diagram showing an example of an overview of the entire system according to a present embodiment.

Various embodiments will be described hereinafter with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes, and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

[Chapter 1: Overview of System Used in Present Embodiment]

Figure 2:
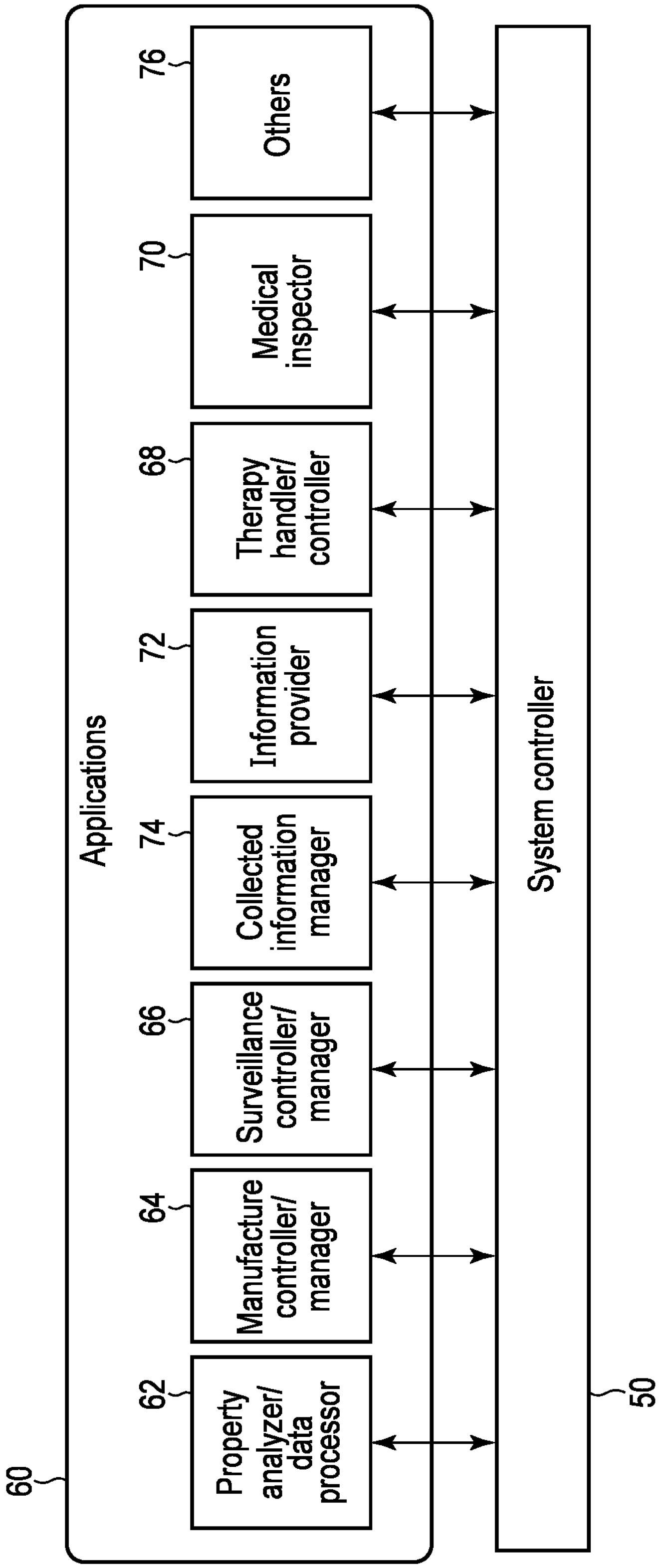
FIG. 2 is a configuration diagram showing an example of an overview of the entire system according to the present embodiment.

FIGS. 1 and 2 show a system used in the present embodiment. Light emitted from a light source 2 is irradiated on a light application object 20 via a light propagation path 6. The light obtained from this light application object 20 is incident on a measurer 8, again, via the light propagation path 6. In addition, not limited to this, the light emitted from the light source 2 may also be directly incident on the measurer 8 via the light propagation path 6. As another embodiment, the light emitted from the light source 2 may reach a display 18 via the light propagation path 6 and display predetermined information on the display 18.

A measurement device 12 in the present embodiment is configured by the light source 2, the measurer 8, and a system controller 50. In addition, applications 60 exist outside the measurement device 12. Each part 62 to 76 in the applications 60 can individually exchange information with the system controller 50.

For example, information obtained as a result of measurement by the measurer 8 and the parts 62 to 76 in the applications 60 are utilized in cooperation to provide services to the user.

A service providing system 14 in the present embodiment is configured by the above measurement device 12, the above applications 60, and an external (internet) system 16, and is configured to provide all kinds of services to users. Here, the part remaining after removing the external (internet) system 16 from the above service providing system 14 functions independently as a light application device 10.

An optical application field 100 applied as the present embodiment is diverse as shown in FIG. 3. However, not limited to this, all application fields 100 related to light in some way (including displays utilizing light) are subject to the present embodiment.

FIG. 3 shows a list of (desirable) optical characteristic items 102 respectively required by different optical application field 100. The present embodiment can meet the required (desirable) optical characteristic items 102 enclosed in rectangular frames.

[Chapter 2: Overview of Basic Optical Effects Used in Present Embodiment]

Figure 4:
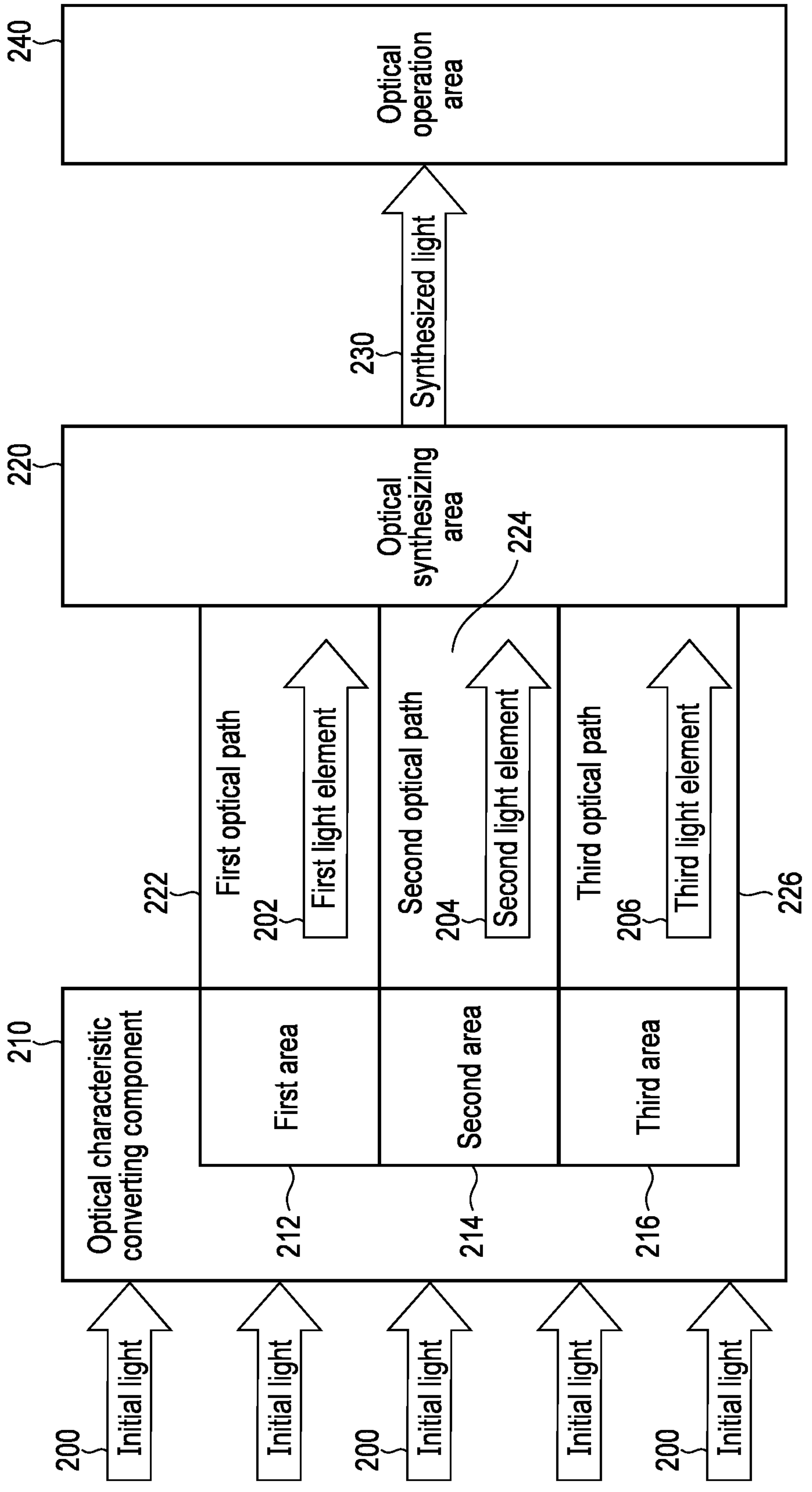
FIG. 4 is an explanatory diagram of the basic principle of optical processing according to the present embodiment.

FIG. 4 shows a basic principle of optical functions in the present embodiment. That is, a first light element 202 having a first optical characteristic is formed in a first optical path 222 and a second light element 204 having a second optical characteristic is formed in a second optical path 224. Thereafter, the first light element 202 and the second light element 204 are synthesized in an optical synthesizing area 220 to form synthesized light 230. Here, at least part of the first optical path 222 and the second optical path 224 is arranged in a different spatial location. Furthermore, the first optical characteristic of the first light element 202 and the second optical characteristic of this second light element 204 are different from each other. In addition, not limited to this, a third light element 206 having a third optical characteristic may further be formed in a third optical path 226. In this case, at least part of this third optical path 226 may be arranged in a different spatial location than the first optical path 222 and the second optical path 224.

Here, as a method of arranging at least part of the first optical path 222, the second optical path 224, and the third optical path 226 in different spatial locations, each light 202 to 206 may be individually extracted by performing wavefront division with respect to initial light 200. That is, each area 212 to 216 is arranged at a different location on an optical cross section of the incident initial light 200 (a plane obtained by cutting a light flux configured by the initial light 200 along a plane perpendicular to a propagation direction of the initial light 200) or on a wavefront of the initial light 200, and each of the lights 202 to 206 is individually extracted.

The above technical method will be explained again from the viewpoint of the structure of an optical characteristic converting component 210 that realizes the original optical function. That is, the optical characteristic converting component 210 used in the present embodiment includes the first area 212 and the second area 214 that differ from each other. Controllable parameters 280 indicating the characteristics of each of the areas 212 and 214 are different from each other. Therefore, the first light element 202 after passing through the first area 212 and the second light element 204 after passing through the second area 214 have different optical characteristics from each other. Furthermore, the optical characteristic converting component 210 has a spatial structure that facilitates synthesizing the first light element 202 and the second light element 204 to form the synthesized light 230 at the optical synthesizing area 220.

As a specific example of the spatial structure that facilitates synthesizing the first light element 202 and the second light element 204 to form the synthesized light 230, the optical characteristic converting component 210 may have a structure that divides the incident initial light 200 into respective light elements 202 and 204 by performing wavefront division. That is, the optical characteristic converting component 210 may have a spatial structure in which the first area 212 is arranged in a predetermined area within a cross section of light flux obtained by cutting the light flux along a plane perpendicular to the propagation direction of the incident initial light 200. The spatial structure may be such that the second area 214 is arranged in another area within the above cross section of light flux. However, it is not limited to this method; therefore, as other methods, the initial light 200 may be subject to amplitude division or intensity division.

As another application example, the structure may be such that the third area 216 is further provided within the optical characteristic converting component 210, and the third light element 206 that has passed through this third area 216 is extracted.

An optical operation area 240 in FIG. 4 includes the light application object 20 in FIG. 1, the display 18, the measurer 8, and the applications 60.

FIGS. 5 and 6 lists and describes optical characteristics to be controlled 252 by the optical characteristic converting component 210 described in FIG. 4 and a location 258 of the above optical characteristic converting component 210 in the present embodiment.

Among control items 250 in FIGS. 5 and 6, first, the optical characteristics to be controlled 252 by the optical characteristic converting component 210 are described. According to category 260 of the optical characteristics to be controlled 252, the optical characteristics to be controlled 252 by the optical characteristic converting component 210 can be categorized into "light intensity profile control of initial light 200", "optical phase profile (wavefront profile) control of initial light 200", and "optical phase synchronizing control". Examples 270 of the optical characteristic converting component 210 corresponding to each category 260 and the controllable parameters 280 for each example 270 are described below. It is known that one of optical disturbance noise phenomenon is optical interference noise. And there are two types of the optical interference noise. One type of the optical interference noise is based on temporal coherence of the initial light 200. And other type of the optical interference noise is based on spatial coherence of the initial light 200. When the optical characteristic converting component 210 gives "optical phase synchronizing control" to the initial light 200, a degree of temporal coherence of the synthesized light 230 is reduced. Here, the present embodiment may use an optical path length varying component as the optical characteristic converting component 210. In the meantime, a degree of spatial coherence of the synthesized light 230 is reduced when the optical characteristic converting component 210 gives "optical phase profile (wavefront profile) control" to the initial light 200.

In the optical characteristic converting component 210 described in the present embodiment, the incident initial light 200 is subject to wavefront division or amplitude division/intensity division, and the optical characteristics are controlled by changing values of the controllable parameters 280 for each divided light.

In a case where a slit or a pinhole to vary optical transmittance/reflectance is used as a specific optical characteristic converting component 210 that controls the light intensity distribution within the cross section of light flux of the initial light 200, the optical characteristics are controlled by changing the pitch, slit width, and pinhole size.

In a case where a transmissible/reflective gradation providing optical component is used as another example 270, gradation characteristics of its transmittance and reflectance are controlled. In addition, not limited to this, the mode of light propagating in a waveguide can also be controlled by controlling the light intensity distribution of light entering the waveguide (this example is described below using FIG. 8).

In a case where the light intensity distribution within the cross section of light flux of the initial light 200 is controlled by other methods, the transmittance value or reflectance value may control light intensity distribution.

As described above, at least one of diffuser, diffraction grating, hologram, wave aberration generating components, and a flat plate having different surface levels (planar stage surfaces) has a function to decrease spatial coherence (to reduce the degree of spatial coherence) of synthesized light 230. In a case where a diffuser is used as a specific optical characteristic converting component 210 to control the optical phase profile or wavefront profile within the initial light 200, not only an averaged roughness "Ra" of the surface and an averaged pitch "Pa" of surface roughness, but also positive/negative pitches of prescribed Fourier element obtained when the surface roughness is Fourier transformed and the ratio of vertical amplitude with respect to the pitch may be controlled.

In a case where a diffraction grating or hologram is used, the pitch and the width ratio between the top and bottom surfaces may be controlled. In many cases, diffraction gratings and holograms are configured by two planes parallel to each other (in blazed gratings, one plane is tilted), which configure the top and bottom surfaces, respectively. However, not limited to this, the number of planar stages can be varied. The result of theoretical analysis described in Chapter 3 implies that increasing the number of planar stages tends to improve the reduction effect of at least one of optical noise and coherence.

In a case of using various wave aberration generating components, the optical design of a converging lens may be changed, or the bending direction of the converging lens may be changed. It is also known that spherical aberration occurs when a parallel plate with a large thickness is placed in the middle of a converging optical path of light, and coma aberration occurs when a tilting flat plate or a non-parallel flat plate is placed. Therefore, the optical characteristics can be controlled by changing the thickness of the above parallel plate, a tilt angle, and an angle between the planes in the non-parallel flat plate.

When a flat plate having different surface levels (planar stage surfaces) with a level difference "t" in the cross section of light flux of the initial light 200 is placed in the middle of the optical path, an optical path length difference of "(n−1) t" is generated. Here, "n" represents a refractive index of the flat plate having different surface levels. A phase difference corresponding to this optical path length difference is then generated. In this case, the optical characteristics can be controlled by changing the level difference values of the plate surface (level difference of flat plate thickness).

In addition, not limited to this, the optical phase profile (wavefront profile) can also be controlled by changing the wavefront profile after transmission or reflection in some way.

As described in detail below in Chapter 3 using FIG. 16, the optical phase synchronizing characteristic can be controlled by using an optical path length varying component as the optical characteristic converting component 210. In this case, the optical path length generated within the optical path length varying component may be larger than the coherence length described below in Equation 1.

As the location 258 of the optical characteristic converting component 210 described above in the present embodiment, the optical characteristic converting component 210 may be placed on a light converging plane, an image pattern forming plane, an aperture plane, or a near field area 170 thereof. In addition, not limited to this, as another embodiment, it may be placed in a far field area 180, which is distant from the above light converging plane or image pattern forming plane.

In the present embodiment, a Fraunhofer diffraction area that is far away from the above light converging plane, image pattern forming plane, or aperture plane is referred to as the far field area 180. On the other hand, an area closer than a Fresnel diffraction area, which is located closer than the far field area 180, is referred to as the near field area.

For a more specific explanation, the diameter of the cross section of light flux or the length of one side of a square aperture of the initial light 200 is defined as "D", and the direction of light propagation of the initial light 200 is taken as a "z-axis". A specific wavelength included in the initial light 200 is represented by "$\lambda_0$".

In this case, according to the diffraction theory, the Fresnel diffraction area is said to be within the range of "$-D^2/\lambda_0 \le z \le +D^2/\lambda_0$". Therefore, the above range will also be defined as the near filed area 170 in the present embodiment. On the other hand, the range of "$|z|>+D^2/\lambda_0$" is known as the Fraunhofer diffraction area. Therefore, the above range will also be defined as the far field area 180 in the present embodiment.

By the way, in a case where the initial light 200 is divergent light having a divergence angle "θ", the size of the cross section of light flux increases when the light is far away from the light converging plane, image pattern forming plane, or aperture plane, and measurement by the measurer 8 becomes impossible. The present embodiment is based on the premise that measurement is possible by the measurer 8. Therefore, in the present embodiment, the upper limit value of the far field area 180 is also defined.

In a case where the value of the cross section size "D" on the light converging plane, image pattern forming plane, or aperture plane is relatively small, the cross section size with respect to a distance "z" from the light converging plane, image pattern forming plane, or aperture plane is approximated by "2zNA". By the way, in a vacuum, it is defined as "NA=2 sin θ". Therefore, detected light intensity at the distance of "z" is reduced to "$D^2/4NA^2z^2$" with respect to the detected light intensity on the light converging plane, image pattern forming plane, or aperture plane. Therefore, in the present embodiment, "$D^2/\lambda_0<|z|<1\times10^8D^2/4NA^2$" is defined as the range of the far field area 180, taking into consideration the upper limit value of the distance "z" corresponding to the far field area 180. Furthermore, considering the measurement accuracy of the measurer 8, it is preferable to specify "$D^2/\lambda_0<|z|<1\times10^4D^2/4NA^2$" as the range of the far field area 180.

According to the diffraction theory of optics, in a case where the position of the above light converging plane, image pattern forming plane, or aperture plane coincides with a focal plane of the converging lens, it is known that a field area near a pupil plane of the converging lens or field near the aperture plane of the converging lens corresponds to the far field area 180 with respect to the above light converging plane or image pattern forming plane. Therefore, in the present embodiment, the "far field area 180" includes not only the above numerical range but also the location of the field area near the pupil plane of the converging lens or the field area near the aperture plane of the converging lens.

The overview of the present embodiment is described in FIGS. 5 and 6. Next, a specific embodiment is described using FIG. 7 to FIG. 15. In order to clarify the correspondence between the contents of each drawing in FIG. 7 to FIG. 15 and the category 260 and the location 258 of the optical characteristic converting component 210 shown in FIGS. 5 and 6, a symbol 290 is set for each example 270 and the location 258 of the optical characteristic converting component 210 within FIGS. 5 and 6.

Figure 7:
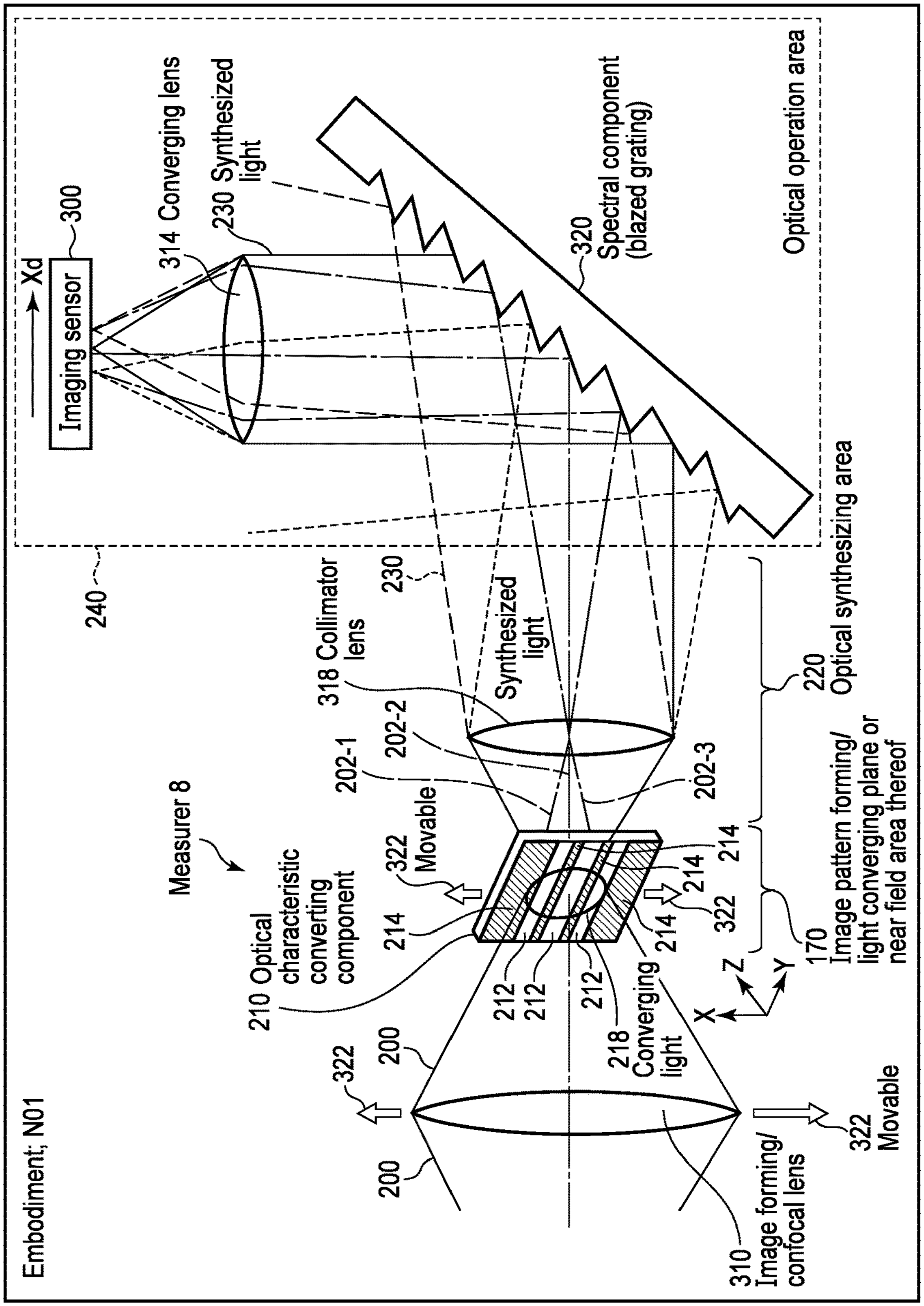
FIG. 7 is an explanatory diagram of an example of performing control of light intensity distribution on or near an image pattern forming/light converging plane.

FIG. 7 shows a specific embodiment example corresponding to embodiment "N01" with respect to the list in FIGS. 5 and 6. Herein, the embodiment "N01" represents a combination between the symbol "N" and the symbol "01" in FIGS. 5 and 6. The symbol "N" indicates a location 258 of optical characteristic converting component 210. Especially the symbol "N" shows a location at light converging plane/image forming plane or near field area thereof 170. The symbol "01" indicates an example 270 of optical characteristic converting component 210. Especially the symbol "01" shows a slit/pinhole to vary optical transmittance/reflectance. That is, in FIG. 7, a slit placed on the light converging plane, the image pattern forming plane/aperture plane, or a near field area 170 thereof is utilized as the optical characteristic converting component 210 to control the light intensity distribution here.

A light transmission area within the slit corresponds to the first area 212. A light-shielding area within the slit corresponds to the second area 214. In FIG. 7, light transmission (first area) within the slit is utilized for selective extraction of first light elements 202-1 to 202-3 included in the initial light 200 toward the optical synthesizing area 220. However, not limited to this, partial reflection of light may be utilized to selectively extract light toward the optical synthesizing area 220.

The first light elements 202-1 to 202-3 that have passed through each first area 212 become parallel lights after passing through a collimator lens 318. The area before and after passing through the collimator lens 318 is then utilized as the optical synthesizing area 220. Each of the first light elements 202-1 to 202-3 synthesized at this optical synthesizing area 220 forms the synthesized light 230.

As the optical operation area 240, in FIG. 7, a combination of a spectral component (blazed grating) 320, a converging lens 314, and an imaging sensor 300 configures an imaging unit of a hyperspectral camera used in the field of imaging spectrum. In order to expand the imaging field of view, an image forming/confocal lens 310 or the optical characteristic converting component 210 (slit) is movable 322 in an X direction. Note that the measuring technique using this imaging spectrum is described below in detail using FIG. 37 and FIG. 38.

The embodiment of the optical operation area 240 when using the specific embodiment example corresponding to embodiment "N01" is not limited to FIG. 7, but can adopt an embodiment of the optical operation area 240 corresponding to any application set in the applications 60 in FIG. 2.

Figure 8:
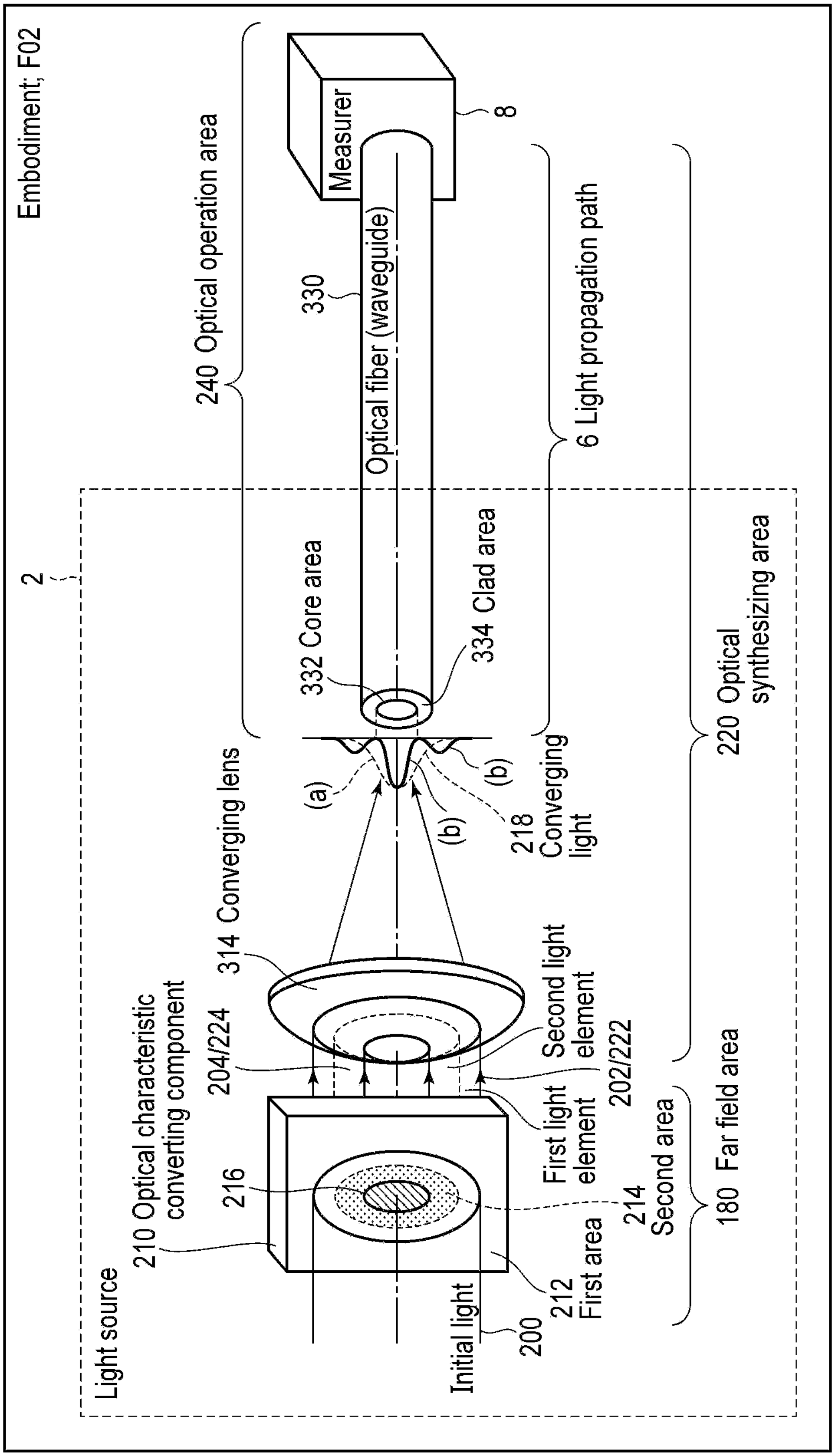
FIG. 8 is an explanatory diagram of an example of performing control of light intensity distribution in a far field.

FIG. 8 shows a specific embodiment example corresponding to embodiment "F02" with respect to the list in FIGS. 5 and 6.

That is, in FIG. 8, the optical characteristic converting component 210 is placed in the far field area 180 to control the intensity distribution (light intensity distribution) of the cross section of light flux obtained by cutting in a plane perpendicular to the propagation direction of the initial light 200.

Since the first area 212 in the optical characteristic converting component 210 does not shield light (has a light transmittance of approximately "100%"), the initial light 200 passing through the first area 212 travels straight. On the other hand, in the third area 216, since the light transmittance is set to approximately "0%", the initial light 200 that reaches the area is shielded. Furthermore, in the second area 214, the light transmittance varies depending on the passing location.

The intensity distribution of converging light 218 obtained after converging light by the converging lens 314 can be changed from the intensity distribution in (a) to the intensity distribution in (b) by inserting the optical characteristic converting component 210 with the above characteristics.

When a converging position of the converging light 218 formed by the converging lens 314 is aligned with the entrance surface of an optical fiber (waveguide) 330, it is possible to optimize the mode control of the light propagating in the optical fiber (waveguide) 330 by controlling the light intensity distribution based on the above optical characteristic converting component 210.

In FIG. 8, as a specific example of the optical operation area 240 in FIG. 4, an example of the light propagation path 6 (FIG. 1) in which the optical fiber (waveguide) 330 and the measurer 8 are combined is configured. The embodiment of the optical operation area 240 when using the specific embodiment example corresponding to embodiment "F02" is not limited to FIG. 8, but can adopt an embodiment of the optical operation area 240 corresponding to any application set in the applications 60 in FIG. 2.

Figure 9:
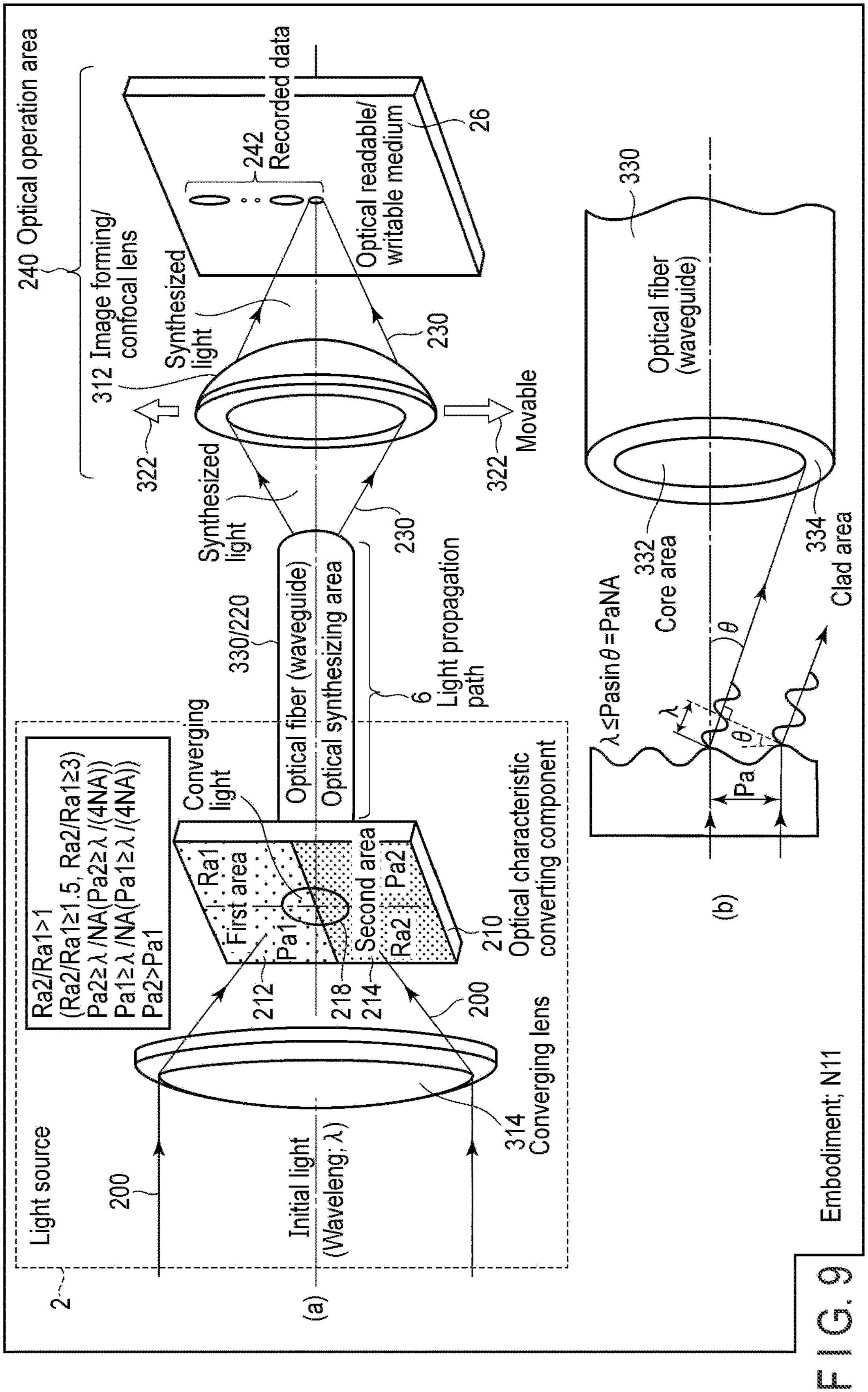
FIG. 9 is an explanatory diagram of one example of performing control of an optical phase profile on or near an image pattern forming/light converging plane.

Portion (a) in FIG. 9 shows a specific embodiment example corresponding to embodiment "N11" with respect to the list in FIGS. 5 and 6. That is, in portion (a) in FIG. 9, a diffuser is placed as the optical characteristic converting component 210 at a converging position of the converging light 218 made of the initial light 200 that is converged by the converging lens 314 (on the light converging plane or on the image pattern forming plane) to control the optical phase profile (wavefront profile) with respect to the converging light 218. The first/second light elements 202 and 204 that pass through this diffuser then enter the optical fiber (waveguide) 330. Thus, in the specific embodiment shown in portion (a) in FIG. 9, the inside of the optical fiber (waveguide) 330 serves as the optical synthesizing area 220. Furthermore, this optical fiber (waveguide) 330 also serves as the light propagation path 6 that directs the synthesized light 230 to an arbitrary location.

In portion (a) in FIG. 9, a specific example of the optical operation area 240 described in FIG. 4 is shown, where the synthesized light 230 passes through an exit surface of the optical fiber (waveguide) 330 (optical synthesizing area 220) and a movable 322 image forming/confocal lens 312 converges the synthesized light 230 onto a surface of the optical readable/writable medium 26. Therefore, the synthesized light 230 can form recorded data 242 on the optical readable/writable medium 26. And the collected information manager 74 of applications 60 described in FIG. 2 may utilize the optical readable/writable medium 26 having recorded data 242. However, without being limited thereto, an embodiment of the optical operation area 240 corresponding to any application set in the applications 60 in FIG. 2 can be adopted.

Here, the controllable parameters 280 for the diffuser control the characteristics between the first area 212 and the second area 214 with the various setting values described in the list in FIGS. 5 and 6. For example, in the case of varying an averaged roughness "Ra1" in the first area 212 and an averaged roughness "Ra2" in the second area 214, to achieve the effect described below in Chapter 3, condition "$Ra2/Ra1>1$" must be satisfied. Based on actual experimental results, the effect is further improved when condition "$Ra2/Ra1\geq 1.5$" is satisfied. It is also desirable to satisfy condition "$Ra2/Ra1\geq 3$".

Portion (b) in FIG. 9 shows an allowable maximum incident angle "θ" of light that can propagate in a core area 332 of the optical fiber (waveguide) 330. When the allowable maximum incident angle of light that can propagate in the core area 332 is expressed as "θ", the value of "$NA=\sin\theta$" is defined for each optical fiber (waveguide) 330. Therefore, it is necessary to set the incident angle of light entering the optical fiber (waveguide) 330 to be equal to or less than "NA value" defined for each optical fiber (waveguide) 330.

Therefore, in a case where the optical characteristic converting component 210 that controls the optical phase profile (wavefront profile) is placed near the incident surface of the optical fiber (waveguide) 330, it is necessary to consider the above incident angle range to the optical fiber (waveguide) 330.

In a case where the diffuser is used as the optical characteristic converting component 210 that controls the optical phase profile (wavefront profile), "$Pa\geq\lambda/NA$" must be satisfied as a condition to be satisfied by an averaged pitch "Pa" on the diffuser surface. Here, "λ" represents the wavelength of light propagating in the optical fiber (waveguide) 330. Similarly, in a case where the diffraction grating or hologram is used, "$Pa\geq\lambda/NA$" must be satisfied for the pitch "Pa" of the diffraction grating or hologram. Furthermore, if condition "$Pa\geq\lambda/(4NA)$" is satisfied, the performance becomes more stable.

In portion (a) in FIG. 9, in the case where the averaged pitches "Pa1" and "Pa2" on the diffuser surfaces are varied between the first area 212 and the second area 214 to achieve the effect described later in Chapter 3, condition "$Pa2/Pa1>1$" must be satisfied. For the above reasons, it is also necessary to set the condition to "$Pa1\geq\lambda/NA$" and "$Pa2\geq\lambda/NA$". Furthermore, if conditions "$Pa1\geq\lambda/(4NA)$" and "$Pa2\geq\lambda/(4NA)$" are satisfied, the performance becomes more stable.

Note that the inside of the optical characteristic converting component 210 (diffuser) shown in the embodiment example in portion (a) in FIG. 9 is divided into the two areas of the first area 212 and the second area 214. However, not limited to this, the inside of the optical characteristic converting component 210 (diffuser) may be divided into three or more areas or four or more areas.

In the optical characteristic converting component 210 shown in the embodiment example in portion (a) in FIG. 9, the first area 212 and the second area 214 are configured by diffusers with different controllable parameters 280. However, the first area 212 and the second area 214 do not necessarily have to be configured by the same diffuser. That is, within the same optical characteristic converting component 210, other specific examples 270 for controlling the optical phase profile (wavefront profile) may be combined. For example, within the same optical characteristic converting component 210, the first area 212 may be configured by a diffuser and the second area 214 may be configured by a diffraction grating/hologram.

Figure 10:
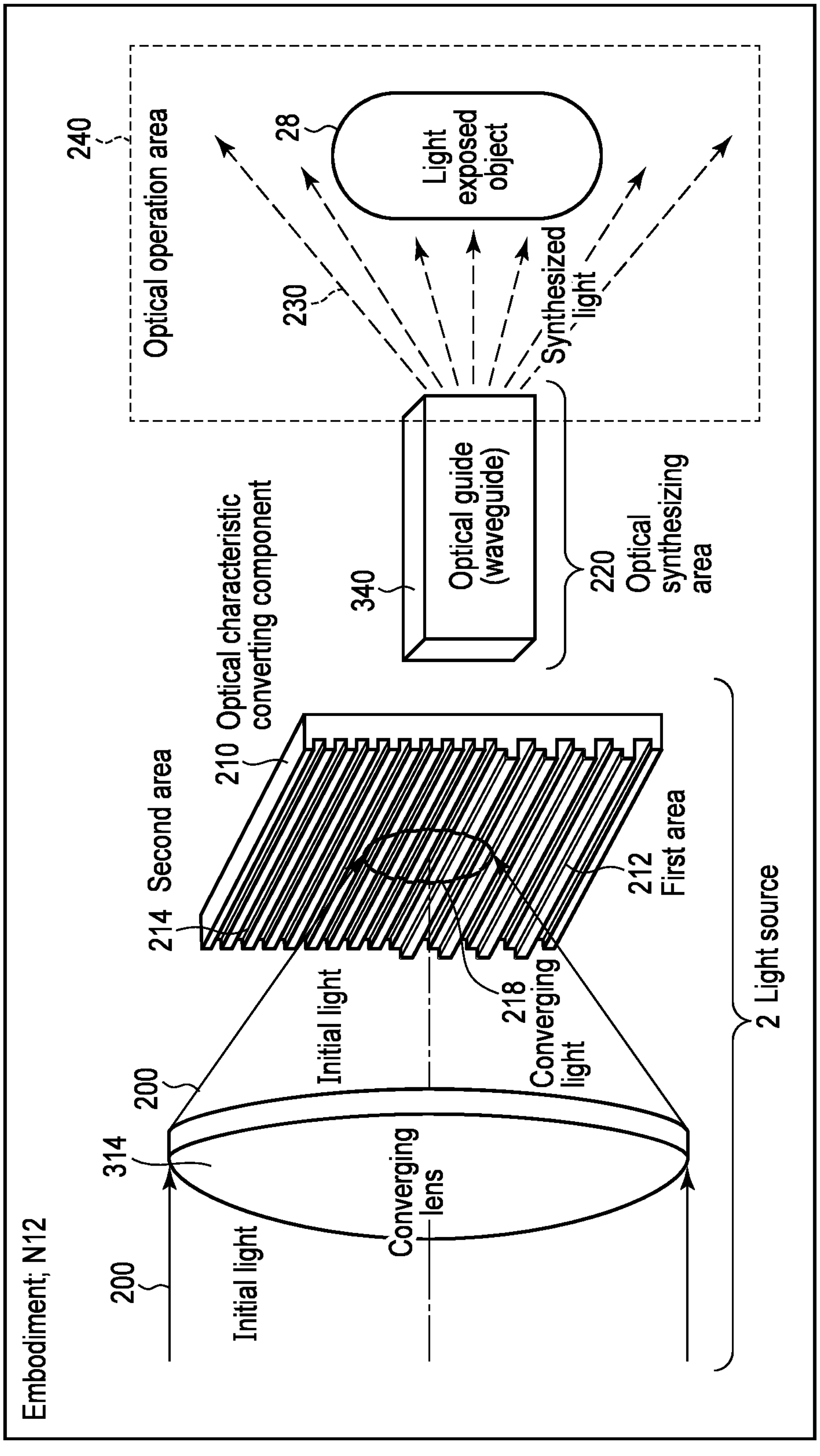
FIG. 10 is an explanatory diagram of another example of performing control of an optical phase profile on or near an image pattern forming/light converging plane.

FIG. 10 shows a specific embodiment example corresponding to embodiment "N12" with respect to the list in FIGS. 5 and 6. A diffraction grating or hologram may be used as a kind of the optical characteristic converting component 210 to control the optical phase profile (wavefront profile). That is, in FIG. 10, the converging lens 314 converges the initial light 200, and a diffraction grating or hologram is placed at the converging position of the converging light 218 (on the light converging plane or on the image pattern forming plane).

Between the first area 212 and second area 214 in the optical characteristic converting component 210 in FIG. 10, the number of level differences in the plane, the pitch (cycle) of level differences, and the duty between the top surface and the bottom surface are varied. When a diffraction grating or hologram is used as the optical characteristic converting component 210, a diffraction angle may exceed the "NA value" of the optical fiber (waveguide) 330 described above. As a countermeasure, in FIG. 10, an optical guide (waveguide) 340 capable of obtaining a large "NA value" is used.

In FIG. 10, as a specific example of the optical operation area 240 in FIG. 4, an illumination system that irradiates the synthesized light 230 emitted from the optical guide (waveguide) 340 onto a light exposed object 28 is configured. However, without being limited thereto, an embodiment of the optical operation area 240 corresponding to any application set in the applications 60 in FIG. 1 can be adopted.

As shown in portion (b) in FIG. 9 and FIG. 10, in the case where the diffuser or the diffraction grating/hologram is used as the specific example 270 of the optical characteristic converting component 210 that controls the optical phase profile (wavefront profile), diffraction light is generated in accordance with the periodicity along the surface direction of the optical characteristic converting component 210 (for example, the averaged pitch "Pa" of surface roughness). The present embodiment utilizes the generation of such diffraction light to control the optical phase profile (wavefront profile) with respect to the initial light 200.

Figure 11:
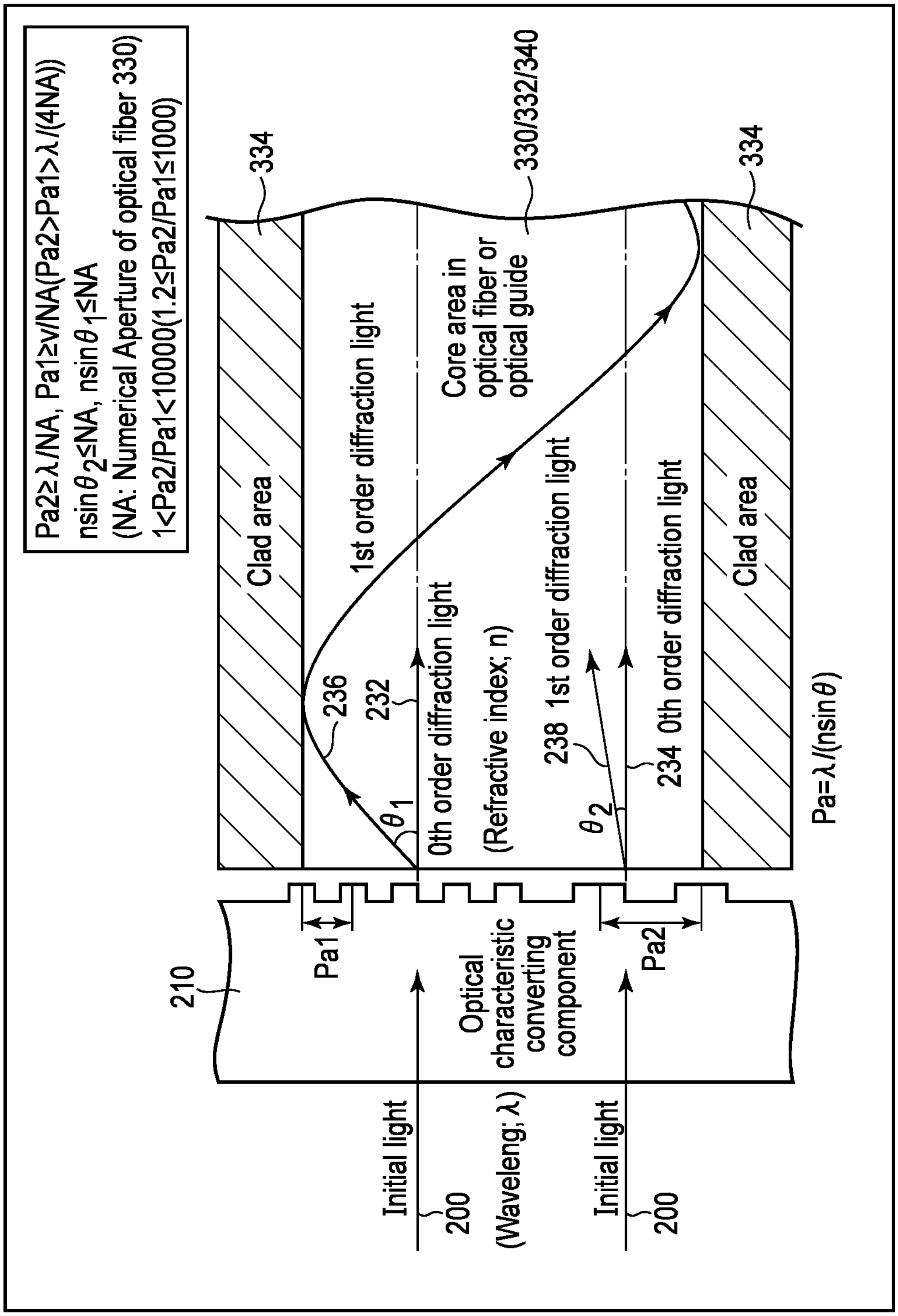
FIG. 11 is an explanatory diagram of an example of a method of generating a phase difference utilizing a difference in optical paths within an optical synthesizing area.

FIG. 11 describes an example of a method for generating a phase difference utilizing the optical path difference within the optical guide 340 or within the core area 332 of the optical fiber 330 utilized as the optical synthesizing area 220. 0th order diffraction lights 232 and 234 with respect to the surface of the optical characteristic converting component 210 travel straight along the propagation direction of the initial light 200. On the other hand, 1st order diffraction lights 236 and 238 generated by periodic roughness of the surface of the optical characteristic converting component 210 travel in the direction of angles "$\theta_1$" and "$\theta_2$" in the optical guide 340 or in the core area 332 of the optical fiber 330.

By the way, the propagation angles "$\theta_1$" and "$\theta_2$" at which the 1st order diffraction lights 236 and 238 change depending on the pitch or the averaged pitch "Pa1" in the first area 212 and the pitch/averaged pitch "Pa2" in the second area 214 in the optical characteristic converting component 210. Therefore, as shown in FIG. 11, when the pitch or averaged pitches "Pa1" and "Pa2" are changed in the first area 212 and in the second area 214, the optical path lengths of the 1st order diffraction lights 236 and 238 change when passing through the optical guide 340 or the core area 332 of the optical fiber 330. Therefore, in the present embodiment, the value of "Pa2/Pa1" must exceed "1" ($1<Pa2/Pa1$), and, furthermore, the relationship of "$1.2\leq Pa2/Pa1$" is desirable.

As described using portion (b) in FIG. 9, relational formula of "$Pa1=\lambda/n \sin\theta_1$" and "$Pa2=\lambda/n \sin\theta_2$" are defined based on the angles "$\theta_1$" and "$\theta_2$" and the pitches "Pa1" and "Pa2". Here, "n" indicates a refractive index within the optical guide 340 or within the core area 332 of the optical fiber 330. Therefore, if "Pa2" is too large, "$\theta_2\approx 0$" is established, and no optical path difference occurs between the 0th order diffraction light 234 and 1st order diffraction light 238.

On the other hand, as a condition for the 1st order diffraction light 236 to stay within the core area 332 of the optical fiber 330, it is necessary to ensure "$Pa1\geq\lambda/NA$" (preferably, "$Pa1\geq\lambda/(4NA)$"). (From the above condition of "$1<Pa2/Pa1$", it is inevitable that the conditions of "$Pa2\geq\lambda/NA$" and "$Pa2\geq\lambda/(4NA)$" be satisfied.) For the above reasons, it is necessary to set an upper limit for the value of "Pa2/Pa1".

In summary, in the present embodiment, the condition for the value of "Pa2/Pa1" is set to "$1<Pa2/Pa1<10000$" (preferably, "$1.2\leq Pa2/Pa1\leq 1000$").

Figure 12:
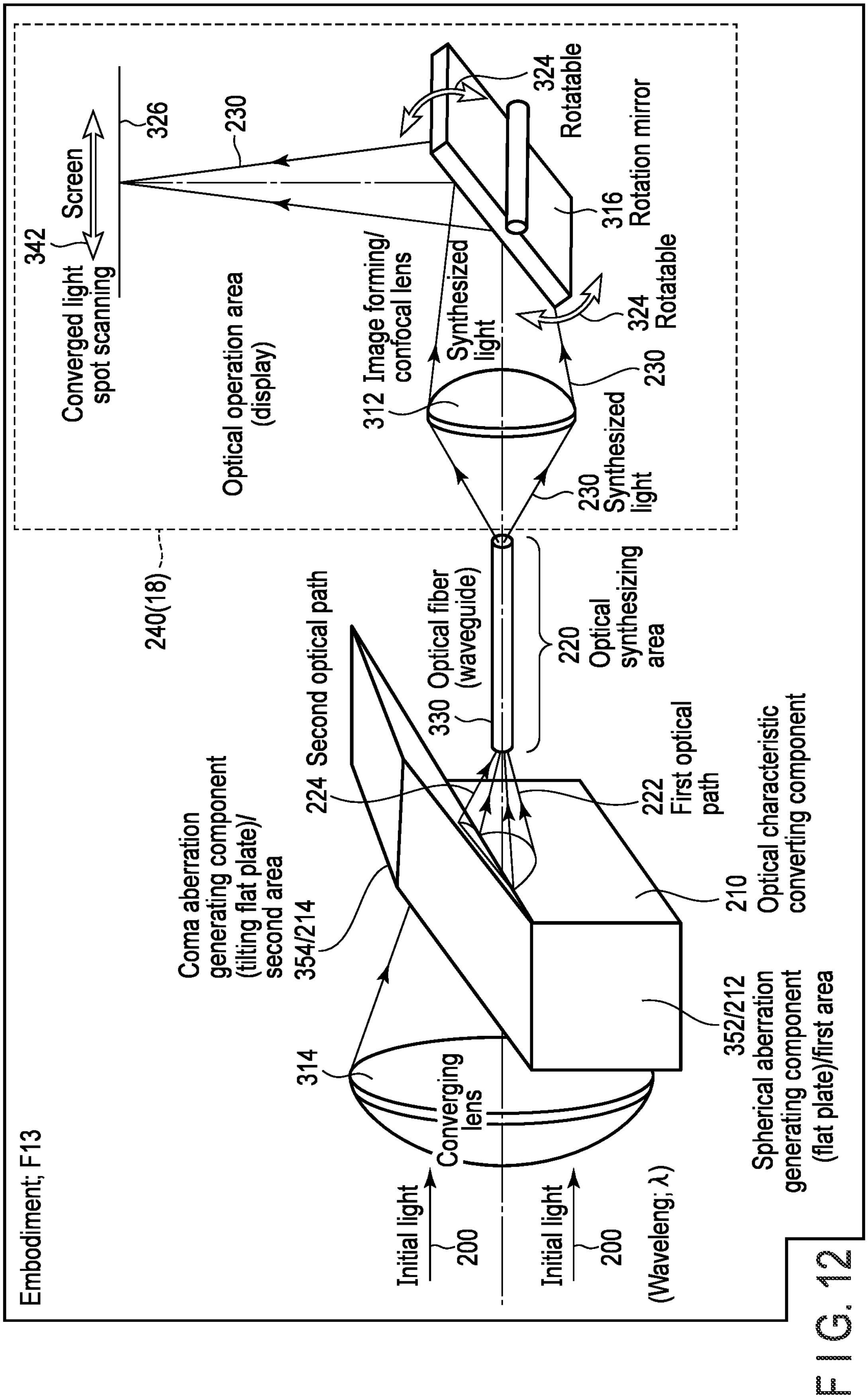
FIG. 12 is an explanatory diagram of an example of generating aberrations in a far field.

FIG. 12 shows a specific embodiment example corresponding to embodiment "F13" with respect to the list in FIGS. 5 and 6.

A phenomenon has already been explained in which spherical aberration occurs when a thick flat plate is placed in the middle of a light converging path using the converging lens 314, and coma aberration occurs when a tilting flat plate is placed. Therefore, in the specific example shown in FIG. 12, various aberrations are generated by placing the optical characteristic converting component 210 within the far field area 180. That is, a spherical aberration generating component 352 using a flat plate is placed as the first area 212 within the optical characteristic converting component 210. In the second area 214, a coma aberration generating component 354 using a tilting flat plate is placed. In FIG. 12, the spherical aberration generating component 352 using the flat plate and the coma aberration generating component 354 using the tilting flat plate are integrally formed. However, without being limited thereto, the spherical aberration generating component 352 and the coma aberration generating component 354 using the tilting flat plate may be separated.

When aberration is generated by this method, if the amount of aberration is too small, the control of the optical phase profile (wavefront profile) will not be effective. Conversely, if the amount of aberration is too large, light will not be converged, and light will not enter the optical fiber (waveguide) 330. Therefore, in the present embodiment, the range of RMS (root mean square) value of the wavefront aberration to be generated is set between $0.5\lambda$ and $100\lambda$ (preferably, between $0.3\lambda$ or more and $1000\lambda$ or less).

In FIG. 12, as a specific example of the optical operation area 240 in FIG. 4, a rotatable 324 rotation mirror 316 is placed in the middle of the optical path where the synthesized light 230 is converged on a screen 326 by the image forming/confocal lens 312, enabling a converged light spot scanning 342 on the screen 326. In this manner, the function of the display 18 (FIG. 1) is achieved. However, without being limited thereto, an embodiment of the optical operation area 240 corresponding to any application set in the applications 60 in FIG. 2 can be adopted.

Figure 13:
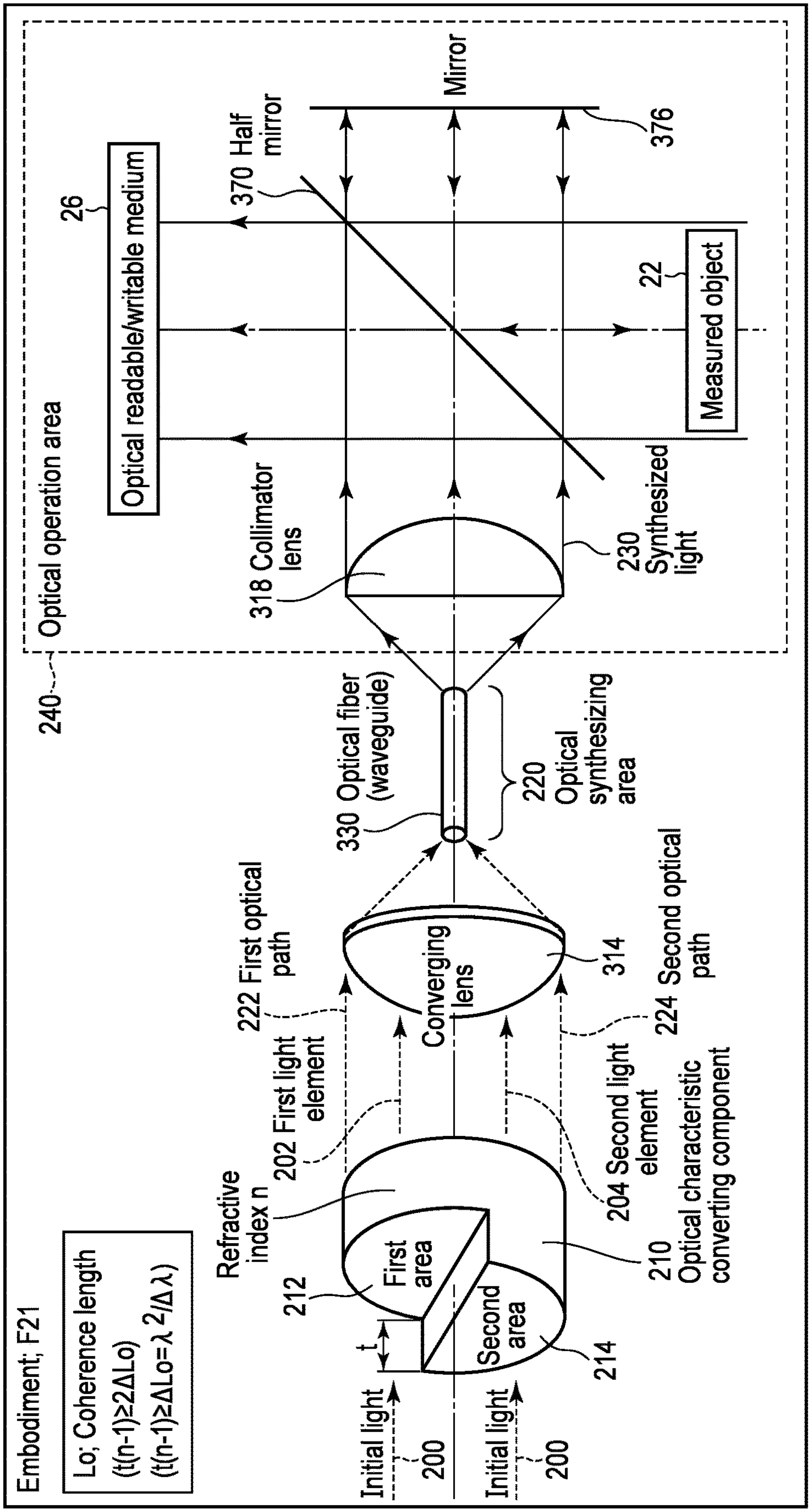
FIG. 13 is an explanatory diagram of an example of performing control of an optical phase synchronizing characteristic in a far field.

FIG. 13 shows a specific embodiment example corresponding to embodiment "F21" with respect to the list in FIGS. 5 and 6. That is, an optical path length varying component is placed in the far field area 180 of the initial light 200 (for example, in the middle of the path of a parallel light) to control an optical phase synchronizing characteristic as the optical characteristic converting component 210. The optical characteristic converting component 210 (optical path length varying component) is formed of a transparent medium having refractive index "n".

The first area 212 and the second area 214 in the optical characteristic converting component 210 have a thickness difference "t" with respect to the propagation direction of the initial light 200. As a result, an optical path length difference of "$t(n-1)$" occurs between the first area 212 and the second area 214. The thickness difference "t" is adjusted so that this value becomes greater than or equal to coherence length "$\Delta L_0$" as described later in Equation 1. Furthermore, setting "$t(n-1)\geq 2\Delta L_0$" as the numerical value above will further improve the effect.

In FIG. 13, the optical path of the first light element 202 passing through the first area 212 to the converging lens 314 corresponds to the first optical path 222. Similarly, the optical path of the second light element 204 passing through the second area 214 to the converging lens 314 corresponds to the second optical path 224. The converging lens 314 then converges the first light element 202 and the second light element 204 together toward the entrance surface of the optical fiber (waveguide) 330.

By the first light element 202 and the second light element 204 being passed together through the optical fiber (waveguide) 330, they are synthesized to form the synthesized light 230. Thus, the interior of the optical fiber (waveguide) 330 acts as the optical synthesizing area 220.

FIG. 13 shows an example of using the optical fiber (waveguide) 330 as the optical synthesizing area 220. However, without being limited thereto, the optical guide (waveguide) 340 may also be used as the optical synthesizing area 220. Furthermore, as described in FIG. 7, an area where the first optical path 222 and the second optical path 224 spatially overlap may also be used as the optical synthesizing area 220.

The entrance surface and exit surface of the optical fiber (waveguide) 330 or the optical guide (waveguide) 340 generally have an optical planar shape. In the present embodiment, instead of the optical planar shape, the entrance surface or exit surface of the optical fiber (waveguide) 330 or the optical guide (waveguide) 340 may have an unpolished roughness (diffuser surface structure or diffraction grating structure). The entrance surface or exit surface of the optical fiber (waveguide) 330 or the optical guide (waveguide) 340 will then have the function of a diffuser or diffraction grating/hologram described as the specific example 270 in FIGS. 5 and 6. As a result, the entrance surface or exit surface of the optical fiber (waveguide) 330 or the optical guide (waveguide) 340 can also serve the function of controlling the optical phase profile (wavefront profile), without having to add a new optical characteristic converting component 210. In this case, since both the optical phase synchronizing characteristic and optical phase profile (wavefront profile) of the initial light 200 can be controlled simultaneously, optical noise reduction effect and coherence reduction effect are further improved. Furthermore, it is possible to simplify the internal structure of the light source 2 and reduce the cost.

An effective roughness in the case where the entrance surface or exit surface of the optical fiber (waveguide) 330 or the optical guide (waveguide) 340 has an unpolished roughness is described below. First, a case in which an unpolished roughness is formed in a diffraction grating or hologram structure is explained. The amount of mechanical level differences between the top and bottom surfaces of the diffraction grating or hologram structure is expressed by "t", and the refractive index in the optical guide (waveguide) 340 or in the core area 332 of the optical fiber (waveguide) 330 is expressed by "n". Then, by the above mechanical level difference, an optical path length difference of "t(n−1)" is generated. In the present embodiment, the effect appears when the difference in optical path length is "λ/16" or more. Here, when the value of the wavelength "λ" is "400 nm" and "n≈1.5", "t≥λ/16(n−1)≈50 nm" is obtained. Therefore, if an amplitude value of the unpolished roughness has a value of "50 nm" or more, the effect described later in Chapter 3 is produced.

On the other hand, if the amplitude value of the unpolished roughness is too large, the stability of control is impaired. Specifically, if the optical path length difference is equal to or greater than "1000λ≈4 mm", the stability of control is impaired. Also, since the optical path length difference is given by "t(n−1)", it is desirable that the maximum value of the mechanical amplitude that allows the unpolished roughness is "8 mm" or less.

In a case where the unpolished roughness is configured by the roughness of the diffuser surface, it is expressed by the averaged roughness "Ra" instead of the maximum amplitude value. Considering the results of the above discussion, when the range of the "Ra value" of the unpolished roughness formed on the entrance surface or the exit surface of the optical fiber (waveguide) 330 or the optical guide (waveguide) 340 is capable of achieving "50 nm≤Ra≤8 mm" (preferably, "13 nm≤Ra≤2 mm"), the effect described below in Chapter 3 can be achieved.

As a specific example of the optical operation area 240 in FIG. 4, FIG. 13 describes an example of an optical system for performing hologram recording on the optical readable/writable medium 26 with respect to a measured object 22. That is, the synthesized light 230 coming out of the optical fiber (waveguide) 330 is converted to parallel light by the collimator lens 318, and reference light reflected by a mirror 376 and reflected light from the measured object 22 are combined by a half mirror 370. The obtained combined light is then irradiated onto the optical readable/writable medium 26 to perform hologram recording. However, without being limited thereto, an embodiment of the optical operation area 240 corresponding to any application set in the applications 60 in FIG. 2 can be adopted.

Figure 14:
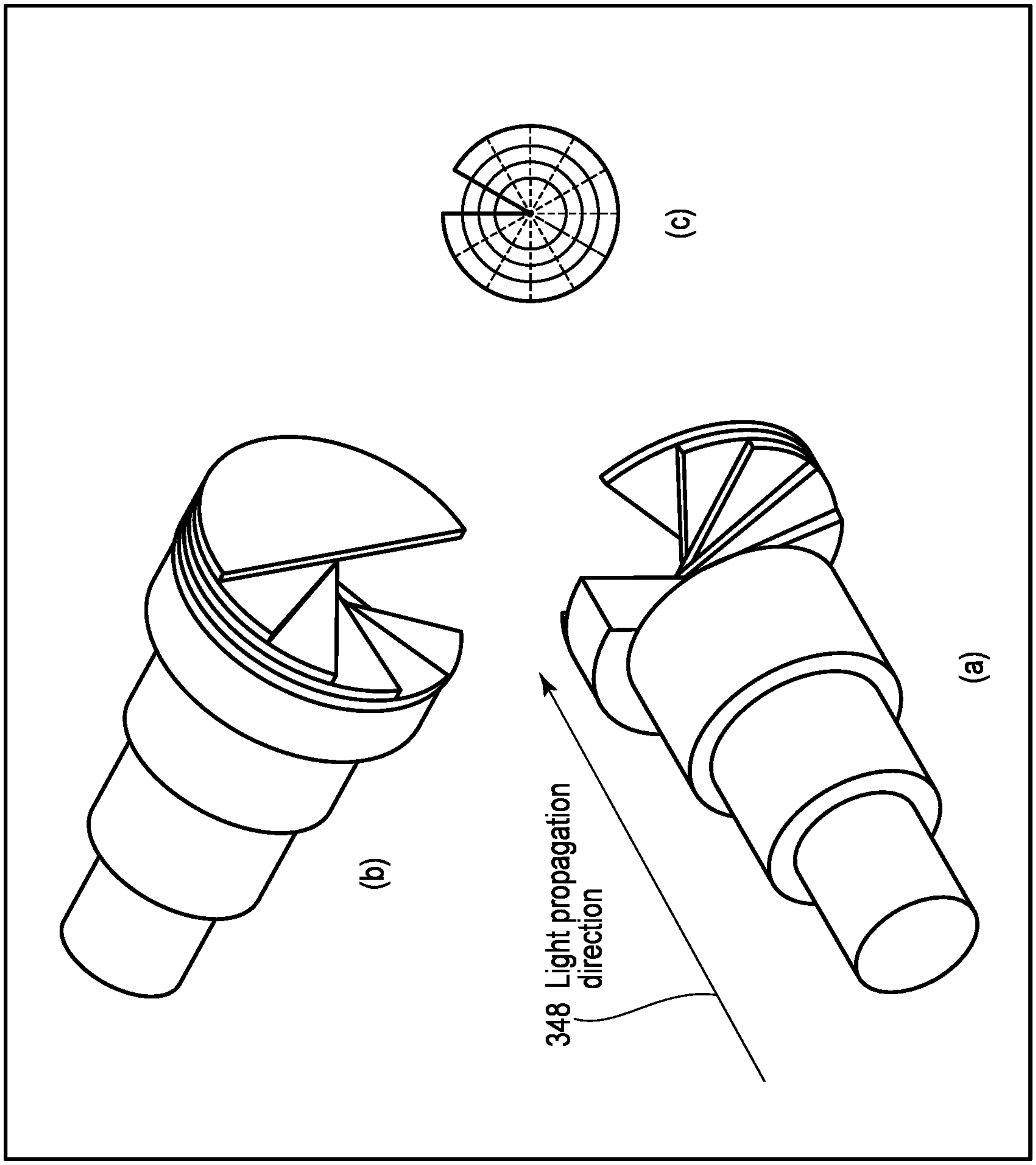
FIG. 14 is a diagram explaining another embodiment of an optical characteristic converting component performing control of an optical phase synchronizing characteristic.

FIG. 14 shows one embodiment example relating to an optical path length varying component (optical characteristic converting component 210 that controls the optical phase synchronizing characteristic) structure. Portion (a) in FIG. 14 is a view from a direction along a propagation direction 348 of the initial light 200. Portion (b) in FIG. 14 is a view from an opposite direction of the propagation direction 348 of the initial light 200.

Portion (c) in FIG. 14 is a view from a cross-sectional direction perpendicular to the propagation direction 348 of the initial light 200. As shown in portion (c) in FIG. 14, the structure is designed to divide the initial light 200 into 48 areas (12 areas regarding angular division×four areas regarding radial division) by wavefront division. That is, a method of dividing the cross section of light flux of the initial light 200 into 12 in an angular direction and four in a radial direction is combined.

As a method of dividing the cross section of light flux into 12 in the angular direction, five semicircular transparent plates having a thickness of "1 mm" are adhered while being sequentially rotated by "30 degrees" each. And then one semicircular transparent plate having a thickness of "6 mm" is additionally adhered. The cross section of light flux is divided into four in the radial direction by adhering cylinders of different radii having a thickness of "12 mm" together while aligning their center positions. As a result, the total thickness amount of each area varies by "1 mm". In the present embodiment, the variation in the total thickness of each area is set to "1 mm". However, without being limited thereto, the variation in the total thickness of each area may be set to other values.

Figure 15:
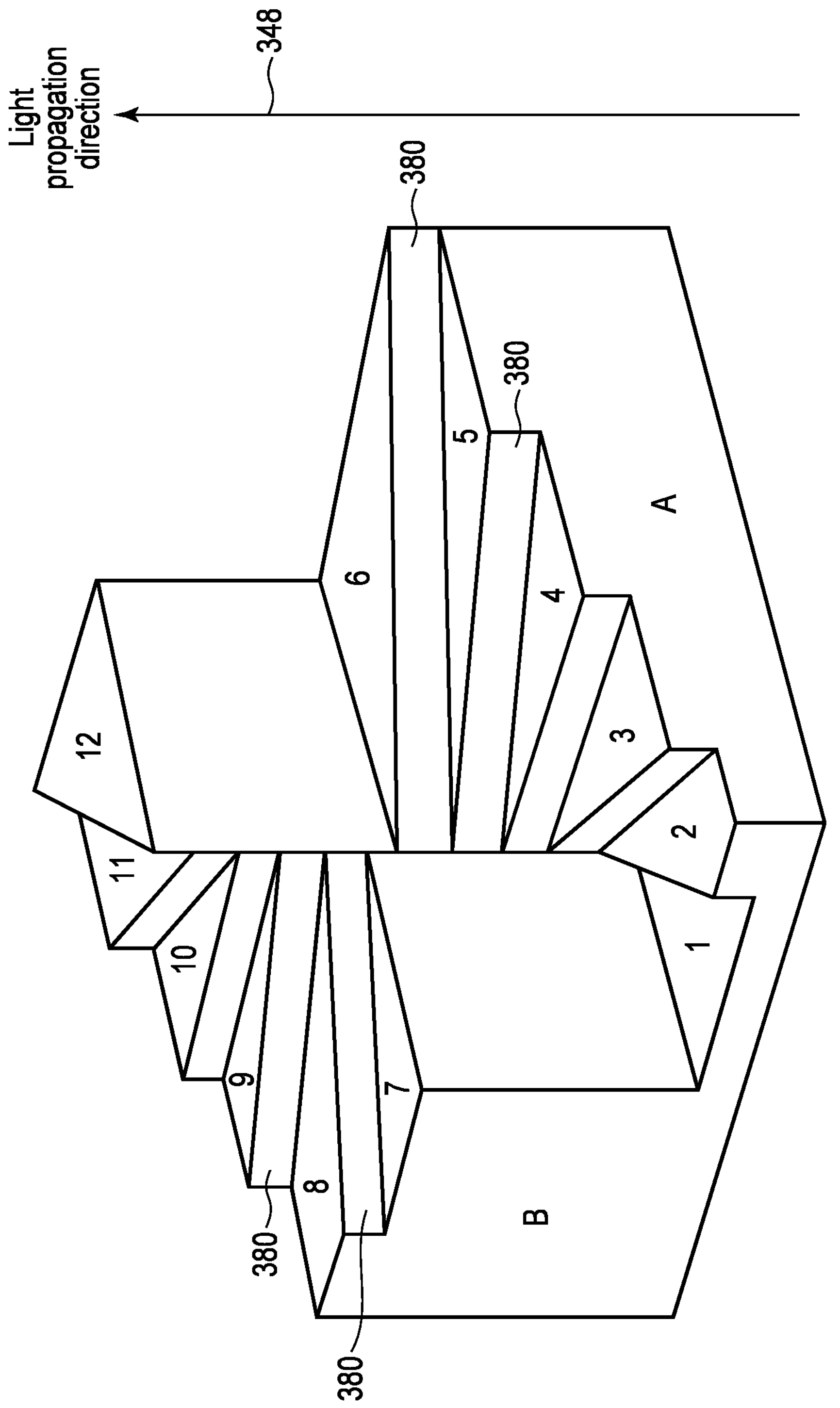
FIG. 15 is a diagram explaining an application example of the optical characteristic converting component performing control of the optical phase synchronizing characteristic.

FIG. 15 shows an application example relating to the optical path length varying component (optical characteristic converting component 210 that controls the optical phase synchronizing characteristic) structure. In FIG. 15, as in FIG. 14, the optical path length varying component is formed of a transparent material, and the initial light 200 passes through it. The structure is designed to divide the cross section of light flux of the initial light 200 passing through into 12 in the angular direction (angular division). When viewed in the light propagation direction 348 of the initial light 200, the thickness varies from "1 mm" to "12 mm" in "1 mm increments".

In the structure in FIG. 15, the number of boundary surfaces arranged along the light propagation direction 348 of the initial light 200 that passes through is designed to be "two boundary surfaces each", which is the minimum number of boundary surfaces. If the plane accuracy of the boundary surface at the interface between a transparent medium area and an air (or vacuum) area configuring the optical path length varying component is low (worse), the wavefront accuracy of the light after passing through the interface will deteriorate. Therefore, by setting the number of boundary surfaces to the minimum number, it is possible to reduce the deterioration of the wavefront accuracy of the light after passing through the optical path length varying component.

Furthermore, in the structure in FIG. 15, side surfaces 380 of different levels between each area in the optical path length varying component (that is, side surfaces of a boundary line where the thickness changes in the optical path length varying component) are all visible from a specific direction (a direction perpendicular to surface B). In other words, all side surfaces 380 between different planar stage surfaces simultaneously face to the specific direction (a direction perpendicular to surface B). With this structure, the manufacturability of the optical path length varying component is improved, and the cost of the optical path length varying component can be reduced.

FIG. 15 shows the structure of the optical path length varying component (optical characteristic converting component 210 that controls the optical phase synchronizing characteristic); however, it may also be serve the function of controlling the optical phase profile (wavefront profile) at the same time. That is, at least one of the boundary surfaces (different planar stage surfaces) arranged in the direction perpendicular to the light propagation direction 348 of the initial light 200 may be not optically planar structure (an unpolished rough surface). As an example 270 described in FIGS. 5 and 6 of this unpolished rough structure, a diffuser structure or a diffraction grating/hologram structure may be provided. The boundary surface (planar stage surfaces) thereby has the function of controlling the optical phase profile (wavefront profile). This allows a single optical component to control both the optical phase synchronizing characteristic and the optical phase profile (wavefront profile), thereby improving the optical noise reduction effect and coherence reduction effect. Furthermore, the entire optical system can be simplified and made less expensive.

As described above, a "transparent" optical characteristic converting component 210 (optical path length varying component) has at least two (two or more) boundary surfaces along the propagation direction 348 of the initial light 200. Here, all boundary surfaces exist at the interface positions between a transparent medium area and an air (or vacuum) area. And one of the boundary surfaces corresponds to an entrance boundary surface for the propagation direction 348 of the initial light 200, and another boundary surface corresponds to an exit boundary surface. According to FIG. 15, the entrance boundary surface for the propagation direction 348 of the initial light 200 corresponds to the bottom flat surface, and the exit boundary surface comprises plural planar stage surfaces (steps). It is desirable that the exit boundary surface has the unpolished rough structure and the entrance boundary surface has polished flat structure. Because the initial light 200 can straightly passes through the inside (transparent medium area) of the "transparent" optical characteristic converting component 210 (optical path length varying component) when the entrance boundary surface has polished flat structure and the exit boundary surface has the unpolished rough structure. On the contrary, the initial light 200 unfortunately tends to change into divergent light in the inside (transparent medium area) of the "transparent" optical characteristic converting component 210 (optical path length varying component) when the entrance boundary surface has the unpolished rough structure and the exit boundary surface has polished flat structure.

In the case of providing the unpolished rough structure on the boundary surface in this manner, the content described using FIG. 13 can also be applied as an effective size range of the rough structure. That is, as the effective size range of the rough structure in this case, the maximum amplitude value of the level difference can be defined as "50 nm or more and 8 mm or less". On the other hand, when expressing an average value "Ra" of the surface roughness, if "50 nm≤Ra≤8 mm" (preferably, "13 nm≤Ra≤2 mm") is achieved, the effect described below in Chapter 3 can be achieved.

FIG. 15 shows that the initial light 200 passes through the inside (transparent medium area) of the "transparent" optical characteristic converting component 210 (optical path length varying component). However, not limited to this, the unpolished rough structure having plural planar stage surfaces (steps) may "reflect" the initial light 200. In the case of reflecting the initial light 200, the initial light 200 may come from an upward area in FIG. 15 to the unpolished rough planar stage surfaces (steps). And the reflected light (plural light elements 202 to 206) may diverge toward an upward area in FIG. 15. The light reflection of the unpolished rough structure having plural planar stage surfaces (steps) has an original effect to make an optical system smaller.

[Chapter 3: Overview of Basic Concepts of Present Embodiment and Explanation of Demonstration Experiment Results and Theoretical Analysis Results]

According to FIGS. 5 and 6, an optical path length varying component may be used as the optical characteristic converting component 210 when a present embodiment aims to achieve the "optical phase synchronizing control". Here, FIG. 13 to FIG. 15 show examples of the optical path length varying component (optical characteristic converting component 210). The "optical path length varying component" generates an optical path length difference between the first optical path 222 and the second optical path 224 (see FIG. 4). Here, the first optical path 222 corresponds to the first area 212 through which the first light element 202 passes, and the second optical path 224 corresponds to the second area 214 through which the second light element 204 passes. The optical cross section of the initial light 200 may be divided into the first light element 202 and the second light element 204 by wavefront division in the first area 212 and the second area 214. The division is not limited to this wavefront division, and the initial light 200 may be divided into the first light element 202 and the second light element 204 by utilizing, for example, amplitude division or intensity division.

Figure 17:
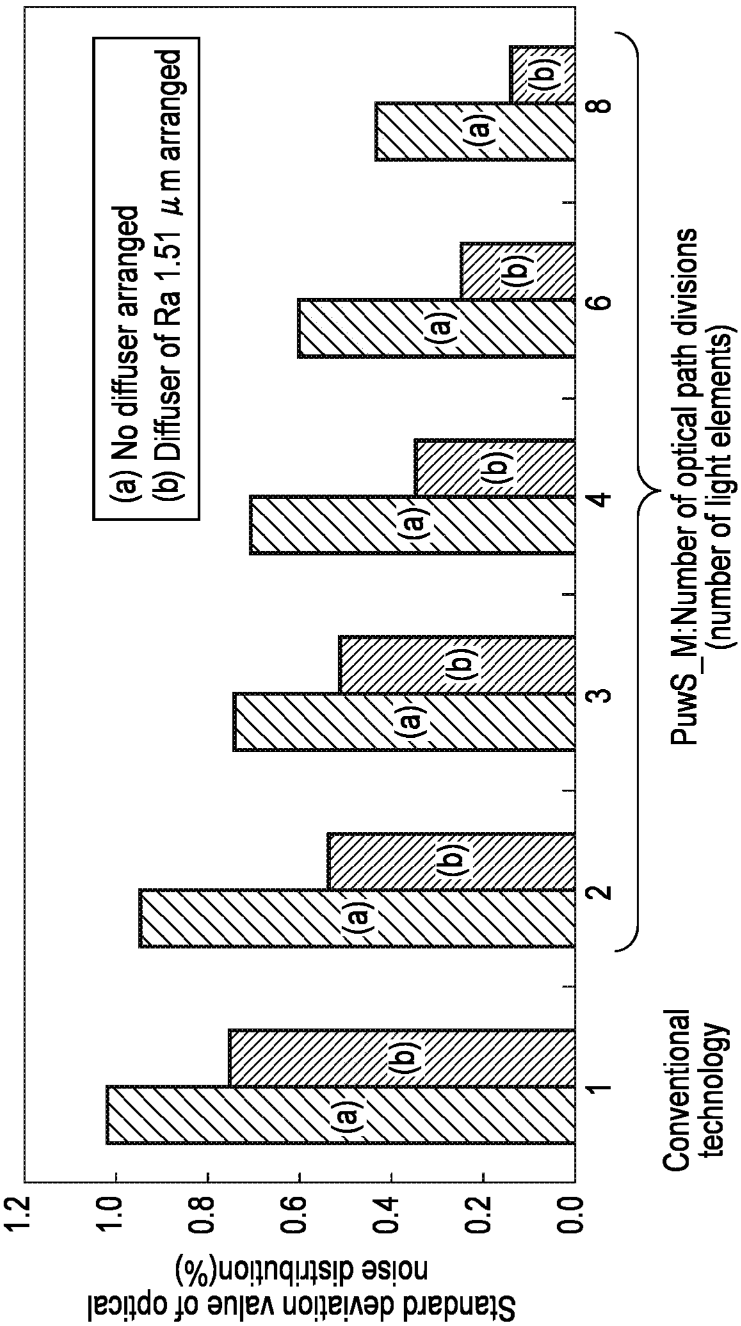
FIG. 17 is an explanatory diagram of an effect of the optical path length varying component reducing noise in a spectral profile.

Furthermore, but not limited to this, an optical path length difference may also be generated between the third optical path 226 and the aforementioned first optical path 222 (or the aforementioned second optical path 224). Here, the optical characteristic converting component 210 may have additionally the third area 216 providing the third optical path 226, and the third light element 206 passes through the third area 216. As an application example thereof, the optical path length difference may also be generated for each of four or more areas, not limited to three areas. In the present embodiment, optical noise is significantly reduced by technically devising the above optical path length difference to be larger than the coherence length described below in Equation 1. The basic concept of the present embodiment is as follows. That is, by synthesizing the above first light element 202 and the above second light element 204 at the optical synthesizing area 220, an ensemble averaging effect is generated between the optical noise generated in the above first light element 202 and the optical noise generated in the above second light element 204. The above ensemble averaging effect is further enhanced when the third light element 206 or even more light elements are further synthesized. FIG. 17 shows experimental results in which the optical noise is reduced as the number of wavefront divisions (number of area divisions or optical path divisions) increases (see below for details).

Figure 16:
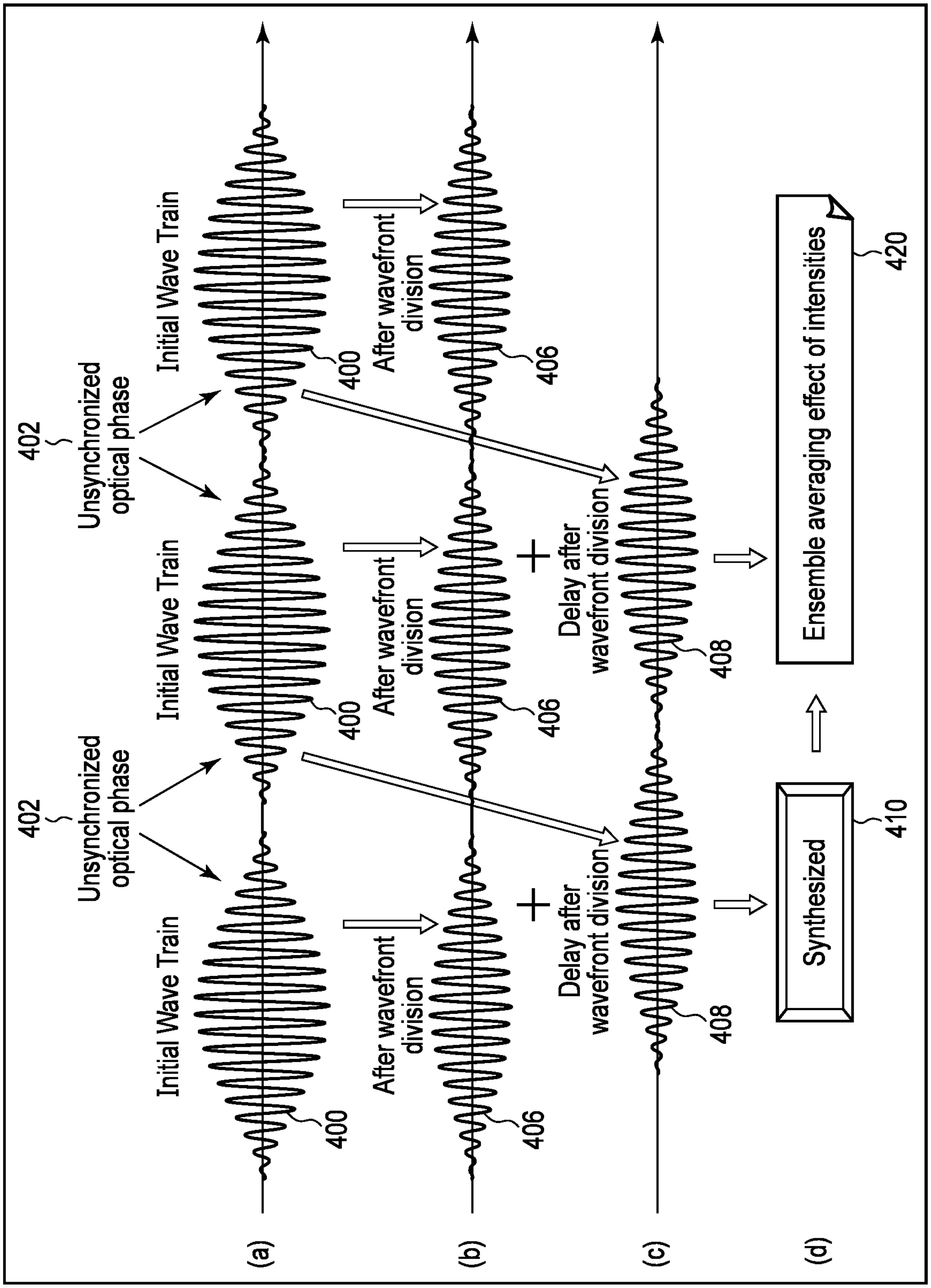
FIG. 16 is an explanatory diagram of the principle of an optical path length varying component performing control of an optical phase synchronizing characteristic.

FIG. 16 is an explanatory diagram showing this basic concept schematically. In general, it is known that laser light has a "single wavelength". Therefore, it was easy to think that "the envelope of an electric field amplitude is uniform everywhere" along the propagation direction 348 of the laser light. However, there is not always a case in which all laser lights have "zero" width of wavelength completely. For example, there are many commercially available laser diodes having a wavelength width (spectral bandwidth) "Δλ" of about "2 nm". When spatially propagating light has a prescribed wavelength width (spectral bandwidth) "Δλ", it is known that the spatially propagating light forms Wave Train 400. And if a center wavelength of the spatially propagating light is "$\lambda_0$", a size of Wave Train 400 along the corresponding light propagation direction 348 relates to a coherence length "$\Delta L_0$" shown as follows.

$$\Delta L_0 = \lambda_0^2/\Delta\lambda \quad \text{Equation 1}$$

Profile (a) in FIG. 16 shows a figure of Wave Trains 400 spatially propagating along the corresponding light propagation direction 348. Wave Train 400 has maximum amplitude of electric field at the center position. And electric field amplitude of Wave Train 400 reduces far away from the center position. That is, the envelope of the electric field amplitude along the light propagation direction 348 is considered to repeatedly increase and decrease as shown in profile (a) in FIG. 16 not only in general light (panchromatic light described later) such as white light or fluorescent light (for example, emitted from a thermal light source), but even in laser light with a narrow wavelength width (spectral bandwidth) "Δλ". It is believed that a phase of preceding initial Wave Train 400 is unsynchronized 402 with another phase of succeeding initial Wave Train 400.

The initial light 200 incident in the form of continuously generated initial Wave Trains 400 shown in profile (a) in FIG. 16 undergoes wavefront division when it passes through the optical characteristic converting component 210, so that the optical characteristic converting component 210 controls the optical phase synchronizing characteristic. Profile (b) in FIG. 16 shows a spatial propagation state (Wave Train state 406) of the first light element 202 that passed through the first area 212 in the optical characteristic converting component 210 shown in FIG. 3. Since the first light element 202 was extracted as a result of the wavefront division for the initial light 200, the amplitude in profile (b) in FIG. 16 is smaller than the amplitude in profile (a) in FIG. 16. Therefore, profile (b) in FIG. 16 shows the first light element 202 obtained after wavefront division 406.

Profile (c) in FIG. 16 shows the spatial propagation state of the second light element 204 extracted after passing through the second area 214 (Wave Train state 408). The amplitude in profile (c) in FIG. 16 is almost the same as that in profile (b) in FIG. 16, but there is an optical path length difference between them. Therefore, in profile (b) in FIG. 16 and profile (c) in FIG. 16, the center positions of the Wave Trains 406 and 408 are shifted. In other words, profile (c) in FIG. 16 shows the second light element 204 delayed after wavefront division 408 because the optical path length difference occurs between the first area 212 and the second area 214 included in the optical path length varying component (optical characteristic converting component 210).

A portion (d) in FIG. 16 shows a situation where both Wave Trains 406 and 408 are synthesized 410 at the optical synthesizing area 220 to form the synthesized light 230. In a case where the optical path length difference between them is larger than the coherence length (or a double value of the coherence length) shown in Equation 1, the Wave Trains 406 and 408 having the unsynchronized optical phase 402 relation with each other are synthesized. And light intensity of the first light element 202 and light intensity of the second light element 204 are simply added in the optical synthesizing area 220 shown in FIG. 4. Accordingly, an ensemble averaging effect of intensities 420 occurs between the optical noise generated in the first light element 202 and the optical noise generated in the second light element 204. And the ensemble averaging effect of intensities 420 reduces originally optical interference noise.

Light with a wide wavelength range (wavelength width (spectral bandwidth) "Δλ") contained in the light propagating in space is referred to as "panchromatic light". On the other hand, light with a narrow wavelength range (wavelength width (spectral bandwidth) "Δλ") is referred to as "monochromatic light". Although the wavelength range (wavelength width (spectral bandwidth) "Δλ") of panchromatic light is different from the wavelength range (wavelength width (spectral bandwidth) "Δλ") of monochromatic light, the coherence length "$\Delta L_0$" can be defined as shown in Equation 1 since both types of light have respective wavelength widths (spectral bandwidths) "Δλ" and respectively central wavelength values "$\lambda_0$". Therefore, the ensemble averaging effect of the above optical noise can be obtained for both the panchromatic light and the monochromatic light.

As a result of this ensemble averaging effect, not only "improvement of detection accuracy (optical S/N ratio)" and "improvement of measurement accuracy (optical S/N ratio)" but also "improvement of durability to optical disturbances" can be achieved in the (desirable) optical characteristic items 102 required for each optical application field shown in FIG. 3.

It was explained above that controlling the optical phase synchronizing characteristic makes it possible to reduce optical noise. However, as shown in FIGS. 5 and 6, the present embodiment is not limited thereto and can also provide the (desirable) optical characteristics (FIG. 3) required for each optical application field by using the control of the light intensity distribution and optical phase profile (wavefront profile) in addition. Furthermore, in the present embodiment, the "control of optical phase synchronizing characteristic" and the "control of optical phase profile (wavefront profile)" may be combined.

Based on FIGS. 5 and 6, the diffuser is one of the specific examples 270 of the optical characteristic converting component that can realize control of the optical phase profile (wavefront profile). FIG. 17 shows experimental results relating to the effect of optical interference noise reduction when a diffuser 488 is used. In the experiment to obtain FIG. 17, a diffuser with an averaged roughness "Ra" of 2.08 μm was placed in the middle of the optical path, and optical noise was artificially generated. A spectral profile was measured by a spectrometer placed in the measurer 8 (FIG. 1), and a relative standard deviation value (value normalized by the average value of spectral detection) of the amount of optical noise generated within the measurement wavelength range of 1.45 μm to 1.65 μm was calculated. A vertical axis in FIG. 17 represents the relative standard deviation values corresponding to the amount of optical noise.

Profile (a) in FIG. 17 shows optical noise characteristics in a case where the diffuser is not placed. Profile (b) in FIG. 17 shows the optical noise characteristics when the diffuser 488 with an averaged roughness "Ra" of 1.51 μm is placed inside the light source 2 (for example, at the location of the diffuser 488 in FIG. 25). As shown in the "conventional technology" on the left end in FIG. 17, by simply inserting the diffuser 488 alone (profile (b) in FIG. 17), optical noise is reduced compared to the conventional method (profile (a) in FIG. 17).

In FIG. 17, the area where the number of optical path divisions (the value of PuwS_M) is two or more shows the effect in the case of using a combination of the control of optical phase synchronizing characteristic and the control of optical phase profile (wavefront profile). Profile (a) in FIG. 17 within this area shows the state of optical noise reduction when the diffuser 488 is not used, and only the control of optical phase synchronizing characteristic is performed (that is, in a case where only the optical path length varying component is placed in the middle of the optical path). Profile (a) of FIG. 17 within this area also shows that the amount of optical noise is reduced as the number of area divisions where optical path length differences occur (number of wavefront divisions or number of optical path divisions, the value of PuwS_M) increases. Profile (a) in FIG. 17 suggests that the optical path length varying component (optical characteristic converting component 210) decreases the degree of temporal coherence of the synthesized light 230. Furthermore, in profile (b) in FIG. 17, which is obtained by combining the diffuser 488 that controls the optical phase profile (wavefront profile), the amount of optical noise is reduced more than in profile (a) in FIG. 17. Especially the diffuser has a specific function to reduce spatial coherence of the initial light 200. In other words, the diffuser decreases the degree of spatial coherence of the synthesized light 230. Therefore, profile (b) in FIG. 17 suggests that a degree of total coherence of the synthesized light 230 corresponds to a multiplication value between the degree of temporal coherence and the degree of spatial coherence.

Figure 18:
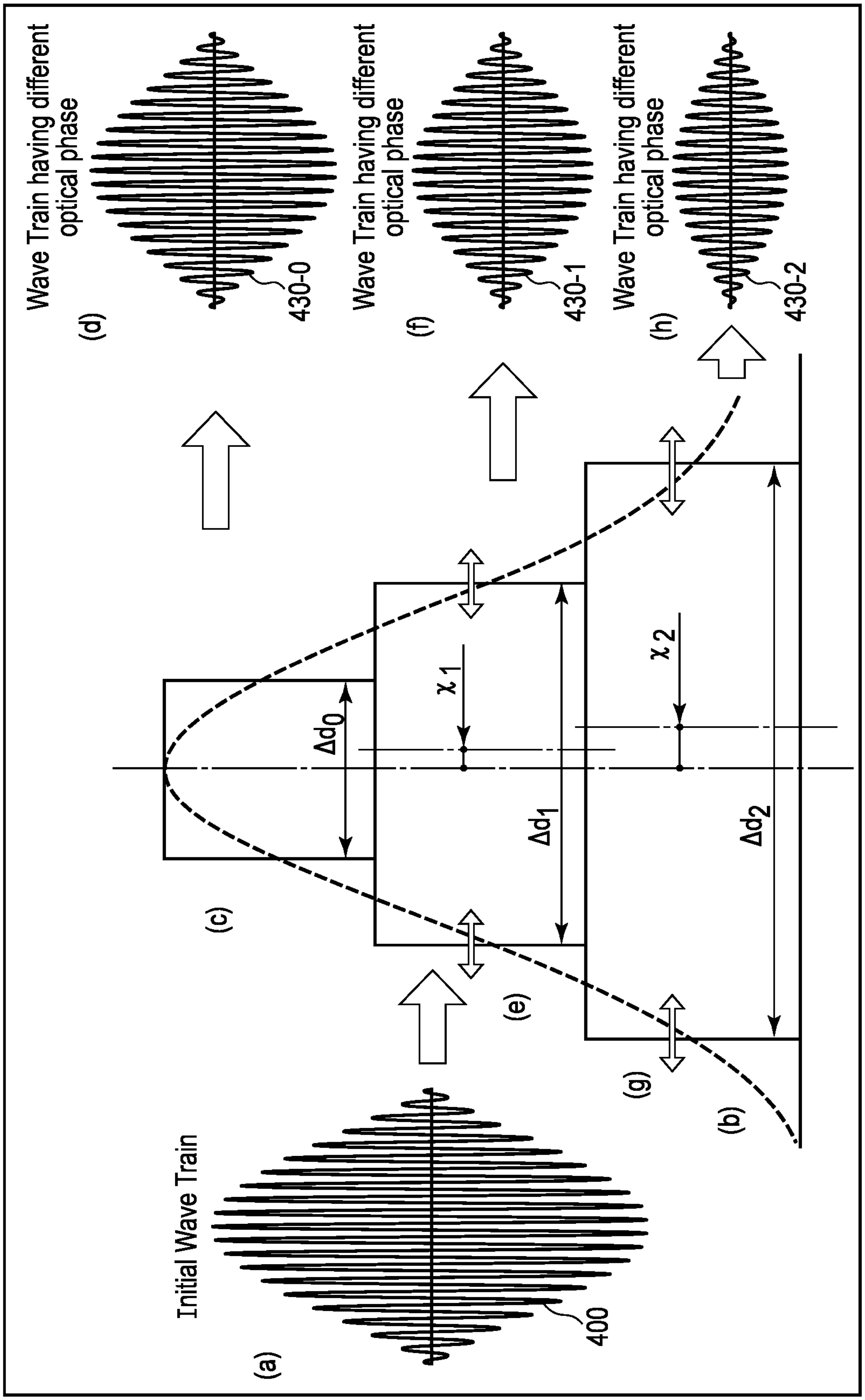
FIG. 18 is an explanatory diagram of the principle of generating a plurality of Wave Trains with different optical phases when passing through a diffuser.

FIG. 18 takes the diffuser as an example and shows the mechanism of reducing the amount of optical noise using the control of optical phase profile (wavefront profile). FIG. 18 corresponds to a part of FIG. 4. The initial light 200 in FIG. 4 forms initial Wave Train 400 in FIG. 18. Profiles (b) to (g) in FIG. 18 indicate specific functions of the diffuser as the optical characteristic converting component 210. At least one surface of the diffuser has the unpolished rough structure. So that the diffuser randomizes the optical phase profile (wavefront profile) of light after passing through the diffuser. Profile (b) in FIG. 18 shows optical phase distribution of the light after passing through the diffuser. The horizontal axis of profile (b) in FIG. 18 indicates the optical phase value, and the vertical axis indicates the probability value. Profile (b) in FIG. 18 assumes Gaussian distribution of the light after passing through the diffuser. The present embodiment approximates Gaussian distribution to a prescribed distribution comprising three rectangular distributions shown in profiles (c), (e), and (g) in FIG. 18. Profile (c) in FIG. 18 shows the uppermost rectangular distribution having a prescribed width "$\Delta d_0$" of the optical phase value. And profile (e) in FIG. 18 shows the middle rectangular distribution having a prescribed width "$\Delta d_1$" of the optical phase value. Here, the central position difference value is assumed to "$\chi_1$" between the central position of the width "$\Delta d_0$" and the central position of the width "$\Delta d_1$". Furthermore, profile (g) in FIG. 18 shows the bottom rectangular distribution having a prescribed width "$\Delta d_2$" of the optical phase value. Here, the central position difference value is assumed to "$\chi_2$" between the central position of the width "$\Delta d_0$" and the central position of the width "$\Delta d_2$". The uppermost rectangular distribution shown in profile (c) in FIG. 18 may correspond to the first area 212 shown in FIG. 4, and the middle rectangular distribution shown in profile (e) in FIG. 18 may correspond to the second area 214 shown in FIG. 4. Moreover, the bottom rectangular distribution shown in profile (g) in FIG. 18 may correspond to the third area 216 shown in FIG. 4. Therefore, the first light element 202 in FIG. 4 may form Wave Train having different optical phase 430-0 in FIG. 18, and the second light element 204 may form Wave Train having different optical phase 430-1. Moreover, the third light element 206 may form Wave Train having different optical phase 430-2. In other words, the initial Wave Train 400 of the initial light 200 is divided into a plurality of Wave Trains 430-0, 430-1, and 430-2 having mutually different phases when one initial Wave Train 400 passes through the diffuser 488 (detailed principle is described below).

The Wave Train 430-0 of the first light element 202 generates first optical interference noise, the Wave Train 430-1 of the first light element 204 generates second optical interference noise, and the Wave Train 430-2 of the third light element 206 generates third optical interference noise. Here, the first optical interference noise is different from the second optical interference noise, and the second optical noise is different from the third optical interference noise. It is important that the Wave Train 430-1 has an optical phase difference "$\chi_1$" from the Wave Train 430-0 and the Wave Train 430-2 has another optical phase difference "$\chi_2$" from the Wave Train 430-0. And these optical phase differences "$\chi_1$" and "$\chi_2$" make a noise cancelling function. As a result, the amount of optical noise is expected to be reduced. The optical noise cancelling mechanism using the optical phase differences accounts for spatial coherence reduction (decreasing the degree of spatial coherence). The spatial coherence reduction of the synthesized light 230 is effective when the optical phase difference "$\chi_1$" or "$\chi_2$" is less than the coherence length "$\Delta L_0$". In the opposite direction, the temporal coherence reduction of the synthesized light 230 is effective when the optical path length difference between different areas 212 to 216 is greater than or equal to the coherence length "$\Delta L_0$" (or a double value of the coherence length "$\Delta L_0$").

As shown in FIGS. 5 and 6, as specific examples 270 of the optical characteristic converting component 210 that controls the optical phase profile (wavefront profile), there are a diffraction grating/hologram, various wave aberration generating components, and transparent plates having different surface levels (planar stage surfaces), etc., in addition to the diffuser. The above optical characteristic converting components 210 other than the diffuser also cause the Wave Train division described above and reduce the amount of optical noise.

By the function of the various optical characteristic converting components 210 that control the optical phase profile (wavefront profile), the Wave Train division 406 with respect to the initial Wave Train 400 and the amount of phase shift (propagation delay after wavefront division 408) between the plurality of divided Wave Trains 430-0, 430-1, and 430-2 are set. Various controllable parameters 280 that control the optical characteristics of the resulting synthesized light 230 are collectively described in FIGS. 5 and 6.

However, there is a limit to the optical characteristic range of the synthesized light 230 that can be controlled only by controlling the values of the controllable parameters 280 described in FIGS. 5 and 6. Therefore, in the present embodiment, as shown in FIG. 4, the optical characteristic converting component 210 is divided into a plurality of areas 212 to 216 so that different values of controllable parameters 280 can be set for each of the areas 212 to 216. This significantly expands the range of optical characteristics of the synthesized light 230 that can be controlled by a single optical characteristic converting component 210. As a result, by using the optical characteristic converting component 210 with a structure divided into a plurality of areas 212 to 216, the easiness of realizing the (desirable) optical characteristic items required for each optical application field described in FIG. 3 improves significantly.

An example in FIG. 18 is used to describe an example of a specific effect of the optical characteristic converting component 210 having a structure divided into a plurality of areas 212 to 216. It is assumed that three Wave Trains 430-0, 430-1, and 430-2 having different optical phases shown in profiles (d), (f), and (h) in FIG. 18 were generated respectively in the light elements 202 to 206 passing through the areas 212 to 216 in the optical characteristic converting component 210. Furthermore, the values of the controllable parameters 280 are varied between the first area 212 and the second area 214. Therefore, the phases of the three Wave Trains having different optical phases that are divided and generated in the second light element 204 passing through the second area 214 are different from the phases of the Wave Trains 430-0 in the first light element 202. As a result of synthesizing all the Wave Trains at the optical synthesizing area 220, three Wave Trains with different phases from each other are included within the synthesized light 230. As the number of Wave Trains having different phases from each other increases in the synthesized light 230 in this manner, the effect of reducing the amount of optical noise is further improved.

As the experimental results in FIG. 17 show, the combination of the control of the optical phase profile (wavefront profile) and the control of the optical phase synchronizing characteristic increases the ensemble averaging effect between the optical noises. Furthermore, this combination can also reduce the coherence of the synthesized light 230. The basic concept relating to the present embodiment is described below.

Optical interference generates spectral profile noise or fringe patterns whose intensity changes periodically appear in the cross section image when monochromatic light has a fixed optical phase. And the fringe patterns can be observed not only in the far field area 180, but also on or near the light converging plane/image pattern forming plane 170.

The world of optics defines a value of visibility "SV". The formula of the visibility "SV" is a fraction whose numerator represents the difference between the maximum intensity and the minimum intensity within this fringe pattern. And the denominator represents an average intensity of the fringe pattern. Specifically, it is defined by the middle side of Equation 13. The value of this visibility "SV" is often used to evaluate the degree of coherence of light.

When coherence of the initial light 200 reduces as described above, the "reduction of speckle noise", "reduction of laser mode hopping noise", and "improved stability of emitted light intensity", etc., are achieved among the (desirable) optical characteristic items 102 required for each optical application field shown in FIG. 3. These effects are commonly obtained for both the panchromatic light and monochromatic light.

As shown in profile (b) in FIG. 17, the effect of reducing coherence is further improved when the present embodiment achieves a combination between the control of the optical phase profile (wavefront profile) and the control of the optical phase synchronizing characteristic. In this case, individual controllable parameters 280 (FIGS. 5 and 6) within the plurality of areas 212 to 216 (FIG. 4) may be flexibly set to best fit the (desirable) optical characteristic items 102 required for each optical application field shown in FIG. 3.

The basic concept of the present embodiment described above will be explained theoretically and concretely below. For simplification of explanation, an example of monochromatic light having a center wavelength of "$\lambda_0$" and a wavelength range (spectral bandwidth) of "$\Delta\lambda$" may be explained below. However, the following description can also be applied to panchromatic light or white light, for example. When an user try to obtain spectral data of the measured object 22, the user exposes the measured object 22 to the panchromatic light or the white light and the user uses a spectrometer having wavelength resolution "$\Delta\lambda$". Here, the spectrometer comprises a plurality of detection cell, and each detection cell detects light intensity of corresponding wavelength "$\lambda_0$".

This theoretical analysis assumes an analytical model of "optical interference occurring between light traveling straight through a parallel transparent plate or transparent sheet and reflected light from front and back surfaces of the parallel transparent plate or the transparent sheet". Using the analytical model, the present embodiment will formulate a normal fringe pattern based on optical interference at the start. Next, the present embodiment will enlarge the normal fringe pattern formula to propose an original formula which represents the optical interference noise. And the original formula explains the optical noise reduction phenomenon when the "control of optical phase synchronizing characteristic" is performed.

Then, a "phase shifting model" of light passing through a diffuser will be explained, and the reduction phenomenon of the visibility value when the "control of optical phase synchronizing characteristic" and the "control of optical phase profile (wavefront profile)" are combined will be discussed. Here, the "control of optical phase synchronizing characteristic" relates to the "temporal coherence reduction" (decreasing a degree of temporal coherence), and the "control of optical phase profile (wavefront profile)" relates to the "spatial coherence reduction" (decreasing other degree of spatial coherence).

The refractive index of a transparent plate or a transparent sheet with parallel front and back surfaces is expressed by "n", and the thickness of the front and back surfaces is described by "$d_0+\delta d$". An arrival time difference "$\tau_j$" between the same phase locations between the light traveling straight through the transparent plate or transparent sheet (j=0) and the light reflected once on each of the front and back surfaces (j=1) is given as follows.

$$\tau_j=\tau_{0j}+\delta\tau_j=\{(2j+1)n-1\}(d_0+\delta d)/c=\{(2j+1)n-1\}d/c \quad \text{Equation 2}$$

There is a relationship between the wavelength width (spectral bandwidth) "$\Delta\lambda$" of the center wavelength "$\lambda_0$" and the corresponding frequency width "$\Delta\nu$" is expressed as follows.

$$c=\lambda_0\nu_0=(\lambda_0+\Delta\lambda/2)(\nu_0-\Delta\nu/2)\approx\lambda_0\nu_0+\nu_0\Delta\lambda/2-\lambda_0\Delta\nu/2 \quad \text{Equation 3}$$

The following relational expression is established.

$$\Delta\nu=(\Delta\lambda/\lambda_0)\nu_0 \quad \text{Equation 4}$$

Therefore, when substituting Equation 4 in Equation 1, the following relational expression is obtained as follows.

$$\Delta\nu=c/\Delta L_0 \quad \text{Equation 5}$$

The amplitude characteristic of the synthesized light 230 obtained when the initial light 200 with a center frequency of "$\nu_0$" and a frequency width of "$\Delta\nu$" passes through a transparent plate or transparent sheet with a thickness range of "$\Delta d$" is expressed as follows.

$$\Psi_R\langle v_0\rangle=\alpha\sum_{j=0}^{1}A_j\int_{d_0-\Delta d/2}^{d_0+\Delta d/2}\int_{v_0-\Delta v/2}^{v_0+\Delta v/2}\exp\{-i2\Pi v(t-r/c-t_j)\}dvdd \quad \text{Equation 6}$$

Therefore, where the following approximate equation is established.

$$\Delta\nu\times\delta\tau_j\approx 0 \quad \text{Equation 7}$$

The integration result of Equation 6 may be given as follows.

$$\Psi_R(\nu_0) = \alpha\Delta\nu\Delta d\sum_{j=0}^{1} A_j Dp_j S_j \exp\{-i2\Pi\nu_0(t - r/c - \tau_{0j})\} \quad \text{Equation 8}$$

Here, the following relationships are established.

$$S_j(\tau_{0j},\Delta L_0,t)\equiv\text{sinc}\{\pi(ct-r-c\tau_{0j})/\Delta L_0\} \quad \text{Equation 9A}$$

when $|ct-r-c\tau_{0j}|\leq\Delta L_0$ $$S_j(\tau_{0j},\Delta L_0,t)\equiv 0 \quad \text{Equation 9B}$$

when $|ct-r-c\tau_{0j}|>\Delta L_0$ $$Dp_j(\Delta d,\lambda_0)\equiv\text{sinc}\{\pi[(2j+1)n-1]\Delta d/\lambda_0\} \quad \text{Equation 10}$$

The intensity characteristics is obtained as follows with respect to the amplitude characteristic given by Equation 8.

$$\langle I_R\rangle=(1-R^2)^2\{Dp_0{}^2+R^4Dp_1{}^2+2R^2Dp_0Dp_1\langle S_0S_1\rangle\cos(4\pi nd_0/\lambda_0)\} \quad \text{Equation 11}$$

Here, variable "R" in Equation 11 represents the amplitude reflectance of light on the front and back surfaces of the transparent plate or transparent sheet. Also, the angular brackets denote temporally ensemble averaging.

The cosine function shown in the third term on the right side in Equation 11 indicates a "periodic change in light intensity" according to the variation in wavelength "$\lambda_0$". Therefore, this cosine function part contributes to the generation of fringe patterns in the spectral profile. "$<s_0s_1>$" may indicate the degree of temporal coherence and "$Dp_0Dp_1$" may indicate the degree of spatial coherence. Therefore, Equation 11 shows a degree of total coherence corresponding to a multiplication value between the degree of temporal coherence and the degree of spatial coherence.

Corresponding to the above "periodic change in light intensity", the aforementioned visibility "SV" is defined as follows.

$$SV\equiv\frac{\langle I_R\rangle_{max}-\langle I_R\rangle_{min}}{\langle I_R\rangle_{max}+\langle I_R\rangle_{min}}=\frac{2\sqrt{I_0\cdot I_1}\,|\mu_{01}^{\tau}|}{I_0+I_1} \quad \text{Equation 12}$$

Here, "$|\mu^{\tau}_{01}|$" denotes the aforementioned degree of coherence of light. When substituting Equation 11 in Equation 12, the following is obtained.

$$SVorg(\lambda_0)=\frac{2R^2Dp_0(\lambda_0)Dp_1(\lambda_0)\langle S_0S_1\rangle}{Dp_0(\lambda_0)^2+R^4Dp_1(\lambda_0)^2} \quad \text{Equation 13}$$

So far, the phenomenon of fringe pattern generation has been analyzed in the case where a parallel transparent plate or transparent sheet is placed as the interference generating path. Next, an optical noise generation model will be set up by extending the concept of this analysis result. That is, it is assumed that some kind of interference generating path is generated in the middle of the optical path of monochromatic light whose phases are synchronized (coincide). Based on the optical interference generated here, an analytical model will be established by assuming that superposition of multiple types of fringe patterns that appear in the cross section image and spectral profile is the cause of generating the optical noise.

In this case, instead of a transparent plate or a transparent sheet with a prescribed thickness range "$\Delta d$", a minute optical path length difference variation range "$(n-1)\Delta d$" that is generated in a specific interference generating path is assumed. Therefore, as a mathematical model for a portion causing optical noise generation, instead of Equation 10, the following is used.

$$D_j(\Delta d,\lambda_0)\equiv\text{sinc}\{\pi(n-1)\Delta d/\lambda_0\} \quad \text{Equation 14}$$

In the optical noise generation model assumed here, the following is assumed:

[A] Initial light 200 with an amplitude value of "1" enters the interference generating path;

[B] Optical noise generating light of amplitude "$E_j$" is generated at a jth optical noise generating location;

[C] As a result of the initial light 200 propagating in the interference generating path, the amplitude decreases to "$E_0=1-\Sigma E_j$"; and

[D] Optical noise is generated by interference between the light whose amplitude is attenuated to "$E_0$" and each optical noise generating light of amplitude "$E_j$".

From [C] above, the following relationship is established.

$$\sum_j E_j^2 = 1 \quad \text{Equation 15}$$

The intensity of light passing through an mth area in the optical path length varying component (optical characteristic converting component 210 that controls the optical phase synchronizing characteristic) is expressed by "$<I_{Rm}>$". This characteristic expression of "$<I_{Rm}>$" is obtained by an equation in which "$Dp_0$" is replaced with "$E_0D_0$", "$R^2Dp_1$" is further replaced with "$E_jD_j$", and "$2d_0$" is replaced with "$X_{mj}$" in Equation 11.

According to FIG. 16, since the Wave Trains 406 and 408 individually passing through each area in the optical path length varying component (optical characteristic converting component 210) have an unsynchronized optical phase relationship 402 with each other, the characteristic expression of the synthesized light 230 obtained after being synthesized at the optical synthesizing area 220 is given by the simple addition of each intensity characteristic. If the number of areas divided in the optical path length varying component (the number of wavefront divisions or the number of optical path divisions, the value of PuwS_M) is "M", the characteristic expression of the synthesized light 230 is given as follows.

$$<I_R>=\sum_{m=1}^{M}<I_{Rm}>\approx (E_0D_0)^2+\frac{2}{M}\sum_{m=1}^{M}\sum_{j\neq 0}E_0E_jD_0D_j<S_0S_j>\cos(2\Pi\chi_{mj}/\lambda_0) \quad \text{Equation 16}$$

The second term on the right side of Equation 16 includes a cosine function that expresses periodic characteristics. That is, the second term on the right side of Equation 16 represents the result of the mathematical expression of the optical noise. As the number of areas "M" is increased in Equation 16, the following equation is established under extreme conditions.

$$\lim_{M\to\infty}\frac{2}{M}\left\{\sum_{m=1}^{M}\sum_{j\neq 0}E_0E_jD_0D_j < S_0S_j > \cos(2\Pi\chi_{mj}/\lambda_0)\right\}=0 \quad \text{Equation 17}$$

Here, Equation 17 denotes that "when a plurality of optical noise characteristics having mutually different phases are superimposed, they are canceled out by an ensemble averaging effect". When substituting Equation 17 in Equation 16, the following is obtained.

$$\lim_{M\to\infty}\langle I_R\rangle \approx (E_0D_0)^2 \quad \text{Equation 18}$$

Equation 18 shows a state in which "periodic change in light intensity" does not appear and optical noise is completely removed. That is, the above mathematical characteristics indicate the optical noise reduction of the optical path length varying component (optical characteristic converting component 210 that controls the optical phase synchronizing characteristic) alone. FIG. 17 shows an experimental verification result with respect to the optical noise reduction when the number of areas "M" described by Equation 17 is increased.

Extending the knowledge obtained above, next, an operation analysis of the optical characteristic converting component 210 that controls the optical phase profile (wavefront profile), such as a diffuser, is performed. A profile (b) in FIG. 18 shows the surface roughness distribution characteristic of the diffuser. According to statistical theory, this surface roughness distribution characteristic is known to be similar to a "Gaussian distribution". Profile (b) in FIG. 18 can be approximated as a combination of three-stage rectangular distributions profiles (c), (e), and (g) in FIG. 18 stacked on top of each other. What is important here is the characteristic that "unlike the perfectly symmetrical Gaussian distribution, the actual surface roughness distribution characteristic of the diffuser deviates from perfect symmetry". Taking the center position of the uppermost rectangular distribution shown in profile (c) of FIG. 18 as a reference, a shift amount of the center position of the middle rectangular distribution shown in profile (e) in FIG. 18 is expressed by "$\chi_1$". Similarly, a shift amount of the center position of the bottom rectangular distribution shown in profile (g) in FIG. 18 is represented by "$\chi_2$". Then, the amplitude value after the initial Wave Train 400 with an amplitude value of "1" in profile (a) in FIG. 18 passes through the rectangular distribution at the "lth stage" ($l\geq 0$) from the top is approximated to "$E_1D_1$".

That is, the first light element 202 passing through the first area 212 in the optical characteristic converting component 210 that controls the optical phase profile (wavefront profile) includes a plurality of Wave Trains 430-0 to 430-2 with the amplitude value "$E_1D_1$" and the phase value "$\chi_1$". In the case of the optical characteristic converting component 210 shown in FIG. 4, which has a structure divided into multiple areas 212 to 216, the generated synthesized light 230 synthesized at the optical synthesizing area 220 includes even more Wave Trains.

The intensity characteristics of this synthesized light 230 can be expressed by an equation in which "$(E_0D_0)^2$" in Equation 16 is changed to "$\Sigma(E_1D_1)^2$". In this case, however, a subscript "m" denotes an area number in the optical characteristic converting component 210 where the optical phase profile (wavefront profile) is controlled. In addition, a variable "M" denotes the total number of areas in the optical characteristic converting component 210 where the optical phase profile (wavefront profile) is controlled.

In this case as well, the same "ensemble averaging effect" as in Equation 17 works, and the following approximate equation is established in an extreme condition.

$$\lim_{X\to\infty}\langle I_R\rangle \approx \sum_l (E_lD_l)^2 \quad \text{Equation 19}$$

When discussing the process of change in the equations leading to this Equation 19, it can be seen that "the optical characteristic converting component 210 that performs control of the optical phase profile (wavefront profile) including the diffuser has a characteristic of increasing optical noise by itself"; however, "the optical noise is reduced" when "the optical characteristic converting component 210 is configured by a plurality of areas 212 to 216 having mutually different controllable parameters 280" shown in FIG. 4. In addition, it can also be considered that "the optical noise is reduced" by combining "the optical characteristic converting component 210 that controls the optical phase profile (wavefront profile) including the diffuser" and "the optical path length varying component (the optical characteristic converting component 210 that controls the optical phase synchronizing characteristic)".

Next, the operating principle of reducing coherence by combining "the optical characteristic converting component 210 that controls the optical phase profile (wavefront profile) including diffusers" and "the optical path length varying component (optical characteristic converting component 210 that controls the optical phase synchronizing characteristic)" will be described. Here, for simplification of explanation, a case where only the first area 212 is included in the optical characteristic converting component 210 that controls the optical phase profile (wavefront profile), such as the diffuser, will be explained. However, although a detailed explanation is omitted, the effect of reducing coherence is further increased in the case where the optical characteristic converting component 210 that controls the optical phase profile (wavefront profile) is configured by a plurality of areas 212 to 216, as shown in FIG. 4.

Here, a case where light passing through the mth area in the optical path length varying component divided into "M" areas passes through the diffuser (optical characteristic converting component 210 that controls the optical phase profile (wavefront profile)) configured only by the first area 212 is considered. In this case, as shown in FIG. 18, after passing through the rectangular distribution of the "lth stage" ($l\geq 0$) from the top, a phase difference of "$\chi_{ml}$" is produced. Even with the same diffuser (optical characteristic converting component 210 that controls the optical phase profile (wavefront profile)), the phase difference "$\chi_{ml}$" changes according to slight changes in each optical path passing through. Thus, the phase characteristics change sensitively based on the differences in optical paths.

On the contrary, the amplitude variation due to the difference in optical path is considered to be very small. In other words, the amplitude value of the initial Wave Train 400 with an amplitude value of "$1/M^{1/2}$" in profile (a) in FIG. 18 after passing through the rectangular distribution of the "lth stage" can be approximated as "$E_lD_l/M^{1/2}$", independent of the area number of passing through the optical path length varying component.

The amplitude characteristic of the individual light elements passing through the above diffuser is expressed as follows after passing through the "transparent plate or transparent sheet with parallel front and back surfaces" described in Equation 8.

$$\Psi_m \approx \frac{(1-R^2)}{\sqrt{M}} e^{-i2\pi\nu_0(t-r/c)} \left\{\sum_{j=0}^{1} R^{2j} Dp_j S_j e^{i2\pi\nu_0\tau_{0j}}\right\}\left\{\sum_{l} E_l D_l e^{i2\pi\chi_{ml}/\lambda_0}\right\} \quad \text{Equation 20}$$

Next, the spectral profile after the individual light elements represented by Equation 20 are synthesized into the synthesized light 230 at the optical synthesizing area 220 is calculated. A spectral profile is generally expressed by a ratio of a "detected spectral intensity profile" to a "spectral intensity profile of reference light that serves as a standard". Here, the spectral intensity profile of the synthesized light 230 that has passed through the "optical path length varying component", "diffuser", and "optical synthesizing area 220" is treated as the spectral intensity profile of the reference light. In this case, the spectral intensity profile of the reference light can be approximated by Equation 19.

The spectral intensity profile obtained when the "transparent plate or transparent sheet with parallel front and back surfaces" is inserted in the middle of the optical path of the reference light is treated as the "detected spectral intensity profile". The spectral profile calculated here is expressed as follows.

$$\langle I_R\rangle = (I-R^2)^2(Dp_0^{\,2}+R^4Dp_1^{\,2}) + 2(I-R^2)^2R^2Dp_0Dp_1\langle S_0S_1\rangle V_R(\lambda_0) \quad \text{Equation 21}$$

Comparing Equation 21 and Equation 11, it can be seen that the maximum amplitude characteristic (visibility) of the fringe patterns changes by "$V_R(\lambda_0)$". "$V_R(\lambda_0)$" in Equation 21 is given as follows.

$$V_R = \cos(4\pi n d_0/\lambda_0) + \frac{1}{2MX\sum_l (E_lD_l)^2} \sum_{m=1}^{M}\sum_{l}\sum_{j\neq l}(E_lD_l)(E_jD_j)\cos\{(2\pi(2nd_0+\chi_{ml}-\chi_{mj})/\lambda_0)\} \quad \text{Equation 22}$$

The first term on the right side of Equation 22 shows fringe pattern characteristics obtained by the optical interference between the light traveling straight through the parallel transparent plate or transparent sheet and the reflected light on the front and back surfaces. The second term group on the right side of Equation 22 is the cause of reduced visibility. Each term in the second term group on the right side of Equation 22 is a periodic function (cosine function) whose phase is shifted by "$\chi_{ml}-\chi_{mj}$" each. Here, the above phase shift value is caused by the phase shift values "$\chi_{ml}$" and "$\chi_{mj}$" that each light element passing through the "mth" area in the optical path length varying component receives when passing through the diffuser.

Then, the fringe pattern characteristics (original visibility "SVorg($\lambda_0$)" expressed by Equation 13) obtained by the optical interference between the light traveling straight through the parallel transparent plate or transparent sheet and the reflected light on the front and back surfaces overlap with the second term group on the right side of Equation 22. When the value of Equation 19 is small, the value of the second term group on the right side of Equation 22 increases overall. As a result, the "ensemble averaging effect" works and the value of the overall visibility "SVdiff($\lambda_0$)" decreases.

As the ratio of the visibility "SVdiff($\lambda_0$)" obtained when using the optical characteristic converting component 210 to the original visibility "SVorg($\lambda_0$)" expressed in Equation 13, the following degree of relative coherence "SVR($\lambda_0$)" is defined as follows.

$$SVR(\lambda_0) = \frac{SVdif(\lambda_0)}{SVorg(\lambda_0)} = \frac{1}{2}(V_R\max - V_R\min) \quad \text{Equation 23}$$

Figure 19:
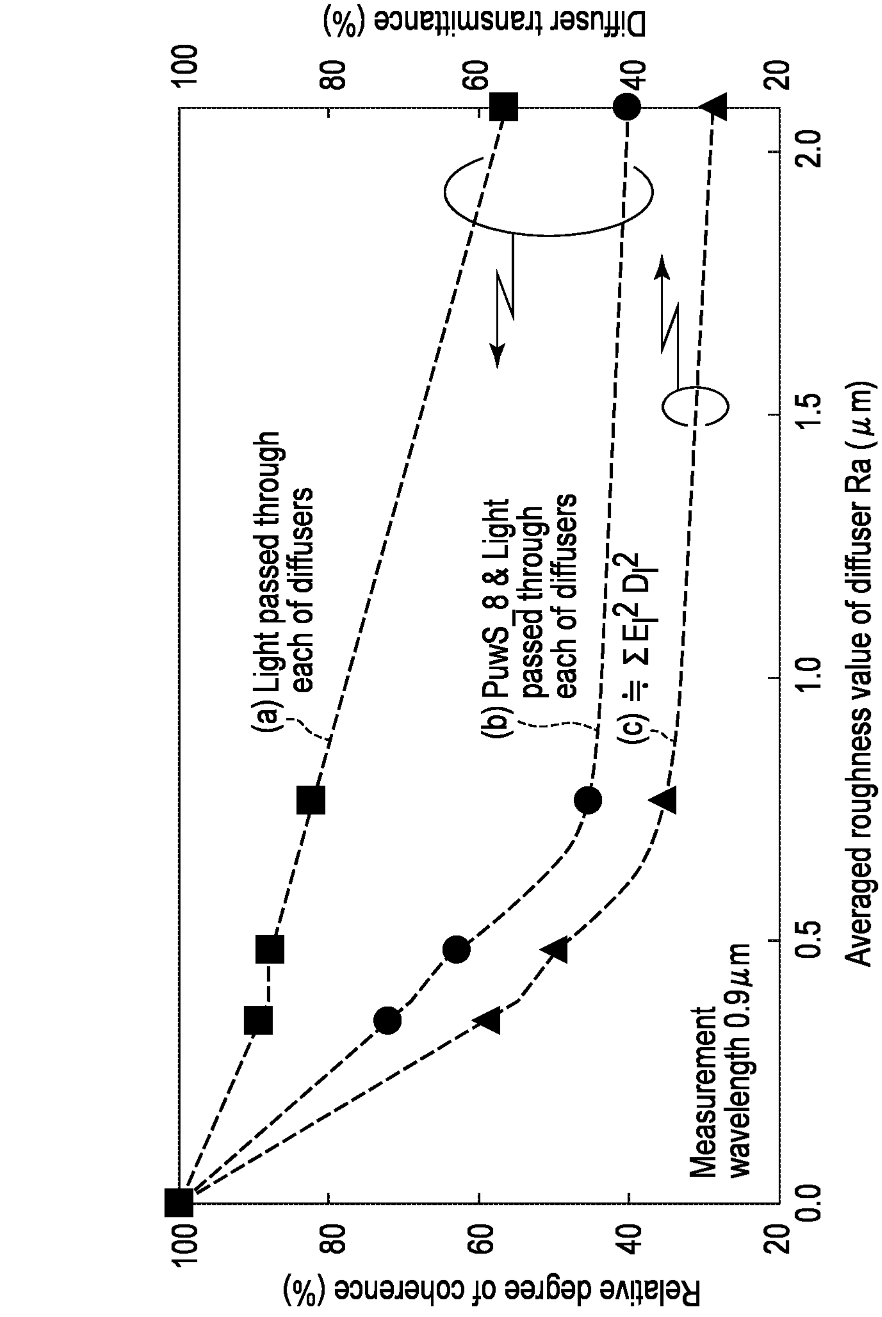
FIG. 19 is an explanatory diagram showing a coherence reduction effect when the optical phase synchronizing characteristic and the optical phase profile are controlled together.

FIG. 19 shows the provable experiment results on the coherence reduction effect of the synthesized light 230 when the optical characteristic converting component 210 used in the present embodiment is used. Profile (a) in FIG. 19 shows variation of the relative degree of coherence when only the diffuser 488 having different averaged roughness "Ra" is placed in the light source 2 (at the corresponding location of the optical characteristic controller 480 in FIG. 24 and FIG. 25). Here, the relative degree of coherence corresponds to the above-mentioned degree of total coherence that indicates the multiplication value between the degree of temporal coherence and the degree of spatial coherence. As the averaged roughness value of diffuser 488 increases, the relative degree of coherence decreases, indicating the effect of the optical characteristic converting component 210 that performs control of the optical phase profile (wavefront profile) to decrease the degree of spatial coherence of the synthesized light 230.

Figure 25:
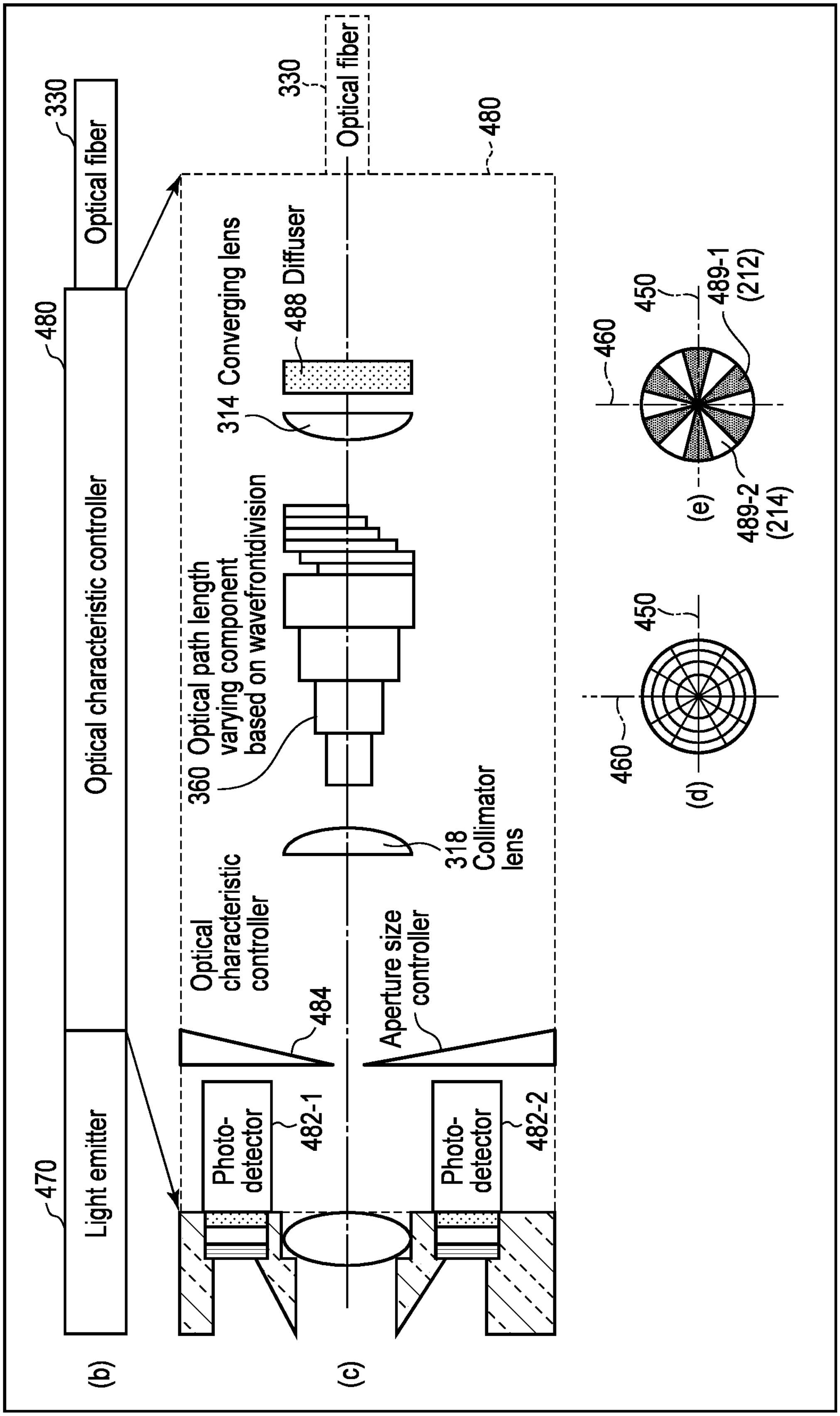
FIG. 25 is an explanatory diagram of a detailed optical arrangement example in the light source.
Figure 26:
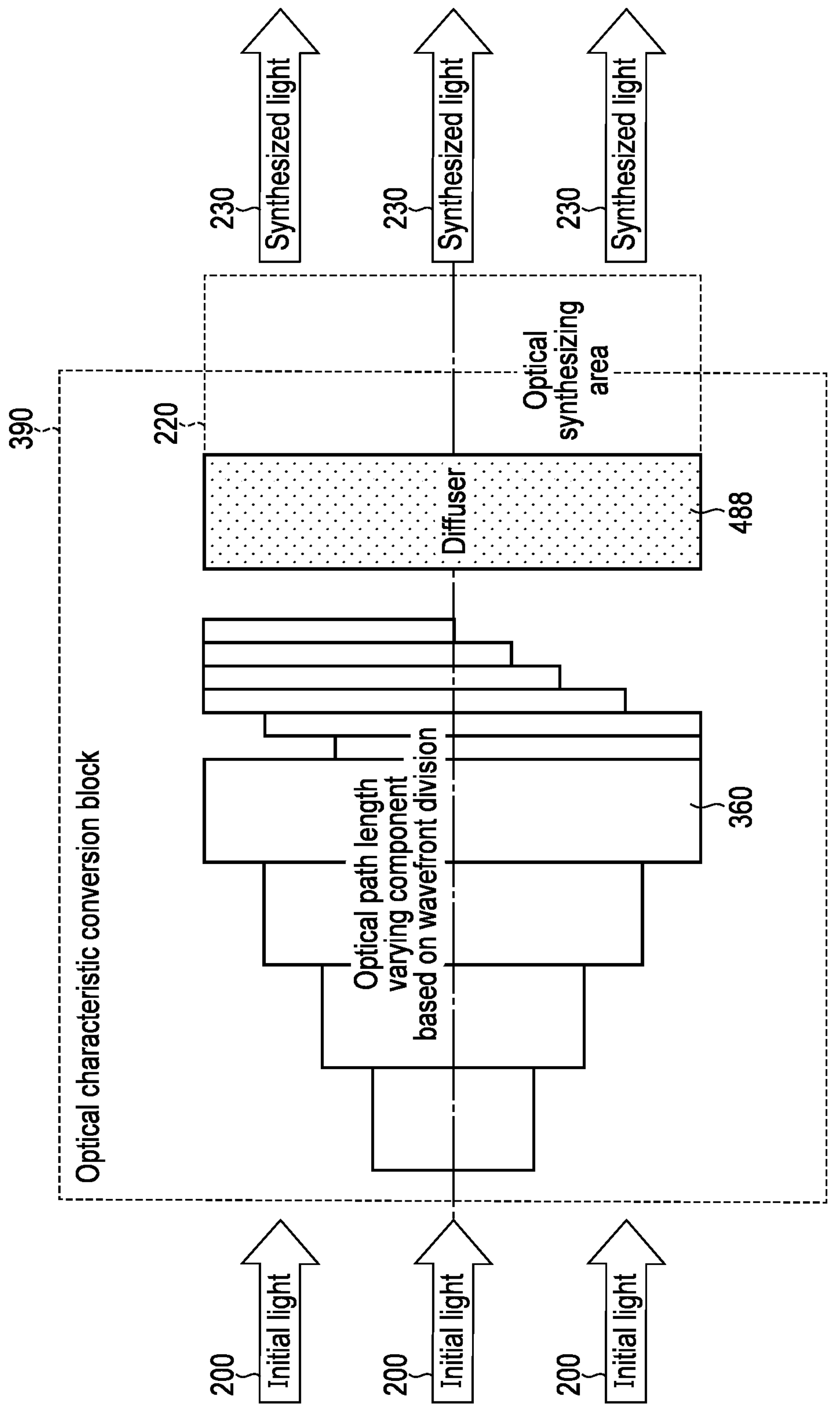
FIG. 26 is an explanatory diagram of a structural example within an optical characteristic conversion block that is arranged in the middle of an optical path and converts optical characteristics.

Profile (b) in FIG. 19 shows variation of the relative degree of coherence when the optical characteristic converting component 210 that controls the optical phase synchronizing characteristic is additionally placed (at the location of a wavefront division optical path length varying component 360 in FIG. 25 and FIG. 26). It can be seen that when the optical characteristic converting component 210 that controls the optical phase synchronizing characteristic is used in addition to the optical characteristic converting component 210 that controls the optical phase profile (wavefront profile), the coherence reduction effect of the synthesized light 230 is increased. And profile (b) in FIG. 19 suggests that the relative degree of coherence (degree of total coherence) corresponds to the multiplication value between the degree of temporal coherence and the degree of spatial coherence because the "optical phase synchronizing characteristic control" accounts for increasing the degree of temporal coherence.

In the above theoretical analysis and the provable experiment of the optical coherence reduction effect, the contribution of the diffuser 488 is given as an example. However, the same effect can be obtained not only for the above diffuser 488, but also for other optical characteristic converting components 210 that control the optical phase profile (wavefront profile).

[Chapter 4: Characteristic Evaluation Method in Present Embodiment]

As described in Chapter 3, the synthesized light 230 formed in the present embodiment has reduced optical interference noise or the degree of total coherence compared to the initial light 200. As a result, compared to the conventional initial light 200, the synthesized light 230 has the (desirable) optical characteristics required for each optical application field shown in FIG. 3.

This chapter describes a characteristic evaluation method for determining whether or not the synthesized light 230 formed in the present embodiment has the (desirable) optical characteristics required for each optical application field shown in FIG. 3. That is, when at least one of the embodiments is implemented (adopted) and the evaluation result by the characteristic evaluation method described below satisfies the predetermined determination conditions, it can be evaluated as "applicable to the present embodiment".

The synthesized light 230 formed by the present embodiment is basically evaluated using:

A] spectral profile; or

B] image characteristic.

Also, the light obtained when at least one of the present embodiments is not implemented is defined as "initial light 200", and the light obtained by implementing at least one of the present embodiments is defined as "synthesized light 230". The optical characteristics of the "initial light 200" and the "synthesized light 230" are then measured using the same characteristic evaluation method, and the measurement results are compared to evaluate whether or not there are differences between the two.

The method shown in FIG. 17 is adopted for the evaluation method relating to the optical interference noise reduction. That is, an optical system configured by the light source 2 and the measurer 8 shown in FIG. 1 may be configured, and the amount of optical interference noise generated in the optical system may be evaluated. Here, the "initial light 200" and the "synthesized light 230" are switched depending on whether or not at least one of the technologies described in the present embodiment is employed in the light source 2 (including an optical characteristic conversion block 390 (FIG. 26) placed within the light propagation path 6). Alternatively, as was done during the data measurement in FIG. 17, the optical characteristics may be compared when the optical system described above (for example, within the light propagation path 6 in FIG. 1) may intentionally include an "optical interference noise generating component". Here, the "optical interference noise generating component" (such as the diffuser 488 or the diffraction grating/hologram) may control the optical phase profile (wavefront profile) of the initial light 200.

As an optical characteristic evaluation value, the "standard deviation value of optical noise distribution" may be used as in FIG. 17. The calculation procedure for this "standard deviation value of optical noise distribution" is described below. That is:

1. Calculate a "mean value" by averaging the data obtained from the above "A] spectral profile" or "B] image characteristic".
2. Calculate the difference values between the above "A] spectral profile" or "B] image characteristic" and the above "mean value".
3. Define the ratio of the above difference values to the above "mean value" (that is, a value obtained by dividing the "difference values" by the "mean value") as "relative difference values".
4. Statistically analyze the distribution of the "relative difference values" to calculate the standard deviation value of optical noise distribution.

The "conventional technology" of profile (a) in FIG. 17 shows the standard deviation value of optical noise distribution regarding the "initial light 200". The other data shows the standard deviation values obtained from the "synthesized light 230" described in the present embodiment. Comparing profile (a) in FIG. 17 and profile (b) in FIG. 17 in the "conventional technology", the "standard deviation value" obtained from the "synthesized light 230" is about 20% less than the "standard deviation value" obtained from the "initial light 200". Therefore, it is considered that the "spatial coherence reduction" is effective against the optical interference noise reduction.

Here, the "standard deviation value" of the "conventional technology" of profile (a) in FIG. 17 is "1%" approximately. And the "standard deviation value" obtained from the "synthesized light 230" is "0.45%" approximately when the number of optical path divisions is "8" in profile (a) in FIG. 17. Therefore, it is considered that the "temporal coherence reduction" is also effective against the optical interference noise reduction.

FIG. 17 shows the comparison data of "A] spectral profile". However, it is not limited to this, and the present embodiment may evaluate "B] image characteristic" caused by the optical interference noise. Here, "B] image characteristic" caused by the optical interference noise appears in the image detected by the imaging sensor 300. In this case also, the "standard deviation value of optical noise distribution" is calculated in the same manner as above.

Figure 20:
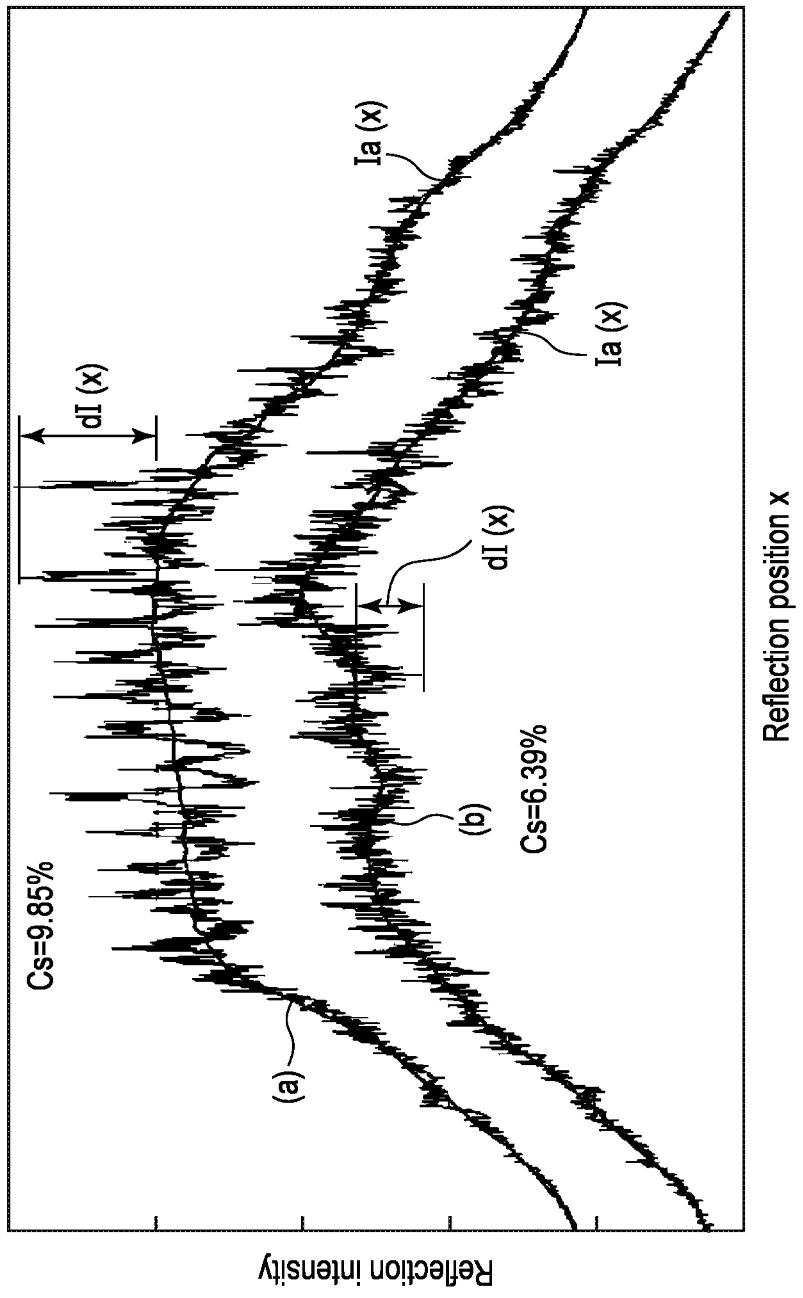
FIG. 20 is an explanatory diagram showing a speckle noise reduction effect of laser light when the optical phase synchronizing characteristic and the optical phase profile are controlled together.

FIG. 20 shows comparative data of speckle noise patterns based on light coherence. The speckle noise pattern in profile (a) in FIG. 20 shows the intensity distribution of reflected (scattered) light obtained from a non-specular surface (general light scattering surface) irradiated with the "initial light 200" (conventional light). Here, any surface that scatters light, such as plain paper, wall, or skin, can be used as the non-specular surface. The horizontal axis in FIG. 20 indicates reflection positions of the non-specular surface, and the vertical axis indicates reflection intensity of the reflected (scattered) light. Similarly, profile (b) in FIG. 20 shows the intensity distribution reflected (scattered) light obtained from a non-specular surface irradiated with the "synthesized light 230".

In the world of laser interference technology, an index referred to as Speckle Contrast is used to evaluate this light coherence. Here, the above speckle contrast uses substantially the same definition formula as the above-mentioned "relative standard deviation value". That is, "Ia (x)" in FIG. 20 denotes the "spatially local mean value of reflected light intensity". In addition, "dI (x)" in FIG. 20 corresponds to the "deviation value from the spatially local mean value" described above.

In a case where the "initial light 200" (conventional light) was used, the Speckle Contrast value obtained in profile (a) in FIG. 20 was "9.85%". On the other hand, in a case where the "synthesized light 230" was used, the Speckle Contrast value obtained in profile (b) in FIG. 20 was "6.39%". Thus, the Speckle Contrast value is reduced by approximately 40% when the "synthesized light 230" is used. As a result of examining the above data in consideration of the optical noise reduction results described above, the present embodiment may define a criterion value (critical value) below which the speckle noise reduction is effective. Here, the criterion value (critical value) may be set with considering a margin of data error. That is, by comparing the Speckle Contrast values, it is regarded as "(the present embodiment is implemented where) there is an effect when the criterion value (critical value) is reduced by 20% or more" or, strictly judging, "(the present embodiment is implemented where) there is an effect when the criterion value (critical value) is reduced by 5% or more".

The measurement data shown in FIG. 20 is the data measured as the "B] image characteristic". However, it is not limited to this, and optical characteristics can also be measured in the form of "A] spectral profile". In this case, the Speckle Contrast value can be calculated in the same way from the distribution of "A] spectral profile" obtained from the non-specular surface by irradiating the "initial light 200" (conventional light) or the "synthesized light 230" in a parallel light state onto the non-specular surface (general light scattering surface).

Furthermore, regarding the evaluation of light coherence, calculating and comparing Speckle Contrast described above provides the highest evaluation accuracy. However, it is burdensome to perform statistical analysis (normalization of "deviation value from the local mean value" by the local mean value) for this purpose. Therefore, instead of calculating the exact Speckle Contrast, the optical interference noise reduction effect may be evaluated by examining the "amplitude value of the noise component" that is considered to be caused by speckle noise in the "A] spectral profile" or "B] image characteristic", and comparing the data obtained from the "initial light 200" (conventional light) with the data obtained from the "synthesized light 230". In this case, the "amplitude values" in the "A] spectral profile" or the "B] image characteristic" may be compared so that it can be regarded as "(the present embodiment is implemented where) there is an effect when the amplitude value is reduced by 20% or more" or, strictly judging, "(the present embodiment is implemented where) there is an effect when the value is reduced by 5% or more".

So far, the method of evaluating/determining the optical characteristics of the "synthesized light 230" has been described. Next, the evaluation method and determination method of the optical characteristics for each individual optical characteristic converting component 210 will be described. That is, an optical system incorporating the optical characteristic converting component 210 whose results measured by the evaluation method shown below satisfy the following determination conditions is considered to be using at least a part of the present embodiment.

Figure 21:
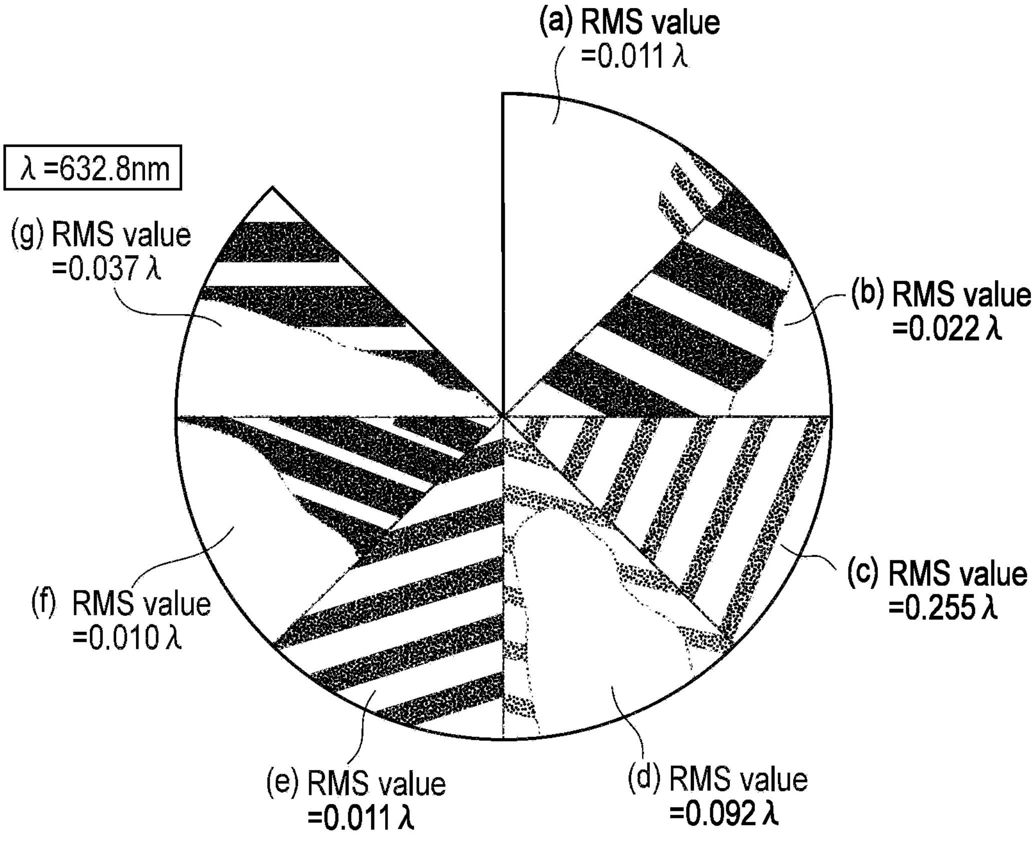
FIG. 21 is an explanatory diagram of an example showing an evaluation method in the case of performing control of the optical phase synchronizing characteristic or the optical phase profile.

FIG. 21 shows an example of RMS (root mean square) values of wavefront aberration obtained as a result of the measurement. FIG. 21 shows the RMS values of wavefront aberration for light passing through the wavefront division optical path length varying component 360 (see FIG. 25), which is "divided into eight in the angular direction" (not divided in the radial direction). As a specific evaluation/measurement method, the RMS value is calculated by measuring the wavefront profile of the light transmitted through or reflected from the optical characteristic converting component 210 using a transmissive or reflective interferometer.

In accordance with what has already been described using FIG. 12, the wavefront accuracy value of the light transmitted through or reflected from the optical characteristic converting component 210 is regarded as "implementing the present embodiment in the case of being 0.5λ or more and 100λ or less" or, strictly speaking, "implementing the present embodiment in the case of being 0.3λ or more and 1000λ or less".

Here, the wavelength "λ" may be set to "400 nm".

Figure 22:
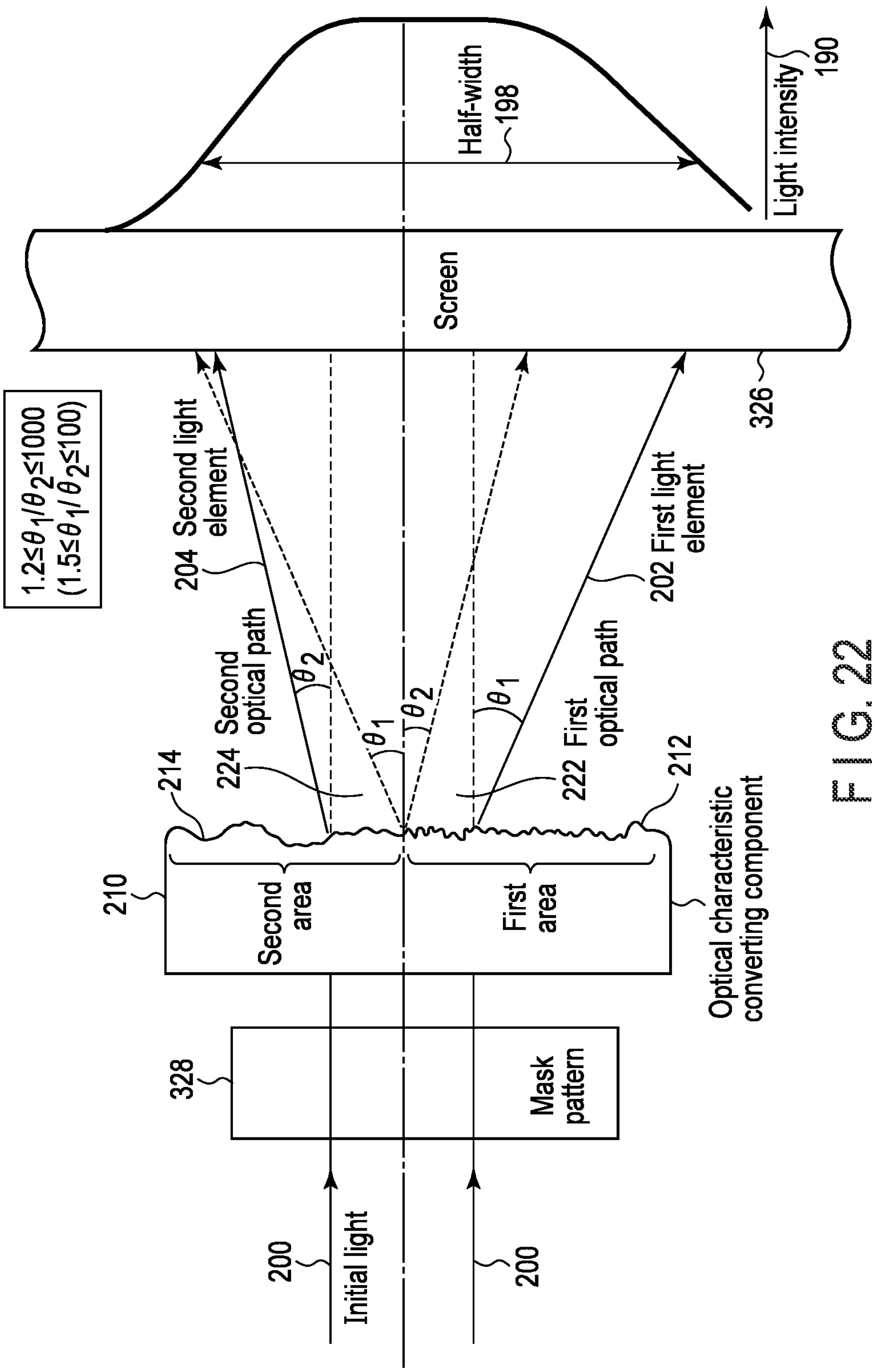
FIG. 22 is an explanatory diagram of one example showing an evaluation method in the case of performing control of the optical phase profile.

As already explained using FIG. 9 to FIG. 11, in the case where the optical characteristic converting component 210 is used to control the optical phase profile (wavefront profile), the divergence angle of the light passing therethrough becomes important. FIG. 22 shows the method for measuring/evaluating the optical characteristic converting component 210 relating to the divergence angle of light and determination criteria thereof.

When the initial light 200 passes through the first area 212, it has a divergence angle of "$\theta_1$" in the first optical path 222. On the other hand, when the initial light 200 passes through the second area 214, it has a divergence angle of "$\theta_2$" in the second optical path 224. The divergence angle "θ" is obtained from a half-width 198 of the intensity distribution of the light projected on the screen 326 arranged at a predetermined distance from the optical characteristic converting component 210. Here, by placing a mask pattern 328 that partially shields a part of the initial light before the optical characteristic converting component 210, and comparing the half-width 198 in the case where only the first area 212 is shielded and the half-width 198 in the case where only the second area 214 is shielded with the half-width 198 in the case where no light is shielded, the respective divergence angles "$\theta_1$" and "$\theta_2$" can be obtained. In the present embodiment, as the relationship between the above divergence angles "$\theta_1$" and "$\theta_2$", "the present embodiment is implemented in a case where $1.2 \leq \theta_1/\theta_2 \leq 1000$" or, strictly, "the present embodiment is implemented in a case where $1.5 \leq \theta_1/\theta_2 \leq 100$".

Figure 23:
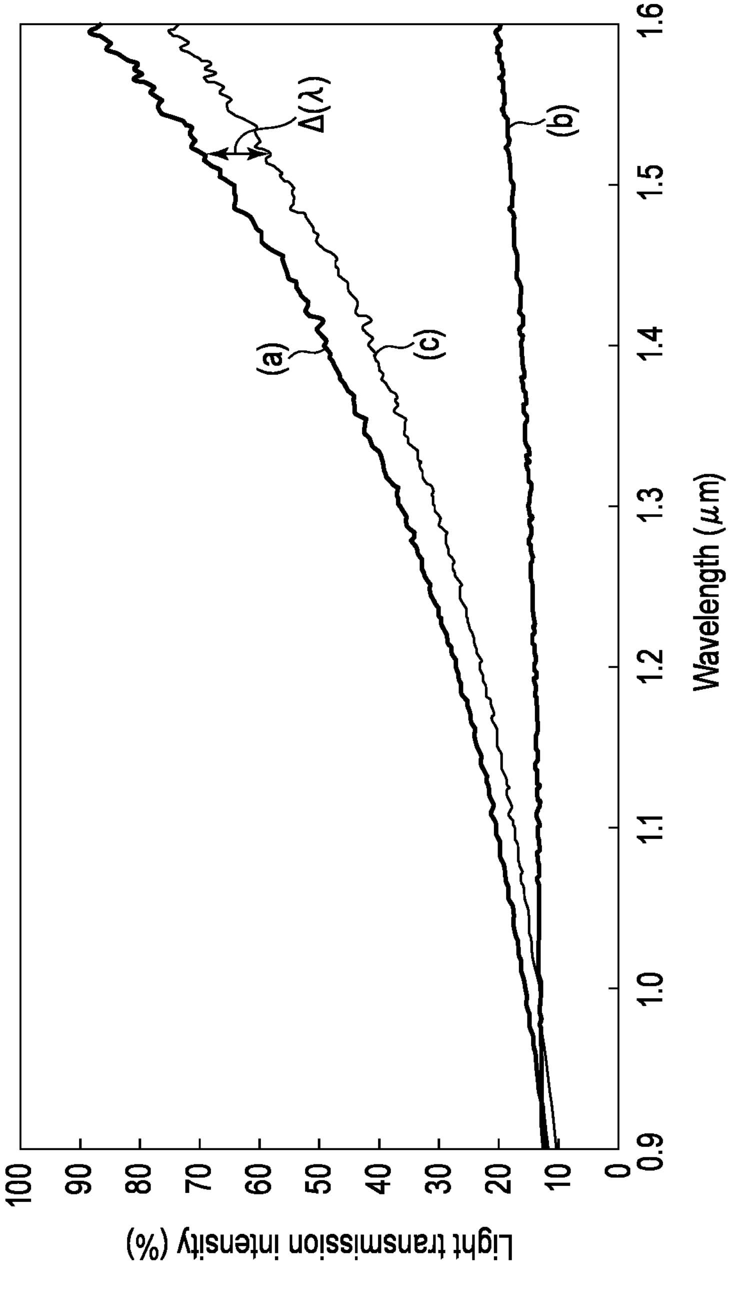
FIG. 23 is an explanatory diagram showing another evaluation method in the case of controlling the optical phase characteristics.

FIG. 23 shows examples of spectral profile measurement results of light transmitted through the optical characteristic converting component 210 that controls the optical phase profile (wavefront profile). Regarding FIG. 23, a spectrometer obtained the spectral profile measurement results. Here, the spectrometer took the position of the screen 326 in FIG. 22 instead of the screen 326. Profile (a) in FIG. 23 shows the spectral profile measurement result of the optical characteristic converting component 210 configured by only the first area 212. The optical characteristic converting component 210 may have two or more areas 212 to 214 to reduce the optical interference noise. Therefore, the effective synthesized light 230 cannot be formed when the initial light 200 passes through the optical characteristic converting component 210 configured by only the first area 212. So that, after passing through the optical characteristic converting component 210 configured by only the first area 212, the corresponding light is equal to the conventional light which divergently propagates. Profile (a) in FIG. 23 shows that the light transmission intensity increases rapidly as the measurement wavelength increases. On the other hand, profile (b) in FIG. 23 shows the spectral profile measurement results of the optical characteristic converting component 210 configured by a combination of the first area 212 and the second area 214, which have different averaged roughness values "Ra" from each other. Compared to profile (a) in FIG. 23, a significant difference in spectral profile is shown. In other words, profile (b) in FIG. 23 shows that the light transmission intensity does not increase as the measurement wavelength increases. Profile (a) in FIG. 23 and profile (b) in FIG. 23 suggest that the spectral profile difference between profile (a) in FIG. 23 and profile (b) in FIG. 23 results from the difference of spatial coherence. Equations 10 and 11 show that a value of the function "$Dp_0^2$" having appropriate "Δd" value increases as the measurement wavelength increases. Therefore, it is suggested that a degree of spatial coherence of the synthesized light 230 reduces.

Here, the data of profile (a) in FIG. 23 is regarded as the data obtained from the "initial light 200". The data of profile (b) in FIG. 23 is regarded as the data obtained from the "synthesized light 230", and both characteristics are compared to each other. The difference in effects between the two is evaluated by the relative variation "Δ(λ)" in light transmission intensity at an arbitrary wavelength when the data of profile (a) of FIG. 23 is used as a reference. In other words, the light transmission intensity does not increase as the measurement wavelength increases when the present embodiment uses the synthesized light 230. In the opposite direction, the light transmission intensity increases rapidly as the measurement wavelength increases when the present embodiment uses the conventional light. Following the evaluation method described above, the differential value between "light transmission intensity obtained from evaluated light" (profile (c) in FIG. 23) and the "light transmission intensity obtained from the initial light 200" (profile (a) in FIG. 23) at the same wavelength is defined as the "relative variation '$\Delta(\lambda)$' in light transmission intensity". In the relative variation "$\Delta(\lambda)$" of this light transmission intensity, it is regarded as "(the present embodiment is implemented where) there is an effect when the change is 20% or more" or, strictly judging, "(the present embodiment is implemented where) there is an effect when the change is 5% or more".

[Chapter 5: Specific Examples in the Light Source and Optical Characteristic Conversion Block]

In Chapter 2, the outline of the basic optical action in the present embodiment was explained. A specific example within the light source 2 or, in a broader sense, the optical characteristic conversion block 390 included in a part of the light source 2 will be described by combining the individual elemental technologies described in Chapter 2.

Figure 24:
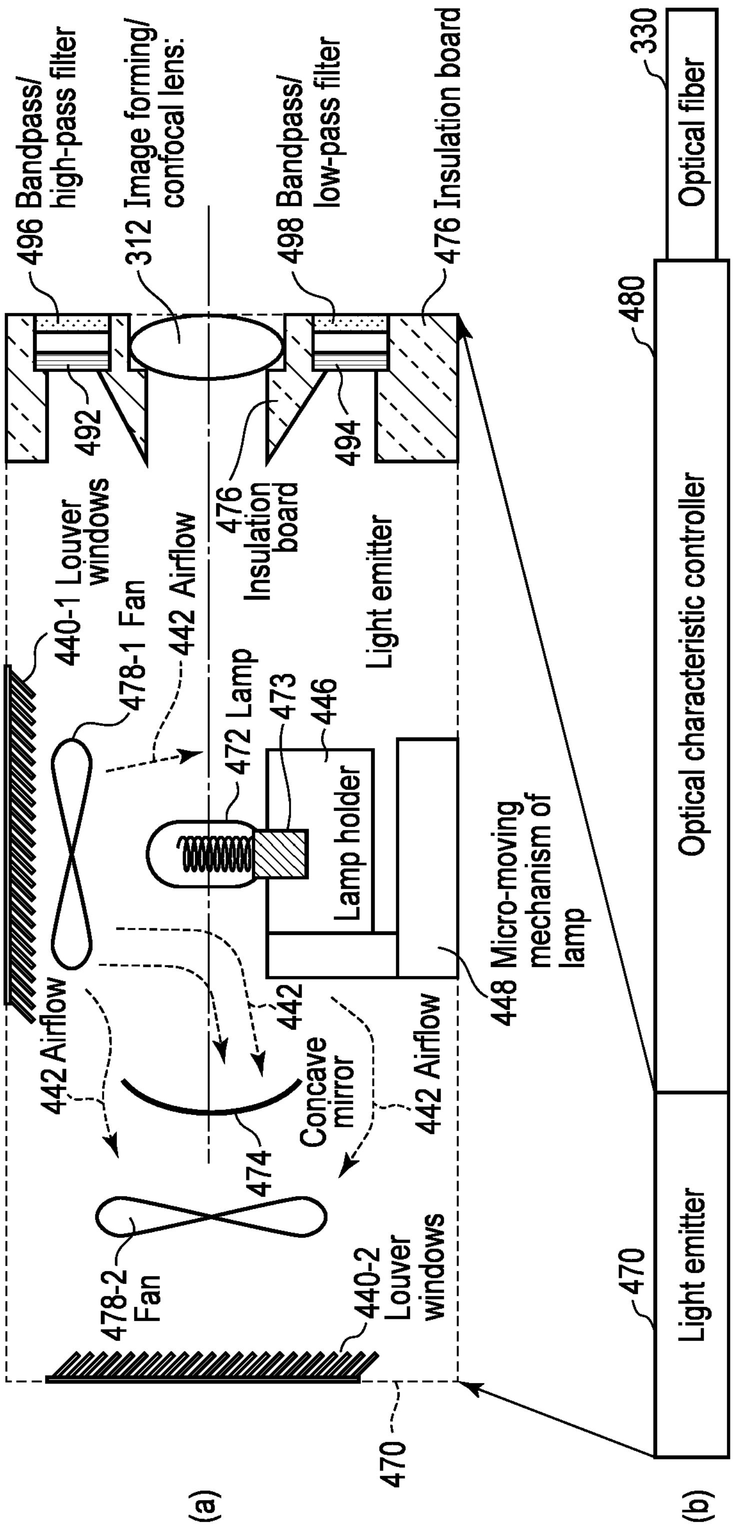
FIG. 24 is an explanatory diagram of a detailed optical arrangement example in a light source.

FIGS. 24 and 25 shows a specific example within the light source 2 in a case where an incandescent light source is used as a light emitting source. For example, the surface of a heat-generating lamp 472 such as a halogen or mercury lamp is hot. On the other hand, the optical system for achieving the effects described in Chapter 3 does not like dust, dirt, or debris in the optical path. In the structural outline shown in a portion (b) in FIG. 24 and a portion (b) in FIG. 25, the structure is designed to mechanically separate a light emitter 470, which houses the incandescent lamp 472, from an optical characteristic controller 480. The optical fiber 330 is then connected to an exit of this optical characteristic controller 480. By using an optical fiber 330 with excellent mechanical flexibility, the light output from the optical characteristic controller 480 can be guided to any desired location. Furthermore, as shown in portion (a) in FIG. 24 and a portion (c) in FIG. 25, an insulation board 476 is placed between the light emitter 470 and the optical characteristic controller 480 to block heat conduction between the two. Furthermore, the periphery of the optical characteristic controller 480 is covered to block the flow of air from the outside. This structure prevents dust, dirt, and debris from entering the optical characteristic controller 480. Furthermore, the thermal deformation inside the optical characteristic controller 480 caused by temperature changes can also be reduced by the insulation board 476 blocking heat conduction.

By the way, the radiated light from the incandescent lamp 472 passes through the optical characteristic controller 480. For this reason, a light-transmissive medium is placed on a part of the insulation board 476. The radiated light from the incandescent lamp 472 passes through this light-transmissive medium. On the other hand, this light-transmissive medium placed inside the insulation board 476 intercepts the flow of air and heat from inside the light emitter 470 to inside the optical characteristic controller 480. Transparent resin (plastic) may be used as the material of this light-transmissive medium. However, transparent resin has a high light absorption rate in the near-infrared region (for example, wavelength of 1.6 μm or more). Therefore, in the case of using near-infrared light obtained from the light source 2, it is desirable to use transparent glass or quartz glass as the material of the light-transmissive medium.

A parallel plate can be used as the shape of this light-transmissive medium. In FIGS. 24 and 25, the image forming/confocal lens 312 is used as the light-transmissive medium to block the flow of air and heat as well as to collect the light emitted from the lamp 472. In this manner, the image forming/confocal lens 312 serves a variety of functions simultaneously. So that the light source 2 itself can be simplified and this optical structure can make less expensive.

In addition, the image forming/confocal lens 312 is arranged at a position recessed from the surrounding insulation board 476. This prevents an operator from accidentally contacting the image forming/confocal lens 312 when replacing the lamp 472.

In FIGS. 24 and 25, neutral density filters (ND filters) 492 and 494, a band-pass filter or high-pass filter 496, and a band-pass filter or low-pass filter 498 are arranged as the light-transmissive media placed at the boundary between the light emitter 470 and the optical characteristic controller 480.

The amount of radiated light from the incandescent lamp 472 and its spectral profile vary with the filament temperature in the lamp 472. Therefore, from immediately after the start of lighting of this incandescent lamp 472 until the filament temperature stabilizes, the light quantity and spectral profile of the radiated light change over time. To stabilize the emitted light intensity of this radiated light, the emitted light intensity is detected by photodetectors 482-1 and 482-2, and electric current values supplied to the incandescent lamp 472 is controlled.

A spectral profile of the emitted light from the incandescent lamp 472 tends to change as the filament temperature of the incandescent lamp 472 varies. The emitted light intensity in a long wavelength area tends to increase as the filament temperature rises. Therefore, for example, in the case of using both visible and near-infrared light emitted from this light source 2 for measurement, it is desirable to simultaneously detect and control emitted light intensity in both the visible and near-infrared light wavelength ranges. Therefore, a photodetector 482-1 that detects only near-infrared light that has passed through the band-pass filter or high-pass filter 496, and a photodetector 482-2 that detects only visible light that has passed through the band-pass filter or low-pass filter 498 are arranged. The detection sensitivities of the photodetector 482-1 for near-infrared light and the photodetector 482-2 for visible light are different from each other. The ND filters 492 and 494 are individually placed for correcting the detection sensitivities.

In the light emitter 470, a concave mirror 474 is placed behind the lamp 472. The light radiated toward the back of the lamp 472 is reflected by the concave mirror 474, passes through the filament gap in the lamp 472, and then travels to the image forming/confocal lens 312. In this manner, the light radiated toward the back of the lamp 472 is also effectively utilized, and the utilization efficiency of the light radiated from the light source 2 is improved.

Two fans 478-1 and 478-2 are arranged in the light emitter 470 to create an artificial airflow 442. Specifically, the fan 478-1 at the top draws in air from the outside, and the fan 478-2 at the back expels air from inside the light emitter 470 to the outside.

A portion of this airflow 442 directly hits the lamp 472, thereby increasing the heat dissipation effect of the lamp 472. On the other hand, the airflow 442 is arranged so that it does not directly hit the image forming/confocal lens 312 and ND filters 402 and 494. This prevents dust and dirt caught in the airflow 442 from adhering to the image forming/confocal lens 312 and ND filters 402 and 494.

In addition, louver windows 440-1 and 440-2 are installed outside each of the fans 478-1 and 478-2 to prevent the radiated light from leaking out of a draw port of the upper fan 478-1 and a discharge port of the rear fan 478-2.

Since the temperature around the incandescent lamp 472 becomes extremely high when it emits light, the present embodiment is desired to stably fix the lamp 472 mechanically. A lamp holder 446 made of a material having an excellent heat insulating effect and a low coefficient of thermal expansion supports a lamp base 473 and stably fixes the position of the incandescent lamp 472. Due to a large temperature change between lighting and turning off of the incandescent lamp 472, large thermal expansion and thermal contraction of the lamp base 473 are repeated. In order to prevent the position of the lamp 472 from shifting due to repeated thermal expansion/contraction of the lamp base 473, the lamp holder 446 has shape elasticity and there is a slidable structure (mechanism) between the lamp holder 446 and the lamp base 473. The lamp holder 446 is made finely adjustable by a micro-moving mechanism of the lamp 448 to finely adjust the position of the lamp 472 in the light emitter 470.

A small aperture 484 is located in the optical characteristic controller 480. The image forming/confocal lens 312 projects (forms) an image pattern of the filament in the lamp 472 onto the position of the small aperture 484. Only the center portion of this image pattern passes through the small aperture 484. In this manner, the small aperture 484 is located in the optical characteristic controller 480 to prevent optical aberrations from “an” optical path (optical axis) of the light radiated from the lamp 472. That is, the small aperture 484 shields radiated light passing through “other” optical path that deviates significantly from the ideal optical path (optical axis) having no optical aberration. This small aperture 484 prevents unnecessary wavefront aberrations that occur in the middle of the optical path. As a result, the optical characteristics described in Chapter 3 can be effectively achieved.

For example, if the position of the lamp 472 is significantly deviated from the center position in the light emitter 470 without the small aperture 484, a large coma aberration will occur on an optical path that forms from the lamp 472 to the converging lens 314. Unnecessary wavefront aberration such as coma aberration that occurs here causes large variation in characteristics during mass production of the light source 2.

The size of the filament in the incandescent lamp 472 is relatively large. Therefore, even in a case where one end part of the filament of the lamp 472 is located near the center position in the light emitter 470, the opposite end part of the above filament is positioned far from the center position in the light emitter 470. Therefore, the light emitted from the opposite end part of the above filament generates a slight coma aberration when it passes through the image forming/confocal lens 312 and collimator lens 318. Therefore, the small aperture 484 shields the light radiated from the opposite end part of the above filament to utilize only the radiated light with less wavefront aberration.

The radiated light that passes through the small aperture 484 is converted into an almost parallel light after passing through the collimator lens 318. The wavefront division optical path length varying component 360 (optical characteristic converting component 210) that controls the optical phase synchronizing characteristic is placed in the middle of the optical path of this parallel light. A portion (d) in FIG. 25 shows a view of this wavefront division optical path length varying component 360 from the light propagation direction. As shown in portion (d) in FIG. 25, the inside of the wavefront division optical path length varying component 360 is divided into 12 in the angular direction and four in the radial direction, resulting in 48 divided areas already described in FIG. 14. Two of the 12 angular boundary lines are set at angles parallel to a horizontal axis 450 and a vertical axis 460, respectively. However, the specific shape of the wavefront division optical path length varying component 360 (optical characteristic converting component 210) is not limited to this, and the 12 divided elements described in FIG. 15 or the two divided elements arranged in FIG. 13 may be used.

Light passing through the wavefront division optical path length varying component 360 is converged by the converging lens 314 and enters the optical fiber 330. The diffuser 488 is placed in the middle of this optical path. Therefore, in the optical characteristic controller 480 in a portion (c) in FIG. 25, since the wavefront division optical path length varying component 360 and the diffuser 488 are used together, both the optical phase synchronizing characteristic and the optical phase profile (wavefront profile) are simultaneously controlled.

A portion (e) in FIG. 25 shows the surface condition of the diffuser 488. The first area 212 is configured by a first diffuser area 489-1, whose averaged value “Ra1” of the surface roughness and its averaged pitch “Pa1” are relatively small. The second area 214 is configured by a second diffuser area 489-2, whose averaged value “Ra” of the surface roughness value and its averaged pitch “Pa2” is relatively large compared thereto (satisfying the relationships of “Ra2/Ra1>1” and “Pa2/Pa1>1”). Each of the first diffuser area 489-1 and the second diffuser area 489-2 forms a fan shape with a “central angle of 30 degrees”, and is alternately arranged as shown in portion (e) in FIG. 25.

The boundary line between the first light diffuser area 489-1 and the second light diffuser area 489-2 is in an inclined relationship with respect to the boundary line of the angular division within the wavefront division optical path length varying component 360. That is, two of the boundary lines for angular division within the wavefront division optical path length varying component 360 are in a parallel relationship to the horizontal axis 450 and the vertical axis 460. In contrast, all boundary lines between the first light diffuser area 489-1 and the second light diffuser area 489-2 have an inclined relationship to the horizontal axis 450 and the vertical axis 460. In other words, the arrangement is such that the boundary lines between the first light diffuser area 489-1 and the second light diffuser area 489-2 exist within any area in the wavefront division optical path length varying component 360 divided into 48 areas.

Therefore, with respect to light that passes through any area within the wavefront division optical path length varying component 360 divided into 48 areas, a portion of the light always passes through the first light diffuser area 489-1 and the remaining portion passes through the second light diffuser area 489-2. As a result, the effect described in Chapter 3 is efficiently achieved.

When the area of the first light diffuser area 489-1 and the area of the second light diffuser area 489-2 are almost equal within any area in the wavefront division optical path length varying component 360 divided into 48 areas, the effect described in Chapter 3 is greatly (maximally) achieved. Specifically, the effect is the greatest when the “angle of the 'boundary line between the first light diffuser area 489-1 and the second light diffuser area 489-2' with respect to the 'boundary line of angular division within the wavefront division optical path length varying component 360'" is "half" the "angle of angular division of the wavefront division optical path length varying component 360". That is, in portion (e) in FIG. 25, since the "angle of angular division within the wavefront division optical path length varying component 360" is "30 degrees", a significant effect can be obtained when the boundary line between the first light diffuser area 489-1 and the second light diffuser area 489-2 is inclined "15 degrees" with respect to the horizontal axis 450 and the vertical axis 460.

Figure 27:
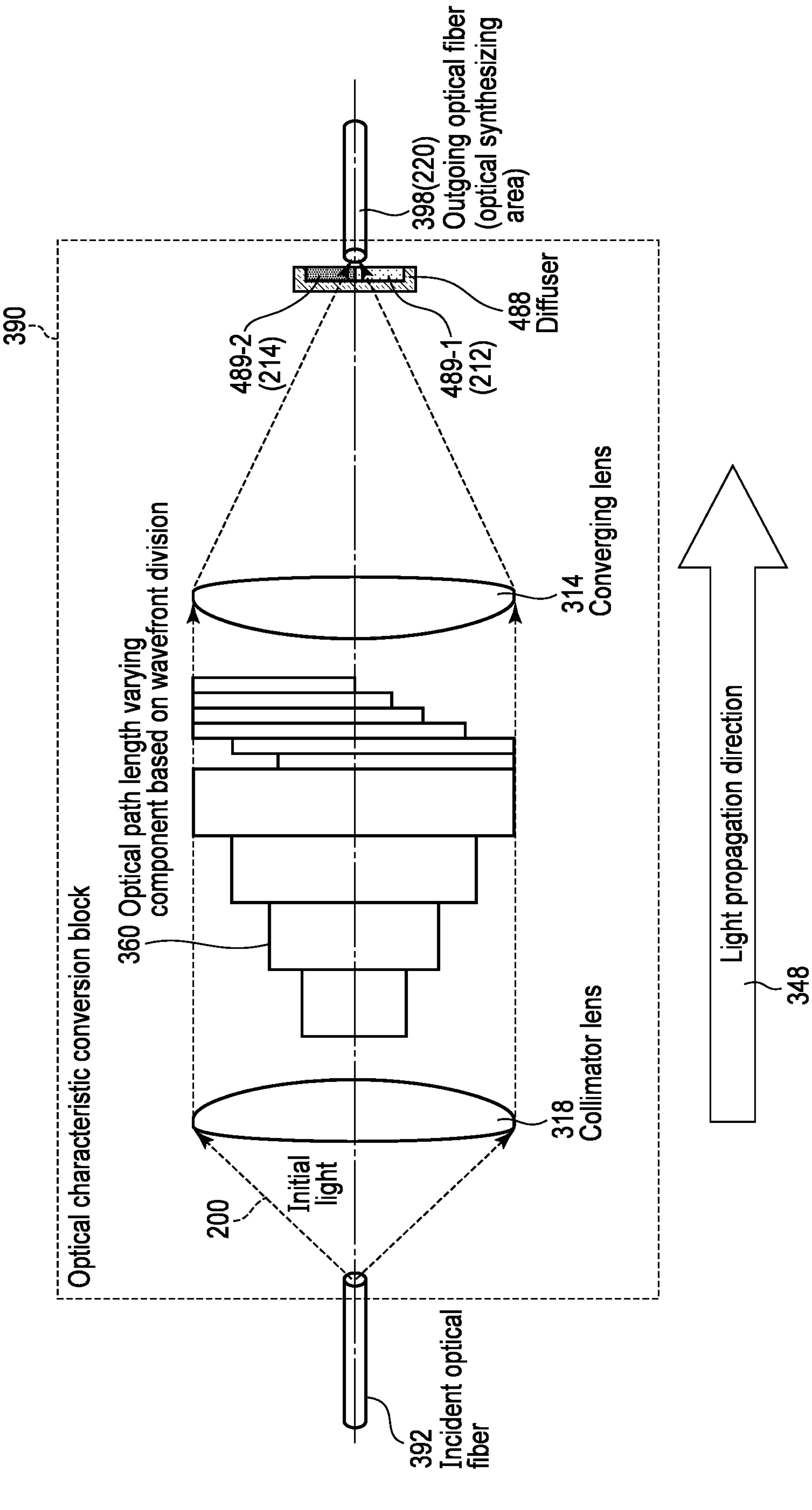
FIG. 27 is an explanatory diagram of an application example of a structure within an optical characteristic conversion block that is arranged in the middle of an optical path and converts optical characteristics.

FIG. 26 and FIG. 27 show examples of structures within the optical characteristic conversion block 390. Here, instead of configuring the light source 2 by itself, this optical characteristic conversion block 390 can be placed in the middle of the optical path of the initial light 200 to control the optical characteristics of the initial light 200.

The optical characteristic conversion block 390 shown in FIG. 26 is placed in the far field area 180 of the initial light 200 (for example, in the middle of the optical path of the parallel light) to generate a synthesized light 230 whose optical characteristics are controlled. In this optical characteristic conversion block 390 as well, both the optical phase synchronizing characteristic and the optical phase profile (wavefront profile) are controlled simultaneously. Particularly, the optical characteristic conversion block 390 controls the optical phase synchronizing characteristic and changes a degree of temporal coherence of initial light 200. And the diffuser 488 or the diffraction grating or hologram controls the optical phase profile (wavefront profile) and changes a degree of spatial coherence of initial light 200. The optical interference noise of the synthesized light 230 reduces more effectively when both the degree of temporal coherence and the degree of spatial coherence is decreased simultaneously.

In other words, the wavefront division optical path length varying component 360 is first arranged first along the propagation direction of the initial light 200, and the optical phase synchronizing characteristic is first controlled. Subsequently, the diffuser 488 or the diffraction grating or hologram is placed to control the optical phase profile (wavefront profile). A nearly parallel light passes through the wavefront division optical path length varying component 360. Since the light that passes through the diffuser 488 or the diffraction grating or hologram travels in various directions, light synthesis is performed in the space immediately after passing through the diffuser 488 or the diffraction grating or hologram. That is, the space immediately after passing through the diffuser 488 or the diffraction grating or hologram becomes the optical synthesizing area 220. As a result, the synthesized light 230 is obtained. When controlled in the above order along the light propagation direction 348 in the optical characteristic conversion block 390, the most efficient and significant effect can be achieved.

In addition, it has the advantage of easily reducing the thickness and cost because the optical characteristic conversion block 390 include only the wavefront division optical path length varying component 360 and the diffuser 488 (or diffraction grating or hologram).

With the recent development of optical communication technology, all types of light, including white light and panchromatic light, as well as monochromatic light represented by laser light, are propagated and used via optical fiber (waveguide) 330, 392, and 398. The optical characteristic conversion block 390 shown in FIG. 27 shows a method of controlling the optical characteristics of the synthesized light 230 in a manner consistent with the technology trend. That is, the optical characteristic conversion block 390 in FIG. 27 is placed in the middle of the light propagation path 6 passing through the optical fiber (waveguide) 330, 392, and 398.

The entrance of the optical characteristic conversion block 390 in FIG. 27 is connected to an incident optical fiber 392, and the exit of the optical characteristic conversion block 390 is connected to an outgoing optical fiber 398. The initial light 200 from the incident optical fiber 392 is converted to a substantially parallel light by the collimator lens 318. In the far field area 180, the substantially parallel light first passes through the wavefront division optical path length varying component 360 along the light propagation direction 348. As it passes through this wavefront division optical path length varying component 360, the optical phase synchronizing characteristic is controlled.

This wavefront division optical path length varying component 360 may also be placed in the near field area 170 close to the exit surface of the incident optical fiber 392. However, considering a light power loss at the boundary surface (for example, side surfaces 380 of different levels in FIG. 15) within this wavefront division optical path length varying component 360, it is preferable to place the wavefront division optical path length varying component 360 in the far field area 180. In addition, the shape of the wavefront division optical path length varying component 360 in FIG. 27 is in the form of 48 divided elements already described in FIG. 14. However, the specific shape of the wavefront division optical path length varying component 360 is not limited thereto, and the 12 divided elements described in FIG. 15 or the two divided elements arranged in FIG. 13 may also be used.

After passing through the wavefront division optical path length varying component 360 along the light propagation direction 348, the light is converged by the converging lens 314 toward the outgoing optical fiber 398. The diffuser 488 is placed just before the entrance of this outgoing optical fiber 398. The first light diffuser area 489-1 and the second light diffuser area 489-2 are formed on the surface facing the entrance of the outgoing optical fiber 398 (the surface closest to the entrance of the outgoing optical fiber 398) in this diffuser 488.

The first light diffuser area 489-1 with a relatively small averaged value "Ra1" of surface roughness and averaged pitch "Pa1" thereof configures the first area 212. In comparison, the second light diffuser area 489-2 with a relatively large averaged value "Ra2" of surface roughness and averaged pitch "Pa2" thereof (satisfying the relationships of "Ra2/Ra1>1" and "Pa2/Pa1>1") configures the second area 214.

As in FIG. 24 and FIG. 25, with respect to the light that passes through at least one of area within the wavefront division optical path length varying component 360 divided into 48 areas, a portion of the light always passes through the first light diffuser area 489-1 and the remaining portion passes through the second light diffuser area 489-2. When the first light diffuser area 489-1 and the second light diffuser area 489-2 are arranged in this manner, a significant effect as described in Chapter 3 is achieved.

The first light element 202 that passes within the first light diffuser area 489-1 and the second light element 204 that passes within the second light diffuser area 489-2 both propagate within the outgoing optical fiber 398. The first light element 202 and the second light element 204 are synthesized in the process of light propagation within the outgoing optical fiber 398. Therefore, the inside of the outgoing optical fiber 398 functions as the optical synthesizing area 220. In this manner, when the optical phase synthesizing profile is controlled, the optical phase profile (wavefront profile) is controlled, and light elements are synthesized in sequence along the light propagation direction 348 (that is, via the optical synthesizing area 220 after passing through the wavefront division optical path length varying component 360 along the light propagation direction 348, and after passing through an optical characteristic controlling component that controls the optical phase profile (wavefront profile)), the effect of Chapter 3 can be achieved most efficiently.

Instead of the diffuser 488 in FIG. 27, a diffraction grating or hologram with an unpolished rough structure surface may be arranged. Alternatively, instead of arranging the diffuser 488 in FIG. 27, the entrance end surface of the outgoing optical fiber 398 may have a rough structure. In this case, the first area 212 and the second area 214 with different averaged values "Ra" of surface roughness and averaged pitch "Pa" thereof may be formed on the entrance end surface of the outgoing optical fiber 398. In this manner, by providing a rough structure on the entrance end surface of the outgoing optical fiber 398 instead of arranging the diffuser 488 in FIG. 27, the number of optical component parts can be reduced. As a result, the optical system can be simplified, downsized, and made less expensive.

[Chapter 6: Unique Imaging Spectrum Measurement Example Combining Imaging Technique and Spectral Profile Measuring Technique]

A measurement example and a service providing example utilizing the synthesized light 230 generated in the light source 2 or formed by the optical characteristic conversion block 390, etc., described in the previous chapters will be described. In the present embodiment, as already explained in FIGS. 1 and 2, the synthesized light 230 obtained in the light source 2 (or formed by the optical characteristic conversion block 390) is transmitted through the light propagation path 6, and is irradiated onto the light application object 20 or measured by the measurer 8. Then, the information obtained as a result thereof and each of the items 62 to 76 in the applications 60 are utilized in cooperation. As a result, services are provided to the user.

As an example of measurement or service provision with using the synthesized light 230, a measurement method and a service providing method utilizing an imaging spectrum, which is a combination of an imaging technique and a spectral profile measuring technique, will be described below. However, it is not limited to imaging spectrum measurement, and may be applied to any measurement or service provision using the synthesized light 230 described in the previous chapters.

Figure 28:
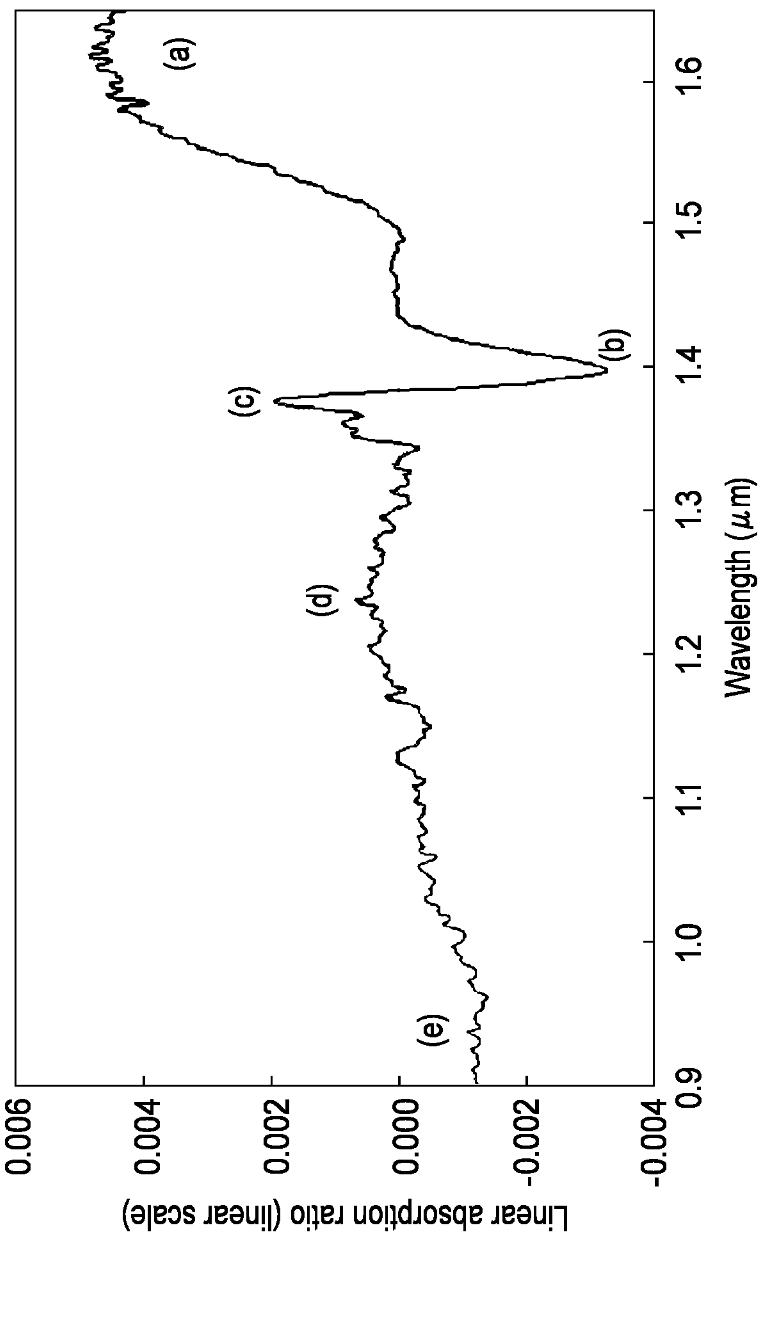
FIG. 28 is an explanatory diagram showing characteristics of a linear absorption ratio of glucose dissolved in water.

FIG. 28 shows a spectral profile of Glucose dissolved in pure water. The vertical axis of FIG. 28 shows the linear absorption ratio on a linear scale. For the measurement in FIG. 28, the synthesized light 230 described above was used. In the aqueous Glucose solution, a volume occupation ratio of pure water is overwhelmingly greater than a volume occupation ratio of Glucose molecules. Therefore, the spectral profile obtained from the aqueous Glucose solution is almost similar to a "spectral profile of pure water only". And the "spectral profile of pure water only" conceals the spectral profile of Glucose dissolved. In order to measure the actual profile of Glucose dissolved, data of the "spectral profile of pure water only" was measured in advance, and the "spectral profile of pure water only" was subtracted from the spectral profile obtained from the aqueous Glucose solution to extract the spectral profile of glucose alone dissolved in pure water.

An area (a) of measurement data in FIG. 28 shows that Glucose dissolved in pure water has a big light absorption near the wavelength of 1.6 μm. This absorption band is presumably due to the vibration mode (1st-order overtone of stretching vibration) of a hydrogen atom bonded independently to a carbon atom in the five-membered ring that constitutes Glucose. Although the amount of light absorption is small, an area (d) of measurement data in FIG. 28 suggests an absorption band corresponding to Glucose near the wavelength of 1.24 μm (combination mode). Moreover, an area (e) of measurement data suggests another absorption band corresponding to Glucose near the wavelength of 0.92 μm (2nd-order overtone of stretching vibration).

Note that the measurement data in the wavelength ranges of areas (b) and (c) in FIG. 28 is interpreted as measurement error. Glucose is well soluble in water. In general, (soluble) substances that dissolve well in water often have local polarity. When a substance with this polarity dissolves in pure water, a hydrogen bond chain in the pure water tends to occur around this polar area. When this hydrogen bond chain in pure water occurs, a maximum light absorption wavelength value (central wavelength value of the corresponding absorption band) in the "spectral profile of pure water only" shifts to a longer wavelength side. As a result, the absorption changes of the areas (b) and (c) of measurement data in FIG. 28 are expected to appear.

Figure 29:
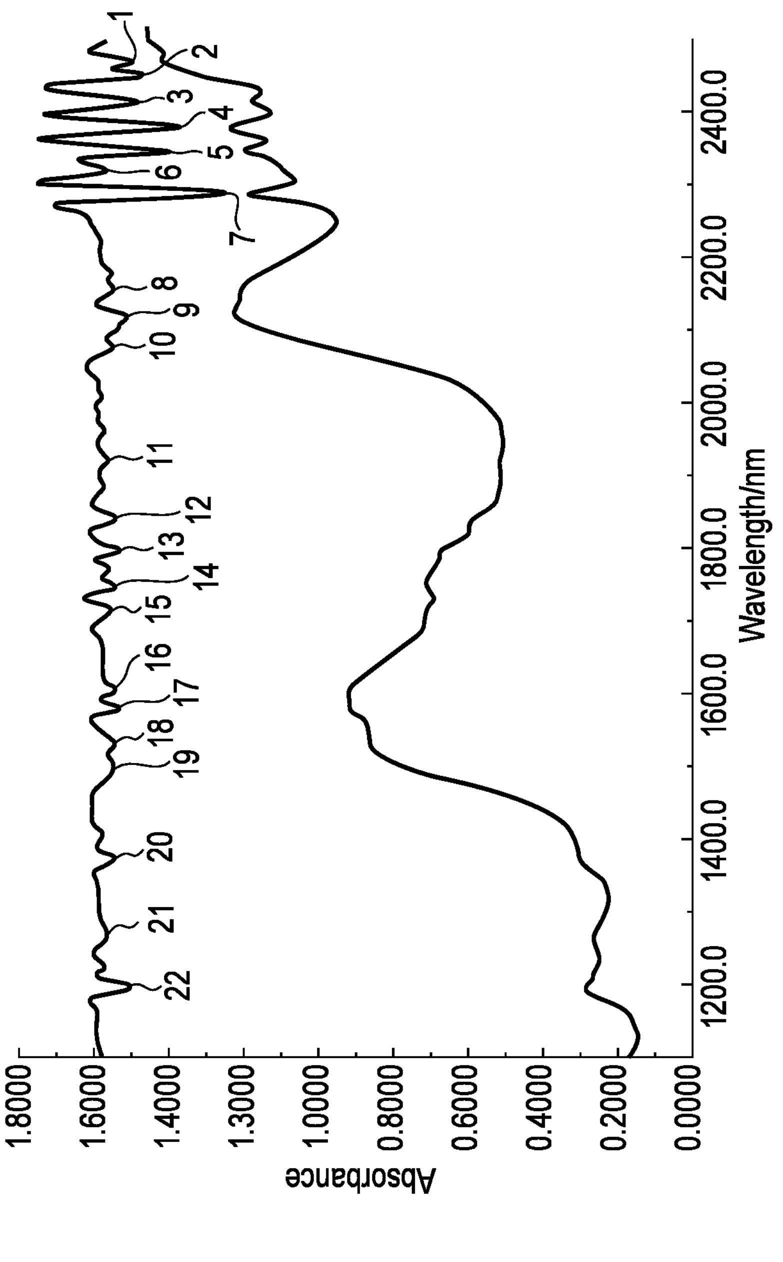
FIG. 29 is an explanatory diagram showing absorbance of glucose alone.

To confirm the authenticity of the measurement data of FIG. 28, the absorbance characteristics of Glucose alone (in its pre-dissolved state in water) were investigated in the literature. FIG. 29 shows the absorbance characteristics of Glucose alone. Here, the vertical axis in a graph (a) in FIG. 29 is shown as "absorbance" on a logarithmic scale. A table (b) in FIG. 29 shows wavelengths at peak positions 1-22 in a graph (a). Although there is a difference in scale display, the upper side of vertical axis in both FIG. 28 and the graph (a) in FIG. 29 shows an increasing direction of light absorption. Note that FIG. 29 is transcribed from Near Infrared Spectroscopy (1996, Gakkai Shuppan Center), p. 211, edited by Yukihiro Ozaki and Satoshi Kawada. The table (b) in FIG. 29 also shows absorption bands at wavelengths of 1.6 μm and 1.26 μm. Therefore, the comparison of FIG. 28 and FIG. 29 confirms the authenticity of the measurement data of FIG. 28.

Figure 30:
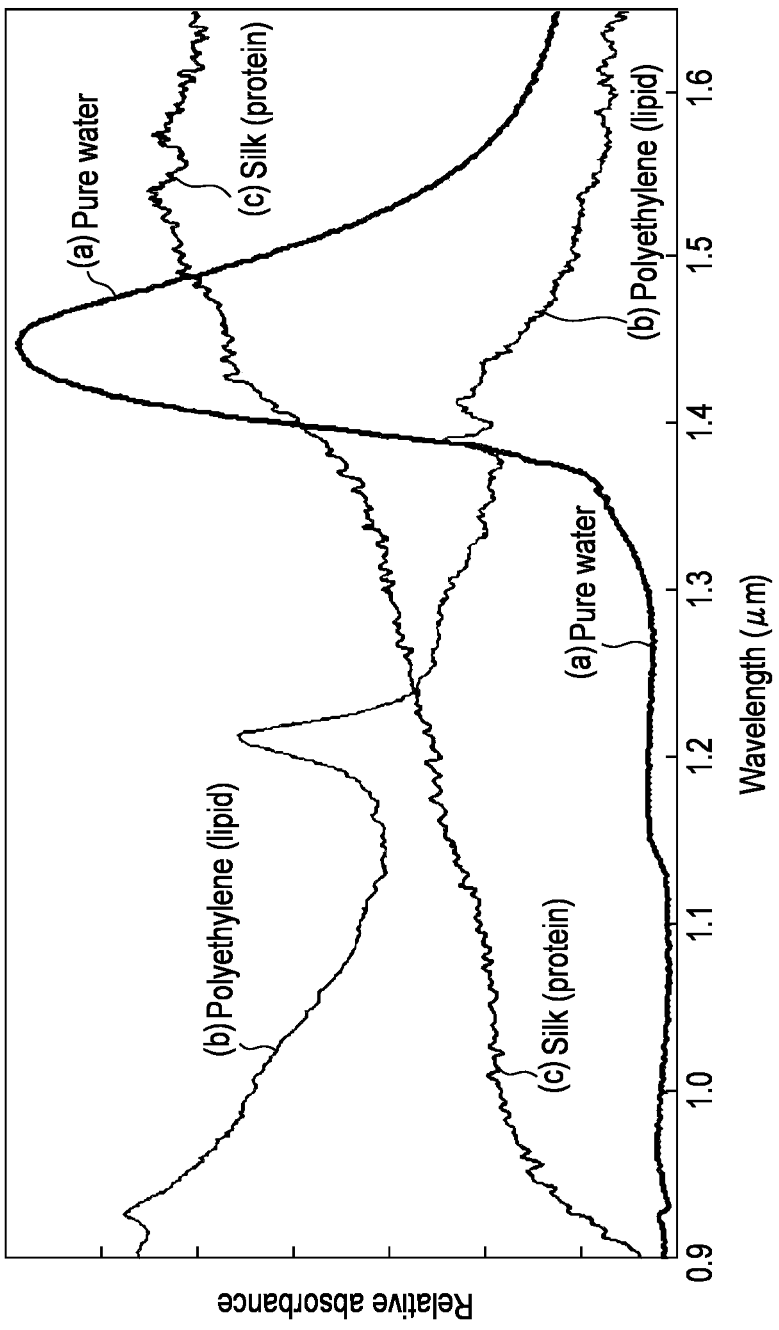
FIG. 30 is an explanatory diagram for comparing relative absorbance of water/silk/polyethylene.

The profiles (a), (b), and (c) in FIG. 30 respectively show the comparative measurement data of the relative absorbance of pure water (a), a Polyethylene sheet (b), and a silk scarf (c). All of these data were measured using the synthesized light 230 described in the previous chapters. There are significantly different profiles in absorbance between the actual measurements of pure water (a), polyethylene sheet (b) and silk scarf (c). In FIG. 30, each of scales of absorbance of profiles (a), (b), and (c) is adjusted for easy comparison.

The majority of living organisms are composed of water components, and the volume ratio of water in blood vessels is particularly large.

A living organism is mainly composed of three major constituents: "carbohydrate", "fat", and "protein". "Carbohydrate" here refers to the aforementioned members of the Glucose family present in either isolated (monosaccharide) or linked (polysaccharide) form. Many of the atomic arrangements within the "fat" are structurally similar to polyethylene. In addition, silk is made from "protein". Thus, the absorbance characteristics of the four major constituents of the living organism, including water, can be roughly considered to be similar to those shown in either FIG. 28 or FIG. 30.

Figure 31:
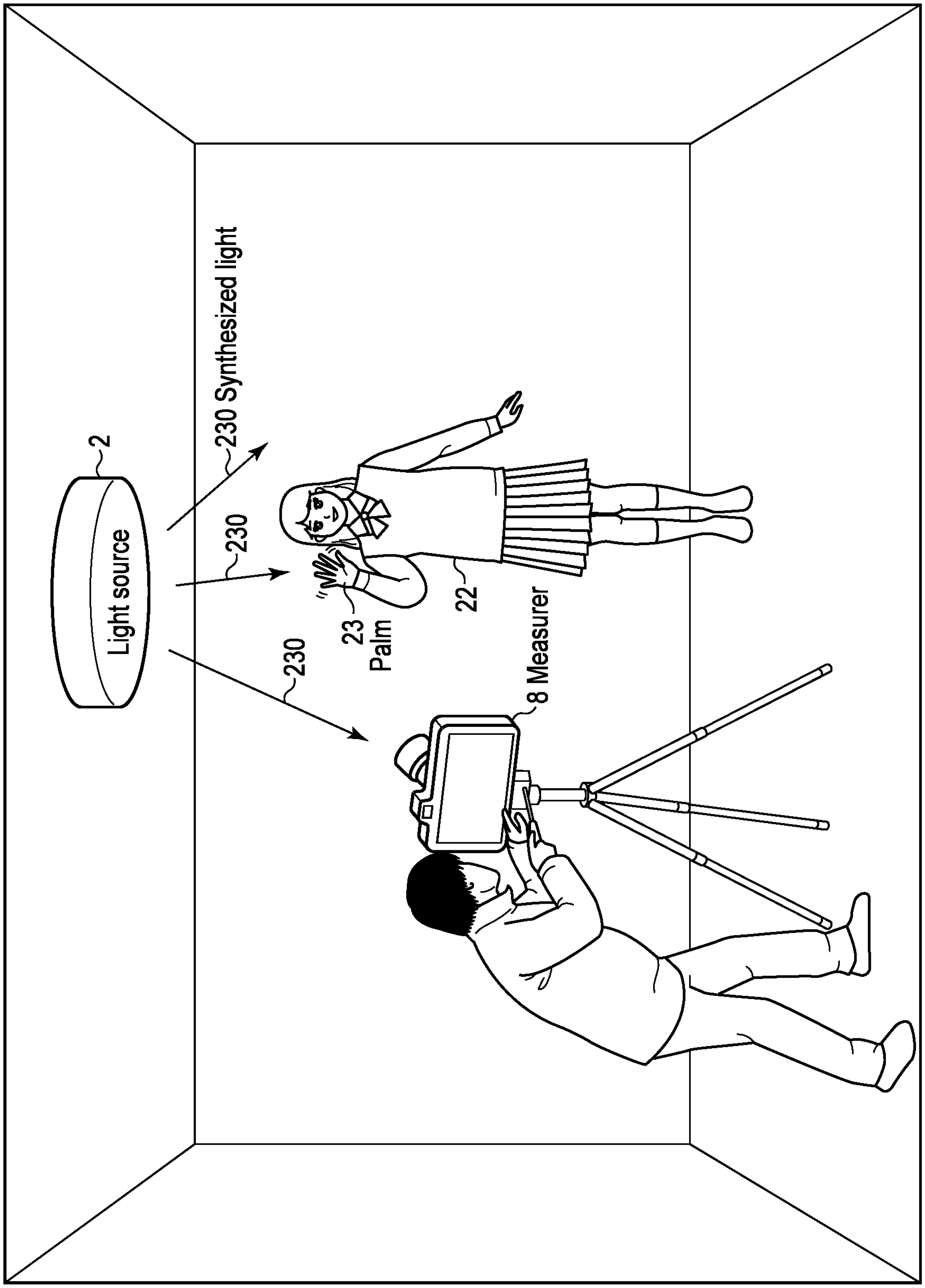
FIG. 31 shows an explanatory example of a measurement state for measuring characteristics of a subject.
Figure 32:
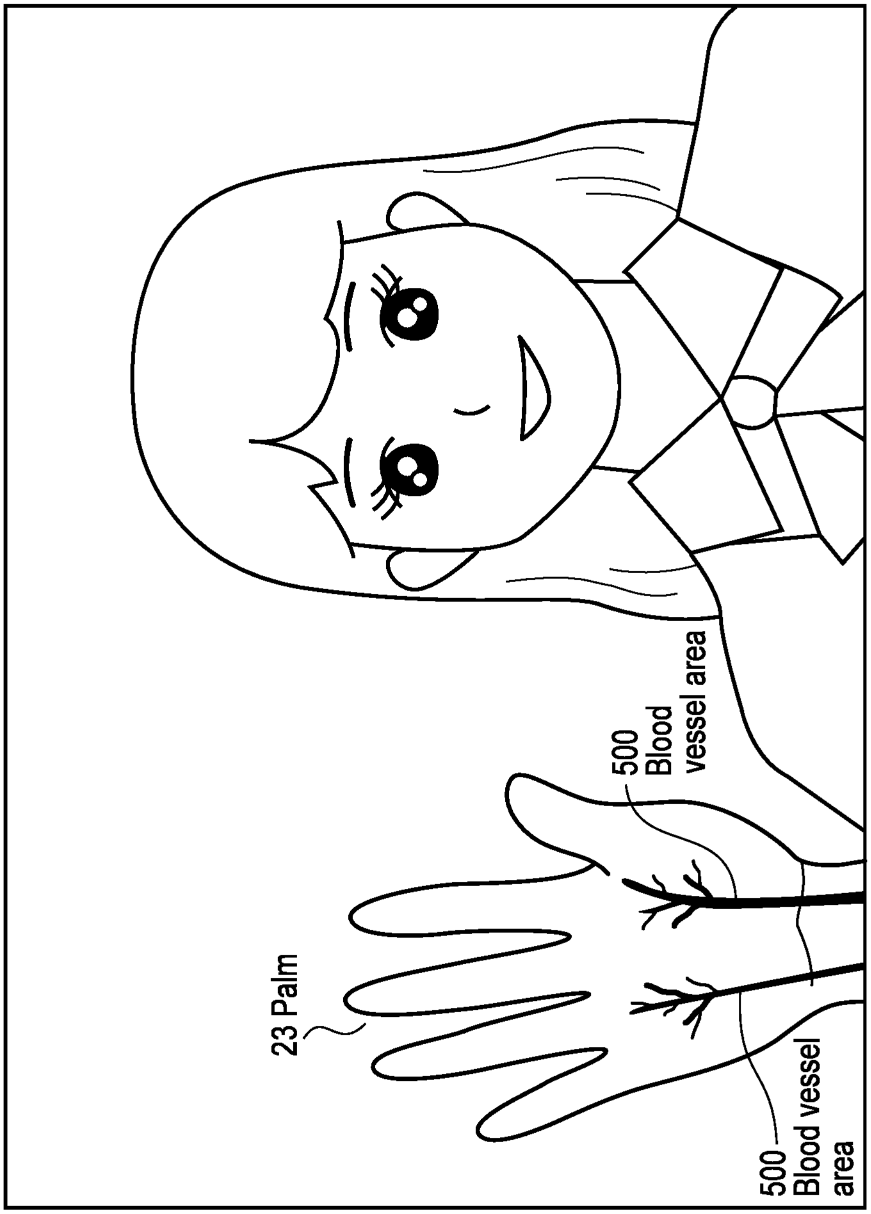
FIG. 32 shows an enlarged view of a measurement area when measuring characteristics of the subject.

FIG. 31 shows an example of a measurement environment utilizing imaging spectrum. The synthesized light 230 described in the previous chapters is emitted from the light source 2. The synthesized light 230 emitted from the light source 2 is reflected by a palm 23 in the measured object 22 and enters the measurer 8. FIG. 32 shows an example of an image captured within the measurer 8. As shown in FIG. 32, there is a blood vessel area 500 at a predetermined location inside the palm 23.

Figure 33:
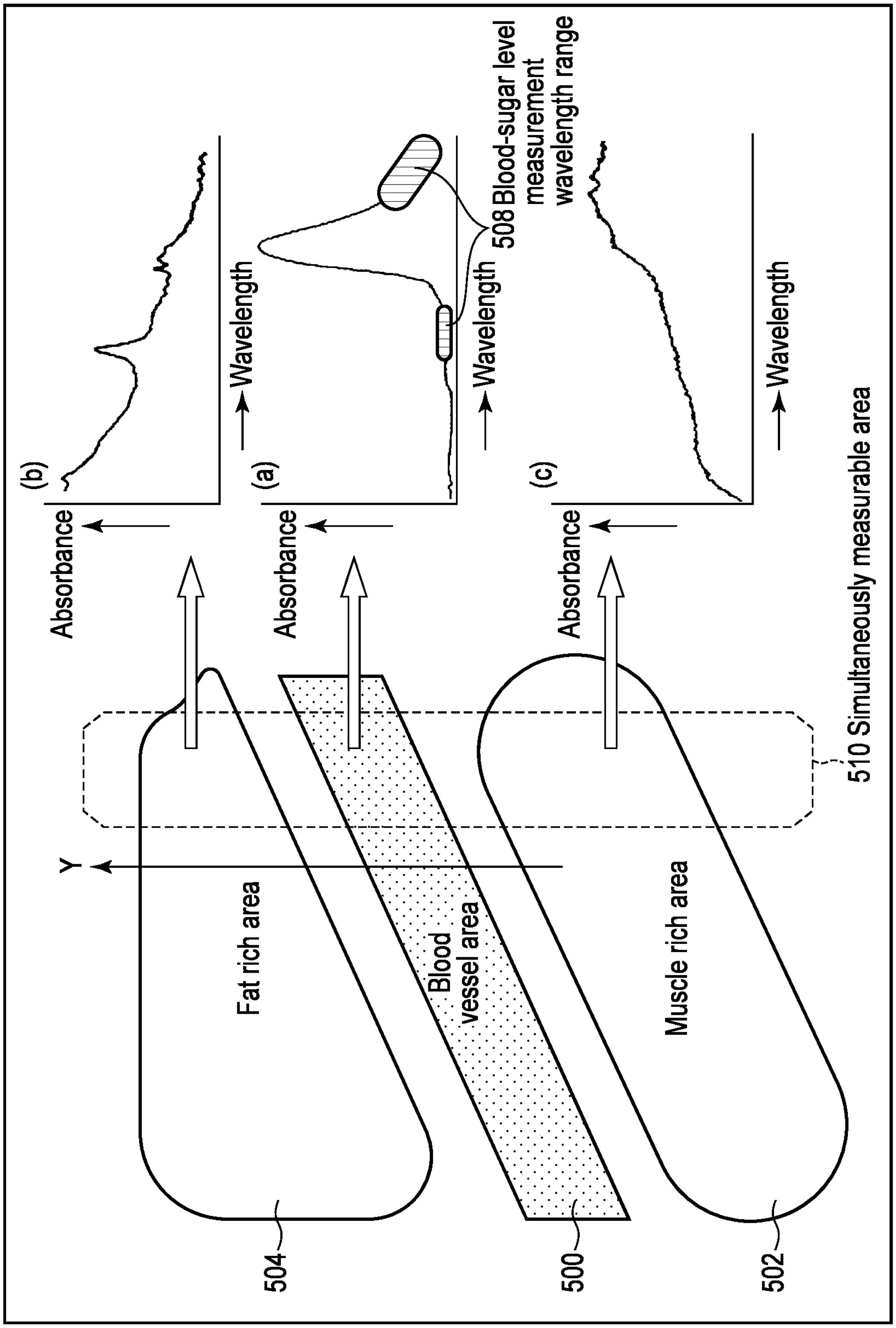
FIG. 33 is an explanatory diagram showing the relationship between measurement locations within the measurement area and spectral profiles obtained therefrom.

FIG. 33 shows an example of an enlarged image around the above blood vessel area 500. In the present embodiment, the spectral profile of each pixel in a one-dimensionally arranged image is measured. A connected area of pixels for which spectral profile can be measured at the same time is referred to as a simultaneously measurable area 510.

The spectral profile (absorbance characteristics) of graph (b) in FIG. 33 is obtained from a fat rich area 504 within the simultaneously measurable area 510 in FIG. 33. The spectral profiles (absorbance characteristics) of graphs (a) and (c) in FIG. 33 are obtained from the blood vessel area 500 and a muscle rich area 502 within the simultaneously measurable area 510. Thus, from the spectral profile (absorbance characteristics) obtained for each pixel within the simultaneously measurable area 510, each of constituents of the living organism, for example, on the arrangement of the blood vessel area 500 can be predicted.

Figure 34:
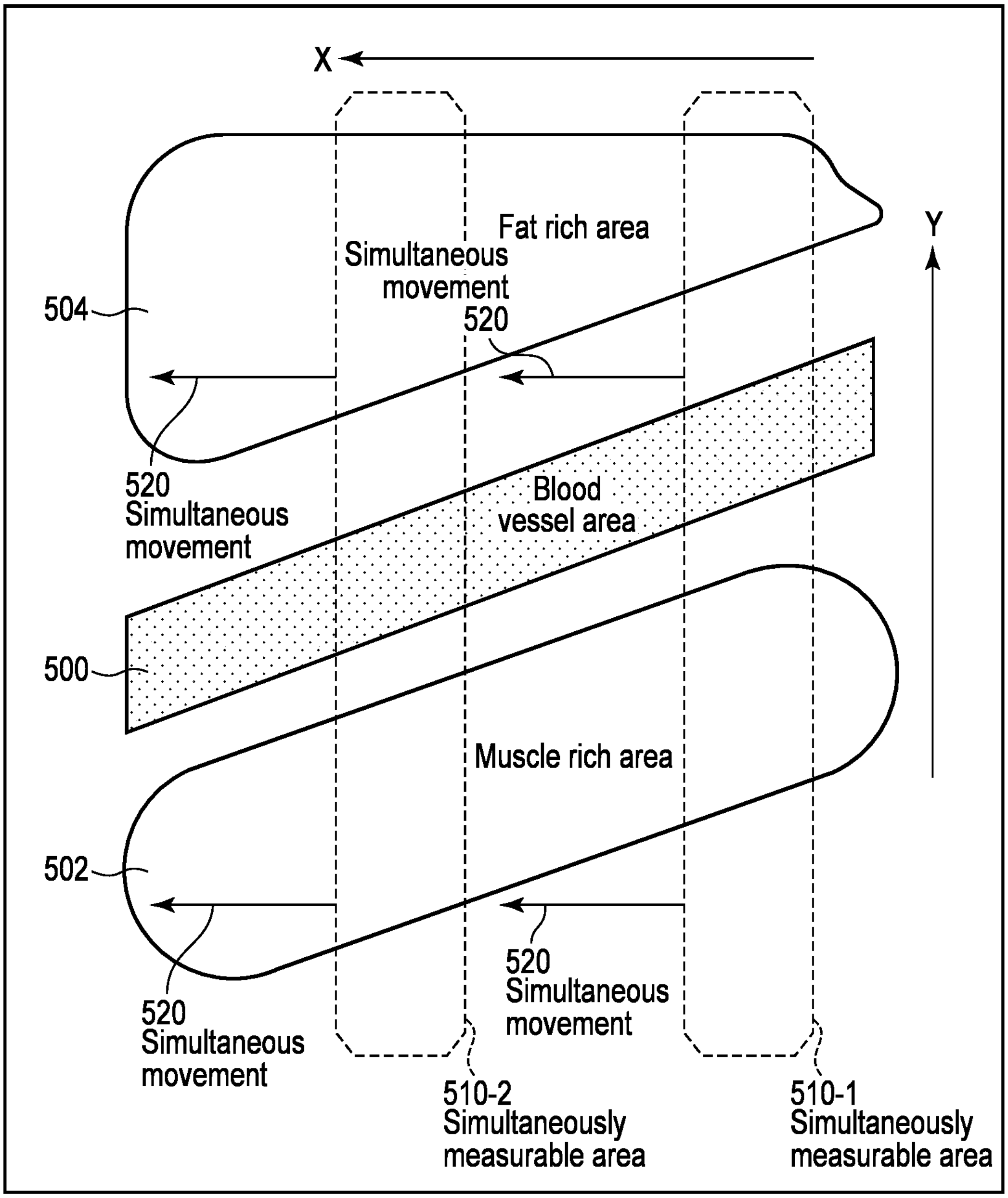
FIG. 34 is an explanatory diagram of a measurement method for an entire two-dimensional area of a measurement target.

As FIG. 34 shows in contrast to FIG. 33, when multiple simultaneously measurable areas 510-1 and 510-2 can be made at the same time, the number of pixels for which spectral profiles can be measured simultaneously increases. As a result, the number of pixels of the imaging spectrum that can be measured at once increases dramatically. Furthermore, if the simultaneously measurable areas 510-1 and 510-2 can be simultaneously moved 520, the spectral profile for each pixel in two dimensions can be collected in a very short time. That is, by simply simultaneously moving 520 the position of the simultaneously measurable area 510-1 to the position of the simultaneously measurable area 510-2 before the simultaneous movement 520, the spectral profile for each pixel can be collected in a short time. To enable this measurement, in the present embodiment, the optical characteristic converting component 210 already described using FIG. 7 is placed in the measurer 8. Note that, the spectral profile information for each pixel in two dimensions is referred to as a data cube. In the description up to FIG. 34, the spectral profile information (data cube) for each two-dimensional pixel can be measured.

Figure 35:
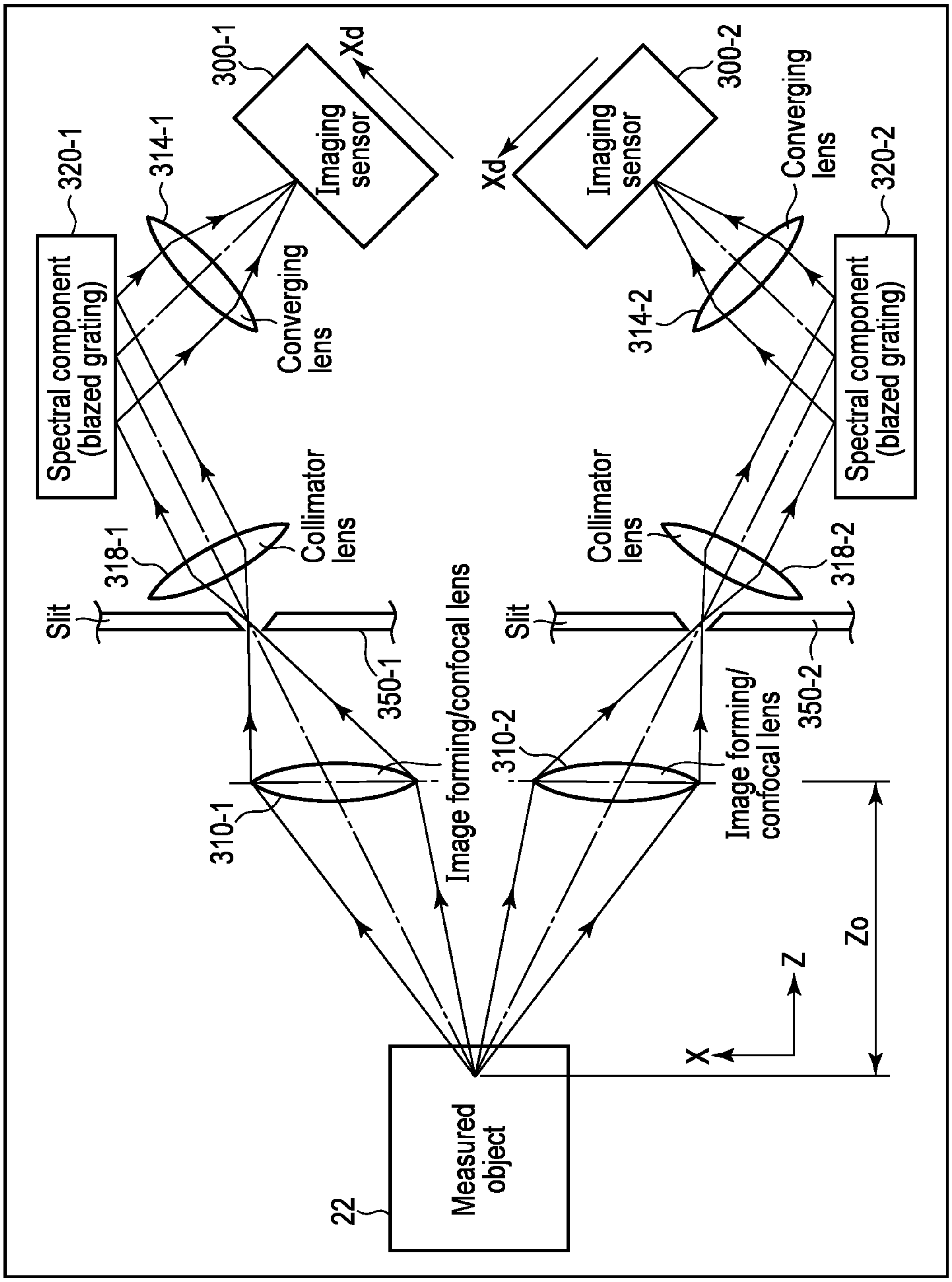
FIG. 35 is an explanatory diagram of a measurement method for a three-dimensional area of a measurement target including a depth direction.
Figure 36:
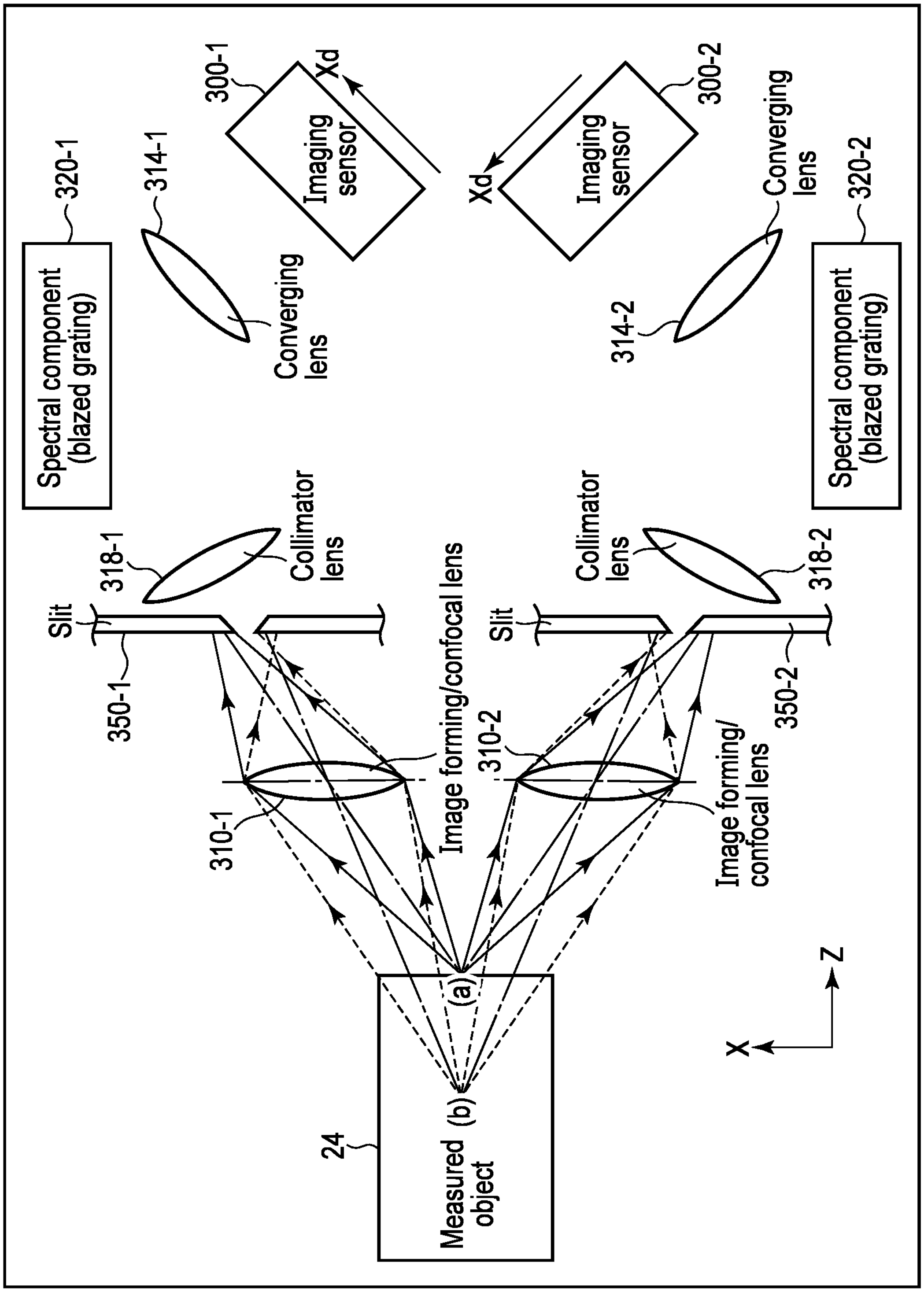
FIG. 36 is an explanatory diagram showing detection accuracy in the depth direction in the three-dimensional area measurement method.

FIG. 35 and FIG. 36 show methods of obtaining the spectral profile information for each pixel in three dimensions, including a depth direction (z-axis direction). As shown in FIG. 35, two sets of optical systems for measurement described in FIG. 7 are placed, and by using the convergence angle between the two two-dimensional images detected between them, it is possible to collect a data cube that depends on a distance "$Z_0$" in the depth direction. Here, the convergence angle changes by controlling (changing) the spacing between two slits 350-1 and 350-2 or controlling (changing) the spacing between two image forming/confocal lenses 310-1 and 310-2. As a result, the measured position "$Z_0$" in the front-back (depth) direction changes.

FIG. 36 shows a method of improving the resolution in the front-back (depth) direction by controlling (changing) the spacings between the image forming/confocal lenses 310-1 and 310-2 and the slits 350-1 and 350-2. Furthermore, if the slit width (width of the area through which the detected light passes) is narrowed within the slits 350-1 and 350-2, the resolution in the front-back (depth) direction is further improved.

That is, FIG. 35 shows a case where data cubes are collected from the optimal measurement positions (a) and (b) in the measured object 22. In comparison, the detected light from the position (a) and the position (b) in FIG. 36 protrudes from the slit width within the slits 350-1 and 350-2. Since the light is shielded by the slits 350-1 and 350-2, the detected light from the position (a) and the position (b) in FIG. 36 does not arrive at imaging sensors 300-1 and 300-2. This improves the resolution in the front-back (depth) direction.

[Chapter 7: Example in Detector]

In FIG. 7, the operating principle of the optical characteristic converting component 210 was mainly described. Now, a method for performing imaging spectrum measurement with high precision and high speed will be described with reference to FIG. 37 and FIG. 38.

Figure 37:
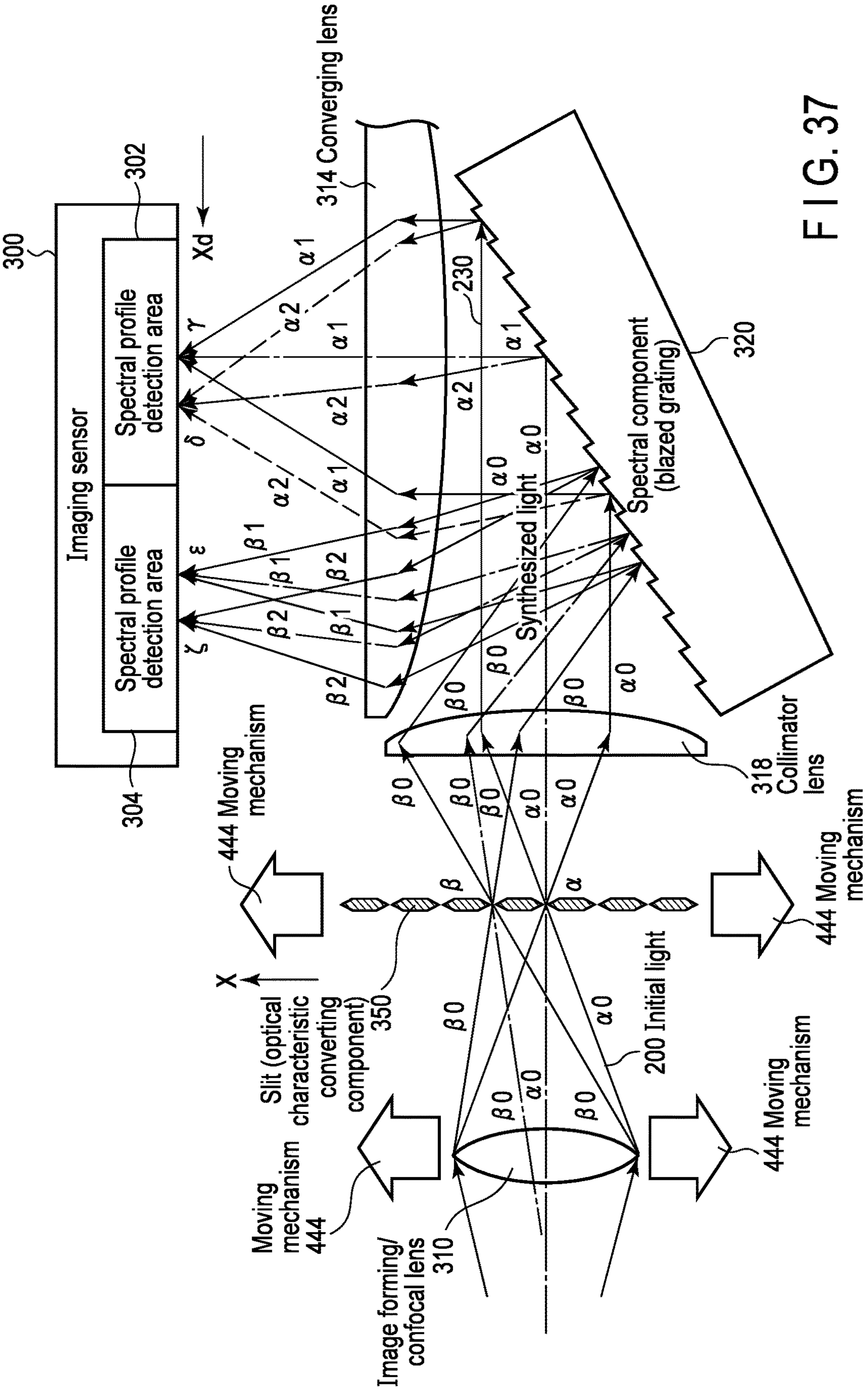
FIG. 37 is a diagram explaining the principle of a measurement method combining spectrometry and imaging.
Figure 38:
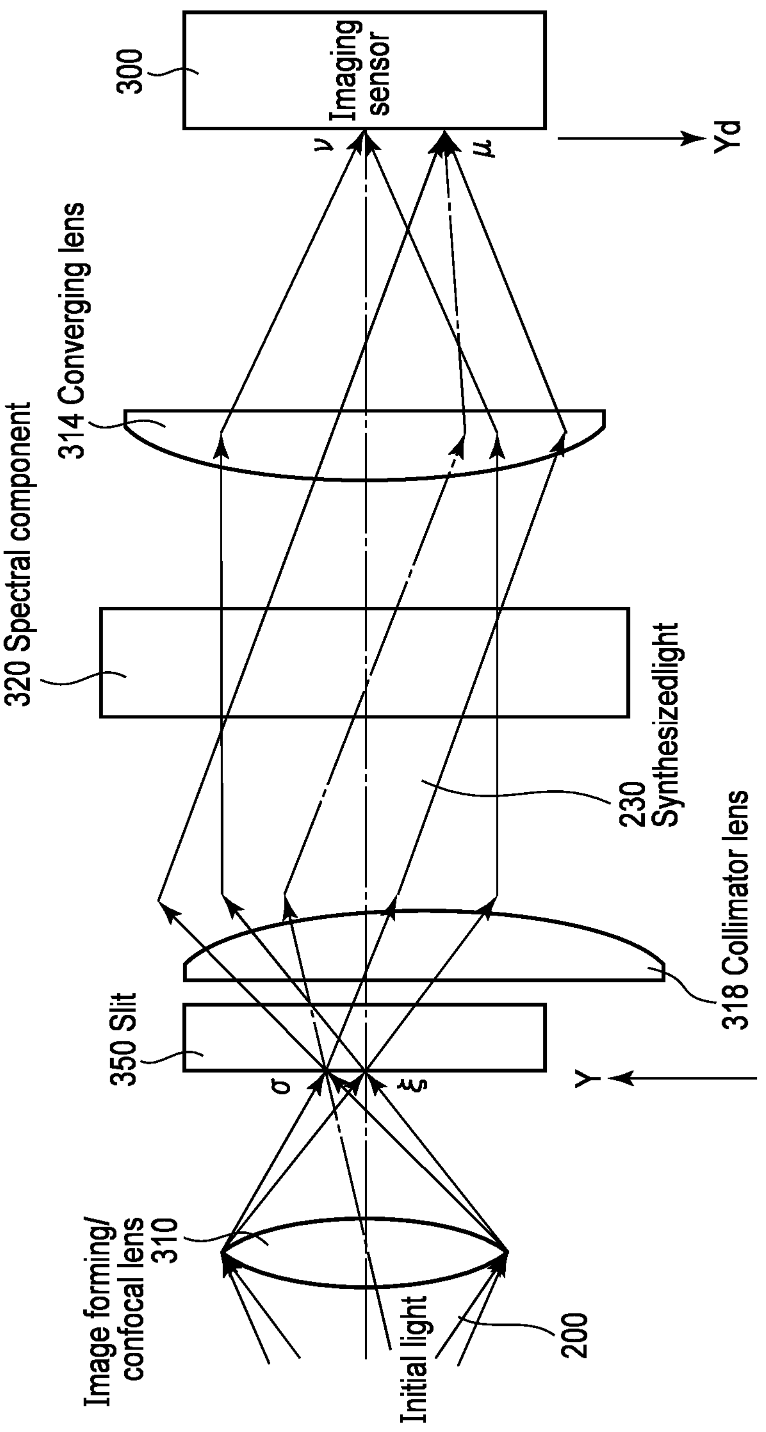
FIG. 38 is an explanatory diagram of image forming direction Yd in the measurement method combining spectrometry and imaging.

FIG. 37 shows a cross-sectional view (XZ cross-sectional view) in a plane direction including an X axis on the slit 350 (optical characteristic converting component 210). The synthesized light 230 traveling along an "XZ plane" on the slit 350 (optical characteristic converting component 210) moves in an "Xd" direction on the imaging sensor 300 when the slit 350 (optical characteristic converting component 210) or the image forming/confocal lens 310 moves along the moving mechanism. FIG. 38 shows a cross-sectional view (YZ cross-sectional view) in a plane direction including a Y axis on the slit 350 (optical characteristic converting component 210). Each different point "σ" and "ξ" on the slit 350 along the Y axis forms an image on each different point "ν" and "μ" along a Yd direction on the imaging sensor 300.

An image formed with respect to the location in the measured object 22 in FIG. 31 on which imaging spectrum measurement is desired to be performed (for example, near the blood vessel area 500 in the palm 23) is formed on the slit 350 (optical characteristic converting component 210) in FIG. 37 and FIG. 38. Then, only the image forming area corresponding to the simultaneously measurable area 510 (FIG. 33 and FIG. 34) in the measured object 22 passes through light transmission areas "α" and "β" in the slit.

The synthesized light 230 passing through the area α in FIG. 37 is converted to a parallel light "α0" by the collimator lens 318, and then is spectrally split on the surface of the spectral component (blazed grating) 320. For simplification of explanation, a case where, among the light reflected on the surface of the spectral component (blazed grating) 320, long-wavelength light travels in direction "α2" as parallel light, and short-wavelength light travels in direction "α1" as parallel light will be considered. This parallel light passes through the converging lens 314 and is converged on the surface of the imaging sensor 300. At this time, the short-wavelength light traveling in direction "α1" is converged on a "γ point" in a spectral profile detection area 302. On the other hand, the long-wavelength light traveling in direction "α2" is converged on a "δ point" in the spectral profile detection area 302. Each wavelength light spectrally split in this manner is converged at different positions in the "Xd" direction within the spectral profile detection area 302. Therefore, by measuring the detection intensity distribution along the "Xd" direction in the spectral profile detection area 302, the spectral profile of the synthesized light 230 passing through the area α can be measured.

Next, the synthesized light 230 passing through the area β in FIG. 37 is converted to a parallel light "β0" by the collimator lens 318, and then is spectrally split on the surface of the spectral component (blazed grating) 320. Among the light reflected on the surface of the spectral component (blazed grating) 320, long-wavelength light travels in direction "β2" as parallel light, and short-wavelength light travels toward "β1" as parallel light. This parallel light then passes through the converging lens 314 and is converged on the surface of the imaging sensor 300. At this time, the short-wavelength light traveling in direction "β1" is converged on a "ε point" in a spectral profile detection area 304. On the other hand, the long-wavelength light traveling in direction "β2" is converged on a "ζ point" in the spectral profile detection area 304. Each wavelength light spectrally split in this manner is converged at different positions in the "Xd" direction within the spectral profile detection area 304. Therefore, by measuring the detection intensity distribution along the "Xd" direction in the spectral profile detection area 304, the spectral profile of the synthesized light 230 passing through the area β can be measured.

As a method of simultaneously moving a plurality of simultaneously measurable areas 510-1 and 510-2 in the manner described in FIG. 34, the present embodiment may move the image forming/confocal lens 310 or the slit 350 (optical characteristic converting component 210) in FIG. 37. As shown in FIG. 37, a moving mechanism 444 may operate the image forming/confocal lens 310. Moreover, the moving mechanism 444 may also operate the slit 350 (optical characteristic converting component 210). In a case where only the image forming/confocal lens 310 is moved, the position of the slit 350 (optical characteristic converting component 210) is fixed. Therefore, the positions of the spectral profile detection area 302 and the spectral profile detection area 304 in the imaging sensor 300 are fixed. Since signal processing can be simplified, when used in application fields that permit slow data cube acquisition, it is desirable to fix the position of the slit 350 (optical characteristic converting component 210) and move only the image forming/confocal lens 310.

The weight (mass) of the image forming/confocal lens 310 is significantly bigger than that of the slit 350 (optical characteristic converting component 210). Therefore, in the case of being used in an application field where simultaneous movement 520 of the simultaneously measurable ranges 510-1 and 510-2 is desired at high speed, it is desirable to fix the position of the image forming/confocal lens 310 and move only the slit 350 (optical characteristic converting component 210). In this case, as the slit 350 (optical characteristic converting component 210) moves, the positions of the spectral profile detection area 302 and the spectral profile detection area 304 in the imaging sensor 300 shift. Therefore, in the case of high-speed operation, it is necessary to correct the detected wavelength value corresponding to each pixel on the imaging sensor 300 while monitoring the movement position of the slit 350 (optical characteristic converting component 210) in some way. In this manner, the spectral profile detection area 302 provides a spectral profile of the light passing through the area "α" in the slit 350 (optical characteristic converting component 210). Here, the spectral profile corresponds to a light intensity distribution in the "Xd direction" on the imaging sensor 300. Moreover, the spectral profile detection area 304 provides another spectral profile of the light passing through the area "β" in the slit 350.

In the "YZ cross section" direction shown in FIG. 38, the spectral component 320 works as a simple plane mirror. Therefore, the formed image corresponding to the image on the slit 350 (optical characteristic converting component 210) appears in the "Yd direction" on the imaging sensor 300. That is, the synthesized light 230 emitted from the "σ point" on the slit 350 (optical characteristic converting component 210) is converged on the "μ point" on the imaging sensor 300. The synthesized light 230 emitted from the "point ξ" on the slit 350 (optical characteristic converting component 210) is also converged on the "point ν" on the imaging sensor 300. Thus, in the imaging spectrum in the present embodiment, the formed image appears in the "Yd direction" on the imaging sensor 300, and the spectral profile appears in the "Xd direction" on the imaging sensor 300.

[Chapter 8: Service Providing System (Hierarchical Structure of Platform)]

Figure 39:
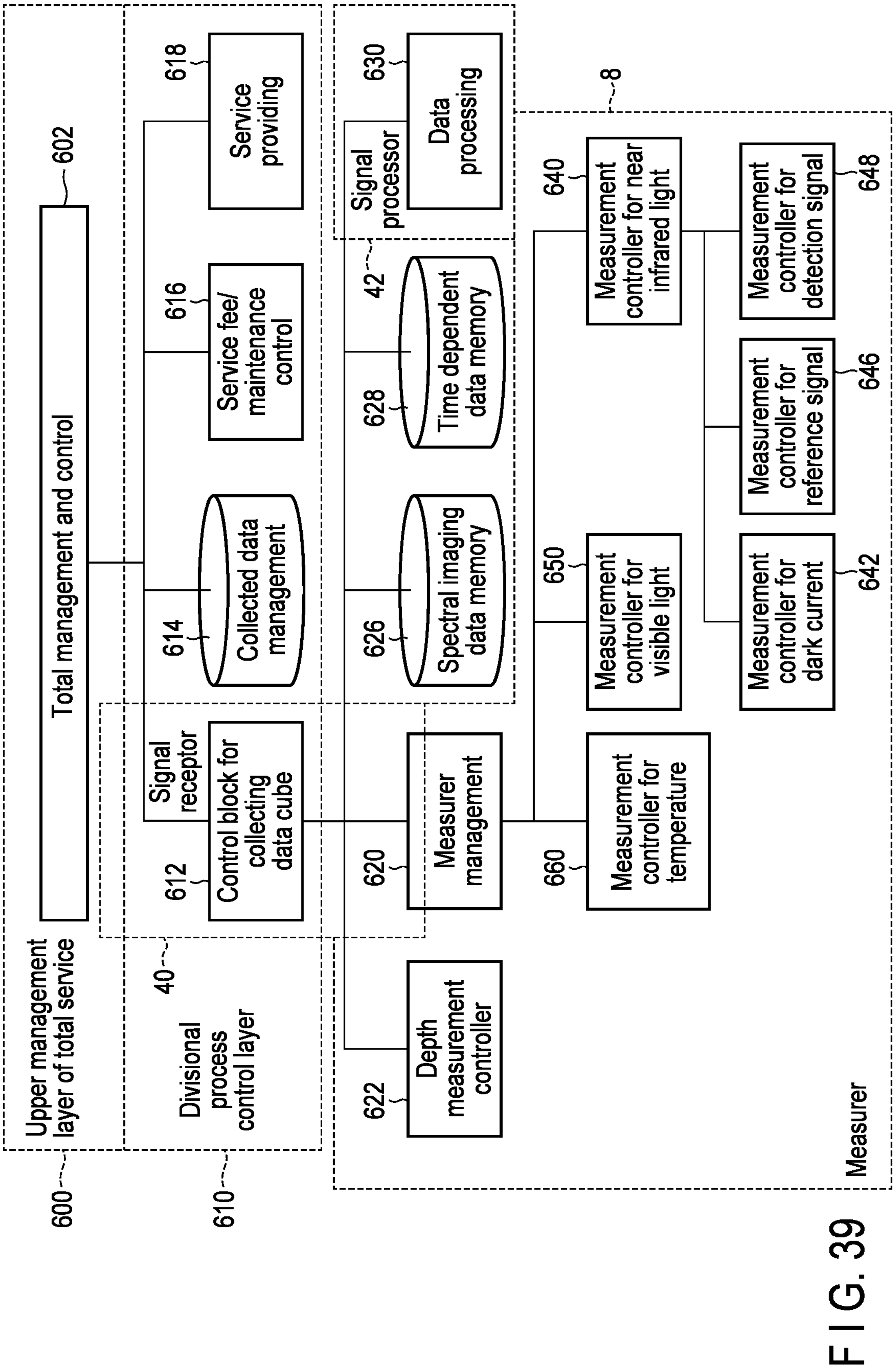
FIG. 39 is an explanatory diagram of upper-level layers of a service providing platform combining spectrometry and imaging.

In the service providing system 14 of FIGS. 1 and 2, the data cubes extracted by the measurer 8 are given to the applications 60 via the system controller 50. FIG. 39 shows the hierarchical structure of a platform controlled within the applications 60. Each block in FIG. 39 may be implemented by hardware. It is not limited thereto, and each block may be implemented by a software module. In the case where this software module is used, command control may be received via an application interface (API) from an upper layer.

A total management and control block 602 is arranged in an upper management layer of total service 600, where overall control is performed, including providing services to users. Below that, in a divisional process control layer 610, a control block for collecting data cube 612, a collected data management block 614, a service fee and maintenance control block 616, and a service providing block 618 are installed (positioned).

From this control block for collecting data cube 612, a depth measurement controller 622 and measurer management block 620, a spectral imaging data memory 626, a time dependent data memory 628, and a data processing block 630 can be controlled individually. Also, from this measurer management block 620, a measurement controller for temperature with far-infrared light (ex. thermography) 660, a measurement controller for visible light 650, and a measurement controller for near infrared light 640 can be individually integrated and controlled.

The measurement controller for near infrared light 640 properly operates a measurement controller for dark current 642, a measurement controller for reference signal 646, and a measurement controller for detection signal 648 to collect highly accurate data cubes.

Figure 40:
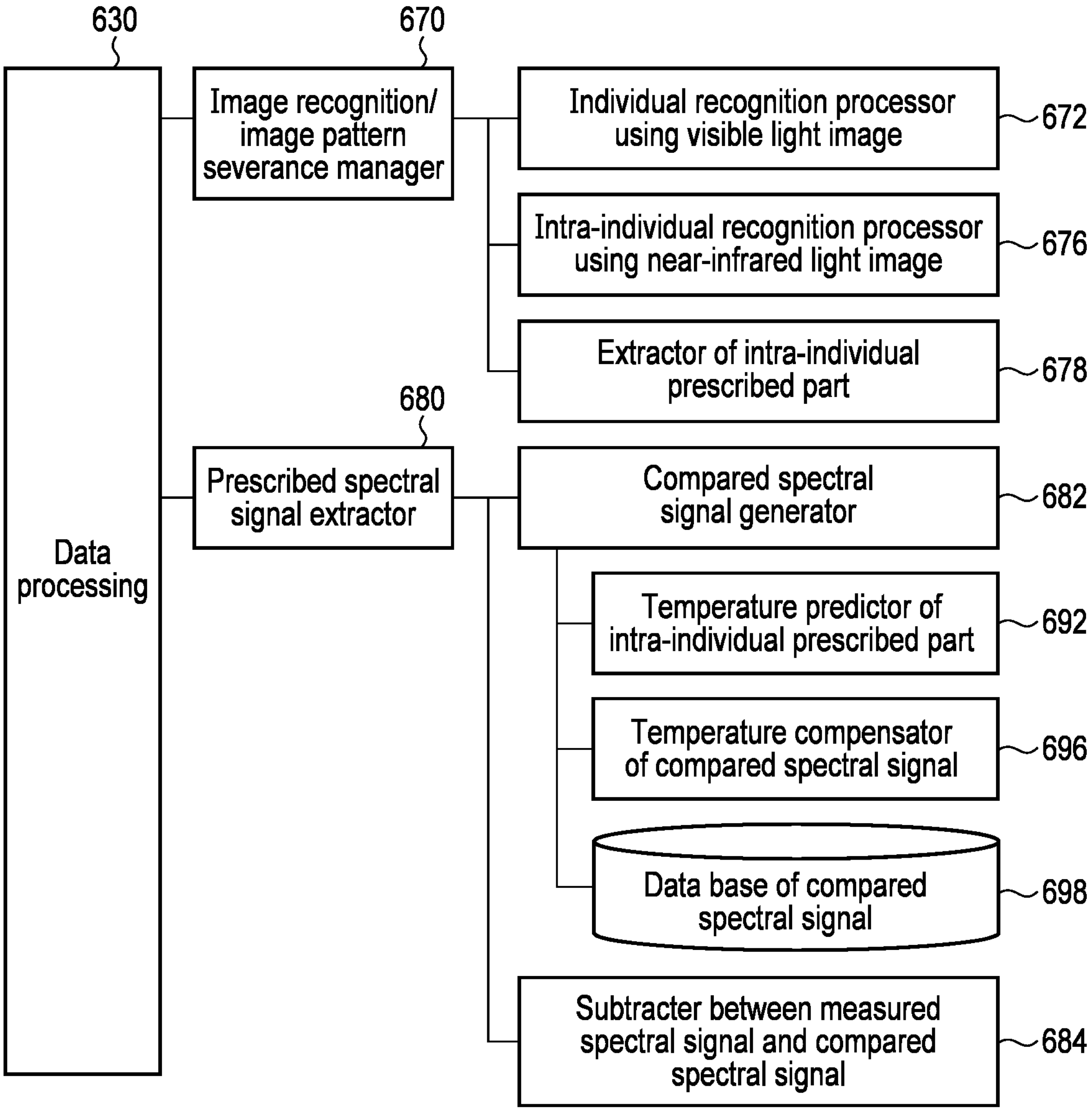
FIG. 40 is an explanatory diagram relating to an example of a configuration within a data processing block located in lower level layers of the service providing platform combining spectrometry and imaging.
Figure 41:
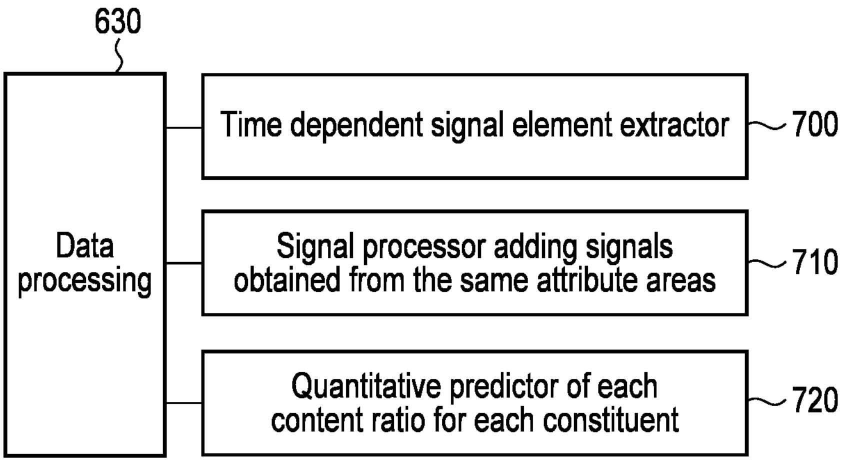
FIG. 41 is an explanatory diagram relating to another example of a configuration within a data processing block located in lower level layers of the service providing platform combining spectrometry and imaging.

FIGS. 40 and 41 shows a control system structure within the data processing block 630 described in FIG. 39. That is, in the data processing block 630, an image recognition and image pattern severance manager 670, a prescribed spectral signal extractor 680, a time dependent signal element extractor 700, a signal processor 710 adding signals obtained from the same areas, and a quantitative predictor 720 of each content ratio for each constituent are installed (positioned).

The image recognition and image pattern severance manager 670 operates an individual recognition processor 672 using visible light image, an intra-individual recognition processor 676 using near-infrared light image, and an extractor 678 of intra-individual prescribed part which are installed (positioned) at the bottom to extract parts for which a spectral profile is to be measured.

When the part for which the spectral profile is to be measured is thus extracted, the prescribed spectral signal extractor 680 operates a compared spectral signal generator

682 and a subtracter 684 between measured spectral signal and compared spectral signal which are installed (positioned) at the bottom to measure highly accurate spectral profile information on the component to be measured. Here, the compared spectral signal generator 682 operates a temperature predictor 692 of intra-individual prescribed part, a temperature compensator 696 of compared spectral signal, and a data base 698 of compared spectral signal which are installed (positioned) at a lower level to correct the measurement result.

Figure 42:
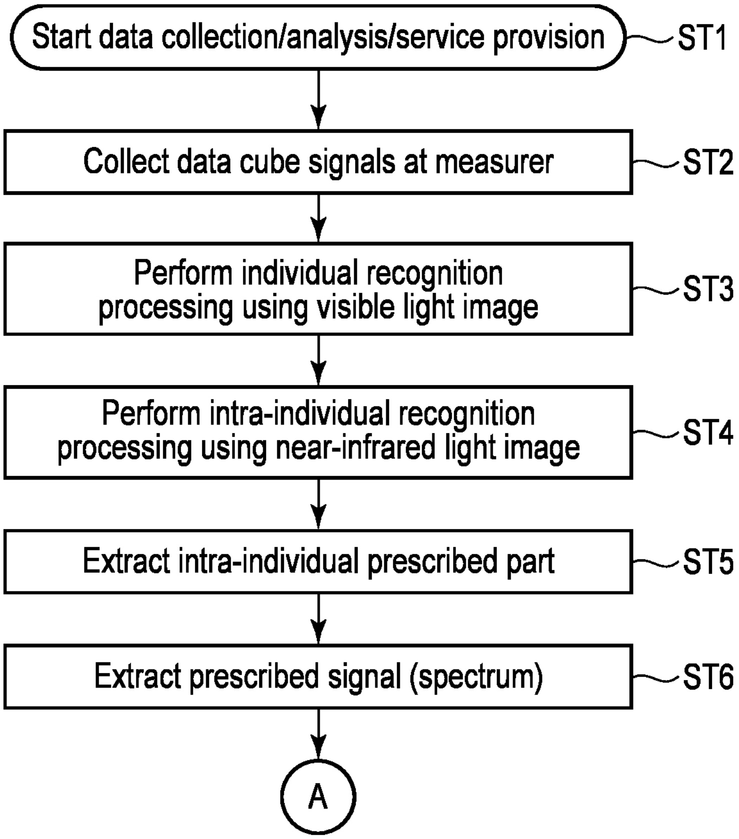
FIG. 42 is an explanatory diagram of an example of the first half of a procedure from collecting data cube signals to analyzing them to provide services.
Figure 43:
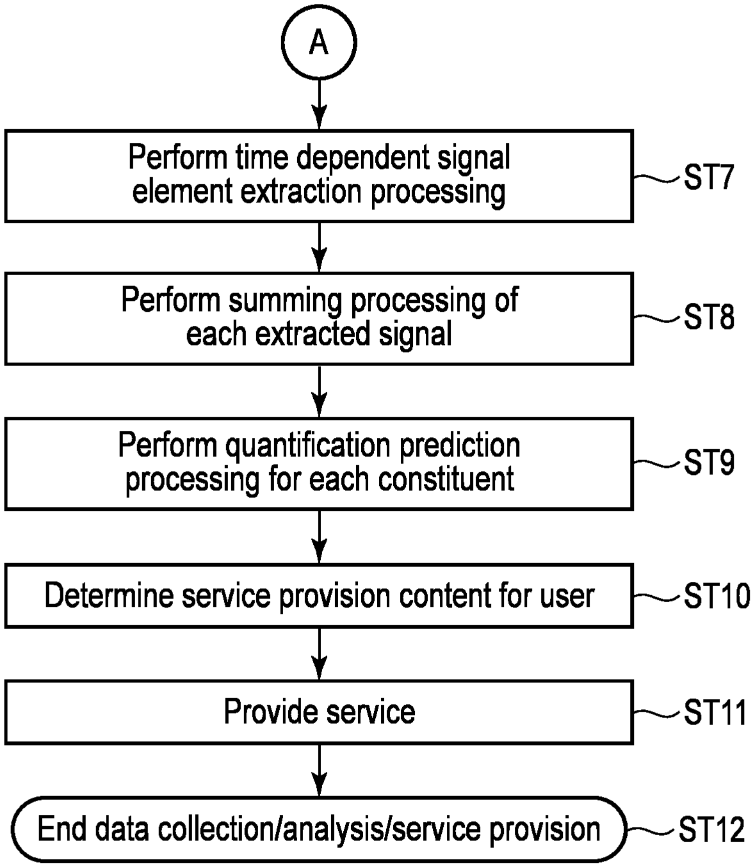
FIG. 43 is an explanatory diagram of another example of the second half of the procedure from collecting data cube signals to analyzing them to provide services.

FIGS. 42 and 43 show a series of processing procedures from a data cube extraction to data processing and providing services to users by utilizing the platform described in FIG. 39. For convenience of explanation, the processing procedures are described using a "method for automatically collecting blood-sugar levels" as an example. However, it is not limited thereto, and the procedure described in FIGS. 42 and 43 can be applied to a wide range of processing procedures.

When data collection/analysis/service provision shown in step ST1 is initiated, first, data cube signals are collected (ST2) at the measurer 8. All data cube signals collected here are temporarily stored in the collected data management block 614, and data processing is executed as described below.

The first step of data processing is to extract parts that are desired to be measured from all the collected data cubes. First, in step ST3 of individual recognition processing using visible light image, the individual recognition processor 672 using visible light image, utilizes information on the visible light image obtained from a measurement controller for visible light 650 to extract only a person area in all data cubes. Next, in intra-individual recognition processing (ST4) using near-infrared light image, recognition processing is performed for each area in the intra-individual recognition processor using near-infrared light image 676. As shown in FIG. 33, a near-infrared spectral profile is utilized to perform area recognition of such as the blood vessel area 500, the fat rich area 504, and the muscle rich area 502. Subsequently, the extractor of intra-individual prescribed part 678 extracts an intra-individual prescribed part (ST5).

Since a living organism contains many constituents and has a complex structure, high measurement accuracy cannot be obtained simply by analyzing the spectral profile at an extraction area of a prescribed part within an individual. Therefore, the following data processing operations are performed to obtain high measurement accuracy. For example, in a case where the blood-sugar level is to be measured, it is necessary to extract only the spectral profile of a glucose component in the blood by removing unnecessary water components from the spectral profile obtained from the blood vessel area 500. Here, even if an attempt is made to remove a signal component from the water in the blood vessel area 500, the spectral profile of water changes greatly with temperature. As a result, FIG. 28 shows error signals mixed at the area (b) and the area (c). Therefore, in the present embodiment, temperature correction relating to the spectral profile of water is performed within the temperature compensator of compared spectral signal 696. And the temperature predictor 692 of intra-individual prescribed part, controls the measurement controller for temperature with far-infrared light (ex. thermography) 660 using a thermography to measure the blood vessel temperature. Next, the temperature compensator 696 of compared spectral signal, utilizes the measured blood vessel temperature result to read the spectral profile information on water for each measured temperature recorded in advance in the data base of compared spectral signal 698 to determine the spectral profile on water corresponding to the measured blood vessel temperature. Then, in the compared spectral signal generator 682, the spectral profile information on the water corresponding to the above-determined blood vessel temperature is generated. Then, in the subtracter 684 between measured spectral signal and compared spectral signal, the spectral component of water is subtracted from the spectral profile information obtained from the blood vessel area 500 to extract the spectral profile of glucose. This series of processing corresponds to step (ST6) of extracting the prescribed signal (spectrum).

Since Cholesterol exists inside blood vessels, it is desired to separate the glucose component from the Cholesterol component in the blood vessels. Blood flow has pulsations and the amount of detected signals of the Glucose component in blood vessels changes accordingly. That is, the detection signal level of the Glucose component synchronously varies based on the pulsations of blood flow. Therefore, in time dependent signal element extraction processing (ST7), a pulsating component is extracted in the time dependent signal element extractor 700, and the signal is separated from the Cholesterol inside the blood vessel.

In order to further improve measurement accuracy, in step ST8 of summing processing of each extracted signal, the signals obtained from all blood vessel areas 500, for example, are summed up inside the signal processor adding signals obtained from the same areas 710.

In near-infrared spectral profile, light absorption efficiency differs for each absorption band being measured. Therefore, the absolute amount of Glucose, for example, cannot be determined simply by calculating the absorbance of the absorption band. Therefore, in step ST9 of quantification prediction processing for each constituent, absorbance correction is performed inside the quantitative predictor of each content ratio for each constituent 720 to predict the absolute value of the content ratio for each constituent.

In step ST11 of service provision, service is provided to the user based on the result of data processing. For example, in a case where a risk of diabetes is detected in the blood-sugar level measurement result, the user and his/her family physician may be notified by e-mail. The service may be provided to the user not only by such notification, but also by other appropriate methods. When the appropriate service provision is completed, the data collection/analysis/service provision is ended (ST12).

In step ST11 of the above service provision, the applications 60 in the service providing system 14 are operated individually. In the present embodiment, the service provision may use information transmission to and from the external (internet) system 16 via the information transmission path 4.

For example, the measured object 22 may be irradiated with a short pulsed light from the light source 2 located far away, and the distance to the measured object 22 may be measured (length measurement) by the time it takes for the pulsed light to return to the measurer 8. The time width of the light pulse (the pulse width) is desirably within the range of 0.1 nS to 100 μS.

If the measurer 8 is configured with a monolithic or hybrid two-dimensionally arranged photodetector cell assembly (p-i-n photodiode array, etc.), three-dimensional image collection becomes possible. In this case, the signal processor 42 determines the time until the light pulse reaches each photodetector cell. A property analyzer and data processor 62 receives information on the time until the light pulse reaches each photodetector cell transmitted from the signal processor 42 via the system controller 50, and generates 3D image information for the measured object 22.

As another example, in the case of providing services related to telemedicine, a medical/welfare-related inspector 70 operates, and the information obtained from the quantitative predictor 720 of each content ratio for each constituent, can be utilized to assist remote diagnosis. For example, the blood-sugar level predicted by the method described above can be used to diagnose diabetes. A pulsation pattern obtained at the same time can also be used to diagnose irregular pulse related to heart disease.

For example, the following is an example of processing in a case where an irregular pulse is detected in the pulsation pattern while measuring the blood-sugar level of a specific user. The pulsation pattern of the specific user is extracted in the signal processor 42 and transmitted to the property analyzer and data processor 62 via a converter 44 (including decryption and signal demodulation) and the system controller 50. The property analyzer and data processor 62 then analyzes the pulsation pattern and performs pattern matching with a standard pattern and a lesion pattern. As a result, defects in the heart can be predicted together with the detection of an irregular pulse. The irregular pulse detection result and information on the predicted defects in the heart are then transmitted to the medical/welfare-related inspector 70 via the system controller 50.

The medical/welfare-related inspector 70 then provides the information to the family physician in the external (internet) system 16 (for example, by sending an e-mail) via the information transmission path 4. In a case where this specific user has a prior contract with a certain insurance company (non-life insurance company), the medical/welfare-related inspector 70 automatically provides information to the above insurance company (non-life insurance company) (for example, by sending an e-mail). As a result, it is possible to provide a service that handles complicated procedures such as hospitalization arrangements and treatment cost reduction processing on behalf of the user, without imposing a burden on the user.

In the case of a patient undergoing medical treatment or being treated for a specific disease, a therapy handler/controller 68 may be operated so that a doctor can monitor the progress of the treatment remotely. That is, by tracking temporal changes in blood-sugar levels and pulsation patterns, a distant doctor can see the progress of the disease and the course of healing.

In addition to the above, the user's health information can be used to provide other optional services. For example, when signing a contract for non-life insurance policies such as automobile insurance or unemployment insurance, the non-life insurance company may use the light application device to check the health condition of the contracted user. A service may then be provided to set the amount of compensation for damages based on the information obtained from the light application device 10.

In addition, the information obtained from the light application device 10 may be used, for example, to set the interest amount and loan conditions when the user deposits money in a bank or in a case where a bank provides a loan to (a company owned by) the user.

As another example of service provision, information obtained from the light application device may be used in educational settings. For example, the concentration level and drowsiness of a student can be predicted from a pulse rate, a respiration rate, an eye movement, and an eyelid movement. Based on the concentration level and drowsiness information obtained from the light application device 10, changes can be made to the content of the lecture as appropriate. This improves educational efficiency.

In addition, as an application example of the service provision, application to abnormality monitoring in public facilities is also possible.

When people are in a "nervous" or "excited" state, their heartbeat (pulse rate) tends to increase. In many cases, terrorists are in a "nervous" or "excited" state inwardly just before committing an incident, and their faces are stiff from nervousness. Therefore, by remotely operating surveillance cameras and simultaneously measuring the pulse rates of an unspecified number of people, it is possible to extract people whose pulse rates are abnormally high and whose facial muscles are contracted.

In the present embodiment, the information transmission path 4 may be utilized so that the light application device 10 serves as an entrance to cyberspace. (That is, the light application device 10 can be directly connected to the cyberspace via the information transmission path 4.) As an example of service provision corresponding to serving as an entrance to cyberspace, all kinds of services can be provided in cyberspace, including personal authentication when entering cyberspace, search and guidance to the most suitable location for each user after entering cyberspace, acting as an agent for active user actions in cyberspace, security protection, etc.

In the present embodiment, automatic input and identification determination of blood vessel patterns and fundus patterns at any part inside the user's body utilizing the light application device 10 (or the service providing system 14 therein), or face and body shape authentication using the visible light camera built into the measurer 8 can be performed. Therefore, in the present embodiment, it is possible to provide personal authentication services when entering cyberspace utilizing user-related information collected by the light application device 10. It is also possible to provide personal authentication services using any method other than the above (for example, voiceprint detection).

As an example of the physical form of the light application device 10 as an entrance to this cyberspace, FIG. 31 shows a form of installation at a fixed position. However, other physical forms of the measurer may also be utilized, such as a camera unit of a personal computer or portable terminal (for example, smartphone or tablet).

Furthermore, a user-wearable terminal may be used as a physical form of the display 18 in the light application device 10. This user-wearable terminal may take any physical form, such as glasses, goggles, a hat, a helmet, or a bag.

For example, in the case of an eyeglass type that realizes virtual reality (VR) or augmented reality (AR) or a type that the user wears directly, there are places that directly contact the user's skin. At least a part of the measurer 8 in the above light application device may be placed in the area that is in direct contact with the user's skin.

By measuring the content of specific constituents such as Noradrenaline or Cortisol in the blood by blood analysis, it is possible to estimate the psychological state of the user wearing the device, such as a "nervous state" or an "excited state". In addition, the psychological state of the user can also be estimated from the location of contraction of the facial muscles on the user's face. Furthermore, as described above, it is also possible to extract a person to be measured who is in a "stressed state" or "excited state" from the pulse rate of a person captured by a remote camera or the like. In addition to this, the present embodiment can also monitor the activity of individual neurons in the user's head. Therefore, by using the light application device 10, it is possible for a user to efficiently approach cyberspace.

As a method for a user to perform active actions in cyberspace using conventional technology, for example, vocalization and finger operations such as key-in were necessary. Therefore, it took a great deal of time to approach cyberspace using conventional technology. In contrast, in the present embodiment, the user's psychological state and intention are predicted automatically and at high speed within the light application device 10, and cyberspace can be dealt with quickly and appropriately. Therefore, in the present embodiment, it is possible to provide information 72 desired by the user and deal with cyberspace at high speed without requiring the user to perform troublesome actions such as vocalization or finger movement.

Not limited to this, by utilizing the non-optical sensor group 52 in the light application device 10, it is possible to provide high user convenience in dealing with cyberspace. For example, a case in which a gyroscope or an acceleration sensor belongs to the non-optical sensor group 52 to detect movement of the user's head or a part of the user's body (for example, hands, fingers, etc.) will be described. When a user shakes his or her head while an image (moving image) is being displayed on the display 18 using a glasses-type wearable terminal such as VR or AR terminal, the display screen rotates accordingly. If the user leans forward or bends over, the user moves forward or backward on the display screen. Here, for example, in a case of attempting to move at high speed in cyberspace in a game or the like, there is a limit to the response speed of the gyroscope and acceleration sensor. In this case, by predicting the user's psychological state and intention and promptly and appropriately dealing with cyberspace, the user's convenience in cyberspace will be greatly improved.

An example of service provision to the user in which the information provider 72, the collected information manager 74, and the signal processer 42 in the service providing system 14 cooperate with each other is shown below. For example, an example of service provision in which a menu screen is displayed on a VR screen or an AR screen of a wearable terminal (for example, glasses or helmet) worn by the user is considered. By estimating the user's "favorability" (or the degree of discomfort) by the light application device 10 at the same time as detecting the user's line of sight, it is possible to instantly (in a short time) display a screen that the user likes.

Also, for example, in a case where 1. wearable terminal for VR, AR, or other is incorporated into the display 18,
2. the gyroscope or acceleration sensor in the non-optical sensor group 52 detects the movement of the user's head or fingers (or hands),
3. the user's biological signal measured by the measurer 8 is utilized for the signal processor 42 to output information related to the user's biological body, and
4. the system controller 50 integrates and utilizes the above information, an identity in cyberspace corresponding to the user utilizing the light application device 10 is formed. Then, arbitrary services can be provided to this identity in cyberspace. In addition, it is possible to provide further services to users by operating robots placed in real space through cyberspace.

For example, sightseeing services can be provided to users by operating an automatically walking robot positioned at a remote location. In addition, it is possible to provide nursing care services, etc., from a distance by operating an automatically walking robot positioned in hospitals and other facilities. In conventional technologies, voice input and user's finger (or hand) movements were required for identity manipulation in cyberspace and robot manipulation in real space. The use of the light application device 10 in the present embodiment eliminates the need for troublesome vocalizations and finger movements, and enables high-speed operation. This greatly improves the convenience of service provision in the present embodiment.

Another embodiment of the service provision utilizing cyberspace can be utilized for marketing applications. For example, while displaying a predetermined image or video on a VR screen or an AR screen via the information provider 72, the user's emotion or intention can be sequentially estimated in the light application device 10. Then, the images, videos, and sounds displayed when the user has a favorable feeling or interest are stored in the collected information manager 74 as appropriate. The external (internet) system 16 collects the aforementioned information (images, video, and audio) stored in the collected information manager 74 via the information transmission path 4 at an appropriate timing. The information collected within the external (internet) system 16 may then be analyzed to extract commodities with purchasing power, and the information may be provided to the sales company of the corresponding commodities for a fee.

Personal information management is extremely important in providing services in cyberspace in the present embodiment. Therefore, among the services provided in the present embodiment, the personal information management service itself becomes a desirable service. In the case where a specific user enters cyberspace and then engages in activities in cyberspace, an account ID (identification) is used to identify the individual user. When the user's health information and preference information obtained from the light application device 10 are linked to the above account ID, it leads to personal information.

As an example of service provision in the present embodiment, a personal information management agent may reside in the collected information manager 74 or in the property analyzer and data processor 62. Information such as "which facial muscles of the user are being contracted", "the content ratio of each constituent in the blood", or "which neurons are active (nerve impulse)" is analyzed in the signal processor 42. High-level judgments such as "estimation of user emotion", "estimation of user preference", and "estimation of user's intention" utilizing the information are performed in the property analyzer and data processor 62. The information obtained by the property analyzer and data processor 62 is stored in the collected information manager 74 as appropriate. Necessary information is then transmitted to the external (internet) system 16 via the information transmission path 4 in response to a request from the external (internet) system 16.

In the service provision example in the present embodiment, the personal information management agent links transmittable external range information to each piece of information obtained by the property analyzer and data processor 62. Therefore, transmittable external range information is set for all information stored in the collected information manager 74. Then, for each information transmission request from the external (internet) system 16, the personal information management agent determines whether or not the information can be transmitted to the outside. By performing the personal information management service within the light application device 10 in this manner, highly reliable personal information protection is possible.

As another service provision application example in the present embodiment, it may be utilized as a tool for creating artificial intelligence (learning by artificial intelligence). As artificial intelligence here, for example, a “multi-input and multi-output parallel processing method with learning function” used in deep learning technology and quantum computer technology may be utilized.

Examples of complex analysis/processing for which multi-input and multi-output parallel processing is suitable include image analysis and image understanding, language processing and language understanding, and high-level judgements adapted to complex situations. Both humans and the artificial intelligence of the measured object 22 are given their tasks simultaneously. Then, with the answer given by humans as the correct answer, artificial intelligence may be given learning feedback so that it approaches the correct answer.

These tools may be executed in cyberspace. In this case, the artificial intelligence to be learned is installed in advance on the external (internet) system 16, and the correct answer given by the human can be notified to the above artificial intelligence from the light application device 10 (or the applications 60) via the information transmission path 4.

Examples of service provision are not limited to those described above, and any service may be provided in a form where the light application device 10 is connected to the cyberspace constructed on the external (internet) system 16 via the information transmission path 4.

[Chapter 9: Applied Equipment]

Figure 44:
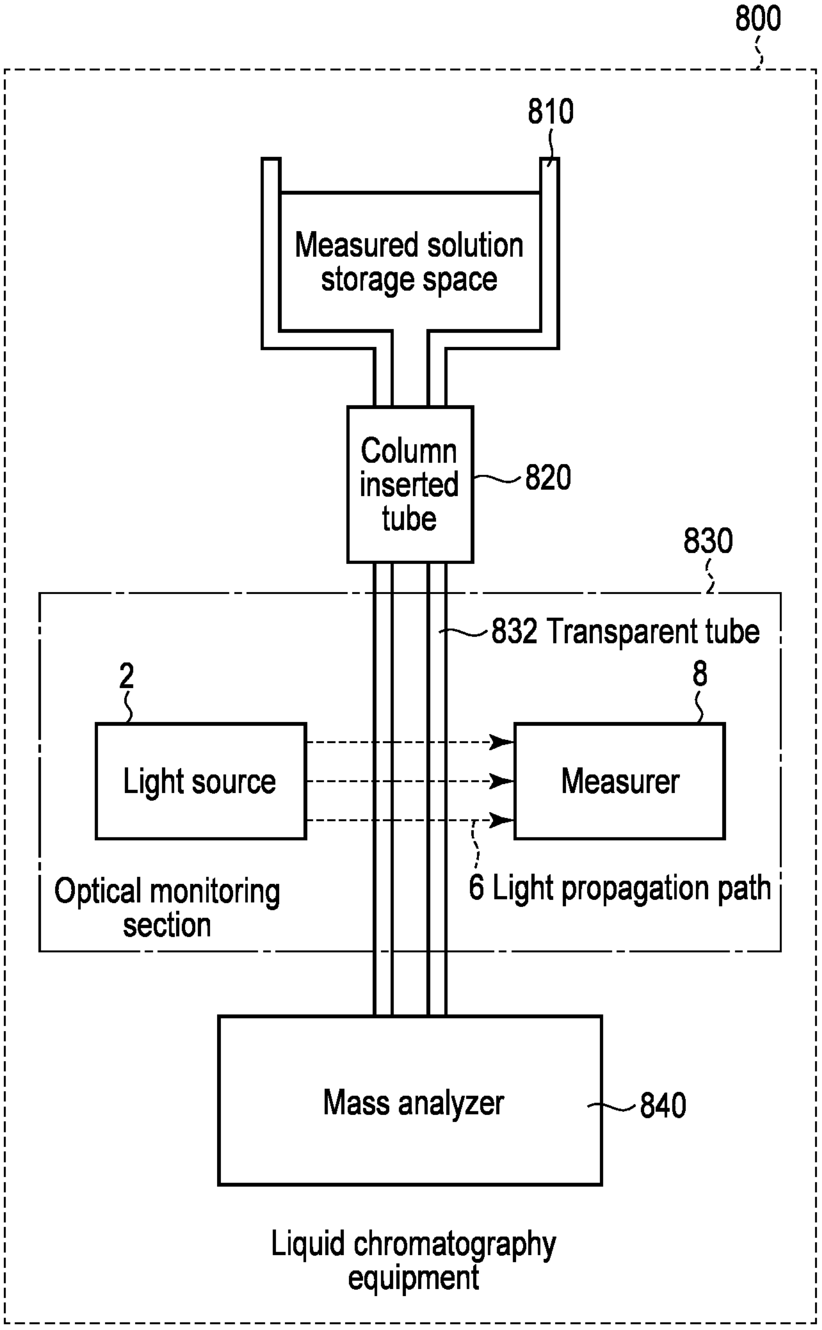
FIG. 44 is an explanatory diagram showing an application example of the present embodiment.

FIG. 44 shows an application example of the present embodiment. For example, the light propagation path 6 from the light source 2 to the measurer 8 may be set in the middle of a path where substances separated by liquid chromatography travel toward a mass analyzer to analyze the components of the substances separated by liquid chromatography.

Figure 45:
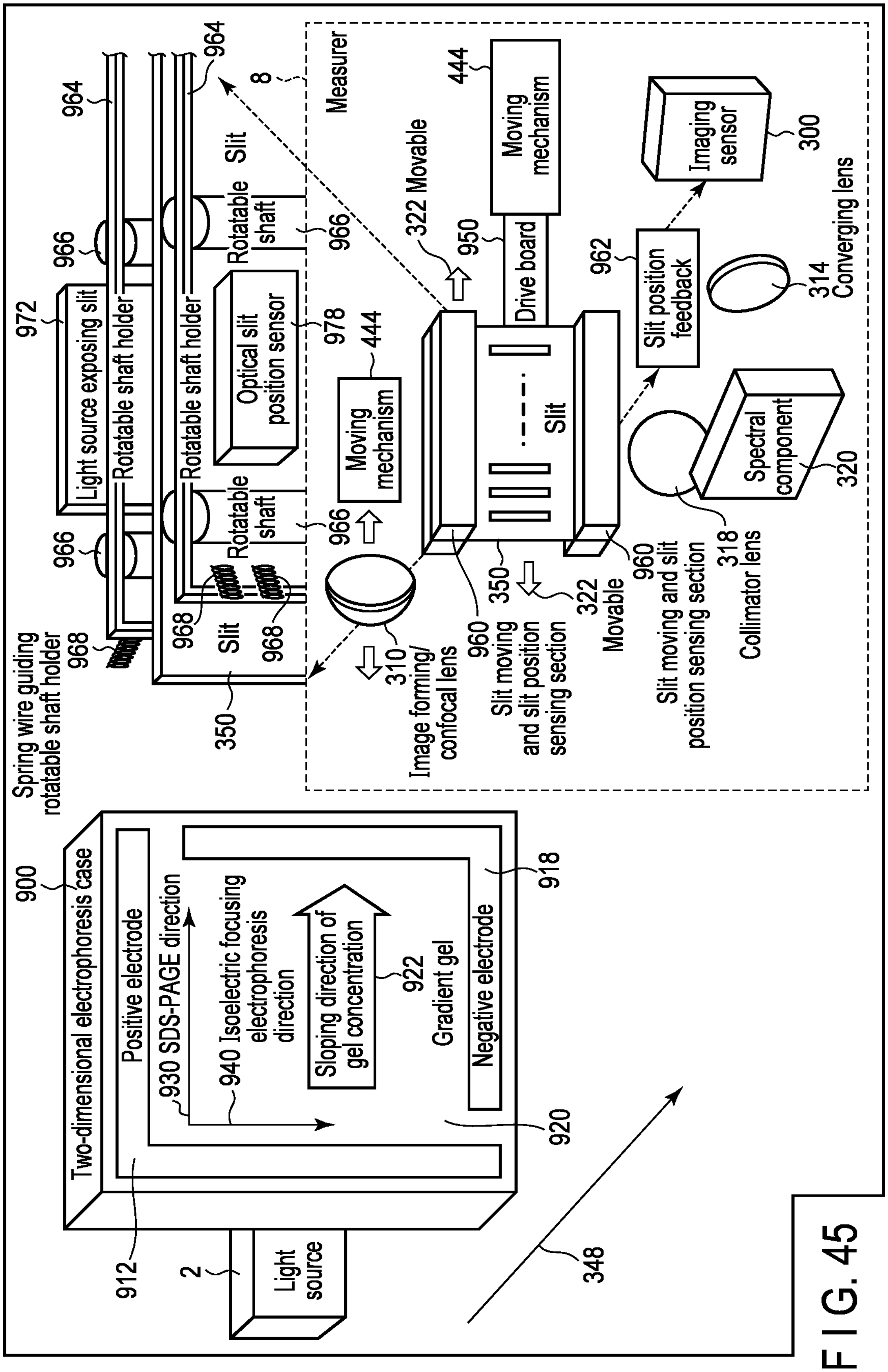
FIG. 45 is an explanatory diagram showing another application example of the present embodiment.

FIG. 45 shows a method of simultaneous parallel analysis utilizing imaging spectrum for each constituent two-dimensionally separated by two-dimensional electrophoresis. A positive electrode 912 and a negative electrode 918 are placed inside a two-dimensional electrophoresis case 900. A sodium dodecyl sulfate polyacrylamide gel electrophoresis (SDS-PAGE) direction 930 is defined along a sloping direction of gel concentration 922 of a gradient gel 920 in the two-dimensional electrophoresis case 900. An isoelectric focusing electrophoresis direction 940 is set in a direction orthogonal thereto.

The light source 2 is installed at the back of the two-dimensional electrophoresis case 900. The synthesized light 230 emitted from the light source 2 passes through the two-dimensional electrophoresis case 900 and reaches the measurer 8 arranged in front thereof. The inside of the measurer 8 has the optical structure already described using FIG. 7, FIG. 37, and FIG. 38.

For example, a voice coil or the like is built in a moving mechanism 444 connected to the slit 350 via a drive board 950, and current is passed through the voice coil to move the slit 350. As already explained using FIG. 35 and FIG. 36, the distance between the image forming/confocal lens 310 and the slit 350 must be maintained with high precision. Therefore, for example, in the case where the image forming/confocal lens 310 is fixed, it is desirable to devise a way to prevent the distance between the image forming/confocal lens 310 and the slit 350 from changing when the slit 350 is moved. For this reason, a slit moving and slit position sensing section 960 that slides on a part of the slit 350 is installed.

Inside this slit moving and slit position sensing section 960, there is a rotatable shaft 966 that rotates and slides with respect to a part of the slit 350 and a rotatable shaft holder 964 that fixes it. A spring wire 968 guiding rotatable shaft holder 964 presses the rotatable shaft holder 964 in the direction of the slit 350. By providing a mechanism that rotates and slides with respect to a part of the slit 350 in this manner, even if the slit 350 moves, not only is the distance from the image forming/confocal lens 310 maintained, but also the silt 350 is made easier to move at high speed.

In addition, a light source exposing slit 972 and an optical slit position sensor 978 are arranged inside the slit moving and slit position sensing section 960, enabling accurate detection of the slit position by optical means. In other words, the present embodiment puts the slit 350 between the light source exposing slit 972 and the optical slit position sensor 978. The detection signal obtained from the optical slit position sensor 978 is used to the slit position feedback 962. FIG. 37 explained that the spectral component (blazed grating) 320 reflects different wavelength light toward different reflection angles based on the different wavelengths respectively, and the different reflection angles vary along the “Xd” direction in the imaging sensor 300. And FIG. 45 shows that the spectral component (blazed grating) 320 reflects the light passing through the slit 350 and the converging lens 314 converges the reflected light respectively on the imaging sensor 300. Therefore, each position of the converged light in the “Xd” direction on the imaging sensor 300 indicates the corresponding wavelength.

[Chapter 10: High-Precision Measurement Method in Optical Application Field]

Figure 46:
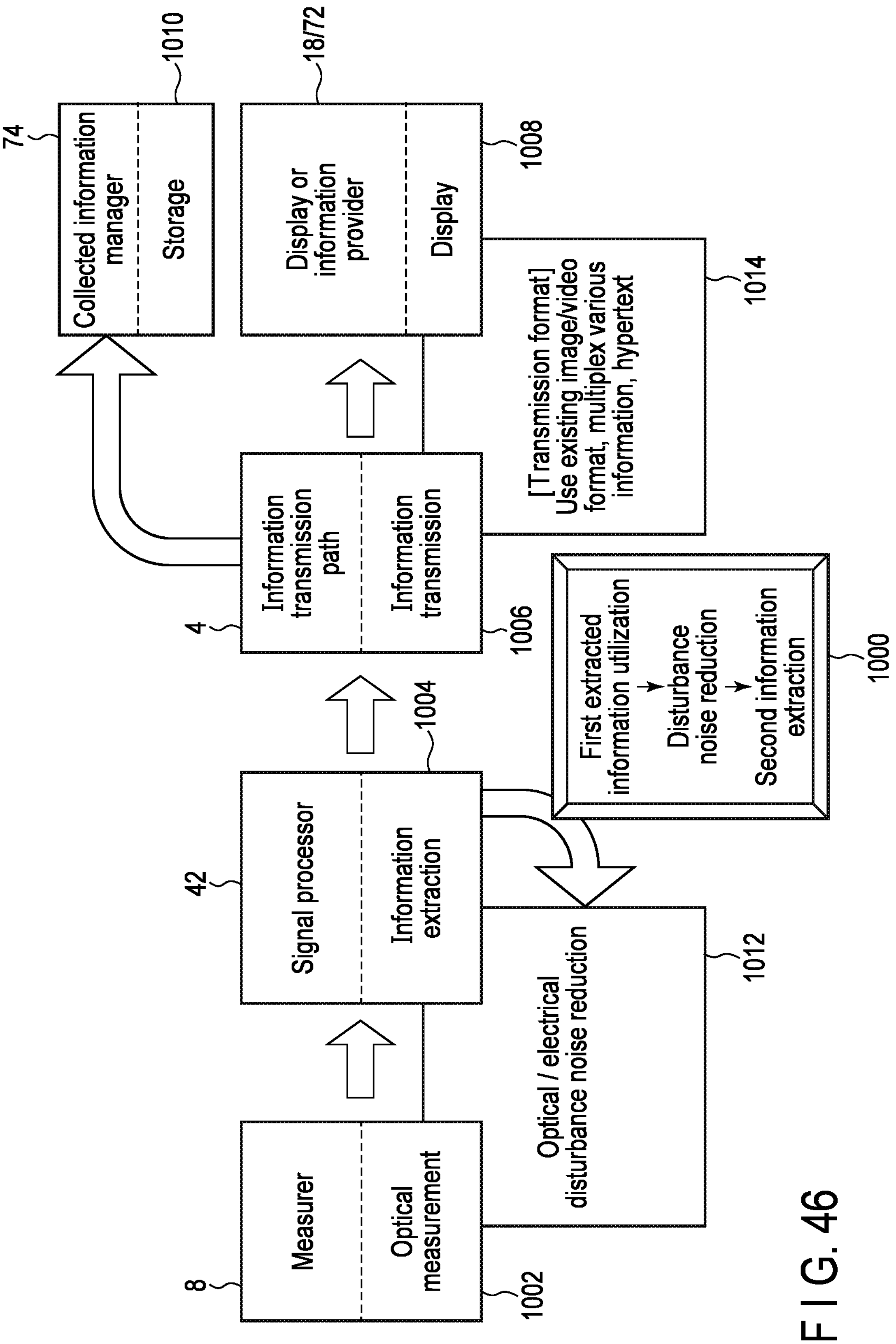
FIG. 46 is an explanatory diagram showing information extraction and data processing flow in the present embodiment.

FIG. 46 shows a high-precision measurement method in an example of the present embodiment in an optical application field 100 (FIG. 3). In FIG. 46, the main parts in the light application device 10 described in FIGS. 1 and 2 are extracted and drawn. In other words, optical measurement 1002 is performed with respect to the measured object 22 in the measurer 8. The result of the optical measurement 1002 obtained there is then analyzed in the signal processor 42 to perform information extraction 1004.

Here, in order to perform highly accurate information extraction 1004, it is desirable to minimize disturbance noise in both the optical measurement 1002 and information extraction processes 1004. In the case of measuring in the optical application field 100 (FIG. 3) using the optical application device 10, two types of disturbance noise, optical noise and electrical noise, are likely to be mixed. Therefore, two types of disturbance noise reduction 1012 (optical/electrical disturbance noise reduction) are desirable for high-precision measurement.

The present embodiment uses an optical system that can reduce optical interference noise to perform highly accurate information extraction 1004 and then can fit into each of applications in the optical application field 100. Unfortunately, a conventional optical device 10 has been carrying only stray light contamination representing a symbol $\alpha c1$ in FIGS. 47 and 48. On the contrary, light interference (symbol $\alpha c2$) occurring in the middle of the light propagation path 6 generates great optical disturbance noise in the optical application field 100. Therefore, the conventional optical device 10 provides signals including the optical interference noise although the conventional optical device 10 fully achieves the electrical disturbance noise reduction processing.

Therefore, the optical application device 10 in the present embodiment uses an optical system that reduces optical disturbance noise originating from light interference representing a symbol αc2 in FIG. 47. Then, after reducing the light interference phenomenon (symbol αc2), reduction processing of the optical/electrical disturbance noise 1012 generated by other factors may be more effective. Therefore, the light application device 10 in the present embodiment may have an optical system that reduces optical disturbance noise originating from light interference (symbol αc2), and, also, reduces optical/electrical disturbance noise 1012 generated by other factors.

The optical system for reducing optical disturbance noise originating from light interference (symbol αc2) in the example of the present embodiment adds the intensities of light elements 202 and 204 that have passed through areas 212 and 214 with different optical path lengths from each other. Thereby, the different noise patterns (noise characteristics) that occur individually in each of the light elements 202 and 204 are averaged (smoothed), resulting in a reduction of optical disturbance noise originating from light interference (symbol αc2). This optical system that reduces the optical disturbance noise originating from light interference (symbol αc2) may be placed at any position in the light application device 10. That is, it may be placed in the optical system (for example, in the light source 2) before light irradiation of the measured object 22. Alternatively, it may be placed in the optical system (for example, in the measurer 8) through which detected light obtained from the measured object 22 passes.

In this manner, by reducing the effect of light interference (symbol αc2) occurring in the middle of the light propagation path 6 and performing the reduction processing for optical/electrical disturbance noise 1012 generated by other factors, it is possible to effectively perform optical/electrical disturbance noise reduction 1012.

Furthermore, in the example of the embodiment shown in FIG. 46, the optical/electrical disturbance noise reduction 1012 is performed by utilizing information obtained from the detected light. For example, the synthesized light 230 is first irradiated to the measured object 22, and first information is acquired from the synthesized light 230 or the detected light obtained from the measured object 22. Then, utilizing the first information, optical/electrical disturbance noise reduction 1012 is performed on a signal obtained from the detected light. Second information may be acquired from the signal obtained after performing the optical/electrical disturbance noise reduction 1012.

That is, the synthesized light 230 emitted from the light source 2 is irradiated onto the measured object 22. The wavelength of this synthesized light 230 may be visible light of 400 nm or more and 700 nm or less. In addition, near-infrared light of 700 nm or more and 2.5 μm or less, infrared light of 2.5 μm or more and 20 μm or less, or far-infrared light with a longer wavelength may also be used as the synthesized light 230. Various types of lamps such as halogen lamps, mercury lamps, and xenon lamps, and incandescent light emitters may be used for the light emitter 470 in the light source 2. Also, in addition, laser diode (LD) or light emitting diode (LED) may be used as the light emitter 470.

The detected light obtained from the measured object 22 is detected by the measurer 8. Here, transmission light from the measured object 22 may be utilized as the detected light, and reflected light from the measured object 22 may be utilized as the detected light. It is not limited thereto, and scattered light from the measured object 22 may also be used as the detected light.

In a case where light of the same wavelength as the above synthesized light 230 is used as the detected light, it is possible to measure light absorption characteristics (absorbance described below) for each wavelength light within the measured object 22. On the other hand, in a case where light with a wavelength longer than the wavelength of the above synthesized light 230 is used as the detected light, it is possible to measure Raman scattering characteristics and fluorescence and phosphorescence characteristics within the measured object 22.

Next, the signal from the detected light obtained by the measurer 8 is processed in the signal processor 42 to obtain the first information. This first information is then utilized to perform disturbance noise reduction in the signal processor 42. As a result, highly accurate (highly reliable) second information extraction 1000 is performed.

Here, the first information used for disturbance noise reduction relates to at least either the "optical" disturbance noise reduction 1012 or the "electrical" disturbance noise reduction 1012. However, the first information may also relate to both the "optical" disturbance noise reduction and the "electrical" disturbance noise reduction 1012.

The extracted first or second information 1000/1004 in the signal processor 42 is transmitted "1006" through the information transmission path 4. The transmitted information 1006 is then stored "1010" based on the collected information manager 74. In addition, it may also be displayed "1008" to the user from the display 18 or the information provider 72. Furthermore, it may be communicated to the external (internet) system 16 via the information transmission path 4.

As a transmission format 1014 used during this information transmission 1006, for example, an existing color image signal or color video signal format, such as RGB (red, green, and blue), may be used. In addition, a multiplexing technique defined by the MPEG (Moving Picture Experts Group) standard, for example, may also be used. Here, images and moving images are time-divided and distributed in a video pack. The information 1004 extracted in the signal processor 42 is then stored in a unique information pack and inserted in a series of the aforementioned video packs. This information pack may be uniquely defined for the present embodiment, or may be an SP pack (Sub-picture Pack) defined in the DVD (Digital Versatile Disk) standard. It may also be written in a hypertext format similar to an HTML (Hyper Text Markup Language) document (for example, XML (Extended Markup Language) format).

Here, the smallest unit of output content obtained from the measurer 8 or a signal receptor 40 may be defined as "data". The aggregate of the data or the relationship between the data may be defined as a "signal". The results of data processing/data analysis of the data or the results of processing/signal analysis of the signals may be defined as "information". The data processing/analysis and signal processing/analysis are performed in the signal processor 42. That is, the measurer 8 or the signal receptor 40 outputs the data or the signal to the signal processor 42. The signal processor 42 then utilizes the data and the signal to generate the extracted first or second information 1000/1004, which is output to the system controller 50.

In brief, the measurer 8 sends the data or the signal to the signal processor 42. Next, the signal processor 42 extracts the first information from the data or the signal. And then the signal processor 42 utilizes the extracted first information and performs the optical/electrical disturbance noise reduction 1012 for the data or the signal to extract the second information 1000 having high accuracy. Basically, the extracted second information may indicate fundamental information. Therefore, utilizing the extracted second information, the property analyzer and data processor 62 in FIG. 2 then forms advanced information. That is, the property analyzer and data processor 62 may convert the second information to the advanced information. Not limited to this, the collected information manager 74 (FIG. 2) may store the second information, and the external (internet) system 16 may convert the stored second information to more advanced information.

For example, the extracted second information 1000 may correspond to a spectral profile of particular constituent included in an organism. Here, the organism includes a plurality of constituents and a spectral profile simply obtained from the organism shows the combination of the constituents. As explained in FIGS. 42 and 43, the signal processor 42 can extract the spectral profile of Glucose. For another example, the extracted second information 1000 may correspond to the blood vessel pattern (image) within the pixel image obtained from the image sensor 300 as explained in FIGS. 42 and 43.

Examples of advanced information formed by the property analyzer and data processor 62 include "user preferences", "user emotions", and "user intentions". In addition, when providing a given service to a user, the property analyzer and data processor 62 may alone form an identity in cyberspace. The property analyzer and data processor 62 may then become an agent and operate the identity in cyberspace and the robot in real space.

FIGS. 47 and 48 shows a list of examples of (the first or the second) information used in the present embodiment. All of these examples of (the first or the second) information are extracted/generated within the signal processor 42 utilizing various signals (or various data) obtained from the measurer 8 and the signal receptor 40. It was explained above that information first extracted "1004" and utilized for optical/electrical disturbance noise reduction corresponds to the "first information", and information extracted after optical/electrical disturbance noise reduction using that first information corresponds to the "second information". The example of "extracted information 1022" in FIGS. 47 and 48 corresponds to the first or second information. Therefore, all the information shown in FIGS. 47 and 48 may correspond to either the "first information" or the "second information". Also, the same information may be used for both the "first information" and the "second information" at the same time.

The information related to the present embodiment can be classified into the following categories 1020. The first category shows "effects of optical actions occurring unnecessarily along with measurements". The second category indicates "information related to shape and arrangement position of the measured object 22". The third category relates to "detection information of a moving object itself in a case where a position of a specific part in the measured object 22 moves". The fourth category corresponds to "composition ratios of constituent parts in the measured object 22". And the fifth category is "time dependent action within the measured object 22".

The optical actions that occur unnecessarily along with measurements occur in both the measurement of spectral profiles and the measurement of image data (image signals). One of the extracted information 1022 categorized into the first category relates to "optical action within measured object". The extracted different information categorized into the first category also relates to "optical action on measured object surface". And the extracted remaining information relates to "optical action at middle of light propagation path". Here, an example of the information relating to "optical action within measured object" is "light absorption of other components", which represents symbol αa1. Other examples 1024 include "light scattering characteristics" (symbol αa2) and "light interference/reflection characteristics" (symbol αa3).

An example 1024 of the extracted information 1022 relating to "optical action on measured object surface" include a phenomenon in which an inclination of the surface causes "refraction" (symbol αb1) of the detected light, which shifts the image formation position in a detection optical system. Also, in a case where the surface of the measured object 22 has unpolished roughness, it causes influence of "diffraction and/or interference" (symbol αb2).

In addition, optical actions that occur in the middle of the light propagation path 6 are also significant as effects of optical actions that occur unnecessarily. In particular, stray light (symbol αc1) mixed in the middle of the light propagation path 6 greatly reduces the optical measurement accuracy. The state of light interference (symbol αc2) occurring in the middle of the light propagation path 6 may also be collected as the first extracted information 1004. The signal processor 42 can arithmetically process a signal obtained from the measurer 8 or the signal receptor 40 and remove the component of the first extracted information 1004 therefrom. Thereby, the second information can be extracted 1004 with high measurement accuracy (and measurement reliability).

Extracted information 1004 related to the "shape and position of the measured object 22" or "moving object detection" found therein is often obtained mainly by data analysis (signal analysis) of image data (or data cubes). That is, information obtained by performing area division (symbol β2) for each constituent in the image signal corresponds to an example 1024 of contour information or feature information of a shape corresponding to abstracts of extracted information 1022 included in the second category relating to the shape and position of the measured object 22. This is obtained as a result of contour extraction of the shape contained in the image data (image signal) within the signal processor 42.

Next, when a pattern matching operation of the contour shape is performed, blank area information (symbol β1) is extracted from the area division information (symbol β2) for each component in the image signal. For example, the blank area (symbol β1) in the data cube does not include spectral profile information. Therefore, by utilizing this blank area information (symbol β1) as the first extracted information, and performing signal analysis (data analysis) of the spectral profile obtained from areas other than the blank area to generate spectral information from only the necessary portions as the second extracted information 1004/1000, there is an advantage that the efficiency of spectral profile analysis for the data cube can be improved. In addition, if spectral profile analysis is performed only for pixels that correspond to important portions in the data cube, further efficiency of spectral profile analysis can be achieved. If position information (symbol β3) of a feature portion in the image signal can be utilized as the first extracted information 1004, the efficiency of generating the second extracted information 1004/1000 can be improved.

As the position information (symbol β3) of the feature portion in the image signal, the contour information of a boundary area where this feature portion exists may be utilized. Instead, if center-of-gravity position information (symbol β4) of the feature portion is output in the form of the corresponding pixel position information in the imaging sensor 300, it is possible to reduce the amount of information as the position information (symbol β3) of the feature portion.

In a case where a moving object such as a car, ship, or airplane is captured in a background image, there is a method of utilizing only the information of the moving object as the first extracted information 1004. In this case, as the abstracts of extracted information 1022, the moving object area in the image corresponds to the extracted information 1004. As examples 1024 of this moving object area, information on the range of the moving object area (symbol γ1), moving speed of the center-of-gravity of the moving object (symbol γ2) in the imaging sensor 300, and time-series shape change information (symbol γ3) of the moving object itself, etc., can also be utilized as the extracted information 1004.

The extracted information 1004, which is mainly obtained by analyzing spectral profile signals, includes content that is categorized 1020 into "composition ratios of constituent parts" and "time dependent actions". Spectral profile signals of infrared light (included in the wavelength range of 2.5 μm to 20 μm) and near-infrared light (included in the wavelength range of 0.8 μm to 2.5 μm) (including fluorescence spectroscopy and phosphorescence spectroscopy such as Raman scattering) contains information on light absorption due to prescribed intramolecular vibrations and prescribed intra-atomic group vibrations. Therefore, by extracting the light absorption information of the prescribed wavelength light contained in these spectral profile signals or its temporal change, information on the composition ratio of the constituent substances in the measured object 22 and information on biological action can be extracted 1004.

In response to the fourth category corresponding to "composition ratios of constituent parts in the measured object 22", there are two type of extracted information 1022. One type of extracted information 1022 relates to "constituent material analysis in solid". And other type of extracted information 1022 relates to "content rate of substance in liquid". Whether the measured object 22 is composed of an organic substance or an inorganic substance can be determined δa1 from the presence or absence of light absorption due to the carbon compound contained in the organic substance. For example, in a case where a methyl group or a methylene group is included, light absorption occurs in the range of 1.15 μm to 1.25 μm or 1.65 μm to 1.8 μm. Conversely, in inorganic materials, light absorption does not occur within the above wavelength range in many cases.

The result of the composition analysis of the constituent components in the measured object 22 can be used to determine (symbol δa2) whether the object is an animal, plant, or an artificial object. Plants contain carbohydrates instead of proteins in animals. On the other hand, artificial objects (plastics etc.) contain the methyl and methylene groups mentioned above instead, and are rarely detected to contain proteins and carbohydrates. Thus, it is possible to discriminate (symbol δa4) between sugar/lipid/protein from the wavelength area where much light absorption occurs.

Pure water exhibits large light absorption in the range of 1.4 μm to 1.5 μm and in the wavelength range of 1.8 μm or higher. Therefore, a water content rate (symbol δa3) can be estimated from the magnitude of light absorption in the above wavelength range.

Protein structures, amino acids having base residue, and saturated and unsaturated fatty acids absorb light in the wavelength ranges described below using FIG. 84. Therefore, discrimination (symbol δa5) between the protein structure and the amino acid having base residue and the degree of non-saturation (symbol δa6) of the fatty acid can be estimated depending on which wavelength of light is absorbed.

Even in the case of extracting information on the composition ratio of the same constituent parts, the method of information extraction 1004 differs greatly depending on whether the measured object 22 is a liquid or a solid that does not contain water. In a case where the liquid contains a small amount of the specific substance, most of the spectral profile signal obtained from the measurer 8 or the signal receptor 40 contains the spectral profile information of the solvent. Therefore, in this case, it is desirable to extract second spectral profile information 1004 obtained from the characteristic substance after removing the spectral profile information component of the solvent alone as the first extracted information 1004 from the spectral profile signal obtained from the measurer 8 or the signal receptor 40. Examples 1024 of the extracted information 1004 related to the content rate of substances in liquids include the content rate (symbol δb1) of sugar components in blood-sugar level and urine and the content rate (symbol δb2) of specific substances in blood.

The extracted information 1022 categorized into the fifth category "time dependent action" generally relates to "biological action". Examples 1024 thereof include the "pulse rate and respiration rate" (symbol ε1), "muscle contraction" (symbol ε2), "nervous system signal pulses generated during nerve impulse and ion pump action" (symbol ε3) generated immediately thereafter, and "chemical signal transmissions that occur within or between cells" (symbol ε4), etc., of a user using the light application device 10.

In FIGS. 47 and 48, individual symbols 290 are set for each of the examples 1024 of information to be extracted "1022". In order to clarify the relationship between the detailed contents of the embodiment to be described later and FIGS. 47 and 48 and FIG. 46, the individual symbols 290 set here will also be quoted within later descriptions.

In order to improve the accuracy and reliability of the information extraction "1004" described above, it is desirable to achieve optical/electrical disturbance noise reduction "1012". Here, the present embodiment may combine the optical noise reduction method and the electrical disturbance noise reduction method to enable highly accurate (highly reliable) measurements. Before describing the optical/electrical disturbance noise reduction 1012 in detail, a disturbance noise mechanism 1036 (FIG. 49) thereof will be described.

FIG. 49 shows a list of a disturbance noise mechanism 1036 for each measured area 1032 in the measured object 22 and a disturbance noise reduction method 1038 thereof. An electrical disturbance noise mechanism 1036 corresponds to shot noise, thermal noise, electromagnetic induction noise, etc., similarly regardless of a measured area 1032.

As the electrical disturbance noise reduction method 1038 in the present embodiment, a bandwidth control of the detected signal may be performed to extract only a carrier component (symbol E1). In addition, the present embodiment may also use a lock-in amplifier (symbol E2). This lock-in amplifier (symbol E2) uses synchronization of the frequency and phase of a reference signal with respect to the detected signal. Therefore, various information 1022 included in the fifth category 1020 "time dependent actions" in FIGS. 47 and 48 may be utilized for the first extracted information 1004 as the above frequency and phase synchronization.

However, it is not limited to the frequency and phase synchronization, an error correction function for digitized signals (symbol E3) may also be used as the electrical disturbance noise reduction method 1038. As an example, techniques such as PRML (Partial Response Most Likelihood) may be used for automatic correction to a signal sequence that is considered most appropriate.

An optical disturbance noise mechanism 1036 differs slightly depending on the measured area 1032 within the measured object 22. In the optical disturbance noise mechanism 1036 common in both cases, there is the effect of optical interference noise. As a method of reducing this optical interference noise, in the example of the present embodiment, at least one of the following methods is performed: averaging (smoothing) interference noise elements (symbol L1); and reducing the degree of coherence (symbol L2).

Optical interference noise includes two different types of interference noise. Both types of interference noise relate to a coherence length $\Delta L_0$, which corresponds to the length of Wave Train. (In other words, adjacent Wave Trains before and after have an incoherent relationship with each other.) Furthermore, when the intensities of the light elements 202, 204, and 206 having an incoherent relationship with each other are added, the interference noise elements that occur uniquely in the individual light elements 202, 204, and 206 are smoothed and make an ensemble averaging effect (symbol L1). Therefore, the optical interference noise reduces as explained in FIG. 16.

One of the above two different types of optical interference noise (symbol L1) is caused by temporal coherence of light and appears in the spectral profile. The reduction effect of optical interference noise caused by this temporal coherence (a spectral degree of temporal coherence) is related to the profile of optical phase differences within each of the light elements 202, 204, and 206, as already explained using FIG. 16 to FIG. 19. However, it is not limited to the spectral profile, the "average (smooth) interference noise elements" (symbol L1) is also effective to reduce speckle noise explained later.

The other (symbol L2) is caused by spatial coherence of light and appears mainly as spatial intensity irregularities. The state in which the spatial intensity irregularities occur is often referred to as the speckle noise. The reduction effect of optical interference noise caused by this spatial coherence (speckle noise amount or speckle constant Cs value) is related to the change in the irradiation angle of the individual light elements 202, 204, and 206 when irradiating the measured object 22. (Details are given in Chapter 12.) However, in addition, the reduction effect of optical interference noise caused by the spatial coherence was also confirmed even when each of the optical phase profiles of the individual light elements 202, 204, and 206 varies individually.

In other optical disturbance noise mechanisms 1036, there is the intrusion of other optical phenomena. In the example of the present embodiment, as a countermeasure 1038 against the intrusion of other optical phenomena (symbol L3), the signal processor 42 achieves arithmetic processing (signal processing or signal analysis) between the measured signals to remove the effects of the other optical phenomena that have intruded. In other words, having obtained a measured signal from the measurer 8 or the signal receptor 40, the signal processor 42 extracts the first information 1004 based on results of the other optical phenomena from the measured signal. And then utilizing the extracted first information 1004, the signal processor 42 removes the redundant signal component from the measured signal. As a result, the second information extraction 1000 is performed after the effects of other optical phenomena have been removed.

A particular phenomenon of "intrusion of other optical phenomena" (symbol L4) belonging to the disturbance noise mechanism 1036 depends on the measured area 1032. Here, the optical phenomenon (symbol L4) does not provide big influence when the measurer 8 obtains signals from entire measured object 22. On the contrary, when a 3D camera tries to obtain each of depth information (local characteristics) from each of different positions on the surface of the measured object 22, the redundant disturbance light obtained from a different depth position ("intrusion of other optical phenomena" (symbol L4)) provides big influence to decrease the measurement accuracy.

The present embodiment may propose one of the disturbance noise reduction methods 1038 that locates an aperture size controller 484 at an imaging position or a confocal position with respect to the local area of the measured object 22. So that in response to the symbol L4, the aperture size controller 484 can shield redundant disturbance light reflected from the different (redundant) depth position. Therefore, the example of the disturbance noise reduction method (symbol L4) prevents false measurement of detected light from depth positions other than the local area to be measured as disturbance light.

In FIG. 49, individual symbols 290 are also set for each of the disturbance noise reduction methods 1038. In order to clarify the relationship between the detailed contents of the embodiment to be described later and FIGS. 47 and 48 and FIG. 46, the individual symbols 290 set here will also be quoted within later descriptions.

[Chapter 11: Mechanism of Continuous and Repeated Generation of Wave Trains Along Light Propagation Direction]

Figure 50:
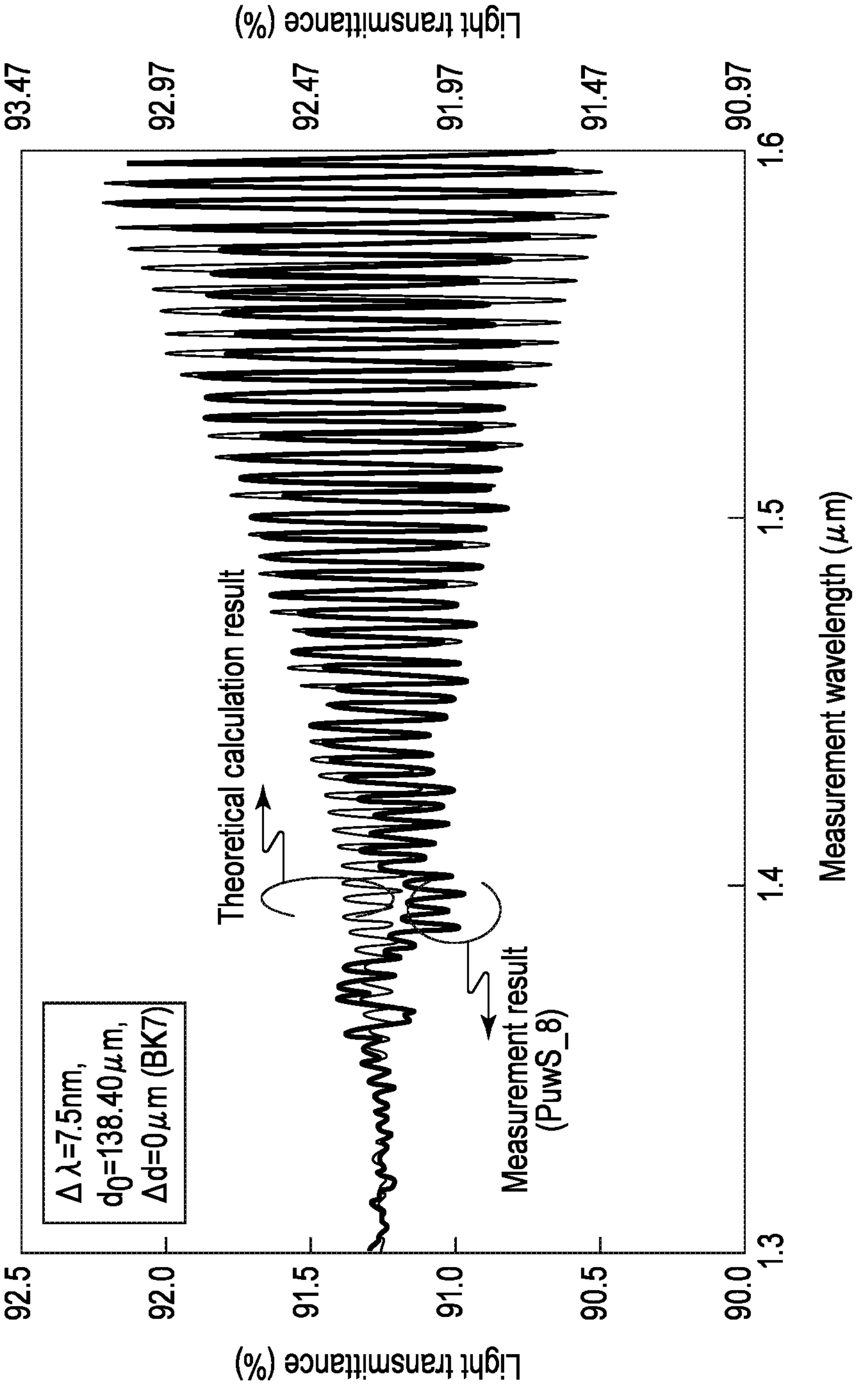
FIG. 50 shows experimental results of Wave Train characteristics related to optical noise reduction.

FIG. 50 shows a profile near the terminating end area of one Wave Train obtained as a result of experimental measurements. Profile (a) in FIG. 16 shows 3 initial Wave Trains 400 forming repeatedly. And an envelope profile of left side terminating end area of one initial Wave Train 400 in FIG. 16 is similar to the envelope profiles shown in FIG. 50. (The horizontal axis in FIG. 50 is different from the horizontal axis in FIG. 16.) The vertical axis in FIG. 50 represents a light transmittance in a case where panchromatic light emitted from a halogen lamp passes through a flat glass plate with a thickness $d_0$ of 138.40 μm. Here, the horizontal axis in FIG. 50 represents a measurement wavelength $\lambda_0$ of the panchromatic light, and the light transmittance for each wavelength $\lambda_0$ from 1.3 μm to 1.6 μm represents in FIG. 50.

When light of each wavelength passes through the flat glass plate, optical interference occurs between the 0th order passing light that travels straight through the flat glass plate and the 1st order reflected light that is reflected twice at the entrance and exit surfaces in the flat glass plate. Here, the 0th order passing light that travels straight through the flat glass plate corresponds to the first light element 202 explained in FIG. 4. And the 1st order reflected light that is reflected twice at the entrance and exit surfaces in the flat glass plate corresponds to the second light element 204. The flat glass plate having slight light reflectance at both the entrance and exit surfaces corresponds to the optical path length varying component 360 as the optical characteristic converting component 210. According to Equation 2, an optical pass length of the 0th order passing light (the first light element 202) equals to "$(n-1)d_0$" when a refractive index of the flat glass plate represents "n" and "j=0". And another optical pass length of the 1st order reflected light (the second light element 204) equals to "$(3n-1)d_0$" when "j=1". Therefore, the optical pass length difference between the first light element 202 (the 0th order passing light) and the second light element 204 (the 1st order reflected light) is "$2nd_0$".

According to FIG. 50, the light transmittance oscillation results from the optical interference between the first light element 202 (the 0th order passing light) and the second light element 204 (the 1st order reflected light). And the envelope profile of the light transmittance oscillation represents interference visibility "SV". Here, the interference visibility "SV" is defined as Equation 12 mentioned before. And the light transmittance oscillation appears based on the right side third term including "$<S_0S_1>$" of Equation 11. Equation 13 suggests that a part of the third term "$<S_1S_1>$" relates to a degree of temporal coherence and another part of the third term "$D_{po}(\lambda_0)D_{po}(\lambda_0)$" relates to a degree of spatial coherence. Here, the combination part of the third term "$D_{po}(\lambda_0)D_{po}(\lambda_0)<S_0S_1>$" corresponds to the general degree of coherence.

Substituting Equations 1 and 2 for Equation 9, the present embodiment can obtain the calculated value of "$<S_0S_1>$". As mentioned above, the optical pass length difference "$2nd_0$" between the first light element 202 (the 0th order passing light) and the second light element 204 (the 1st order reflected light) is mechanically constant. On the contrary, the estimated value of the coherence length $\Delta L_0$ varies based on the measurement wavelength $\lambda_0$. Therefore, an estimated value of "$<S_0S_1>$" varies based on the measurement wavelength $\lambda_0$. According to Equations 1, 9, and 11, the estimated value of "$<S_0S_1>$" approaches "0" when the measurement wavelength $\lambda_0$ approaches 1.32 μm. Therefore, an area near the measurement wavelength $\lambda_0$ of 1.32 μm corresponds to the terminating end area of one Wave Train as shown in FIG. 50.

As explained above, the estimated value of "$<S_0S_1>$" relates to the degree of temporal coherence. So that, when the optical pass length difference between the first light element 202 (the 0th order passing light) and the second light element 204 (the 1st order reflected light) is more than or equal to twice the coherence length "$2\Delta L_0$", the degree of temporal coherence is always "0" and there may be an "incoherent relation (temporal incoherence)" between the first light element 202 (the 0th order passing light) and the second light element 204 (the 1st order reflected light). And there may be a "coherent relation (temporal coherence)" between the first light element 202 (the 0th order passing light) and the second light element 204 (the 1st order reflected light) when the optical pass length difference between the first light element 202 (the 0th order passing light) and the second light element 204 (the 1st order reflected light) is relatively small in comparison with the coherence length $\Delta L_0$. Moreover, there may be a "low coherent relation (temporally low coherence)" between the first light element 202 (the 0th order passing light) and the second light element 204 (the 1st order reflected light) when the optical pass length difference between the first light element 202 (the 0th order passing light) and the second light element 204 (the 1st order reflected light) is more than the coherence length $\Delta L_0$ and less than double value of the coherence length "$2\Delta L_0$".

In addition, not limited to the relation between FIG. 50 and FIG. 4, the Wave Trains after wavefront division 406 representing profile (b) in FIG. 16 may correspond to the 0th order passing light that travels straight through the flat glass plate (the first light element 202). Moreover, the Wave Trains delayed after wavefront division 408 representing profile (c) in FIG. 16 may correspond to the 1st order reflected light that is reflected twice at the entrance and exit surfaces in the flat glass plate (the second light element 204).

Since Equation 9 indicates an envelope profile of only one Wave Train, "$<S_0S_1>$" included in Equations 11 and 13 shows the optical interference within only one Wave Train. However, FIG. 16 shows a plurality of Wave Trains repeatedly forming along a Wave Train propagation direction. Therefore, a profile of previous Wave Train may be substituted for "$S_0$" in "$<S_0S_1>$", and another profile of succeeding Wave Train may be substituted for "$S_1$" in "$<S_0S_1>$". In case of the situation, a condition of "$<S_0S_1>=0$" occurs because the succeeding Wave Train has unsynchronized optical phase 402 compared to another optical phase of the previous Wave Train. Therefore, the well-known optical interference based on the temporal coherence occurs within only one Wave Train.

According to FIG. 4, at the optical synthesizing area 220, an amplitude characteristic of the second light element 204 is added to an amplitude characteristic of the first light element 202 to generate the optical interference between the first light element 202 and the second light element 204 when the optical path length difference is less than the coherence length $\Delta L_0$. The same Wave Train is included in both of the first light element 202 and the second light element 204 when the optical path length difference is less than the coherence length $\Delta L_0$.

Equation 8 shows the amplitude characteristic summation corresponding to an amplitude characteristic of the synthesized light 230. Here, the first light element 202 may correspond to "j=0" (the value of the suffix j is "0"), and the second light element 204 may correspond to "j=1" (the value of the suffix j is "1"). And Equation 11 shows the light intensity of the synthesized light 230 based on Equation 8. Equation 9 indicates that, when the optical path length difference between the first light element 202 and the second light element 204 is greater than twice the coherence length $\Delta L_0$, Equation 11 shows "$<S_0S_1>=0$". Here, Equation 11 indicates the light intensity summation between a light intensity of the first light element 202 and a light intensity of the second light element 204, and the light interference phenomena does not occur when "$<S_0S_1>=0$".

In the opposite direction, when the optical path length difference between the first light element 202 and the second light element 204 is less than the coherence length $\Delta L_0$, Equation 11 shows "$<S_0S_1>\neq 0$". Here, Equation 9 accounts for the inequality "$<S_0S_1>\neq 0$" when both of the first light element 202 and the second light element 204 include the same Wave Train simultaneously. In case of "$<S_0S_1>\neq 0$", Equation 11 shows the optical interference phenomenon because the third term of the right side in Equation 11 indicates the optical interference phenomenon. Moreover, Equation 11 does not indicate the light intensity summation between a light intensity of the first light element 202 and a light intensity of the second light element 204 when "$<S_0S_1>\neq 0$" even though Equation 8 shows the amplitude characteristic summation between an amplitude characteristic of the first light element 202 and the second light element 204. Therefore, with respect to the synthesized light 230, the amplitude summation phenomenon occurs. That is, the amplitude characteristic of the synthesized light 230 is obtained by adding the amplitude characteristic of the second light element 204 to the amplitude characteristic of the first light element 202.

With respect to the incoherent relation (temporal incoherence), the second light element 204 (the Wave Trains delayed after wavefront division 408) has the fully unsynchronized optical phase 402 compared with the optical phase of the first light element 202 (the Wave Trains after wavefront division 406). And in response to the low coherent relation (temporally low coherence), the second light element 204 (the Wave Trains delayed after wavefront division 408) has the partially unsynchronized optical phase 402 compared with the optical phase of the first light element 202 (the Wave Trains after wavefront division 406).

Using Equation 11, the theoretical calculation result is obtained and shown in FIG. 50. The theoretical calculation result is similar to the measurement result. FIG. 50 shows slight difference area between the theoretical calculation result and the measurement result when the measurement wavelength $\lambda_0$ is about 1.39 μm. It is supposed that the slight difference area results from light absorption of hydroxyl group included in the flat glass plate. In other words, slight difference area between the theoretical calculation result and the measurement result does not result from the optical interference phenomenon. The wavelength resolution (spectral bandwidth) ΔA of the spectrometer used in this experiment is around 7.5 nm. So that substituting the value (7.5 nm) for Equation 1, the coherence length $\Delta L_0$ can be calculated.

Figure 51:
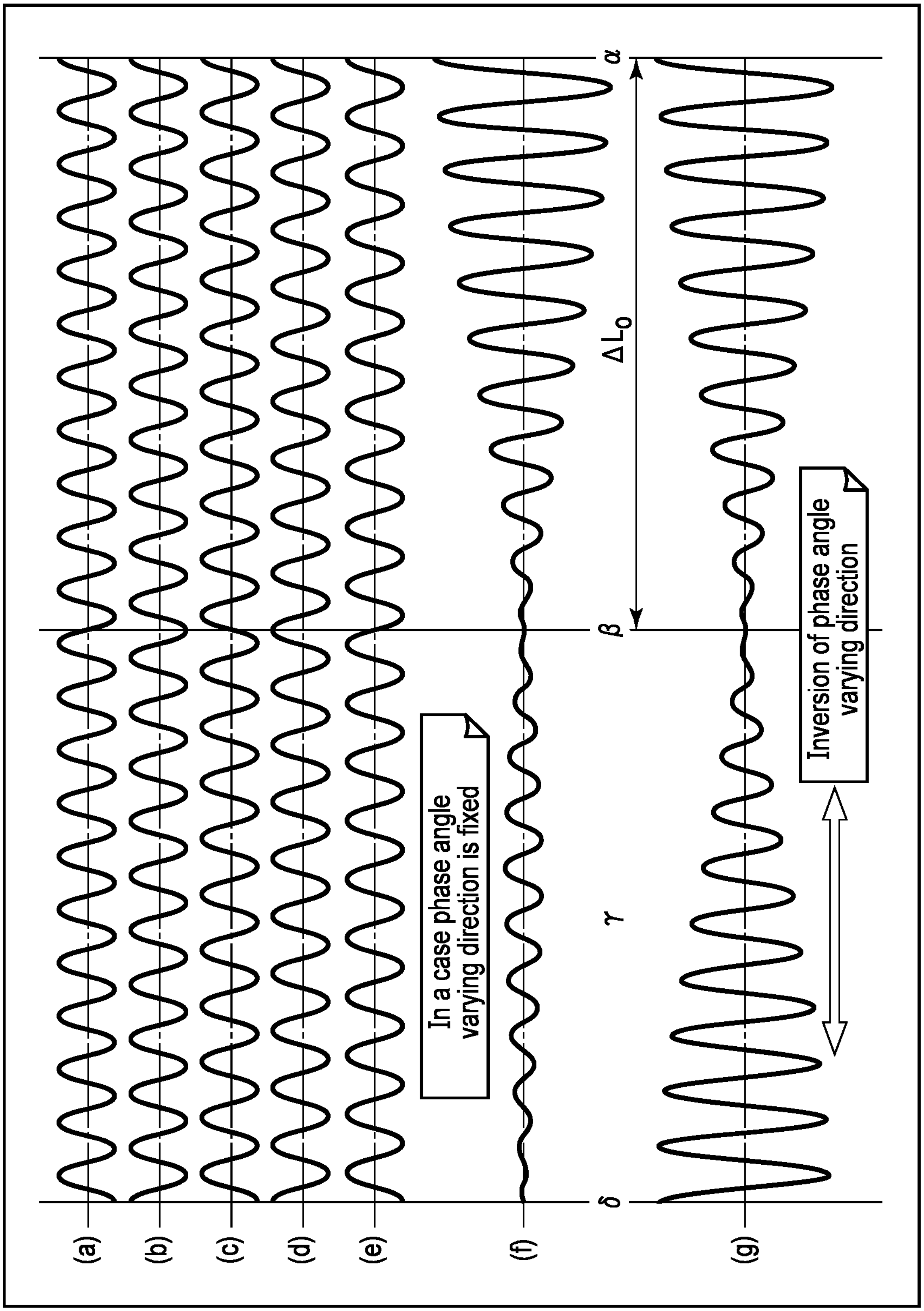
FIG. 51 is an explanatory diagram of a prediction mechanism by which Wave Trains are generated.

Profile (f) in FIG. 51 shows a conventionally known mechanism model of Wave Train formation. The horizontal axis of FIG. 51 shows the spatial distance along the Wave Train propagation direction. The vertical axis of FIG. 51 represents each of electrical field variations at a prescribed time. Wave Train comprises a plurality of plane waves having different wavelengths within a wavelength width (spectral bandwidth) Δλ.

When a central wavelength within the wavelength width (spectral bandwidth) ΔA is $\lambda_0$, profile (c) in FIG. 51 shows an electric field variation of a plane wave of $\lambda_0$ having constant amplitude at the prescribed time. Profile (a) in FIG. 51 shows anther electric field variation having constant amplitude of a wavelength of "$\lambda_0-\Delta\lambda/2$". Similarly, profiles (b), (d) and (e) in FIG. 51 show electric field variations of plane waves with wavelengths of $\lambda_0-\Delta\lambda/4$, $\Delta_0+\Delta\lambda/4$, and $\Delta_0+\Delta\lambda/2$, respectively. And profile (f) in FIG. 51 represents the electric field variation of conventionally known Wave Train obtained by amplitude addition (amplitude synthesis or addition for each electric field variation) of each of plane waves.

A case in which phases of all plane waves respectively having different wavelengths representing profiles (a) to (e) in FIG. 51 coincide at the position α is considered. Here, since the electric field variations of all plane waves respectively have their maximum values at the position α, the amplitude of the Wave Train whose amplitudes are added together becomes the maximum value at the position α. By the way, since each wavelength of each plane wave is different from each other, the phase shifts occur between the different plane waves as it moves from the position α to a position β. And at the position β, the electric field value for each of plane waves becomes random. As a result, the amplitude of the Wave Train whose amplitudes are added together at the position β becomes "0". According to profile (f) in FIG. 51, the position β corresponds to near the terminating end area of one Wave Train. Here, the electrical field variation (amplitude distribution) of the Wave Train is represented by Equation 24 explained later. According to the Equation 24, an absolute value of the electric field of Wave Train $|\psi(\nu_0)|$ equals to "1" when "ct=r". And an absolute value of the electric field of Wave Train $|\psi(\nu_0)|$ becomes "0" when "ct−r=". Therefore, the distance between the positions α and β corresponds to the coherence length $\Delta L_0$.

It may be noticed that there are different conditions between FIG. 50 and profile (f) in FIG. 51 to decrease each of envelope amplitudes. According to profile (f) in FIG. 51, the distance between the positions α and β equals to the coherence length $\Delta L_0$ because profile (f) shows a part of one Wave Train. Meanwhile, FIG. 50 shows the optical interference phenomenon based on the temporal coherence. And the amplitude value of the light transmittance oscillation shown in FIG. 50 approaches to "0" when the optical pass length difference between the first light element 202 (the 0th order passing light or the Wave Train after wavefront division 406) and the second light element 204 (the 1st order reflected light or the Wave Train delayed after wavefront division 408) approaches to twice the coherence length "$2\Delta L_0$".

According to the conventionally known mechanism model of Wave Train formation, there is no place where the phases of each plane wave match at a position (position γ or δ) farther than the position β. Therefore, the conventionally known mechanism model of Wave Train formation cannot explain the principle of the continuous and repeated generation of Wave Trains along the light propagation direction.

Furthermore, in the conventionally known mechanism model of Wave Train formation shown in profile (f), Item 1. A small amplitude value of the Wave Train appears at the position γ, and Item 2. The phase of the Wave Train here is inverted with respect to the phase of the Wave Train between the positions α and β.

Here, profile (f) in FIG. 51 can be realized if a phase angle varying direction of Wave Train is fixed at a position (position γ or δ) farther than the position β (all points α to δ have the same phase angle varying direction).

However, as far as the measurement data shown in FIG. 50 are examined in detail, the experimental results predicted by items 1 and 2 were not obtained. From these experimental results, it is expected that "a mechanism other than the conventionally known mechanism model of Wave Train formation is at work to generate Wave Trains continuously and repeatedly". For the first time in the present explanation, a new mechanism model for Wave Trains forming repeatedly is proposed.

As shown in profiles (a) to (f) of FIG. 51, in the case where one Wave Train indicated by profile (f) is formed by adding or combining the wavelength light (plane waves) from $\lambda_0-\Delta\lambda/2$ to $\Delta 0+\Delta\lambda/2$, the relational equation for the Wave Train is given as follows.

$$\Psi(\nu_0) = \alpha A_0 \int_{\nu_0-\Delta\nu/2}^{\nu_0+\Delta\nu/2} \exp\{-i2\pi\nu(t-r/c)\}d\nu = \mathrm{sinc}\{\pi(ct-r)/\Delta L_0\}\exp\{-i2\pi\nu(t-r/c)\} \quad \text{Equation 24}$$

Here, near the terminating end area of the Wave Train (near the position β in FIG. 51), the Equation 24 is approximated as follows.

$$\mathrm{sinc}\{\pi\,(ct-r)/\Delta L_0\} \approx \frac{\sin\{\pi(ct-r)/\Delta L_0\}}{\pi} \quad \text{Equation 25}$$

On the other hand, the sine function from the viewpoint of complex function theory is expressed by the following relationship.

$$\sin\theta = \frac{e^{i\theta} - e^{-i\theta}}{2i} \quad \text{Equation 26}$$

Substituting Equation 25 and Equation 26, Equation 24 can be transformed as follows.

$$\begin{aligned}\Psi(\nu_0) &\approx \frac{\sin\{\pi(ct-r)/\Delta L_0\}}{\pi}\exp\{-i2\pi\nu_0(t-r/c)\} \\ &= \frac{\sin\{\pi(ct-r)/\Delta L_0\}}{\pi}\exp\{+i2\pi\nu_0(t-r/c)\} \\ &\quad -i\frac{\sin\{\pi(ct-r)/\Delta L_0\}}{\pi}\exp\{i2\pi\nu_0(t-r/c)\}\end{aligned} \quad \text{Equation 27}$$

Here, where the following condition is satisfied, $$\sin\{\pi(ct-r)/\Delta L_0\}\sin\{2\pi\nu_0(t-r/c)\}\approx 0 \quad \text{Equation 28}$$

the following relationship is established.

$$\begin{aligned}\Psi(\nu_0) &= \frac{\sin(\pi(ct-r)/\Delta L_0}{\pi}\exp\{-i2\pi\nu_0(t-r/c)\} \\ &= \frac{\sin(\pi(ct-r)/\Delta L_0}{\pi}\exp\{+i2\pi\nu_0(t-r/c)\}\end{aligned} \quad \text{Equation 29}$$

The upper right side of Equation 29 represents the "preceding (previously occurred) Wave Train" near the terminating end area. The lower side of Equation 29 represents near the starting end area of the "succeeding (later occurring) Wave Train". Here, a combination between the upper and the lower right side of Equation 29 suggests an inversion of the phase angle varying direction.

In the conventionally known mechanism model of Wave Train formation, there is no place where the phases of each wavelength light (plane wave) match at a position farther than the position β (position γ or position δ). In other words, in response to profiles (a) to (e), there is no optical phase synchronizing area except the position α. Therefore, according to the conventionally known mechanism model of Wave Train formation, the "succeeding Wave Train" does not occur.

However, when the "inversion of phase angle varying direction" occurs near the terminating end area of the "preceding Wave Train" (near the position β in FIG. 51), phase synchronization between the plane waves (component wavelength lights) starts immediately thereafter. As a result, the "succeeding Wave Train" can be generated. Profile (g) in FIG. 51 shows a newly proposed model for Wave Trains repeatedly forming.

All kinds of light are generally emitted from any kinds of light emitters 470. And the quantum mechanics teaches us that an "induced radiation" occurs when the light emitter 470 emits light. Therefore, it may suggest that the "induced radiation" may account for the optical phase synchronization to form the "succeeding Wave Train".

According to profile (g) in FIG. 51, a neighborhood area of the position β satisfies the condition of Equation 28. And the neighborhood area is slightly wide. In other words, the starting end position of the "succeeding Wave Train" is not uniquely determined in detail even though the terminating end position of the "preceding Wave Train" is set in detail. Therefore, a random phase shift occurs between the "preceding Wave Train" and the "succeeding Wave Train". As a result (because the phase is not fixed), an "incoherent" (or "partial coherent") relationship occurs between the "preceding Wave Train" and the "succeeding Wave Train". That is, in a case where a random phase shift occurs between the preceding and succeeding Wave Trains repeatedly formed, a combination between the preceding and succeeding Wave Trains prevents the optical interference. And as shown in profile (d) in FIG. 16, the synthesized light 230 represents the "adding intensities" between a light intensity of the preceding Wave Train and a light intensity of the succeeding Wave Train.

A different perspective explains the model difference between the newly proposed model of Wave Trains repeatedly forming as described above and the conventionally known mechanism model of Wave Train. As shown in profile (f) in FIG. 51, in the conventionally known mechanism model of Wave Train formation, the phase angle varying direction is fixed at a position farther than the terminating end position (the position β). And the conventionally known mechanism model not only inhibits the formation of the succeeding Wave Train but also causes an optical phase inversion at the position γ. Therefore, the conventionally known mechanism model contradicts the experimental result shown in FIG. 50. In contrast, according to the newly proposed model of Wave Trains repeatedly forming, the phase angle varying direction is inverted near the terminating end position of the preceding Wave Train (the position β), and a succeeding Wave Train having a random optical phase is generated continuously.

In the example of the present embodiment, utilizing the principle of Wave Trains repeatedly forming along the light propagation direction, the optical interference noise is reduced. That is, in the optical system included in the light application device 10 or the service providing system 14 used in the example of the present embodiment, the first area 212 and the second area 214 are configured with the optical path lengths differing by (twice) a coherence length $\Delta L_0$ or more. The initial light 200 emitted from the light emitter 470 is wavefront-divided (wavefront division) or amplitude-divided (amplitude division). As a result, a portion of the initial light 200 passes through the first area 212 as the first light element 202 as shown in FIG. 4. Also, at least a portion of the remainder of the initial light 200 passes through the second area 214 as the second light element 204. The intensities of the first light element 202 after passing through the first area 212 and the second light element 204 after passing through the second area 214 are then added together (synthesized in terms of light intensity).

Since Wave Trains are generated continuously and repeatedly along the light propagation direction, different Wave Trains are always included in the first light element 202 and the second light element 204 at the time of the intensities are added (synthesis in terms of light intensity). Since the difference in optical path length between the first area 212 and the second area 214 is separated by (twice) a coherence length $\Delta L_0$ or more, the first Wave Train contained in the first light element 202 and the second Wave Train contained in the second light element 204 do not interfere with each other.

There is a possibility that first interference noise may occur within the first Wave Train contained in the first light element 202, and that second interference noise may occur within the second Wave Train contained in the second light element 204. Here, the characteristics of the first interference noise and the characteristics of the second interference noise are different from each other. Therefore, the addition of both intensities (synthesis in terms of light intensity) causes ensemble averaging (smoothing) between the first and second interference noises. As a result of the ensemble average phenomenon, a canceling effect occurs between the interference noise of each other, and the overall interference noise is reduced.

[Chapter 12: Spatial Interference Noise (Interference Noise Caused by Spatial Coherence) Reduction Method]

Speckle noise is known as optical interference noise generated by light having a high degree of spatial coherence, such as laser light. As shown in FIG. 49, one of the disturbance noise reduction methods 1038 is to use the averaging effect of a plurality of interference noise patterns (speckle noise patterns) representing the symbol "L1". As explained above, the optical path length varying component 360 decreases a degree of temporal coherence between different divided light elements. And the optical path length varying component 360 is very effective for averaging the plurality of interference noise patterns (speckle noise patterns) though the speckle noise occurs based on the spatial coherence of light.

Figure 52:
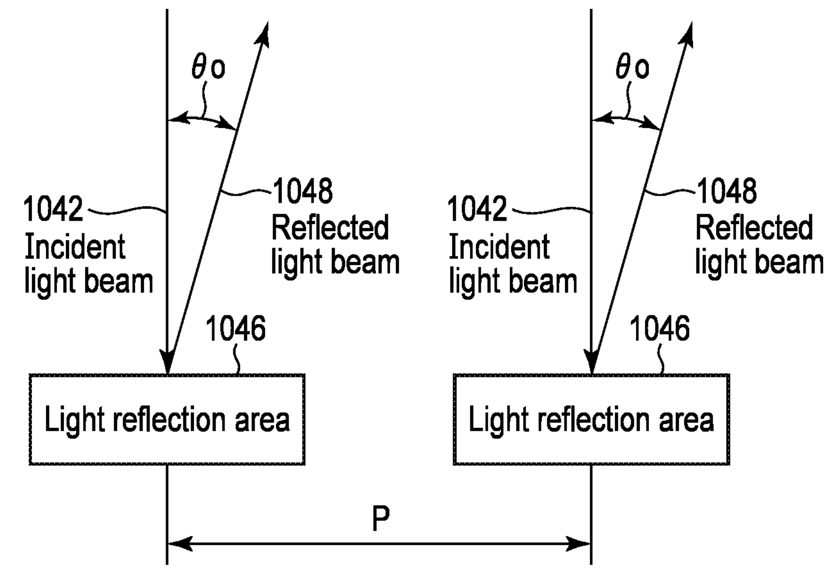
FIG. 52 is a principle explanatory diagram from another viewpoint regarding the cause of optical noise generation in the present embodiment.

FIG. 52 shows the basic principle of spatial interference noise (speckle noise) generation. Two light reflection areas 1046 separated by a pitch P are arranged. FIG. 52 shows that incident light beams 1042 are vertically bound for the light reflection areas 1046, and the reflected light beams 1048 propagate with a reflection angle $\theta_0$. According to the interference theory of light, a total light intensity of the reflected light beams 1048 is proportional to "$\cos^2(\pi P\theta_0/\lambda)$". That is, the total reflected light intensity varies periodically relating to the reflection angle $\theta_0$ of the reflected light beams 1048. This periodic variation of the total reflected light intensity corresponds to spatial interference noise (speckle noise).

Extending FIG. 52 further, a case in which multiple light reflection areas 1046 are regularly arranged at pitch P is considered. In a case where the position of a user's eye observing the reflected light beams 1048 is fixed, the reflection angle $\theta_0$ entering the user's eye varies for each reflection. As a result, some areas appear brighter due to reflection amplitudes from adjacent light reflection areas 1046 strengthening each other, and other areas appear darker due to the reflection amplitudes canceling each other out. This appearance is referred to as a speckle noise pattern.

Figure 53:
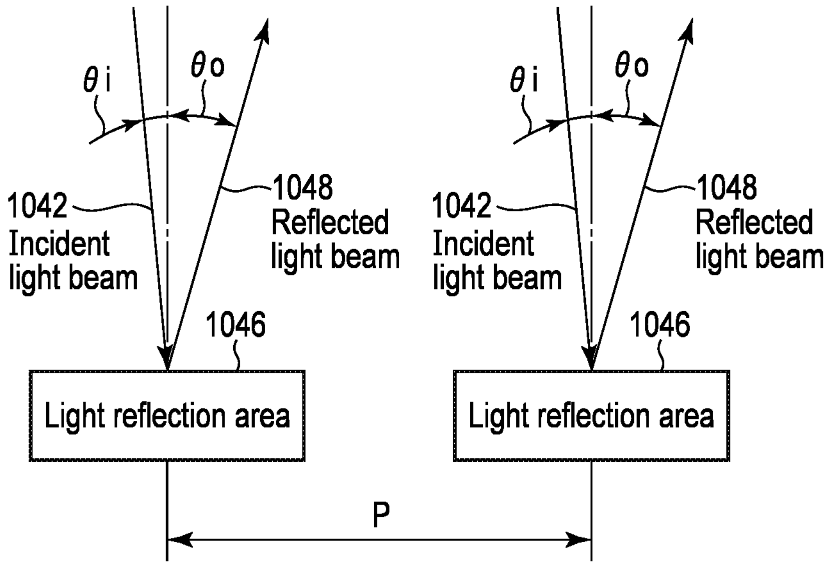
FIG. 53 is a principle explanatory diagram from still another viewpoint regarding the cause of optical noise generation in the present embodiment.

FIG. 53 shows the total light intensity of the reflected light beams 1048 propagating with a reflection angle $\theta_0$ in a case where the incident angle of the incident light beam 1042 to the two light reflection areas 1046 changes from "0" to "$\theta_i$". According to the interference theory of light, total light intensity of the reflected light beams 1048 varies as "$\cos_2\{\pi P(\theta_0-\theta_i)/\lambda\}$".

It was explained in the previous chapter that, since different Wave Trains do not optically interfere with each other, the synthesized light 230 between different Wave Trains provides the simply added intensity (synthesizing light intensity values) between intensities of the different Wave Trains. For example, as shown in FIG. 52, a first light element containing a part of at least one Wave Train is vertically incident on two light reflection areas 1046. At the same time, the second light element 204 containing at least a part of another Wave Train that does not interfere with the above Wave Train is incident with the incident angle $\theta_i$. The total light intensity (simply added intensity) of the synthesized light 230 reflected with the reflection angle $\theta_0$ is given by "$\cos^2(\pi P\theta_0/\lambda)+\cos^2\{\pi P(\theta_0-\theta_i)/\lambda\}$". The composition formula (the added formula) can realize an ensemble averaging effect (an ensemble smoothing effect) on the optical interference pattern (the speckle noise pattern) if the value of the incident angle $\theta_i$ is optimized. For example, when the prescribed reflection angle $\theta_0$ maximizes the light intensity in the first term, the corresponding incident angle $\theta_i$ can minimizes the light intensity in the second term to cancel between the maximum and the minimum intensities. As a result, spatial interference noise (speckle noise) is greatly reduced.

In other words, when the first light element 202 and the second light element 204, which are in an incoherent relation (temporal incoherence) or a low coherent relation (temporally low coherence) with each other, are irradiated simultaneously on the measured object 22 at different irradiation angles (with different incident angles with each other), optical interference noise (speckle noise) based on the spatial coherence of light can be reduced. In FIGS. 52 and 53, for simplicity of explanation, only the intensities of the two light elements 202 and 204, which are mutually incoherent (or low coherent), are added together. However, it is not limited thereto, and three or more (or four or more) types of light elements 202, 204, and 206, which are in a mutually incoherent relation (or low coherent relation), may be irradiated simultaneously to the measured object 22 at different irradiation angles (with different incident angles with each other). Increasing the number of mutually incoherent (or low coherent) light element irradiations increases the averaging (smoothing) effect that corresponds to the optical interference noise (speckle noise) reduction effect.

In order to effectively reducing the optical interference noise (speckle noise), the present embodiment considers an irradiation angle difference (incident angle difference) $\Delta\theta_i$ between the irradiation angle (incident angle) of the first light element 202 and the irradiation angle (incident angle) of the second light element 204. The present embodiment presumes that the pitch P is more than the central wavelength $\lambda_0$. So that, a relation "$P\theta_i/\Delta_0>\theta_i$" satisfies. Therefore, the irradiation angle difference (incident angle difference) $\Delta\theta_i$ may be greater than "1/100,000" expressed in a unit of radian. Not limited to the condition, it may be desirable that the irradiation angle difference (incident angle difference) $\Delta\theta_i$ may be greater than "1/1000".

Next, a maximum value of the irradiation angle difference (incident angle difference) $\Delta\theta_i$ is considered. A distance between the light source 2 and the measured object 22 represents "L". A minimum light element size (a minimum diameter) of the first light element 202 and the second light element 204 at an exit of the light source 2 represents "W". And a minimum divergence angle of the first light element 202 and the second light element 204 at the exit of the light source 2 represents "$\theta_d$". It may be desirable that the first light element 202 and the second light element 204 overlap at the same arbitrary point on the measured object 22. If the first light element 202 and the second light element 204 overlap at the same point on the measured object 22, the maximum condition of the irradiation angle difference (incident angle difference) $\Delta\theta_i$ is "$\Delta\theta_i<W/L+\theta_d/2$". In other words, the irradiation angle difference (incident angle difference) $\Delta\theta_i$ may be less than "$W/L+\theta_d/2$".

Portion (d) in FIG. 16 shows a synthesizing process using the Wave Train 406 after wavefront division (the first light element 202) and the Wave Train 408 delayed after wavefront division (the second light element 204). Under the maximum condition of the irradiation angle difference (incident angle difference) $\Delta\theta_i$, the synthesizing process between the first light element 202 and the second light element 204 achieves at the overlapped position on the measured object 22 even if the synthesizing process does not achieve in the light source 2. Therefore, with respect to synthesizing process 410 in FIG. 16, the synthesizing process between the first light element 202 and the second light element 204 achieves not only in the light source 2 but also at the irradiated (exposed) position on the measured object 22 (out of light source 2).

Critical illumination and Koehler illumination are generally known as light illumination methods for the measured object 22. In order to efficiently reduce interference noise, it may be desirable that a plurality of light elements 202, 204, and 206 that are incoherent (temporal incoherence) or low coherence (temporally low coherence) with each other are irradiated in an overlapped manner on the same location anywhere in the measured object 22. Therefore, it may be preferable to use Koehler illumination as the light illumination method with respect to the measured object 22 in the example of the present embodiment.

In the example of the present embodiment, the initial light 200 emitted from the light emitter 470 is divided to generate light elements 202, 204, and 206 that are in an incoherent relation (temporal incoherence) or low coherent relation (temporally low coherence) with each other (utilizing the description in the previous chapter, light containing different Wave Trains from each other). If amplitude division (or intensity division) is used as a method of dividing the initial light 200 at this time, it is difficult to obtain a large substantial number of divisions. Therefore, in the example of the present embodiment, the initial light 200 is divided by utilizing the wavefront division method, which increases the number of divisions to the light elements 202, 204, and 206 that have incoherent relation (temporal incoherence) or low coherent relation (temporally low coherence) with each other.

As a conclusion of explanations mentioned above, the present embodiment explains the synthesized light 230 generating method. According to the method, the light emitter 470 emits the initial light 200. The initial light 200 has a wavelength width (spectral bandwidth) $\Delta\lambda$, and the present embodiment may define a central wavelength value $\lambda_0$ within the wavelength width (spectral bandwidth) $\Delta\lambda$. Here, in response to the central wavelength value $\lambda_0$, the present embodiment may set a free value included in the wavelength width (spectral bandwidth) $\Delta\lambda$. And the present embodiment may define a coherence length $\Delta L_0=\lambda_0^2/\Delta\lambda$. The present embodiment may divide the initial light 200 into the first light element 202 and the second light element 204. And each of the first and the second light element 202 and 204 has the same wavelength width (spectral bandwidth) $\Delta\lambda$ and the central wavelength value $\lambda_0$. Here, at least a wavefront angular division and a wavefront radial division may be used as the wavefront division method. The optical path length varying component 360 makes (provides) an optical path length difference between the first light element 202 and the second light element 204. Here, the optical path length difference is at least more than the coherence length $\Delta L_0$ in case of a low coherent condition (temporally low coherence), and it is desirably more than twice the coherence length $\Delta L_0$ in case of an incoherent condition (temporal incoherence). In the synthesized light 230, the propagation direction of the first light element 202 is different from the propagation direction of the second light element 204. The optical path length of the first light element 202 is different from the optical path length of the second light element 204. The propagation angle difference $\Delta\theta_i$ between the first propagation direction of the first light element 202 and the second propagation direction of the second light element 204 may be greater than "1/100,000". If the propagation angle difference $\Delta\theta_i$ is greater than "1/100,000", the synthesized light 230 can provide (generate) an ensemble averaging (smoothing) effect to reduce optical interference noise (speckle noise) based on a light intensity summation phenomena when each of the first and the second light elements 202 and 204 generates individual optical interference noise (speckle noise) with each other. The synthesized light 230 may adapt to at least one of Koehler illumination and Critical illumination may be used as the synthesized light 230.

And the present embodiment includes the synthesized light 230 applying method. According to the method, the present embodiment may use the synthesized light 230 mentioned above.

Moreover, the present embodiment includes a measurement method. According to FIG. 1, the light source 2 irradiates the measured object 22 with the synthesized light 230 having a wavelength $\lambda_0$. Here, the synthesized light 230 may include light having the wavelength $\lambda_0$.

And the measurer 8 receives (measures) the detection light (measurement light) obtained from the measured object 22. The measurer 8 may include a spectrometer having a spectral resolution $\Delta\lambda$. In case of the above measurement condition, the coherence length "$\Delta L_0=\lambda_0^2/\Delta\lambda$" may be defined. The synthesized light 230 comprises the first light element 202 and the second light element 204. At a prescribed position on the measured object 22, an incident angle of the first light element 202 is different from an incident angle of the second light element 204. The incident angle difference $\Delta\theta_i$ between the first incident angle and the second incident angle may be greater than "1/100,000" expressed in a unit of radian. And the first light element 202 and the second light element 204 overlap at a prescribed position on the measured object 22. Therefore, at the prescribed position on the measured object 22, the first light element 202 and the second light element 204 are synthesized. The synthesized light 230 may be adapted to at least one of Koehler illumination and Critical illumination. The light source 2 may generate an optical path length difference between the first light element 202 and the second light element 204. Here, the optical path length difference is more than the coherence length $\Delta L_0$ in case of a low coherent condition (temporally low coherence), and it is desirably more than twice the coherence length $\Delta L_0$ in case of an incoherent condition (temporal incoherence).

When the propagation directions of the light elements 202, 204, and 206, which are in incoherent (or low coherent) relation with each other, are individually tilted toward each other as described above, optical interference noise (speckle noise) based on the spatial coherence of the light can be efficiently reduced. Embodiment examples of the method of tilting the propagation direction for each light element 202, 204, and 206 in incoherent (or low coherent) relation are described sequentially below.

Figure 54:
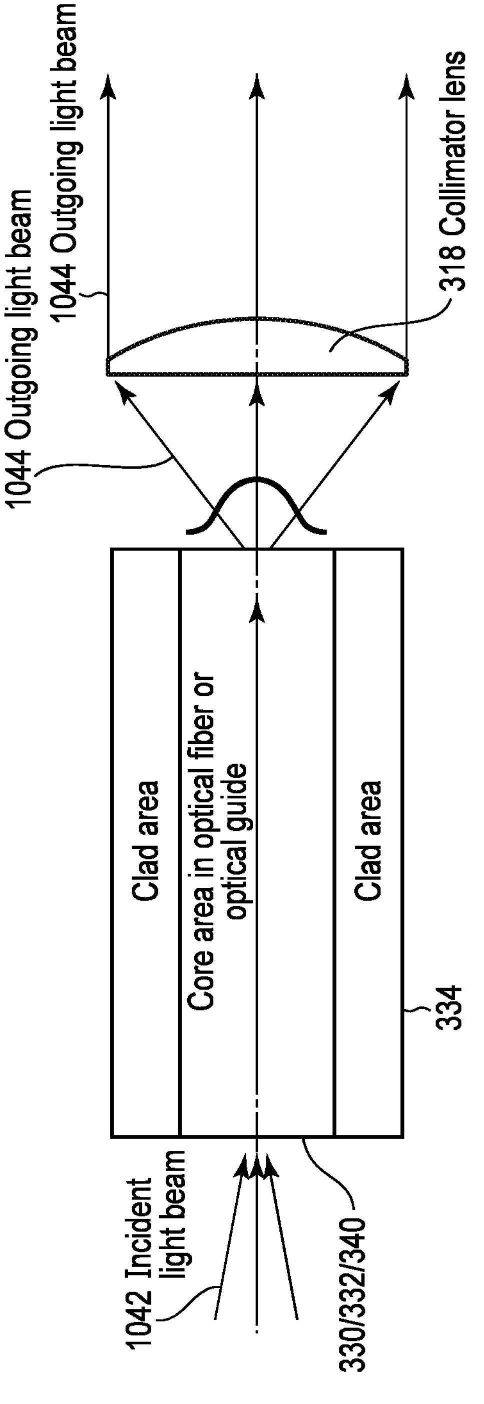
FIG. 54 is an explanatory diagram showing the relationship between modal characteristics of a multimode fiber and optical noise reduction.
Figure 55:
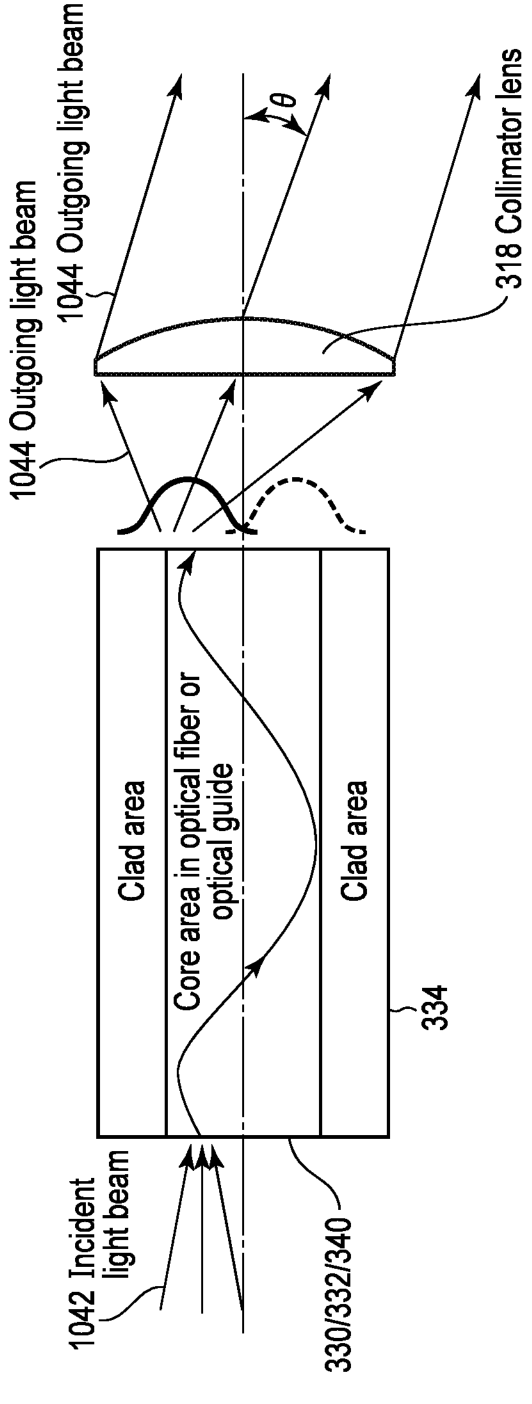
FIG. 55 is an explanatory diagram showing the relationship between modal characteristics of a multimode fiber and optical noise reduction.

FIGS. 54 and 55 show examples of a method for reducing optical interference noise (speckle noise) utilizing a single-core multimode optical fiber. FIG. 54 shows the characteristics of an outgoing light beam 1044 when an incident light beam 1042 is converged on the center of a core area in the optical fiber or the optical guide 330/332/340 and on an incident (entrance) surface of the core area in the optical fiber or the optical guide 330/332/340.

In the state of FIG. 54, most of the light in the incident light beam 1042 travels straight through the core area in the optical fiber or the central part in the optical guides 330/332/340. As a result, the intensity distribution of the outgoing light beam 1044 at a near field area or a far field area exhibits the highest intensity in the direction along the center of the optical axis on the output (exit) surface, showing an intensity characteristic that is almost axially symmetrical. When the central position of the core area in the optical fiber or the output (exit) surface in the optical guides 330/332/340 is aligned with the front focal position of the collimator lens 318, the outgoing light beam 1044 after passing through the collimator lens 318 becomes parallel light. The propagation direction of this parallel light coincides with the optical axis of the collimator lens 318.

FIG. 55 shows the characteristics of the outgoing light beam 1044 when the incident light beam 1042 is converged on the outer side (that is, a position near a clad area 334) of the core area in the optical fiber or the optical guide 330/332/340 and on the incident surface of the core area in the optical fiber or the optical guide 330/332/340. In this case, much of the light in the incident light beam 1042 undergoes multiple reflections near the interface between the core area in the optical fiber or the optical guide 330/332/340 and the clad area 334. As a result, the intensity distribution of the outgoing cross section of the outgoing light beam 1044 from the core area in the optical fiber or the optical guide 330/332/340 at the far field area 180 tends to be, for example, a “donut-shaped intensity distribution” with low intensity in the center and high intensity in the periphery.

The core diameter of a single-core multimode optical fiber 330 is often larger than that of a single-mode optical fiber. As an example, the core diameter of a single-mode optical fiber is 3 μm to 5 μm, while the core diameter of a multimode optical fiber is often between 30 μm or more and 2000 μm or less (for example, 220 μm or 600 μm as standard sizes). Therefore, the outgoing light beam 1044 emitted from the periphery in the core of the multimode optical fiber 330/332/340 is tilted in the propagation direction by θ relative to the optical axis of the collimator lens 318 after passing through the collimator lens 318. Thus, by changing the converged light incident position of the single-core multimode optical fiber, the propagation direction after passing through the collimator lens 318 is changed, and optical interference noise is reduced.

In fact, the optical intensity distributions in the cross section of the core area 332 represent any types of light intensity mode, rather than a geometric optical interpretation in the optical fiber 330. However, in FIGS. 54 and 55, for convenience of explanation, this has been explained by the difference in the optical path passing through the core area in the optical fiber or the optical guide 330/332/340.

As shown in FIG. 54, straightly propagating light along the center line of the core area 332 in optical fiber or optical guide 330/332/340 tends to form a “TE1 mode” in the core area 332 of the multimode optical fiber 330. The “TE1 mode” shows a fundamental mode and forms a far field pattern similar to Gaussian pattern at the far field area 180 of the optical fiber exit face.

As shown in FIG. 55, light passing through the peripheral area of the core area 332 near the interface between the core area 332 and the clad area 334 tends to form a “TE2 mode” in the core area 332 of the multimode optical fiber 330. The “TE2 mode” shows an excited mode, and a far field pattern formed by the “TE2 mode” is relatively dark at a center area (the “donut-shaped intensity distribution”). Therefore, the far field pattern at the far field area 180 of the exit face of the optical fiber 330 suggests the different type of light intensity mode in the core area 332. There are more excited modes “TE3 mode” or “TE4 mode”.

In response to FIGS. 54 and 55, the incident light beam 1042 may correspond to the synthesized light 230 including the first light element 202 and the second light element 204. And as described above, the synthesized light 230 may have the propagation angle difference $\Delta\theta_i$ between the light element 202 and the second light element 204 when the optical path length difference between the light element 202 and the second light element 204 is greater than the coherence length $\Delta L_0$ (or the double value of the coherence length $\Delta L_0$).

Since the propagation direction of the first light element 202 is different from the propagation direction of the second light element 204, an optical path of the first light element 202 may adapt to FIG. 54, and an optical path of the second light element 204 may adapt to FIG. 55. By utilizing Koehler illumination, it is easy to irradiate the outgoing light beam 1044 on the same arbitrary point in the measured object 22. Here, the outgoing light beam 1044 includes the incoherent (or low coherent) light elements 202 and 204 after passing through the collimator lens 318. This allows the optical interference noise to be easily reduced.

The above method is also effective in reducing the optical interference noise that appears in spectral profiles. Because the core area in the optical fiber or the optical guide 330/332/340 can have the function of the optical path length varying component 360 as a kind of the optical characteristic converting component 210. FIG. 54 shows the minimum optical path length in the core area of the optical fiber or the optical guide 330/332/340. In comparison with FIG. 54, FIG. 55 shows the longer optical path length in the core area of the optical fiber or the optical guide 330/332/340. Therefore, the core area of the optical fiber or the optical guide 330/332/340 provides (generates) the optical path length difference to reduce the optical interference noise in spectral profiles.

FIGS. 54 and 55 show different positions of the converged incident light beams 1042 on the entrance surface of the core area in the optical fiber or the optical guide 330/332/340. In addition, not limited to the different positions, the present embodiment may provide (generate) the incident angle difference $\Delta\theta_i$ between the first light element 202 and the second light element 204 on the entrance surface of the core area in the optical fiber or the optical guide 330/332/340. When an incident angle of the first light element 202 is “0” (vertically incidence), the first light element 202 straightly propagate. And a propagation direction of the first light element 202 after passing through the collimator lens 318 is parallel to the optical axis of the collimator lens 318. When an incident angle of the second light element 204 is greater than “0”, an optical path of the second light element 204 in the core area 330/332/340 is similar to FIG. 55. And there is a different angle “θ” between the optical axis of the collimator lens 318 and the propagation direction of the second light element 204 after passing through the collimator lens 318.

According to the different angle “θ” on the entrance surface of the core area 332, a part of the first/second light element 202/204 may form the TE1 mode, and other part of the first/second light element 202/204 may form the TE2 mode simultaneously. As explained above, the amplitude summation phenomenon occurs in the first light element 202 or in the second light element 204. Therefore, the core area 332 allows an amplitude summation between the TE1 mode and the TE2 mode in the first light element 202 or in the second light element 204.

The added amplitude distribution between the TE1 mode and the TE2 mode forms an asymmetrical profile with respect to the central line in the core area 332. As shown in FIG. 55, the asymmetrical profile accounts for the propagation direction angle θ after passing through the collimator lens 318. Therefore, an amplitude ratio difference of TE1 mode between the light element 202 and the second light element 204 accounts for the propagation angle difference $\Delta\theta_i$ between the light element 202 and the second light element 204.

The optical path length varying component 360 shown in FIGS. 14, 24, 25, 26, and 27 divides the initial light 200, with the wavefront angular division method and the wavefront radial division method, into the first light element 202 and the second light element 204. Therefore, an incident situation of the first light element 202 on the entrance surface of the core area 332 is different from an incident situation of the second light element 204. So that, the incident situation difference between the first light element 202 and the second light element 204 accounts for the different rate of amplitude summation mode in the core area 332 between the first light element 202 and in the second light element 204. Moreover, the wavefront angular division of the optical path length varying component 360 may account for an angular difference of amplitude summation mode in the core area 332. Therefore, the combination between the core area in the optical fiber/optical guide 330 and the wavefront division of the optical path length varying component 360 provides (generates) the propagation angle difference $\Delta\theta_i$ between the first light element 202 and the second light element 204 after passing the collimator lens 318.

Figure 56:
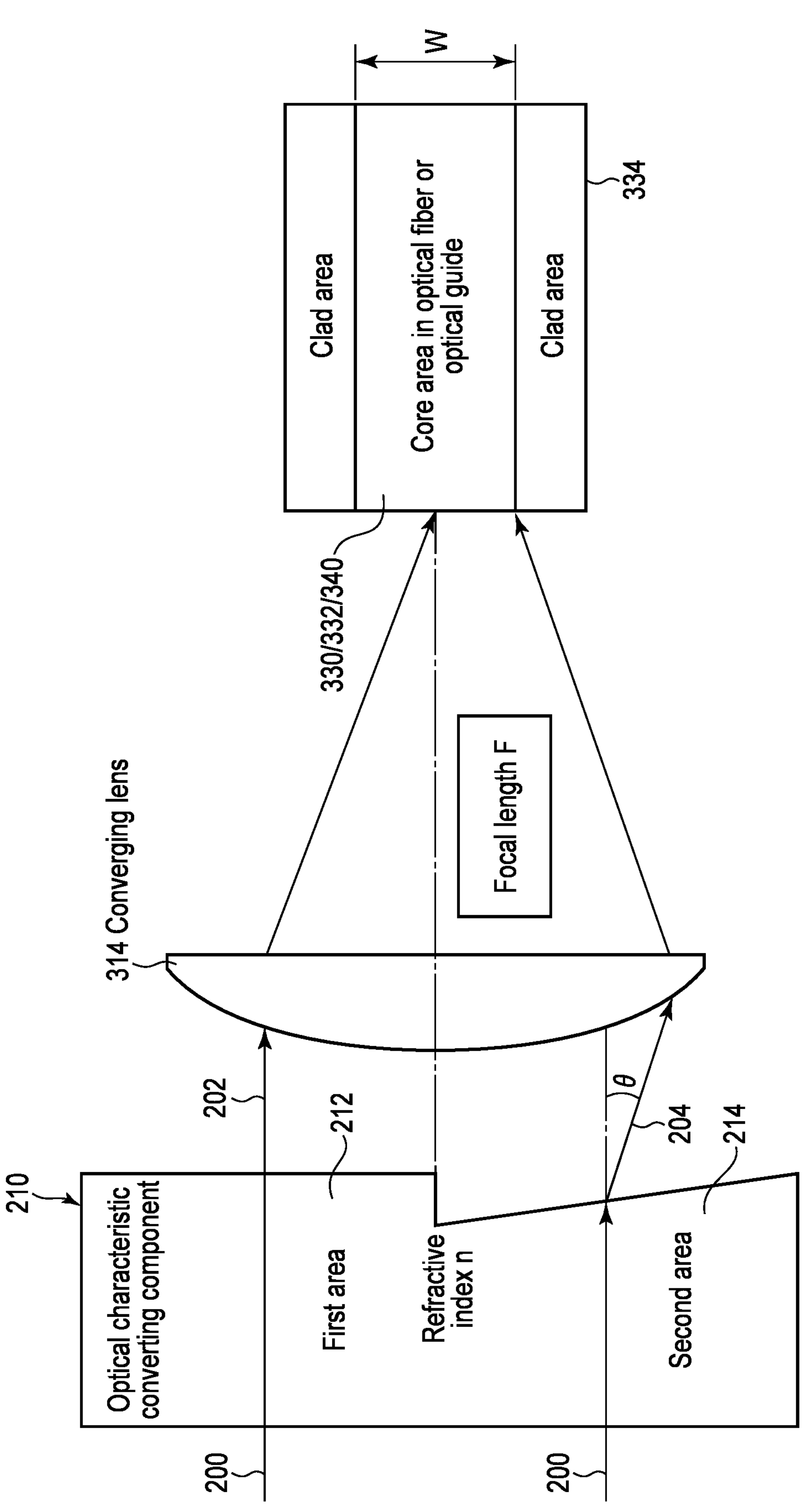
FIG. 56 is an explanatory diagram of the relationship between an optical characteristic converting component and the multimode fiber.

FIG. 56 shows an application example of the optical interference noise reduction method described in FIGS. 54 and 55. The optical characteristic converting component 210 (the optical path length varying component 360) formed of an optical transparent material with refractive index "n" provides the first area 212 and the second area 214. When the difference in optical path lengths between the first area 212 and the second area 214 becomes greater than the aforementioned coherence length $\Delta L_0$ (or twice that length), a degree of partial coherence (the degree of temporal coherence) between the first light element 202 and the second light element 204 passing through the areas 212 and 214, respectively, is significantly reduced.

If the incident surfaces or the output surfaces in the respective areas 212 and 214 have different slope angles, the output angles between the first light element 202 and the second light element 204 will be different from each other in a case where the incident angle of the initial light 200 is the same. Therefore, by optimizing the output angles between the first light element 202 and the second light element 204, the optical interference noise reduction described in FIGS. 54 and 55 can be efficiently executed.

Here, the difference value between both output angles is denoted by "θ". Immediately after the optical characteristic converting component 210, the converging lens 314 with a focal length "F" is placed, and the incident (entrance) surface of the core area 332 in the optical fiber or the optical guide 330/332/340 is aligned with a rear focal plane position of the converging lens 314. Then, the light converging position of the core area in the fiber or the optical guide 330/332/340 is shifted by "Fθ" on the incident (entrance) surface of the core area 332.

The width of the core area in the fiber or the optical guide 330/332/340 is denoted by W. When the shift amount "Fθ" of the light converging position of the both exceeds W, the light intensity of one of the first light element 202 and the second light element 204 that enters the core area in the fiber or the optical guide 330/332/340 is significantly reduced. Therefore, it may be desirable that the condition of "Fθ≤W" satisfies.

The diffraction theory of light teaches us that the light elements 202 and 204 at the light converging position have predetermined spot sizes. Therefore, even under the condition of "Fθ>W", a portion of both lights will enter the core area in the fiber or the optical guide 330/332/340. Therefore, a minimum essential condition is "Fθ>W/2".

As shown in FIGS. 54 and 55, the optical paths in the core area in the fiber or the optical guides 330/332/340 are different between the first light element 202 and the second light element 204, which are incoherent (or has low coherence) with each other. The condition for both optical paths to be different is "Fθ≤W/1000" (preferably "Fθ≤W/1000").

Summarizing the results of the above description, the range of angle θ formed between the first light element 202 passing through the first area 212 and the second light element 204 passing through the second area 214 is "W/(100F)≤θ≤W/(2F)" (preferably "W/(1000F)≤θ≤W/F").

Figure 57:
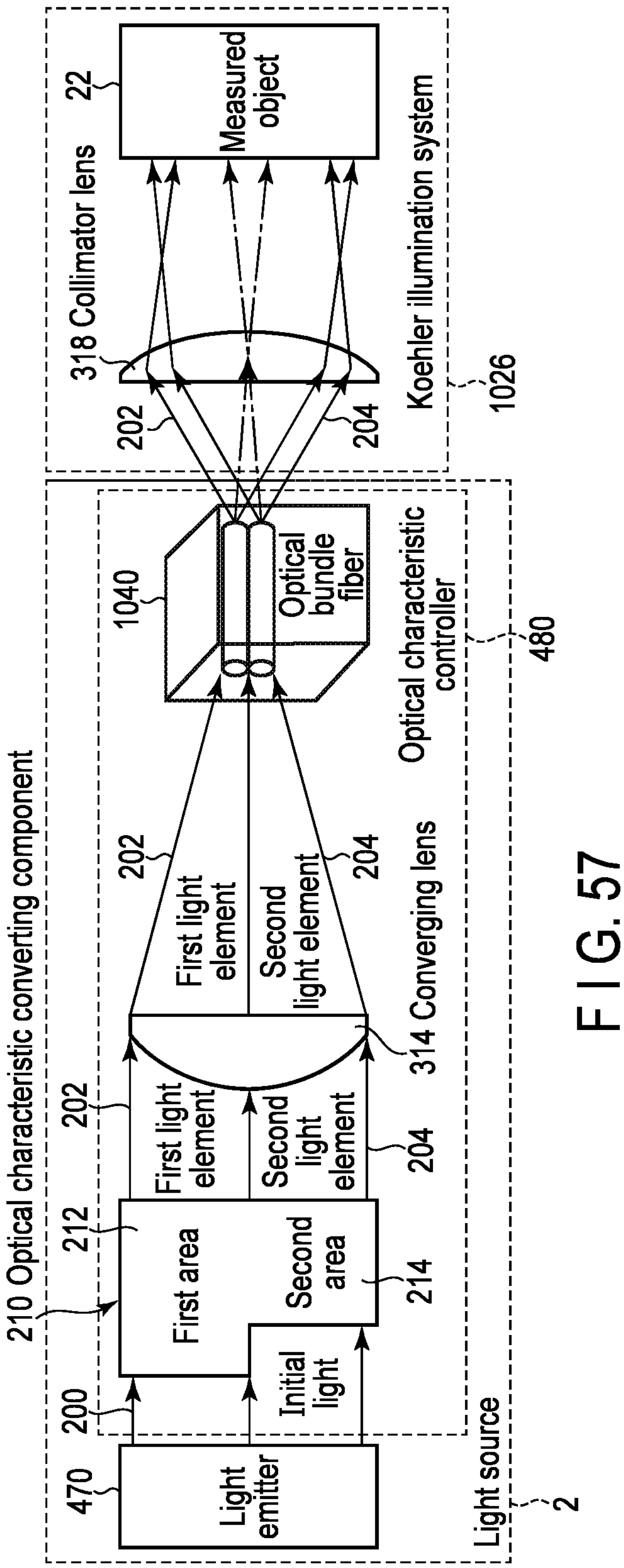
FIG. 57 is an explanatory diagram of an implementation example relating to an optical noise reduction method.

Instead of using a single-core fiber as the application example of the present embodiment, an optical bundle fiber 1040 may be used. FIG. 57 shows an application example using the optical bundle fiber 1040. As shown in FIGS. 24 and 25, the light source 2 may be configured by the light emitter 470 and an optical characteristic controller 480. The mutually incoherent (or low coherent) first light element 202 and second light element 204 emitted from this light source 2 may be irradiated onto the measured object 22 by the Koehler illumination system 1026. The focal length of the collimator lens 318 located in this Koehler illumination system 1026 controls the value of the irradiation angle difference $\Delta\theta_i$ between the first light element 202 and the second light element 204 irradiated on the measured object 22. Here, if the focal length of the collimator lens 318 becomes short, the irradiation angle difference $\Delta\theta_i$ between them increases.

In the optical characteristic converting component 210 (the optical path length varying component 360) placed in the optical characteristic controller 480, the thickness is different between the first area 212 and the second area 214. When the optical path length between the two areas 212 and 214 is greater than the coherence length $\Delta L_0$ (or twice that length), the degree of (temporal) coherence between the first light element 202 and the second light element 204 decreases.

The converging lens 314 converges the first and second light elements 202 and 204 onto the incident (entrance) surface of the optical bundle fiber 1040. Here, the first light element 202 and the second light element 204 respectively enter different core areas in the optical bundle fiber 1040. Each of the different core areas takes each of different positions on the exit surface of the optical bundle fiber 1040. Therefore, a propagation direction of the first light element 202 passing through a core area and the collimator lens 318 is different from a propagation direction of the second light element 204 passing through another core area and the collimator lens 318.

Figure 58:
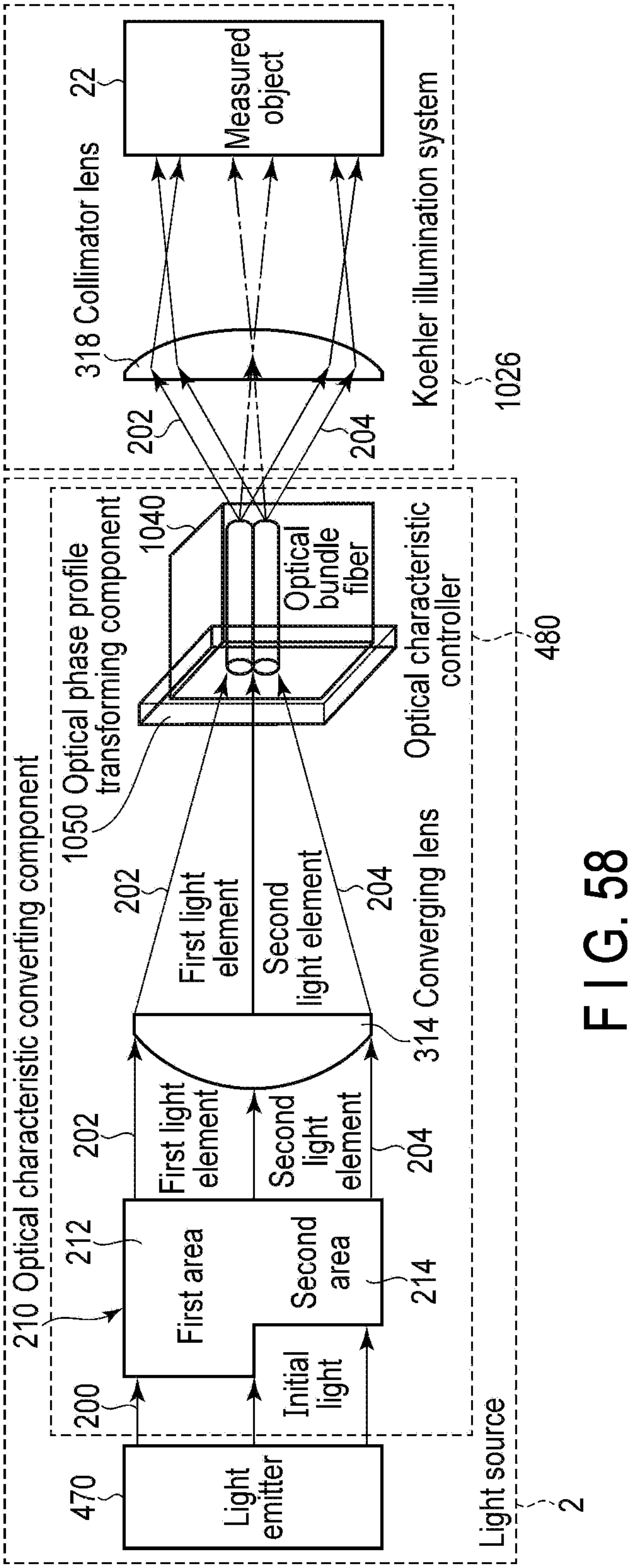
FIG. 58 is an explanatory diagram of another implementation example relating to an optical noise reduction method.

Compared to FIG. 57, FIG. 58 shows an optical system in which an optical phase profile transforming component 1050 is placed just before the incident (entrance) surface of the optical bundle fiber 1040. The first and second light elements 202 and 204 that pass through the optical phase profile transforming component 1050 enter the optical bundle fiber 1040 with transformed optical phase profiles, respectively. As the optical phase profile transforming component 1050, a diffuser having an unpolished structure on its surface, such as a frosted glass, may be used. It is not limited thereto, and gratings, hologram elements, Fresnel zone plates, etc., may also be used.

At the beginning of this chapter, it was explained that an effective way to reduce interference noise caused by spatial coherence is to change the irradiation angle with respect to the measured object 22. However, it is not limited thereto, and it has been experimentally confirmed that the difference in the optical phase distribution between the mutually incoherent (or low coherent) light elements 202 and 204 is also effective in reducing interference noise caused by spatial coherence. In other words, as an experimental result, the optical system of FIG. 58 was more effective in reducing interference noise caused by spatial coherence than the optical system of FIG. 57.

Figure 59:
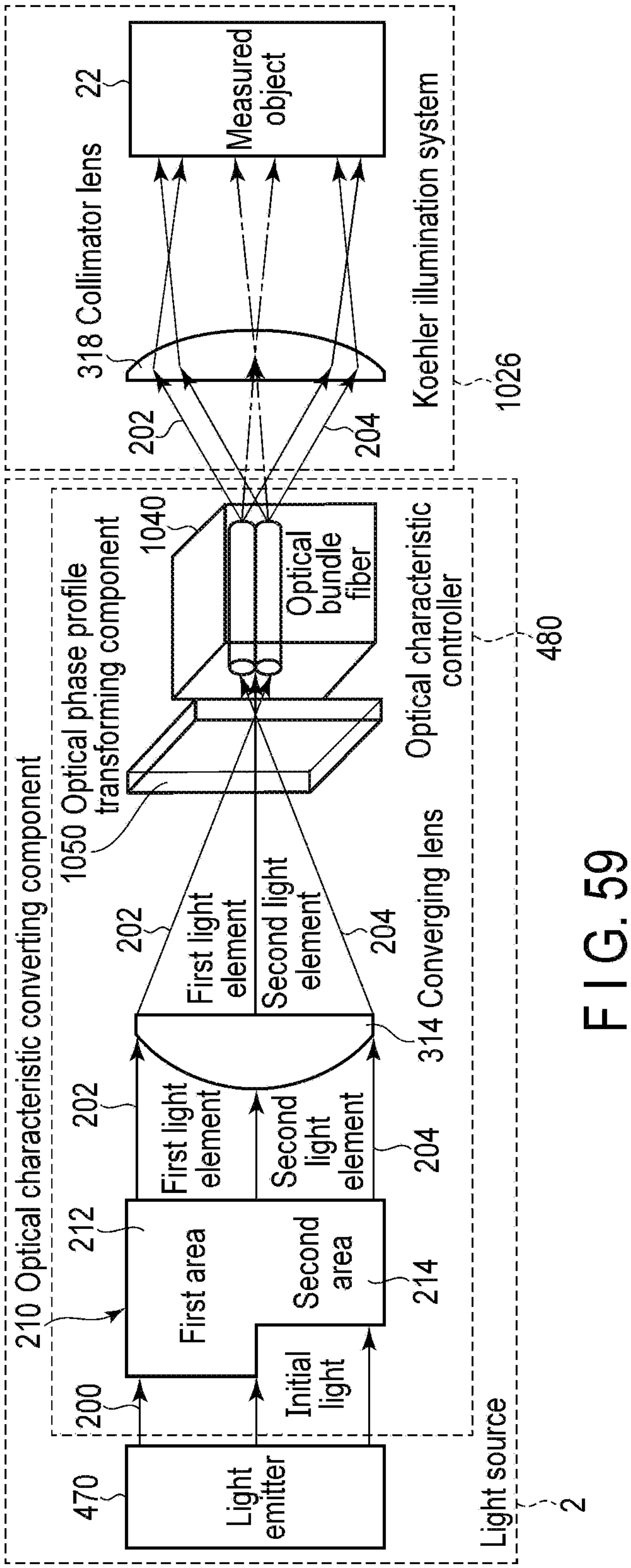
FIG. 59 is an explanatory diagram of a still another implementation example relating to an optical noise reduction method.

In FIG. 59, compared to FIG. 58, the optical phase profile transforming component 1050 is placed near the light converging plane of the first light element 202 and the second light element 204. In FIGS. 57 and 58, mainly, the first light element 202 and the second light element 204 pass through different core areas in the optical bundle fiber 1040 separately. In comparison, in FIG. 59, the first light element 202 and the second light element 204 mix with each other when passing through the optical phase profile transforming component 1050. As a result, the first light element 202 and the second light element 204 may pass through the same core area in the optical bundle fiber 1040.

Figure 60:
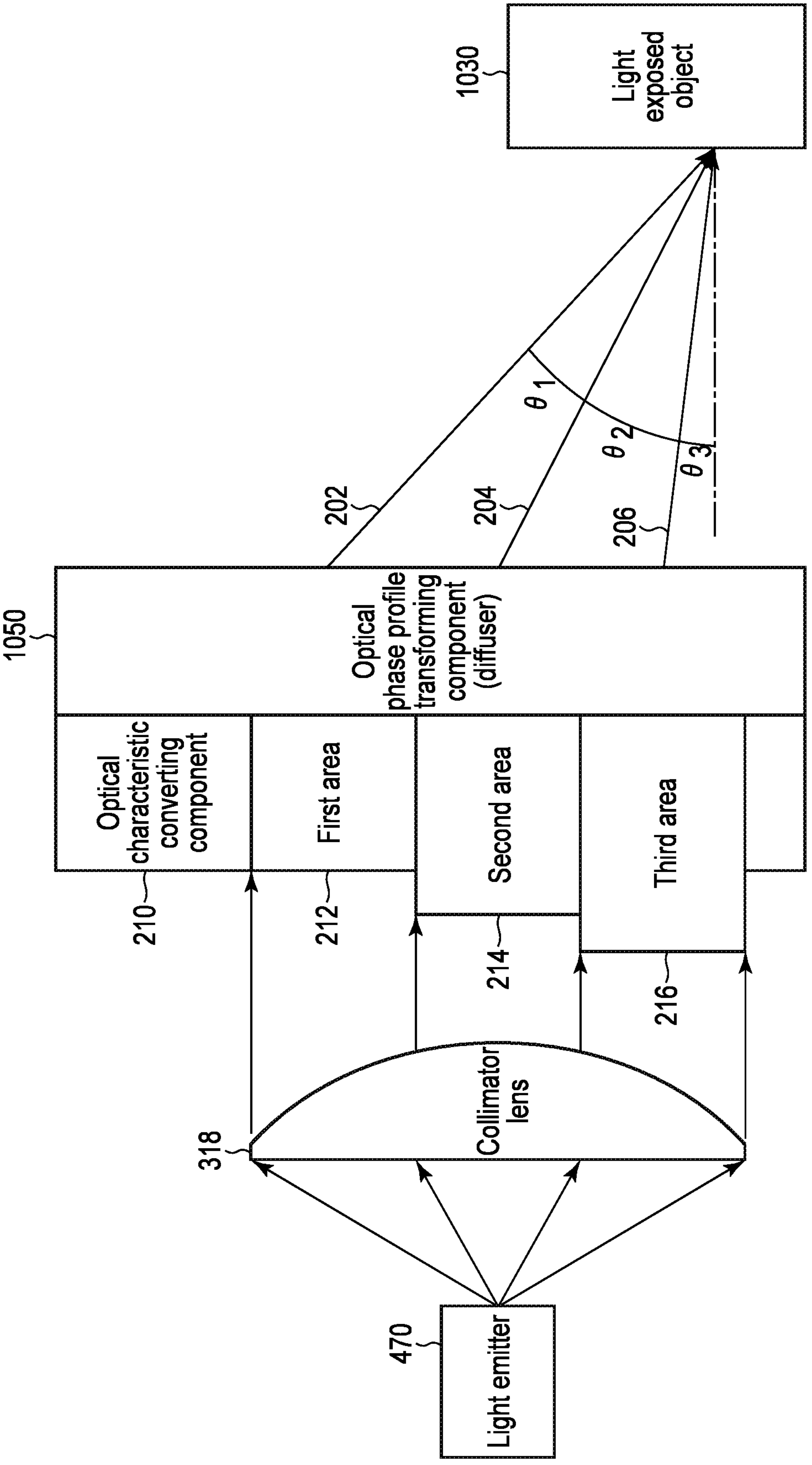
FIG. 60 is an explanatory diagram of another example relating to the optical noise reduction method.

FIG. 60 shows another example of the present embodiment. As a method of overlapping and irradiating each of the light elements 202, 204, and 206 passing through different areas 212, 214, and 216 while changing the irradiation angle with respect to a light exposed object 1030 (the measured object 22), the optical phase profile transforming component 1050 such as a diffuser is utilized. Since the surface of the optical phase profile transforming component 1050 has an unpolished roughness surface, it diffuses the light passing therethrough. The irradiation angle of the first light element 202, the second light element 204, and the third light element 206 then change to θ1, θ2, and θ3 at an arbitrary position on the light exposed object 1030 (the measured object 22). At the same time, the first light element 202, the second light element 204, and the third light element 206 are overlapped and irradiated at this position (the arbitrary position).

Since the respective irradiation angles θ1, θ2, and θ3 are different from each other, the pattern of optical interference noise (speckle noise) appearing on the light exposed object 1030 (the measured object 22) differs between the first light element 202, the second light element 204, and the third light element 206. Since the first light element 202, the second light element 204, and the third light element 206 have an incoherent (or low coherent) relation with each other, the different optical noise patterns mix with each other on the light exposed object 1030 (the measured object 22). As a result, the optical noise patterns are averaged (smoothed) and the overall interference noise is reduced.

According to FIG. 60, the optical characteristic converting component 210 (the optical path length varying component 360) is made with an optical transparent material to provide (generate) the irradiation (propagation) angle difference $\Delta\theta_i$ between different light elements 202, 204, and 206. In addition, not limited to the light transmission system, the optical characteristic converting component 210 (the optical path length varying component 360) may comprise an optical reflection material to provide (generate) the irradiation (propagation) angle difference $\Delta\theta_i$ between different light elements 202, 204, and 206.

As explained in FIG. 15, the optical characteristic converting component 210 (the optical path length varying component 360) may have optical reflection planar stage surfaces having different levels. In case of the light reflection type, each of optical reflection planar surfaces individually tilts with each other to provide (generate) the irradiation (propagation) angle difference $\Delta\theta_i$ between different light elements 202, 204, and 206. In addition, not limited to the reflective flat mirror, at least a part of the optical reflection stage may have unpolished rough surfaces having different levels to mix different light elements 202, 204, and 206.

Figure 61:
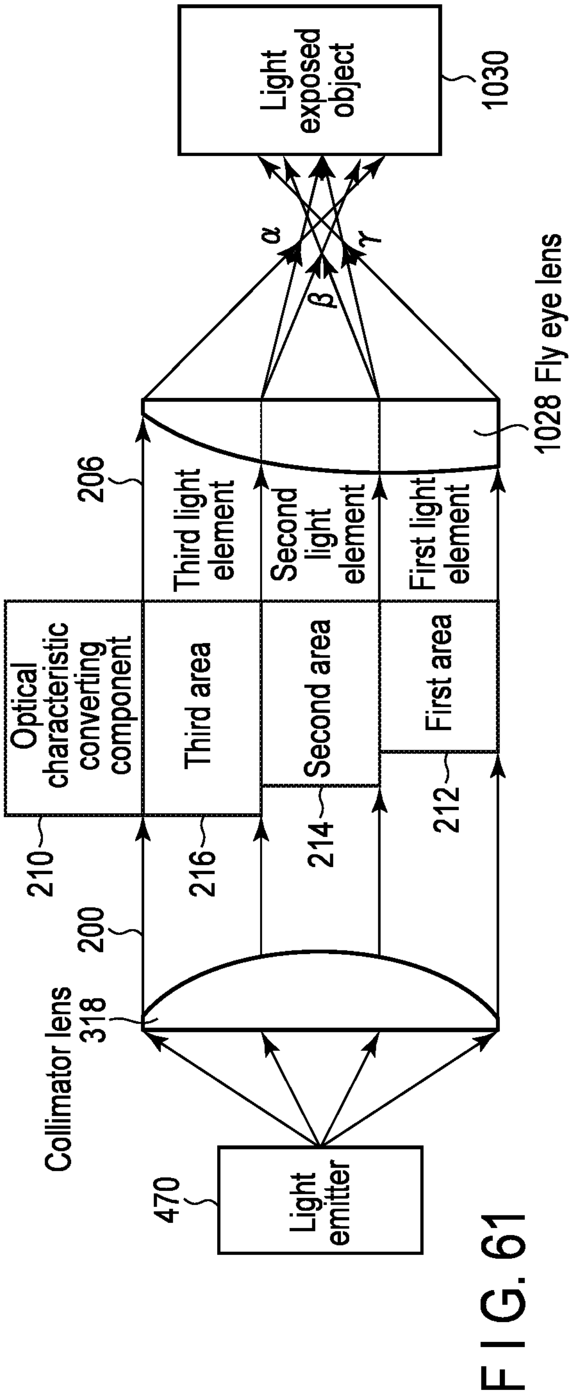
FIG. 61 is an explanatory diagram of an application example relating to the optical noise reduction method.
Figure 62:
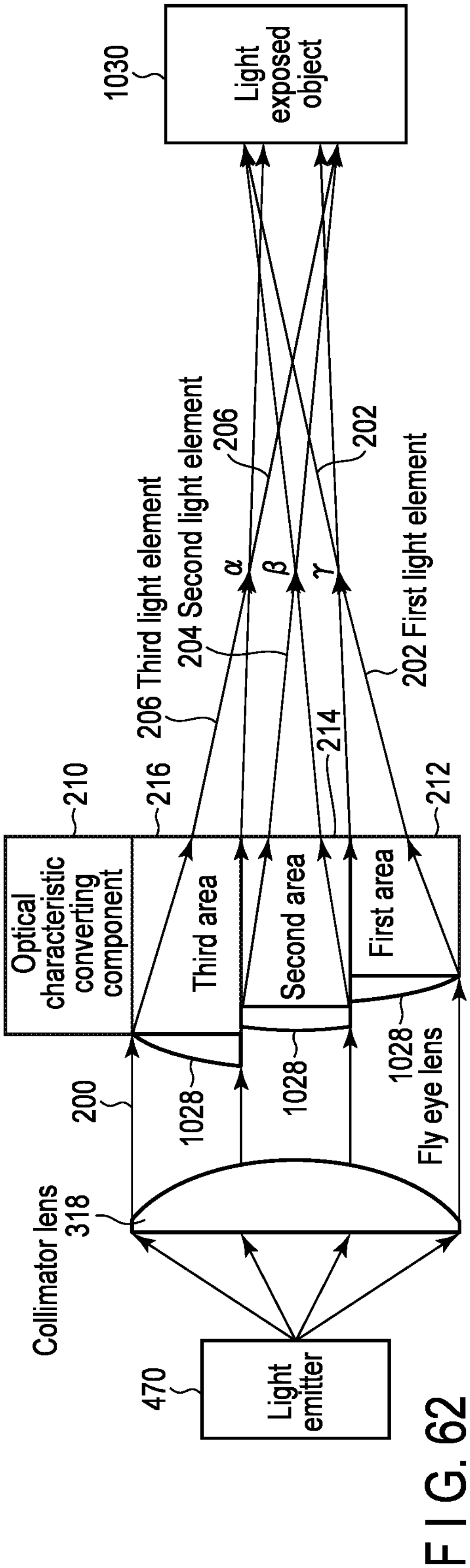
FIG. 62 is an explanatory diagram of another application example relating to the optical noise reduction method.

FIGS. 61 and 62 show application examples in the present embodiment. In FIGS. 61 and 62, light is converged at spatially different positions between the light elements 202, 204, and 206 that are incoherent (or have low coherence) with each other. In a case where the Koehler illumination system 1026 may be employed as the illumination system for the light exposed object 1030 (the measured object 22), the light elements 202, 204, and 206 converged at these different positions are mixed (overlapped) with each other and irradiated to arbitrary position in the light exposed object 1030 (the measured object 22). Also, the irradiation angles at this time are different from each other. As a result, the optical interference noise patterns (speckle noise patterns) are averaged (smoothed), and the overall optical interference noise (speckle noise) is reduced.

As a method of converging the light elements 202, 204, and 206 that are incoherent (or has low coherence) with each other to spatially different positions, an example of FIG. 61 may use a fly eye lens 1028, which is a lens with multiple optical axes arranged on the same space. In FIG. 61, this fly eye lens 1028 is placed immediately after the optical characteristic converting component 210 (the optical path length varying component 360). In FIG. 62, this fly eye lens 1028 is placed just before the optical characteristic converting component 210 (the optical path length varying component 360) and is also formed integrally with the optical characteristic converting component 210 (the optical path length varying component 360).

In both of FIGS. 61 and 62, the third, second, and first light elements 206, 204, and 202 that individually pass through the third, second, and first areas 216, 214, and 212, respectively, converge at positions α, β, and γ. Here, with the employment of the Koehler illumination system 1026, each of the light elements 206, 204, and 202 after passing through each light converging position α, β, and γ is mixed together and irradiates the light exposed object 1030 (the measured object 22) with different irradiation angles.

As a method of converging light at different positions α, β, and γ for each of the light elements 206, 204, and 202 passing through different areas 216, 214, and 212, the examples in FIGS. 61 and 62 may use the fly eye lens 1028. However, it is not limited thereto, and the lights may be converged at different positions α, β, and γ by any other method. As another embodiment example, a liquid crystal lens array may be used instead of the fly eye lens 1028.

Figure 63:
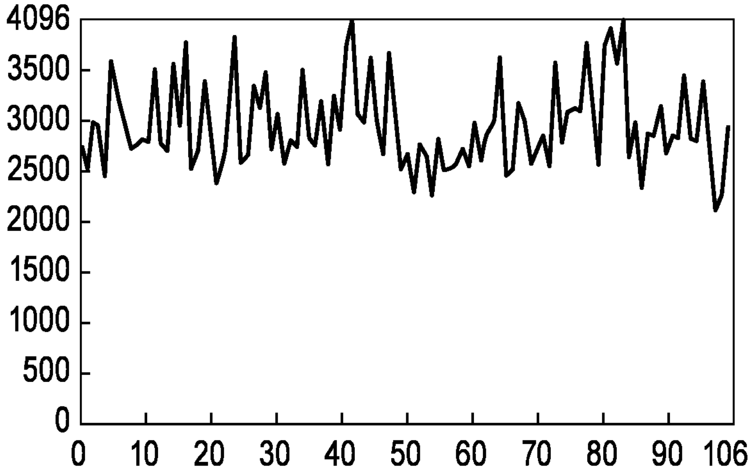
FIG. 63 is an explanatory diagram of experimental results showing the optical noise reduction effect in the present embodiment.
Figure 64:
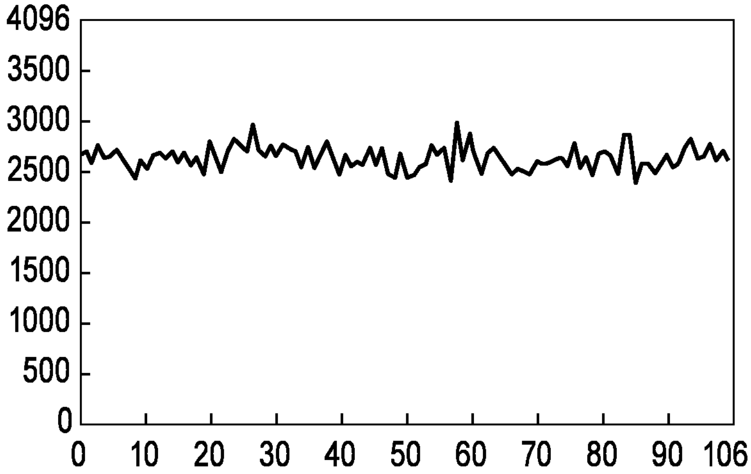
FIG. 64 is an explanatory diagram of experimental results showing the optical noise reduction effect in the present embodiment.

FIGS. 63 and 64 show the results of an actual experiment to confirm the effect. The horizontal axis of each of FIGS. 63 and 64 represents different positions of the surface of the measured object 22. The vertical axis of FIGS. 63 and 64 represents light intensities that appear on a camera's imaging sensor. A diffuser surface with a Ra value (a value of averaged roughness) of 2.8 μm was used as the measured object 22. The experiment used Laser Diode having wavelength of "$\lambda_0$=450 nm" and a wavelength width (spectral bandwidth) of "$\Delta\lambda$=2 nm".

FIG. 63 shows the optical interference noise pattern (speckle noise pattern) when conventional light passing through the core area 332 in the single-core optical fiber or the central part in the optical guide 330/332/340 was irradiated onto the measured object 22 having the diffuser surface. In FIG. 63, the light intensity fluctuates greatly, and a large optical interference noise (speckle noise) appears.

FIG. 64 shows the optical interference noise pattern in a case where the optical system of FIG. 58 is employed. Quartz glass is used as the material for the optical path length varying component 360 (the optical characteristic converting component 210) shown in FIG. 14, which has 48 divided areas each having a thickness different by 1 mm. A diffuser with a Ra value of 0.5 μm is used for the optical phase profile transforming component 1050. The length of the optical bundle fiber 1040 is 1.5 m, and 320 fibers with a single core diameter of 230 μm (numerical aperture (NA) 0.22) are bundled within a range of diameter 5 mm. The focal lengths of both the converging lens 314 and the collimator lens 318 are set at 50 mm.

Compared to the FIG. 63, FIG. 64 shows a significantly reduced optical interference noise (speckle noise).

[Chapter 13: Optical Measurement System Adaptable to Various Measured Object and to Various Measured Ranges]

Figure 65:
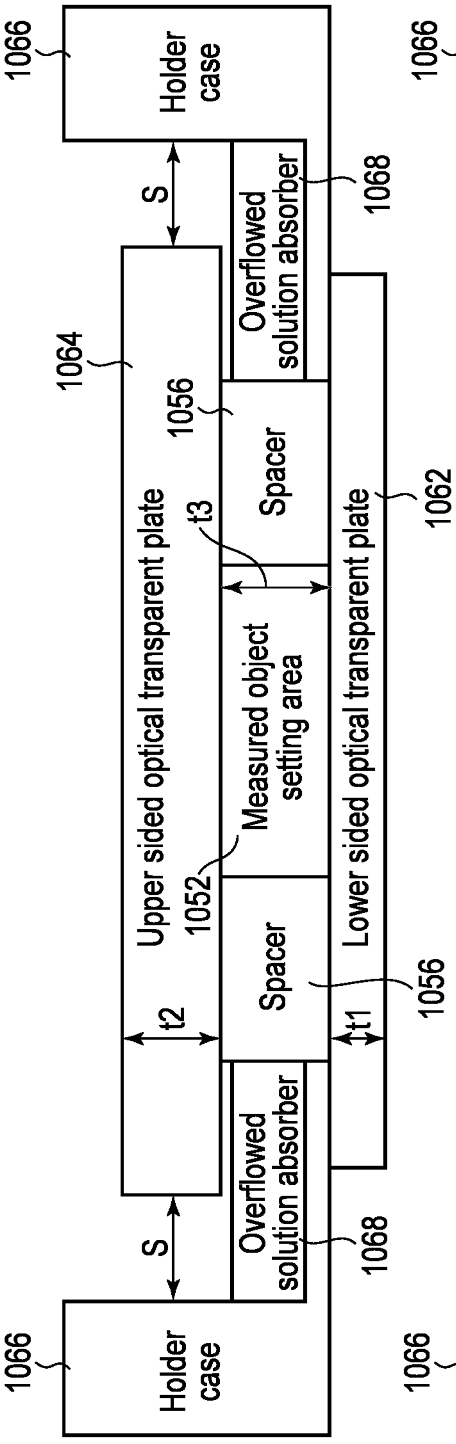
FIG. 65 is an explanatory diagram of a holding container structure of a measured object.

FIG. 65 shows an example of a holding container structure for the measured object 22 in the present embodiment. The example of the present embodiment provides a holding container that can reproducibly measure not only solids but also liquids and gases as the form of the measured object 22 under the same conditions. In a case where the measured object 22 is a liquid or gas, measurement data varies significantly according to changes in a thickness t3 of a measured object setting area 1052 in which the measured object 22 is set. As a countermeasure, the example of the present embodiment has a structure that allows the thickness t3 of the measured object setting area 1052 to be fixed at a constant level. Specifically, the structure is such that the measured object setting area 1052 is sandwiched between an upper sided optical transparent plate 1064 and a lower sided optical transparent plate 1062 via a spacer 1056 whose thickness t3 is strictly controlled. By adopting this simplified structure, not only can the user be provided with a holding container at a very low cost, but it also has the effect of accurately reproducing the thickness t3 of the measured object setting area 1052.

Also, as mentioned above, since the holding container structure of FIG. 65 can be manufactured at a very low cost, it is easily "disposable" for each measurement by the user. The light application device shown in FIGS. 1 and 2 is required very high-precision measurements. Therefore, in a case where the same holding container is used for different measurements, there is a risk that fragments of the previously measured object 22 will remain in the holding container, and the measurement data detected from these fragments will degrade the accuracy of the current measurement. If the holding container can be "disposable" for each measurement, not only will measurement accuracy be improved, but user convenience will also be greatly enhanced.

Figure 66:
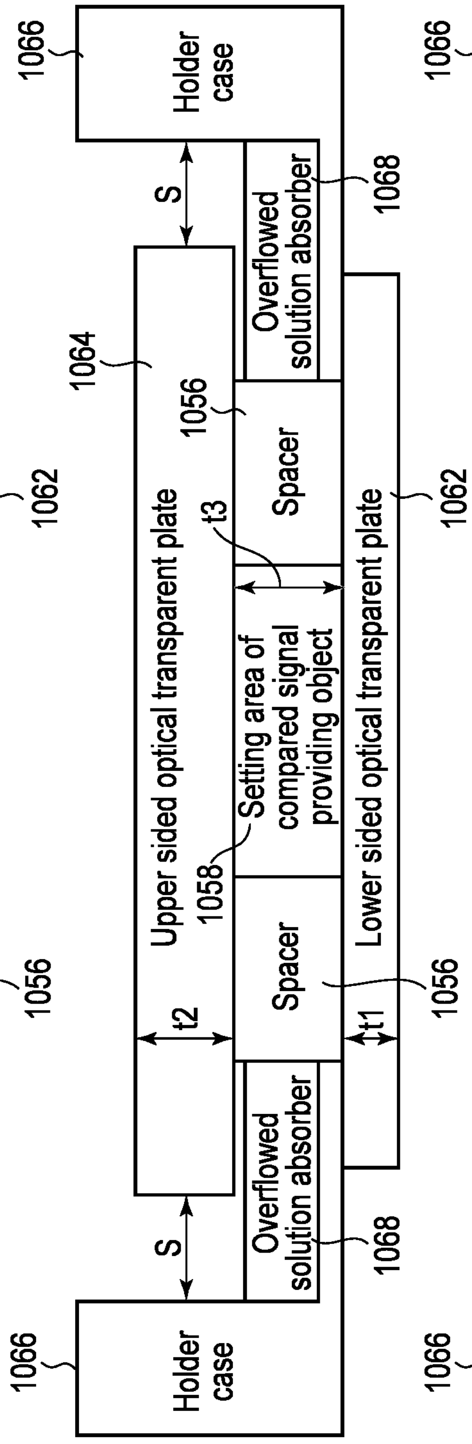
FIG. 66 is an explanatory diagram of a holding container structure of a measured object.

An example of the material of the upper sided optical transparent plate 1064 and the lower sided optical transparent plate 1062 used in FIG. 65 or 66 is an inorganic material. If the upper sided optical transparent plate 1064 and the lower sided optical transparent plate 1062 are made of an organic material, the methyl and methylene groups in the organic material absorb light at wavelengths around 1.7 μm significantly. Therefore, in the case of measuring the spectral profile of the measured object 22 up to the wavelength range around 1.7 μm, it is not preferable to use an organic material. In addition, commonly used soda lime glass and optical glass often contain a large amount of hydroxyl groups during manufacturing. Therefore, an inorganic material (for example, silicate glass, anhydrous glass, and anhydrous quartz) that contains a small amount of hydroxyl groups may be desirable as a material for the upper sided optical transparent plate 1064 and the lower sided optical transparent plate 1062.

An area adjacent to the measured object setting area 1052 for both the upper sided optical transparent plate 1064 and the lower sided optical transparent plate 1062 corresponds to the light propagation path 6 through which light for detection passes. Therefore, to prevent the user from accidentally touching this area, it is integrated (bonded) with a holder case 1066 at the outer circumference of the lower sided optical transparent plate 1062. The user moves the holding container by holding the outer circumference of the holder case 1066. In this manner, the holder case 1066 that can be directly toughed by the user is formed on the outer side of the light propagation path 6 through which light passes to improve user convenience.

Figure 67:
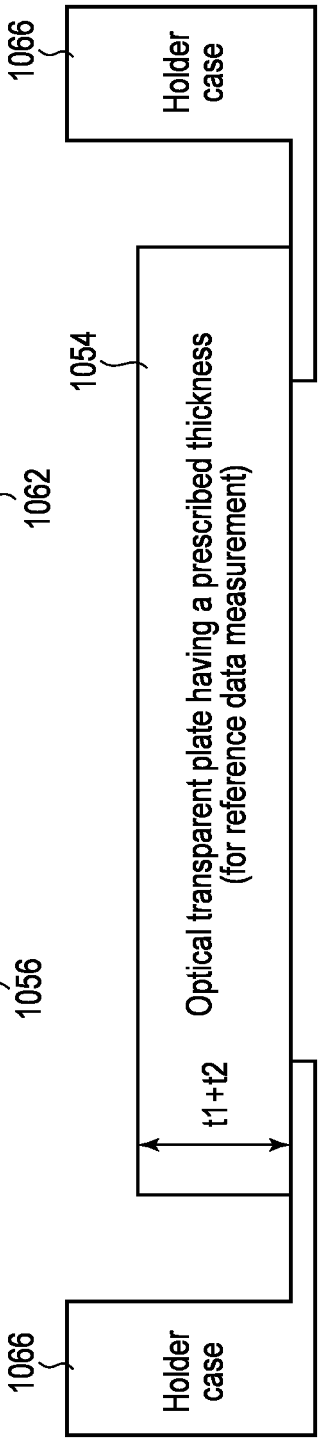
FIG. 67 is an explanatory diagram of a holding container structure of a measured object.

As shown in FIGS. 65, 66, and 67, the inner diameter (of the inner hole) of the holder case 1066 is slightly wider than the outer diameter of the spacer 1056. Therefore, the thickness of the measured object setting area 1052 can be precisely defined only by the thickness of the spacer 1056, without being affected by the thickness of the holder case 1066.

Furthermore, a gap is provided between the inside of a side wall of the holder case 1066 and the outside of the upper sided optical transparent plate 1064 so that a jig such as tweezers can be inserted into this gap. The upper sided optical transparent plate 1064 can then be moved up and down against the holder case 1066 while supporting the outer circumference of the upper sided optical transparent plate 1064 with the jig such as tweezers inserted into this gap. This structure improves user convenience to the holding container. Here, if a difference value "2S" between the inner diameter of the side wall of the holder case 1066 and the outer diameter of the upper sided optical transparent plate 1064 is set to 1 mm or more and 2 m or less (preferably 4 mm or more and 4 cm or less), user convenience can be ensured.

For example, in a case where the measured object 22 is liquid, this measured object setting area 1052 is filled with liquid. When this measured object setting area 1052 is sandwiched between the upper sided optical transparent plate 1064 and the lower sided optical transparent plate 1062 via the spacer 1056, there is a risk that part of the above liquid will overflow and leak into the light propagation path 6. To prevent this risk, the structure is designed so that an overflowed solution absorber 1068 made of a highly water absorbent material can be placed. Therefore, when the measured object setting area 1052 is sandwiched between the upper sided optical transparent plate 1064 and the lower sided optical transparent plate 1062 via the spacer 1056, the overflowed solution absorber 1068 absorbs the overflowing liquid. The water-absorbing action of the overflowed solution absorber 1068 prevents contamination of a portion inside the light propagation path 6 that is caused by overflowing liquid flowing over the upper sided optical transparent plate 1064. As a result, stable and highly accurate measurement is possible.

Here, if the inner diameter of the overflowed solution absorber 1068 is larger than the outer diameter of the spacer 1056, and the outer diameter of the overflowed solution absorber 1068 is smaller than the inner diameter of the side wall of the holder case 1066, the overflowed solution absorber 1068 can be properly positioned on the inner top surface of the holder case 1066. Furthermore, if fluff or dust comes out of the overflowed solution absorber 1068, this fluff or dust may be measured incorrectly and deteriorate the accuracy of measurement. Therefore, a material that is resistant to fluff and dust (for example, non-woven fabric, filter paper, or special paper used in clean rooms) may be desirable as the material of the overflowed solution absorber 1068.

FIG. 65 shows an example of the holding container structure utilized to take spectral data in the absence of the measured object 22. For example, in the case of measuring the spectral profile of the measured object 22, the ratio (difference on a log scale) between the spectral profile with and without the measured object 22 is often taken. For this reason, spectral data without the measured object 22 is first obtained utilizing the holding container shown in FIG. 67. Then, spectral data from the measured object 22 is acquired in the holding container shown in FIG. 65.

The structure in FIG. 67 has an optical transparent plate 1054 having a prescribed thickness located in the holder case 1066. As described above, an inorganic material containing a low amount of hydroxyl groups may be desirable as the material for the upper sided optical transparent plate 1064 and the lower sided optical transparent plate 1062. However, even a certain type of anhydrous quartz contains some hydroxyl groups; therefore, light absorption occurs to some extent for light passing through the upper sided optical transparent plate 1064 and the lower sided optical transparent plate 1062 in a wavelength range of around 1.4 μm, for example. Therefore, in the example of the present embodiment, it may be desirable to use the same material for the upper sided optical transparent plate 1064 and the lower sided optical transparent plate 1062, as well as the same material for the optical transparent plate 1054 having a prescribed thickness described in FIG. 67. Furthermore, in order to match the amount of light absorbed at wavelengths around, for example, 1.4 μm, which is caused by the effect of thickness, the thickness of the optical transparent plate 1054 having a prescribed thickness is desired to be "t1+t2", which is a value obtained by adding a thickness "t1" of the lower sided optical transparent plate 1062 and a thickness "t2" of the upper sided optical transparent plate 1064. Here, if the dimensional error between the added value "t1+t2" of the thickness "t1" of the lower sided optical transparent plate 1062 and the thickness "t2" of the upper sided optical transparent plate 1064 and the thickness of the optical transparent plate 1054 having a prescribed thickness is 1 mm or less, or 0.2 mm or less (preferably 0.1 mm or less), high measurement accuracy can be ensured.

As described below, in some cases, the measured object 22 may be configured by of a plurality of different materials (different compositions), and the spectral profile of only a prescribed material (prescribed composition) among them may be required to be measured. In this case, spectral data obtained from materials (compositions) outside the measured object inhibit the measurement accuracy (the phenomenon represented by the symbol "αa1" shown in FIGS. 47 and 48). In the example of the present embodiment, in order to ensure high measurement accuracy, information extraction 1004 is performed for the characteristics of the inhibiting factor (symbol "αa1") in advance, and the first extracted information thereof is utilized to reduce the disturbance noise and perform the second information extraction 1000 relating to the spectral profile of only the specific material (specific composition) to be measured.

FIG. 65 shows an example of the holding container structure used to perform the information extraction 1004 for the characteristics of the inhibiting factor (symbol "αa1") in advance. Basically, the structure is the same as that in FIG. 66, and only the measured object setting area 1052 is replaced by a setting area of compared signal providing object 1058. Many living organisms contain large amounts of water. Alternatively, in the case of obtaining characteristic information of specific cells being cultured in a culture medium, the extracted information 1004 from the medium itself is mixed in as disturbance noise. Therefore, the holding container structure for extracting the spectral profile information of pure water or the medium itself as the information 1004 to be extracted in advance corresponds to the structure of FIG. 66. In other words, in this case, the pure water and culture medium are filled as the setting area of compared signal providing object 1058 within the location of the measured object setting area 1052 in FIGS. 65, 66, and 67. Here, in FIG. 66, in the same manner as in FIG. 65, the lower sided optical transparent plate 1062, the setting area of compared signal providing object 1058, and the upper sided optical transparent plate 1064 correspond to a part of the light propagation path 6.

Figure 68:
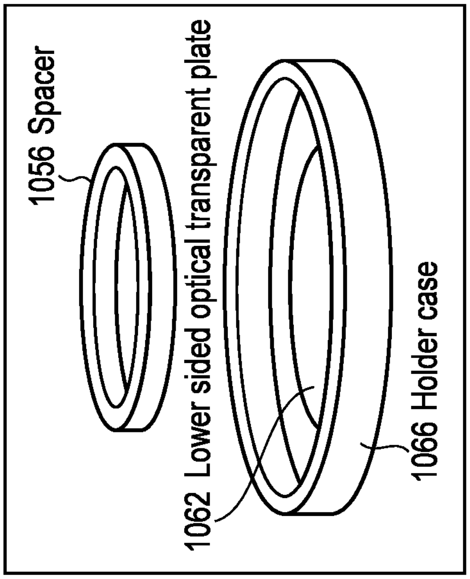
FIG. 68 is an explanatory diagram showing an example of a method of installing the measured object in a holding container.

FIGS. 68 to 72 show a procedure example of holding the measured object 22 in the holding container described above. As shown in FIG. 68, the holder case 1066 and the lower sided optical transparent plate 1062 are integrated (bonded) in advance. The user then places the spacer 1056 on top of the lower sided optical transparent plate 1062.

Figure 69:
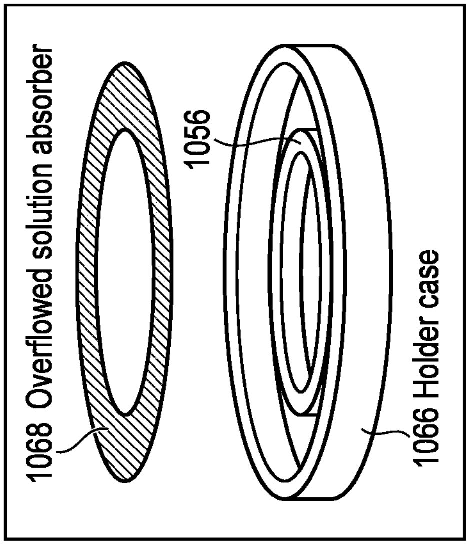
FIG. 69 is an explanatory diagram showing another example of a method of installing the measured object in a holding container.
Figure 70:
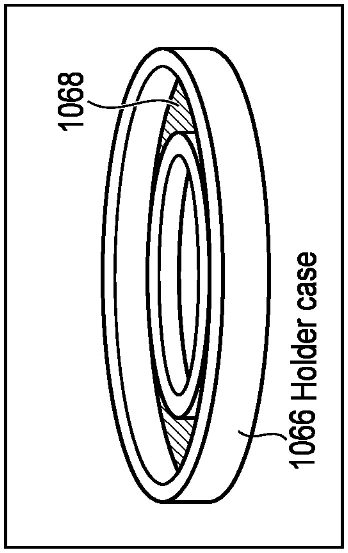
FIG. 70 is an explanatory diagram showing a still another example of a method of installing the measured object in a holding container.

Next, as shown in FIG. 69, the user puts the overflowed solution absorber 1068 on the outer side of the spacer 1056 (the inner side of the holder case 1066). FIG. 70 shows a state in which the spacer 1056 is placed on top of the lower sided optical transparent plate 1062 and the overflowed solution absorber 1068 is located on top of the inner top surface of the holder case 1066.

Figure 71:
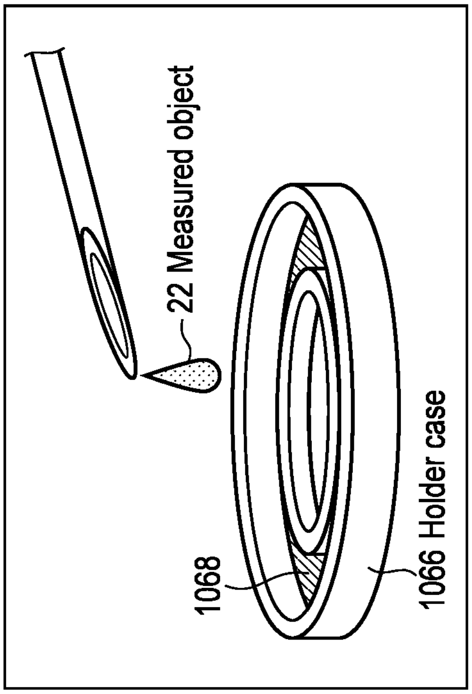
FIG. 71 is an explanatory diagram showing a further example of a method of installing the measured object in a holding container.

In a case where the measured object 22 is solid, the measured object 22 is picked up with tweezers or the like and installed inside the spacer 1056. FIG. 71 shows an example of the installation method when the measured object 22 is in a liquid state. In this case, an appropriate amount of the measured object 22 is injected inside the spacer 1056 with a pipette or syringe needle.

Figure 72:
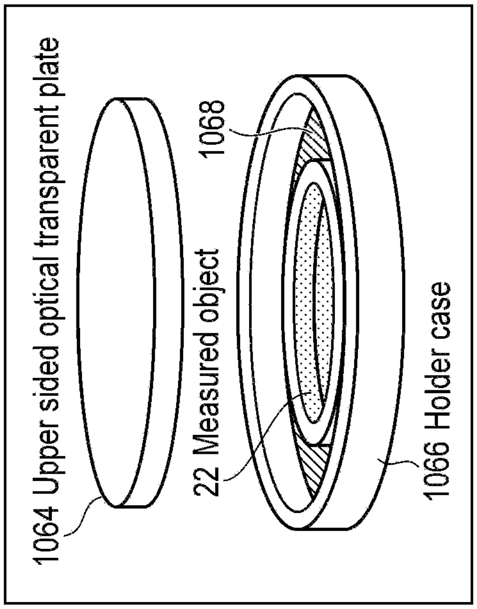
FIG. 72 is an explanatory diagram showing a still further example of a method of installing the measured object in a holding container.

As shown in FIG. 72, the upper sided optical transparent plate 1064 is gently placed from the top. At this time, the overflowed solution absorber 1068 absorbs excess liquid overflowing from the gap between the spacer 1056 and the upper sided optical transparent plate 1064. The effect of the excess liquid absorbed by the overflowed solution absorber 1068 prevents deterioration in measurement accuracy caused by excess liquid mixing into the light propagation path 6.

Figure 73:
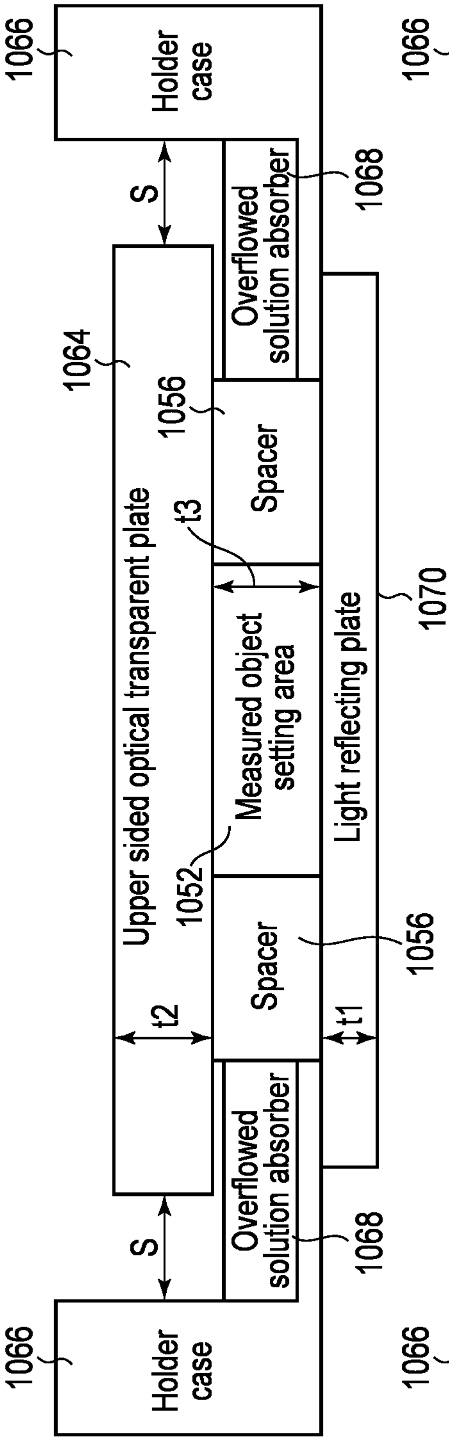
FIG. 73 is an explanatory diagram of another implementation example of the holding container structure of the measured object.
Figure 74:
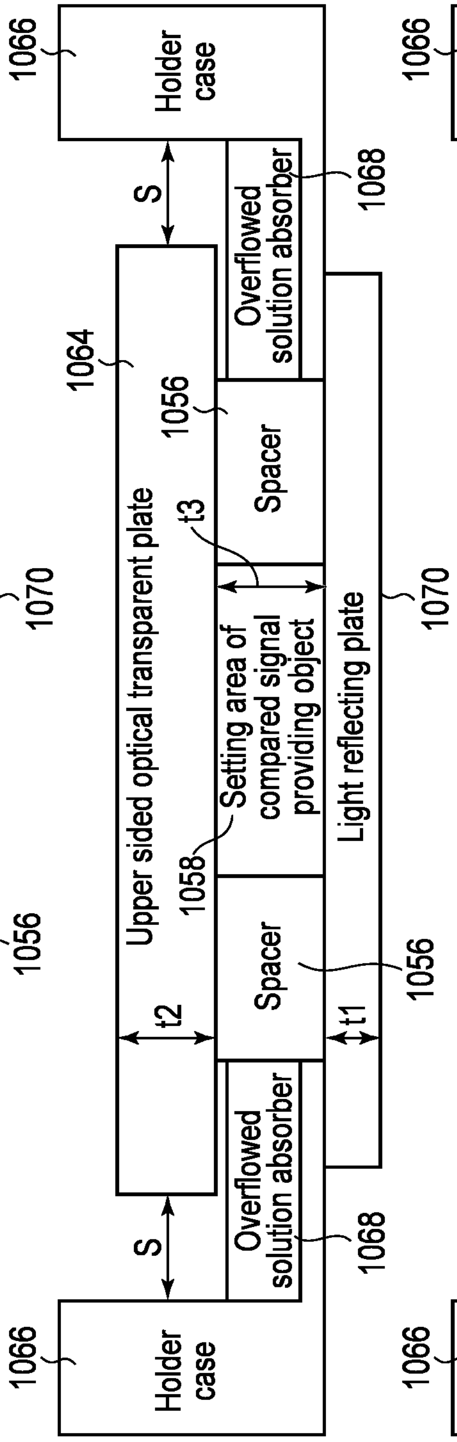
FIG. 74 is an explanatory diagram of still another implementation example of the holding container structure of the measured object.
Figure 75:
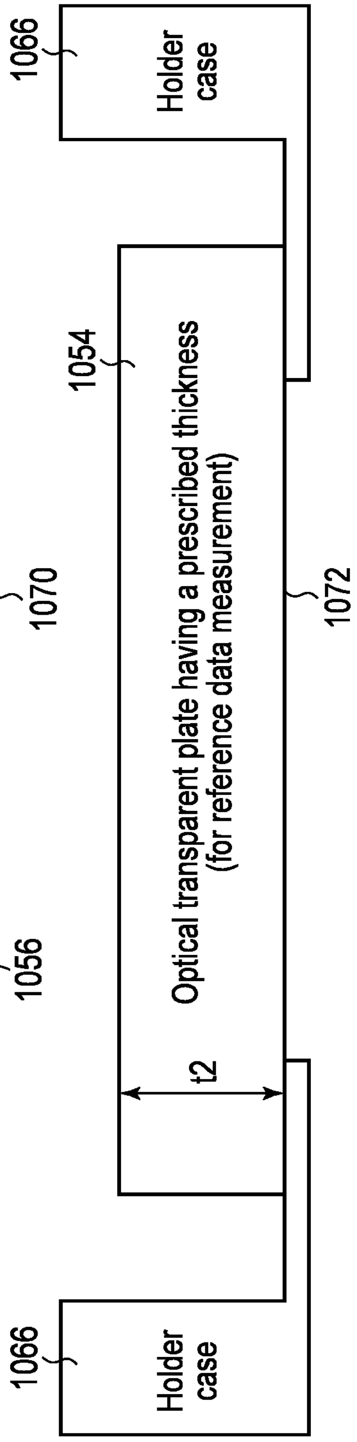
FIG. 75 is an explanatory diagram of a further implementation example of the holding container structure of the measured object.

In the case of performing measurement using transmitted light to the measured object 22, it may be desirable to use the holding container structure example in FIGS. 65 to 67. In contrast, FIGS. 73 to 75 show examples of a holding container structure in the case of performing measurement using reflected light from the measured object 22. In FIGS. 73 and 74, instead of using the lower sided optical transparent plate 1062 used in the FIGS. 65 and 66, a light reflecting plate 1070 coated with a light reflecting film on the top surface (upper side on one side) is used. Other elements in FIGS. 73 and 74 match corresponding elements in FIGS. 65 and 66.

In FIG. 67, the upper and lower surfaces of the optical transparent plate 1054 having a prescribed thickness have light transmission characteristics, and the light utilized for measurement passes through the upper and lower surfaces of the optical transparent plate 1054 having a prescribed thickness. In contrast, in FIG. 75, the lower surface of the optical transparent plate 1054 having a prescribed thickness is a light reflecting surface 1072. The thickness of the optical transparent plate 1054 having a prescribed thickness in FIG. 75 matches the thickness t2 of the upper sided optical transparent plate 1064.

When the disturbance noise reduction method 1038 was explained in Chapter 10 using FIG. 49, it was explained that the optical disturbance noise mechanism 1036 slightly differs depending on the measured range 1032. In connection with the explanation, an example of a measurement optical system used to comprehensively measure the characteristics of the entire measured object 22 and an example of a measurement optical system suitable for measuring the characteristics of only a local area within the measured object 22 will be explained.

Figure 76:
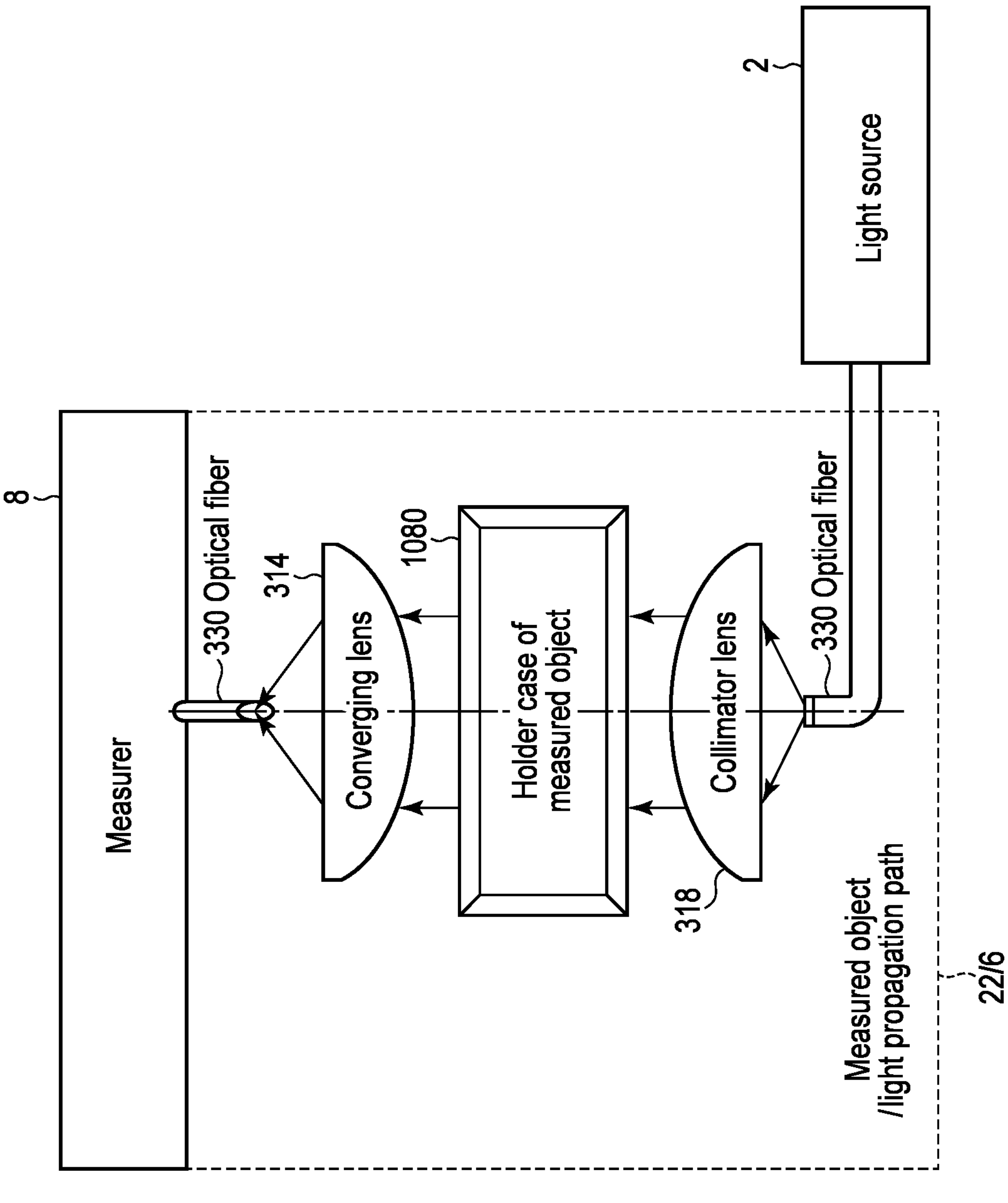
FIG. 76 is an explanatory diagram of a measurement optical system when measuring the total characteristics of the measured object.

FIG. 76 shows an example of the measurement optical system suitable for comprehensive measurement of the characteristics of the entire measured object 22. In the case of measuring the characteristics of the entire measured object 22, it may be desirable to collect and measure an entire detection light obtained from the entire measured object 22. As a specific example, in FIG. 76, an irradiated light emitted from the light source 2 is uniformly irradiated to the entire measured object 22, and the detection light 1100 obtained from the entire measured object 22 is collected and sent to the measurer 8. In the embodiment example shown in FIG. 76 as a method of collecting the detection light 1100, the light obtained from the entire measured object 22 is converged on the entrance surface of the optical fiber 330 by the converging lens 314.

As a method for uniformly irradiating the entire measured object 22 with the irradiated light emitted from the light source 2, the Koehler illumination system is used in FIG. 76. For example, the irradiated light 1190 generated in the light source 2 having the optical system structure as shown in FIGS. 24 and 25 is guided by the optical fiber 330 into the light propagation path 6 including the measured object 22. The divergent light (irradiated light 1190) emitted from the optical fiber 330 is converted into parallel light by the collimator lens 318. By setting the size (luminous flux diameter) of the luminous flux (irradiated light 1190) in the parallel state larger than the size of the entire measured object 22, a relatively uniform amount of light can be irradiated onto the measured object 22. Thus, the Koehler illumination is suitable for characteristic measurement of the entire measured object 22.

As a method of setting the measured object 22 in the light propagation path 6, a holder case of measured object 1080 shown in FIG. 65, 66, or 67 or FIG. 68, 69, 70, 71, or 72 can be used to improve user convenience. In the case of measuring the optical characteristics of the measured object 22 with high accuracy, if a user's fingerprint or dirt adheres to the surface of the measured object 22, the measurement accuracy will deteriorate. As shown in FIG. 29A or FIG. 68, 69, 70, 71, or 72, since the measured object 22 itself is stored inside the holder case of measured object 1080, the user would not directly touch the measured object 22 before and after measurement. Furthermore, the outer circumference of the holder case 1066, which the user directly touches, is outside of the light propagation path 6. Therefore, it is possible to avoid the risk of deterioration in measurement accuracy due to the handling of the holder case of measured object 1080.

As an application example of FIG. 76, a component (for example, diffuser) for transforming the phase profile of the irradiated light 1190 may be placed in the path of the parallel luminous flux (irradiated light 1190) just before it passes through the holder case of measured object 1080 to reduce the degree of temporal coherence of the irradiated light 1190 itself. Based on this, a reduction measure (corresponding to the symbol "L2" in FIG. 49) can be taken against the optical interference noise generated by light interference (corresponding to the symbol "αc2" in FIGS. 47 and 48) in the middle of the light propagation path 6.

Furthermore, as another application of FIG. 76, an aperture size controller (for example, aperture) may be placed in the path of the parallel luminous flux (irradiated light 1190) before it passes through the holder case 1080 of the measured object. By limiting the aperture so that the irradiated light 1190 passes only through the measured object setting area 1052 in the holder case 1080 of the measured object in this manner, stray light mixture (represented by the symbol "αc1" in FIGS. 47 and 48) that occurs during measurement can be prevented.

Next, an example of the measurement optical system suitable for measuring the characteristics of only a local area within the measured object 22 will be described. In many cases of measuring characteristics of only a local area within the measured object 22, an image pattern for the measured object 22 is formed on the surface of the imaging sensor 300 using the image forming/confocal lens 312.

Figure 77:
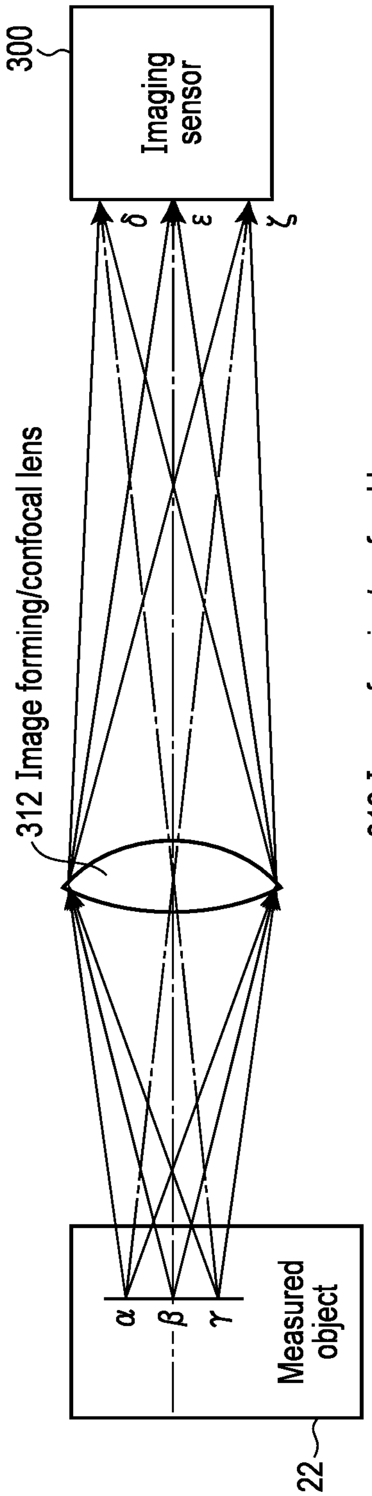
FIG. 77 is an explanatory diagram of a problem that occurs when measuring a local area within the measured object.

FIG. 77 shows an example of an image forming optical system. The detection light emitted from a point β, in the measured object 22 is converged at a point ε on the surface of the imaging sensor 300 by the action of the image forming/confocal lens 312 placed in the middle of the optical path. Similarly, the detection light emitted from points α and γ in the measured object 22 forms images on the points ζ and δ on the surface of the imaging sensor 300. Therefore, by measuring the optical characteristics at each of the points δ, ε, and ζ on the surface of the imaging sensor 300, it is possible to measure the characteristics of each local area γ, β, and α within the measured object 22. Thus, by using the image forming optical system shown in FIG. 77, it is possible to easily measure the optical characteristics of the two-dimensionally arranged local areas α, β, and γ in the measured object 22.

However, in the case of measuring the optical characteristics of each local area in a three-dimensional structure of the measured object 22, or in a case where light scanners exist in the middle of an optical path of the detection light 1100 from the local area to the measurer 8 (for example, imaging sensor 300), in the image forming optical system in FIG. 77, the measurement accuracy is significantly degraded due to the stray light mixture corresponding to the symbol "αc1" in FIGS. 47 and 48. Here, as an example in which the light scanners exist in the optical path of the detection light 110, there is a case of measuring nerve cell activity in the brain by an optical method. The brain of reptiles and higher animals is covered by a skull. The inside of the skull has a relatively complex structure and thus acts as a light scattering object.

Figure 78:
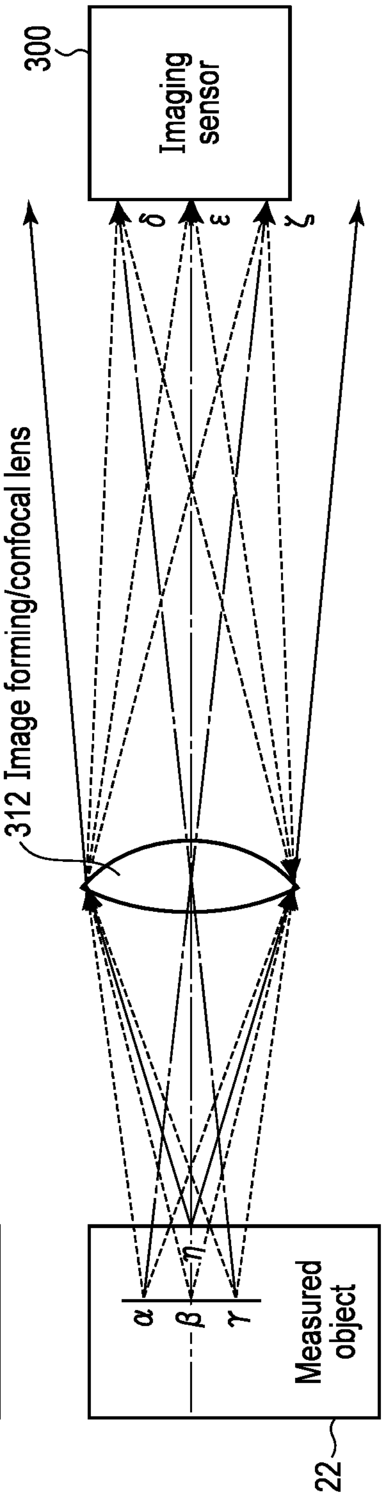
FIG. 78 is an explanatory diagram of a problem that occurs when measuring a local area within the measured object.

The cause of the degradation of measurement accuracy due to light mixture (represented by the symbol "αc1" in FIGS. 47 and 48) is explained below. FIG. 78 shows the optical path of the detection light 1100 emitted from a point η closer to the image forming/confocal lens 312 than the points α, β, and γ arranged on a plane in the aforementioned measured object 22 after passing through the image forming/ confocal lens 312. Since the detection light 1100 emitted from the point η diffuses on the surface of the imaging sensor 300, the influence of the point η is relatively small at the points δ, ε, and ζ on the imaging sensor surface.

Figure 79:
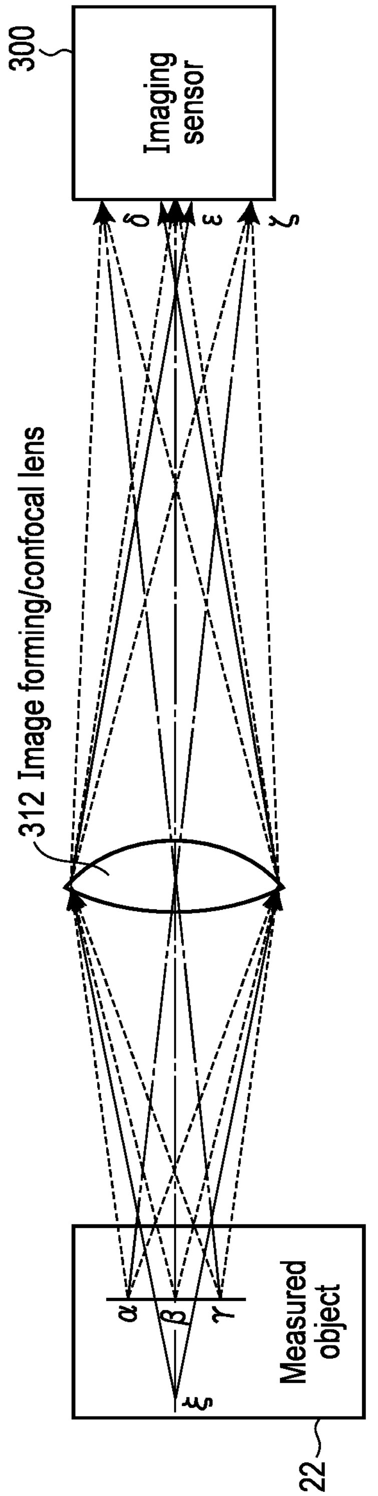
FIG. 79 is an explanatory diagram of a problem that occurs when measuring a local area within the measured object.

FIG. 79 shows the optical path of the detection light 1100 emitted from a point ξ, which is farther from the image forming/confocal lens 312 than the points α, β, and γ arranged on a plane in the aforementioned measured object 22, after passing through the image forming/confocal lens 312. Since the detection light 1100 emitted from the point is converged just before the imaging sensor 300, it irradiates the vicinity of the point ε. Therefore, the detection light 1100 emitted from point ξ is mixed in as stray light corresponding to the symbol "αc1" in FIGS. 47 and 48, degrading the measurement accuracy with respect to the point β of the measured object. For similar reasons, also in a case where light scanners exist in the optical path of the detection light 1100, a large amount of stray light mixture (corresponding to the symbol "αc1" in FIGS. 47 and 48) occurs with respect to the optical characteristic measurement of the local measurement target point β in the measured object 22.

Figure 80:
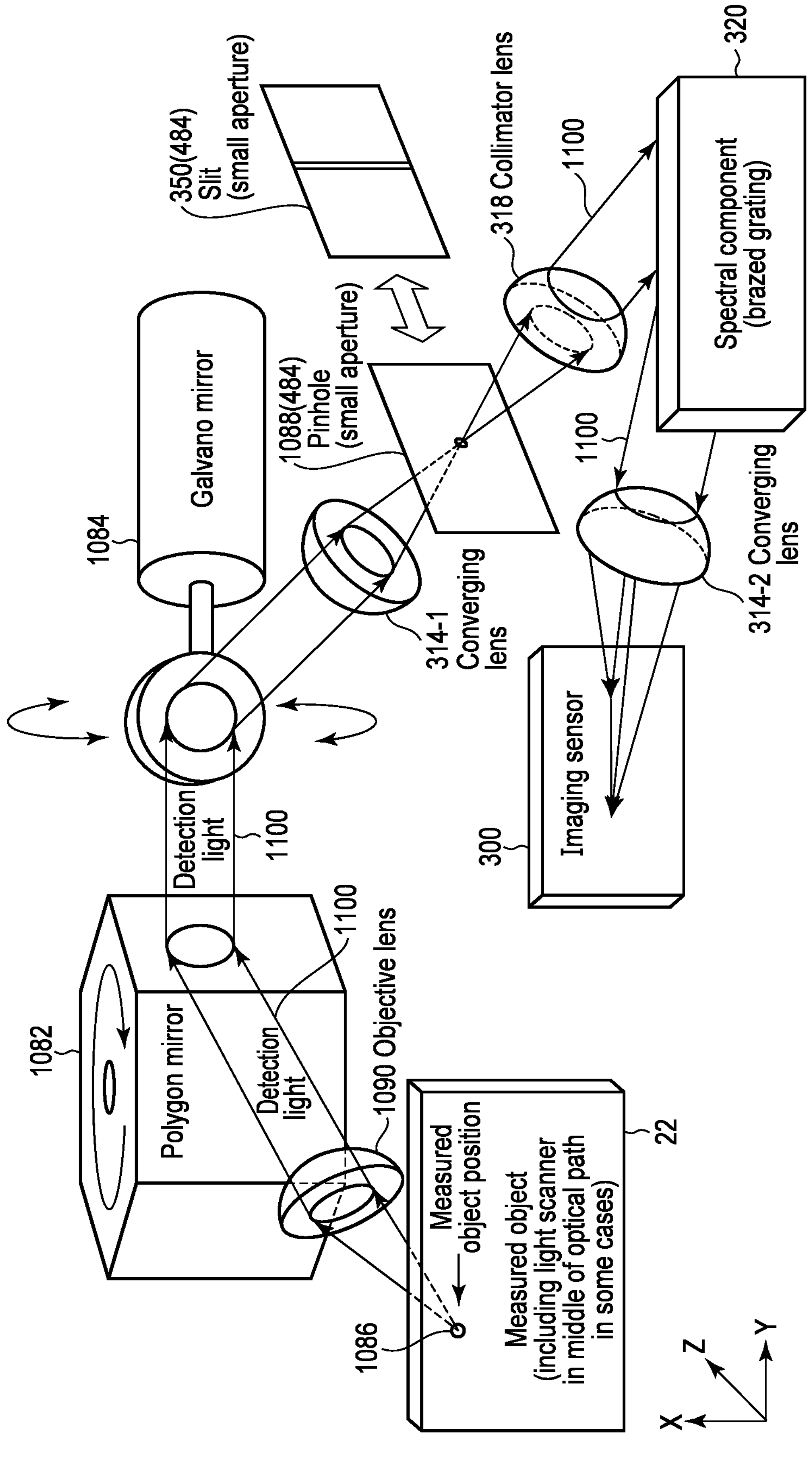
FIG. 80 is an explanatory diagram of a measurement optical system for measuring a local area within the measured object in the present embodiment.

FIG. 80 shows an example of the measurement optical system suitable for high-precision measurement in a local area that includes three dimensions within the measured object 22 as well. In the measurer 8, an imaging (confocal) optical system is formed for a measured object position 1086 in a local three-dimensional direction within the measured object 22. The pinhole (small aperture) 1088(484) is then provided at the imaging or confocal position corresponding to the measured object position 1086. Stray light mixture (corresponding to the symbol "αc1" in FIGS. 47 and 48) from different depth positions η and ξ is then eliminated. A pinhole (small aperture) 1088(484) or a slit 350(484) may be used as an example of the form of this aperture size controller 484.

In the embodiment example of FIG. 80, the detection light 1100 in a divergent light state that has passed through the pinhole (small aperture) 1088(484) or the slit 350(484) is once converted to parallel light by the collimator lens 318 and then enters the spectral component (for example, blazed grating) 320. The detection light 1100, which is divided by each measurement wavelength in the spectral component, is converged on the imaging sensor 300 by a converging lens 314-2.

When using the pinhole (small aperture) 1088(484) as the aperture size controller 484, the imaging sensor 300 is configured by a line sensor arranged in one dimension. The spectrally separated intensity of the detection light 1100 is measured for each cell on the line sensor. The spectral signal obtained from this line sensor (imaging sensor 300) is measured by the signal receptor 40 and transferred to signal processor 42.

On the other hand, in the case where the slit (small aperture) 350(484) is used as the aperture size controller 484, the detection light 1100 emitted from multiple local measured object positions 1086 (for example, the positions of the point α to point γ in FIGS. 77, 78, and 79) arranged in a row on the same plane in the measured object 22 simultaneously passes through the slit 350. In the illustration of FIG. 80, in this case, the multiple local measured object positions 1086 arranged in a row on the same plane in the measured object 22 are projected in a vertical direction in the imaging sensor 300, and the spectral profile of each local measured object position 1086 (for example, spectral profile of each of the points α, β and γ in FIGS. 77, 78, and 79) is measured in a horizontal direction in the imaging sensor 300.

The detection light 1100 in the divergent light state from the measured object position 1086 in the measured object 22 becomes a parallel light state by an objective lens 1090. The detection light 1100 in this parallel light state is reflected by a polygon mirror 1082 and a galvano mirror 1084, respectively, and then formed into an image by a converging lens 314-1.

In the embodiment example of FIG. 80, the measured object position 1086 coincides with a front focal position of the objective lens 1090. Therefore, when the distance between the objective lens 1090 and the measured object 22 is changed, the measured object position 1086 in the Z direction changes. Also, the measured object position 1086 in the Y direction changes depending on the tilt angle of the light reflecting surface of the galvano mirror 1084. Furthermore, rotation of the polygon mirror 1082 changes the measured object position 1086 in the X direction. In this manner, it is possible to measure the spectral profile at any local measured object position 1086 in the three-dimensional direction within the measured object 22.

For example, the case of measuring changes in spectral profile at each local position in the brain in relation to biological activity in the brain for reptiles and higher animals will be taken as an example. The detection light 1100 to be measured by the measurer 8 must be measured after passing through the skull. The inside of the skull has a relatively complex structure and acts as a light scattering object with respect to the detection light 1100. The scattering angle range inside the light scattering object is very wide. Therefore, the detection light 1100 after passing through the light scattering object is mixed with light obtained from multiple different locations and acts as the stray light mixture corresponding to the symbol "αc1" in FIGS. 47 and 48.

As a characteristic of light passing through the light scattering object, part of the light passing through the light scattering object travels straight inside the light scattering object. Therefore, if only the detection light 1100 that travels straight through the light scattering object can be collected and measured, measurement through the light scattering object becomes possible. By using a detection optical system such as FIG. 80, which measures the optical characteristics of the local measured object position 1086 in the measured object 22 by setting the aperture size controller 484 at the imaging (confocal) position, the stray light mixture (corresponding to the symbol "αc1" in FIGS. 47 and 48) from other positions in the measured object 22 can be reduced.

The most significant cause of the decrease in the amount of light traveling straight through the light scattering object is the "canceling phenomenon of the amount of straight traveling light due to the phase shift between the straight traveling lights". Here, the longer the wavelength of the detection light 1100, the smaller the effect of the canceling phenomenon on the same amount of phase shift, and the more accurate the measurement through the light scattering object becomes. Therefore, near-infrared light with a wavelength of 750 nm or more reduces the amount of light traveling straight through the light scattering object less than visible light with a wavelength of 700 nm or less. On the other hand, there is a large amount of spinal fluid just below the skull. The water component in the spinal fluid absorbs infrared light with a wavelength of 2 μm or more to a large extent. Therefore, in the case of measuring changes in spectral profile at each local position in the brain through the skull, the measurement accuracy improves by using near-infrared light in the wavelength range of 750 nm to 2 μm (preferably 850 nm to 1.85 μm).

In the example of the present embodiment, in a case where an animal or the like is the measured object 22, for example, the measurement system shown in FIG. 31 may be used. Alternatively, at least a part of the measured object 22

(the part including the measured object position 1086) may be fixed in some way. On the other hand, in a case where the measured object 22 is in a form of a relatively small solid, or is contained in a liquid or gas, it may be held in the holder case 1080 of the measured object as described in FIGS. 65 to 75 and measured.

[Chapter 14: Optical Disturbance Noise Reduction Method Using Extracted Information]

As already explained using FIG. 49, the optical disturbance noise mechanism 1036 slightly differs depending on the measured range 1032. In consideration of this, in Chapter 13, an example of a measurement optical system suitable for each measured range 1032 has been described. In Chapter 12 and earlier, the optical interference noise mechanism and examples of countermeasures were explained. Chapter 14 describes an example of a method for reducing the effects of optical disturbance noise by methods other than the optical interference noise reduction described above. Specifically, as already described with reference to FIG. 46, the first extracted information is used to reduce the disturbance noise, and the second information extraction 1000 is performed. This enables high-precision measurement. Note that, as the measurement optical system and the method of holding the measured object 22 used in this chapter, the embodiment examples already described in Chapter 13 may be used.

Figure 81:
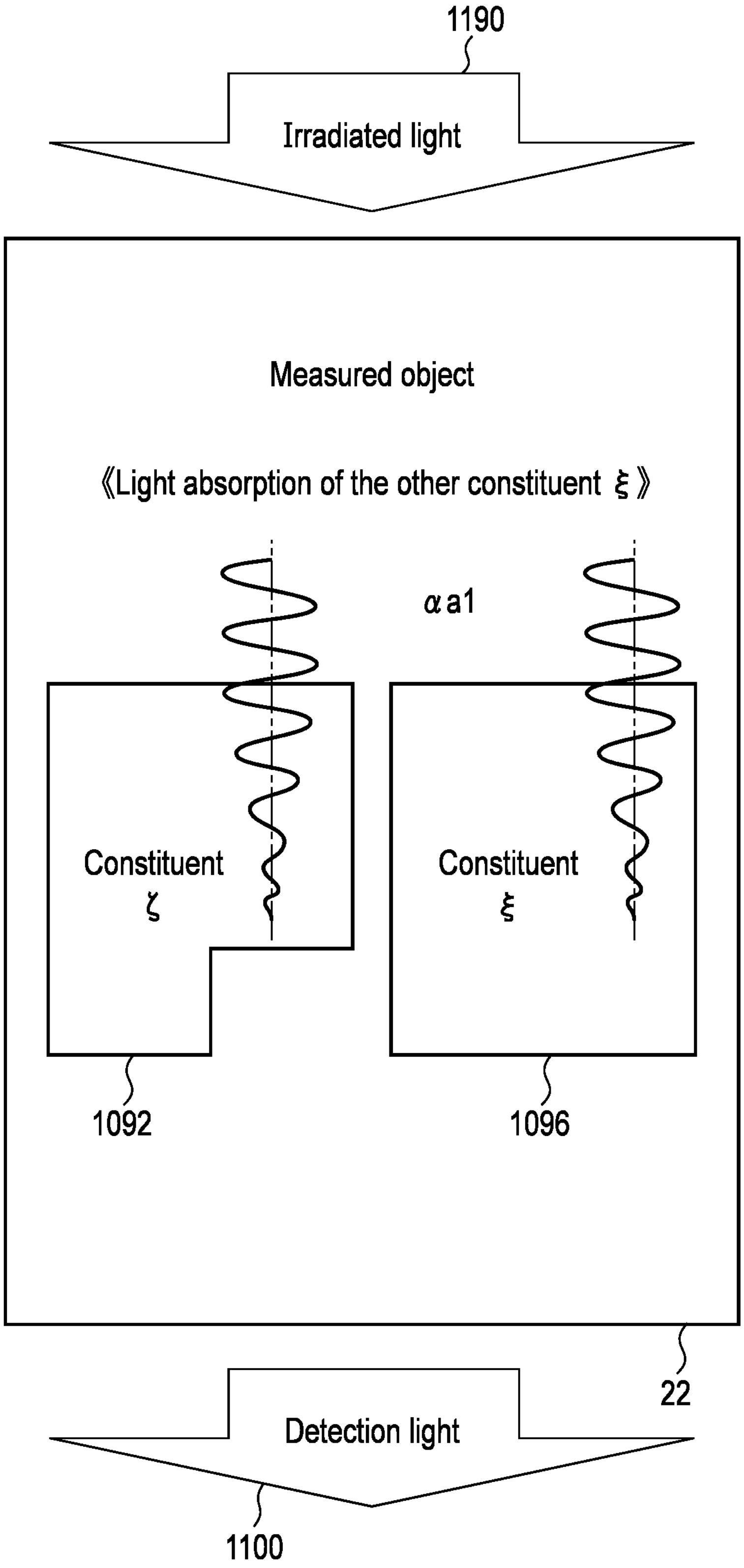
FIG. 81 is an explanatory diagram that diagrammatically illustrates an interaction with light inside the measured object.
Figure 82:
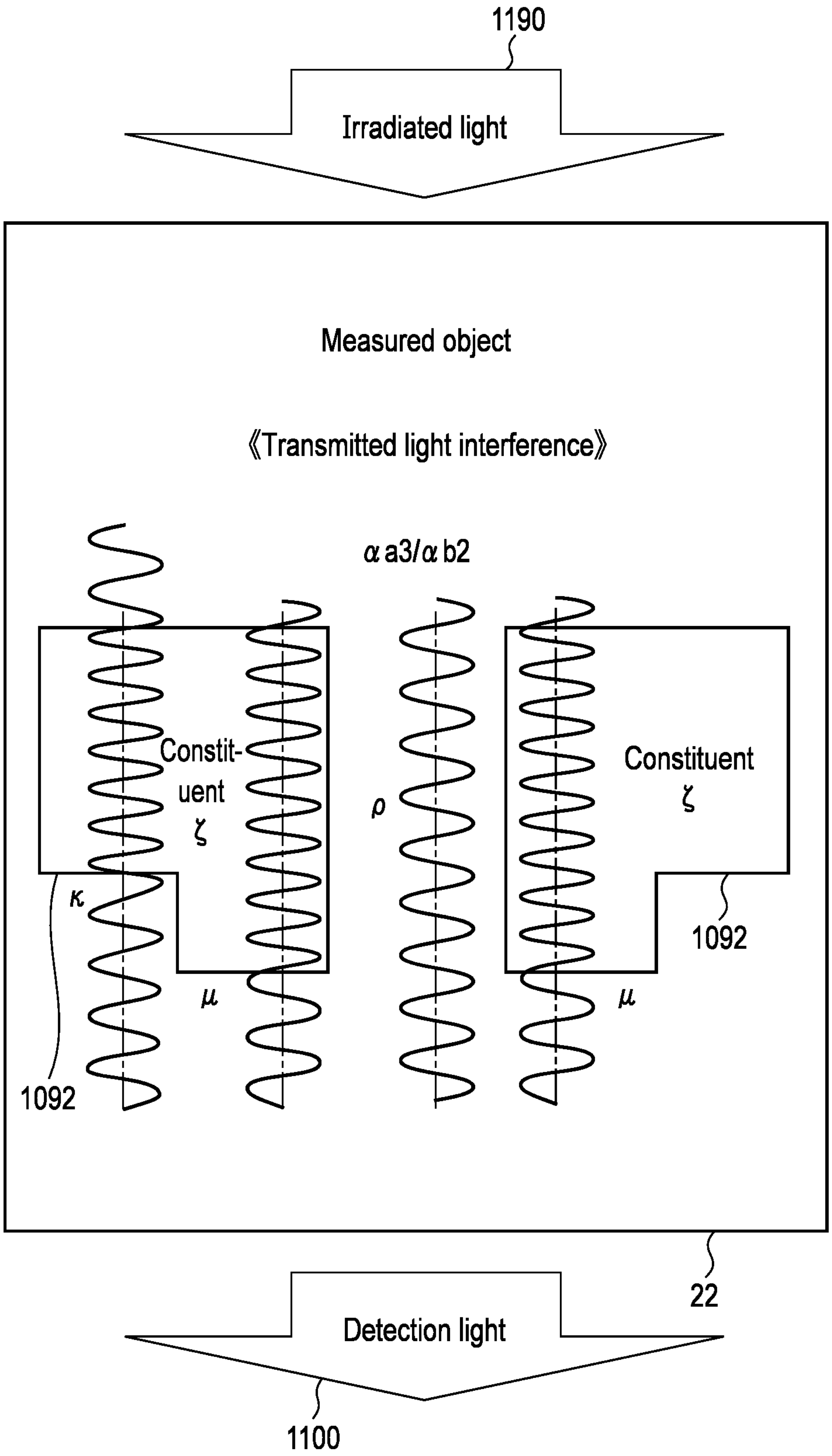
FIG. 82 is an explanatory diagram that diagrammatically illustrates an interaction with light inside the measured object.
Figure 83:
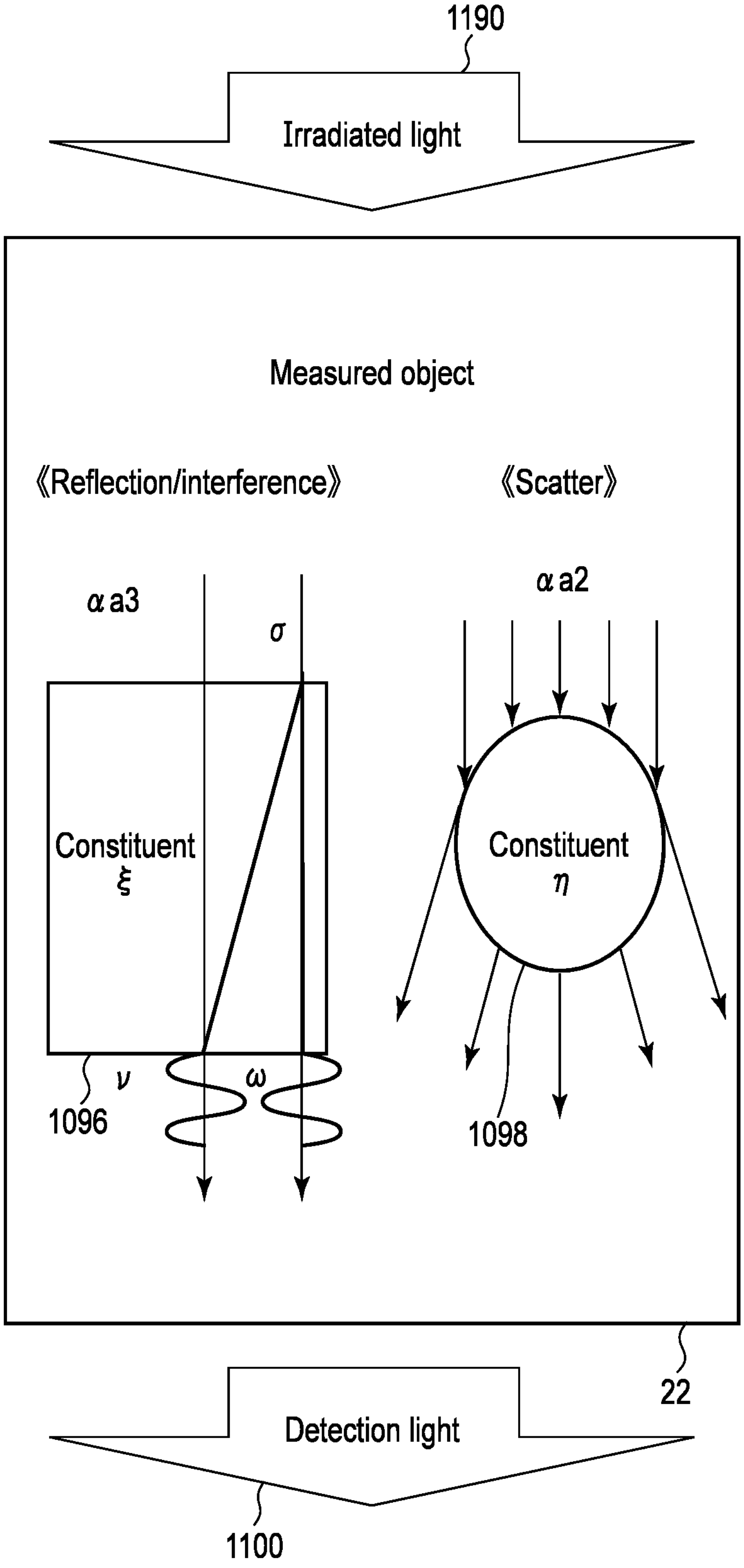
FIG. 83 is an explanatory diagram that diagrammatically illustrates an interaction with light inside the measured object.

FIGS. 81, 82, and 83 show various optical disturbance noise forms generated by the interaction with light inside the measured object 22. Here, the interaction with light inside the measured object 22 corresponds to the symbols "αa1" to "αa3" in FIGS. 47 and 48. According to FIGS. 81, 82, and 83, irradiated light 1190 causes various interactions inside the measured object 22. Therefore, the detection light 1100 includes information on the effects of these interactions. Moreover, the effects of the various interactions are mixed into the detection light 1100 as optical disturbance noise.

A case in which the measured object 22 is composed of a complicated composition will be first described. For example, most biological systems are composed of sugars, lipids, proteins, and nucleotides, and contain a lot of water. Therefore, for example, even if an attempt is made to measure the optical characteristics of only proteins in a living organism, the measurement data will be affected by the optical characteristics of water.

In infrared spectroscopy, near-infrared spectroscopy, Raman spectroscopy, fluorescence/phosphorescence spectroscopy, and the like, composition analysis is performed using the light absorption amount (absorbance) characteristics of light of a specific wavelength within the measured object 22. Therefore, the light absorption effects from other components (corresponding to the symbol "αa1" in FIGS. 47 and 48) is mixed in as optical disturbance noise.

FIG. 81 shows that the measured object 22 includes a first constituent ζ 1096 and a second constituent ξ 1096. And a measurer expects to obtain spectral absorption characteristic of only first constituent ζ 1096 from the detection light 1100. For example, a case where the constituent ζ 1096 to be measured has a low absorbance in the prescribed wavelength light (almost no light absorption), while another constituent ξ 1092 has a high absorbance in the same prescribed wavelength light (large amount of light absorption) will be considered. In a case where irradiated light 1190 having a prescribed wavelength light is irradiated, a large amount of the prescribed wavelength light is absorbed in the other constituent ξ 1096 in the measured object 22. Therefore, the intensity of the prescribed wavelength light contained in the detection light 1100 obtained from the measured object 22 is greatly reduced. Here, the case shown in FIG. 81 corresponds to the symbol "αa1" in FIGS. 47 and 48.

The right side of FIG. 82 corresponds to the symbol "αa3" in FIGS. 47 and 48 and shows the effect of an example of the light interference characteristics. When light transmits inside the constituent ζ 1092, the physical wavelength of light is inversely proportional to the refractive index within the constituent ζ 1092. Depending on the refractive index inside the constituent ζ 1092, the physical wavelength of the light that passes inside and outside the constituent ζ 1092 is different. Therefore, if a phase difference occurs between the light after passing inside the constituent ζ 1092 and the light that travels straight outside the constituent ζ 1092, the light interferes with each other. And then, summated light amplitude and the total intensity vary based on the phase difference. In other words, according to Equation 8, the first amplitude term representing "j=0" may correspond to the light travelling straight outside the constituent ζ 1092. And the second amplitude term representing "j=1" may correspond to the light passing inside the constituent ζ 1092. And then, the phase difference may correspond to "$2nd_0/\lambda_0$". Therefore, Equation 11 shows that the summated intensity varies based on the phase difference "$2nd_0/\lambda_0$". This phenomenon occurs not only in a case where the constituent ζ 1092 exists alone in the air, but also in a case where the constituent ζ 1092 is dispersed in an aqueous solution.

The left side of FIG. 82 corresponds to the symbol "αb2" in FIGS. 47 and 48 and shows the effect of light diffraction/light interference that occurs in a case where the surface of the constituent ζ 1092 has roughness. In a case where the phases of light after passing through a convex portion p and a concave portion K on the surface of the constituent ζ 1092 are changed, they interfere with each other.

The left side of FIG. 83 corresponds to the symbol "αa3" in FIGS. 47 and 48 and shows an example of the effect of light reflection characteristics and light interference characteristics. For example, a case where an upper surface σ and lower surfaces ν and ω of the constituent ξ 1096 are flat and, also, parallel to each other is considered. Most of the light that passes through the interior of the constituent ξ 1096 passes through the lower surface ν. However, some light is reflected by the lower surface ν and returns to the interior of the constituent ξ. Then, after being reflected by the upper surface σ of the constituent ξ 1096, it goes out of the constituent ξ 1096 via the lower surface ω. Light interference then occurs between the light passing through the lower surface ν and the light passing through the lower surface ω via the upper surface σ, and the summated light intensity varies.

The right side of FIG. 83 corresponds to the symbol "αa2" in FIGS. 47 and 48 and shows the effect of another example of light scattering at a constituent η 1098 contained in the measured object 22. When light scattering occurs at the constituent η 1098, the intensity of straight propagating light is reduced. On the other hand, most of the light bends and travels in a direction that deviates significantly from the direction of incidence of the irradiated light 1190. Thus, many kinds of optical interactions occur inside the measured object 22.

In FIG. 81, the light is affected by the light absorption of the other constituent ξ 1096. However, in the other cases shown in FIGS. 82 and 83, the intensity reductions of the detection light 1100 do not result from chemically light absorption phenomena. Therefore, the intensity reductions of the detection light 1100 can be referred to as "light intensity loss". The spectral profile or spectral profile signal of the detection light 1100 obtained by these phenomena can also be referred to as a light intensity loss spectral profile or a light intensity loss spectral profile signal.

The present embodiment may prevent all kinds of the optical disturbance noise shown in FIGS. 81, 82, and 83 with performing arithmetic processing between signals represented by the symbol "L3" in FIG. 49. A concrete example may extract the second information as accurate and reliable information with utilizing the extracted first information 1000 explained in FIG. 46.

In case of FIG. 81, the present embodiment may utilize spectral profile information obtained from the other constituent ξ 1096 (absorbance information of the other constituent ξ 1096 alone) is utilized as the first extracted information 1004. In advance, the present embodiment may prepare a prescribed measured object 22 including only the constituent ξ 1096. And then the present embodiment may obtain the spectral absorbance information (profile signal) of constituent ξ 1096 as the first extracted information 1004. Then, using this first extracted information (absorbance information of the other constituent ξ 1096 alone) 1004, the absorbance information (or linear absorption ratio information) of the constituent ζ 1092 corresponding to the second information that was unknown is extracted 1000. Here, the spectral profile signal of the detection light 1100 obtained from the measured object 22 that contains both the constituent ξ 1096 and the constituent ζ 1092 is collected in the measurer 8. Then, the signal processor 42 subtracts the absorbance information or the linear absorption ratio information of the known other constituent ξ 1096 alone (first extracted information 1004) from the spectral profile signal containing both the constituent ξ 1096 and the constituent ζ 1092. Therefore, the present embodiment may extract 1000 the absorbance information or the linear absorption ratio information of the constituent ζ 1092 alone (second extracted information 1004).

In response to FIGS. 82 and 83, the method of extracting 1000 the absorbance information or the linear absorption ratio information (second extracted information 1004) of the constituent ζ 1092 alone will be described in detail.

The effect of the interactions explained in FIGS. 82 and 83 mainly appears in the baseline profile of the spectral profile signal. Therefore, a process of "baseline correction (or baseline compensation)" may correspond to the "second information extraction based on the extracted first information" 1000. Here, the first information extraction may correspond to a baseline profile extraction from the spectral absorbance profile (or the spectral profile of linear absorption ratio) of the detection light 1100.

For convenience of explanation, the above explanation describes the embodiment example in which the "baseline correction (or baseline compensation)" is performed after removing the effect of the absorbance (liner absorption ratio) information 1004 of the other constituent ξ 1096. However, it is not limited thereto, and, for example, in a case where the measured object 22 is configured only by the constituent ζ 1092, the baseline correction (or baseline compensation) may be performed directly with respect to the spectral profile signal obtained from the measurer 8 (and signal receptor 40).

Figure 84:
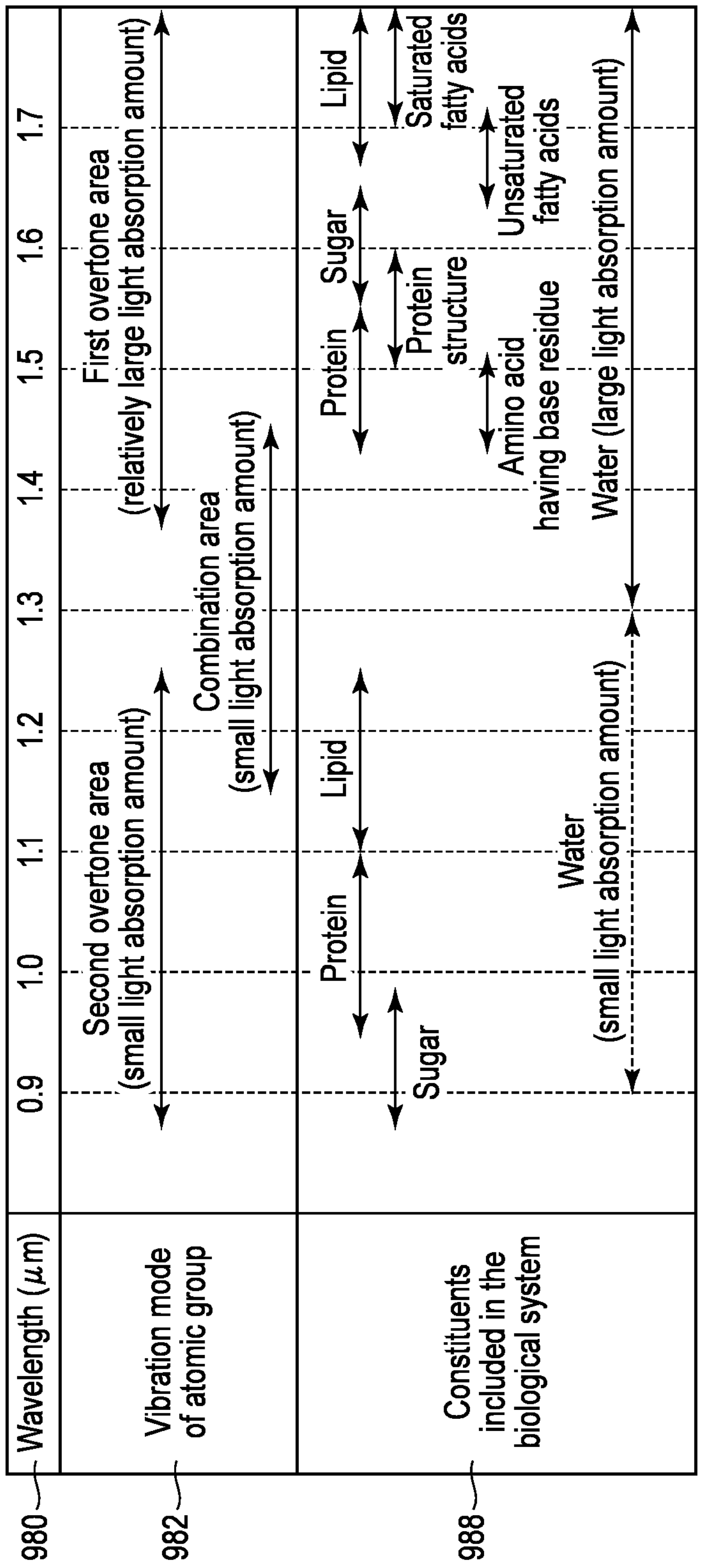
FIG. 84 is an explanatory diagram of absorption band wavelengths for each constituent comprised in a biological system.

FIG. 84 shows the relation between many kinds of atomic groups 982 and corresponding central wavelength values (maximum absorbed wavelength) of absorption bands obtained when using near-infrared light in the wavelength range of 750 nm to 2 μm (preferably 850 nm to 1.85 μm). A first overtone area, a combination area, and a second overtone area with respect to a vibration mode of atomic group 982 containing hydrogen atoms that configure a molecule absorb the above near-infrared light. The vibration mode of atomic group 982 includes stretching vibrations and deformation vibrations. The stretching vibration is almost twice the absorption intensity (linear absorption ratio) of the deformation vibration generally. In other words, the absorption intensity (linear absorption ratio) of the stretching vibration is bigger than one of the deformation vibration. Therefore, FIG. 84 omits the effect of the deformation vibration.

The first overtone area of the atomic group absorbs light mainly in the range of 1.37 μm to 1.8 μm as the wavelength 980. Compared to the combination area and the second overtone area, absorption intensity (linear absorption ratio) of the first overtone area is relatively big. Furthermore, since the wavelength range absorbed by each of the constituents included in the biological system 988 differs, a corresponding constituent included in the biological system 988 can be predicted from the value of the maximum absorbed wavelength (the center wavelength of the absorption band).

Sugars absorb the most light at around 1.6 μm (1.55 μm to 1.65 μm). Lipids also absorb light at 167 μm to 1.8 μm. Furthermore, among lipids, the wavelength at which saturated fatty acids (1.7 μm to 1.8 μm) are absorbed is longer than the wavelength at which unsaturated fatty acids (1.63 μm to 1.73 μm) are absorbed. From this characteristic, the degree of unsaturation (percentage of unsaturated fatty acids) in the lipid can be estimated to some extent.

Atomic group vibrations, in which hydrogen atoms bonded to nitrogen atoms in proteins vibrate, absorb light from 1.43 to 1.55 μm. The protein structures with unique structures (secondary layered structures) such as α-helix or β-sheet absorb light from 1.5 to 1.6 μm. A central wavelength value (maximum absorbed wavelength) of the α-helix is shorter than that of β-sheet. In addition, amino acids having base residue absorb light from 1.43 to 1.52 μm. In the amino acids having base residue, lysine, arginine, and histidine are arranged in descending order of absorption wavelength.

The absorption wavelength range of proteins shown in FIG. 84 is only the range of atomic group vibrations of hydrogen atoms bonded to nitrogen atoms, and the actual absorption wavelength range of proteins is extremely wide. This is because alanine in amino acids contains a methyl group (included in the lipid range), and serine contains a hydroxyl group (included in the water absorption range), so their absorption bands also appear.

The combination area absorbs light mainly in the range of 1.14 μm to 1.45 μm as the wavelength 980, and the absorption intensity (linear absorption ratio) of the combination area is smaller than that of the first overtone area. The second overtone area absorbs light mainly in the range of 0.85 μm to 1.25 μm as the wavelength 980, and the absorption intensity (linear absorption ratio) of the second overtone area is even smaller than that of the first overtone area. Within this second overtone area, the optical absorption wavelength range for lipids is 1.10 μm to 1.25 μm, the optical absorption wavelength range for sugars is 0.85 μm to 1.00 μm, and the optical absorption wavelength range for proteins is 0.94 μm to 1.10 μm.

As shown in FIG. 84, the absorption intensity (linear absorption ratio) of the first overtone area is the biggest and that in the second overtone area is the smallest. Therefore, in the spectral profile information after baseline correction (baseline compensation), the maximum absorbance in the first overtone area is bigger than the maximum absorbance within the second overtone area and the combination area. This characteristic can be utilized to predict the correction curve (corrected baseline curve). In other words, the baseline correction may be performed so that the maximum absorbance in the first overtone area becomes greater than the maximum absorbance within the second overtone area and the combination area.

In the example of the present embodiment, the above feature may be utilized to optimize the correction curve (corrected baseline curve) according to an envelope line tracing minimum values at a short wavelength area (0.85 μm to 1.35 μm, preferably 0.90 μm to 1.25 μm) including the second overtone area (0.85 μm to 1.25 μm) or even the combination area in the light intensity loss spectral profile before baseline correction.

By the way, as FIG. 84 shows, the light absorption of water (pure water) in the wavelength area of 1.3 μm to 1.8 μm is extremely large. Although there is light absorption of water (pure water) in the wavelength area of 0.88 μm to 1.3 μm, the absorption intensity (linear absorption ratio) of water (pure water) in the wavelength area of 0.88 μm to 1.3 μm is relatively smaller than that within the above range of 1.3 μm to 1.8 μm. The wavelength ranges including the corresponding absorption bands of proteins, sugars, and lipids as constituents of the biological system 988 are relatively separated with each other. However, the wavelength range in which water (pure water) greatly absorbs light overlaps with the above wavelength ranges.

The water molecule accounts for the majority of the composition ratio of each component that configures the biological system 988. Therefore, when a living organism (organism) is used as the measured object 22, the spectral profile signal of pure water accounts for the majority of the spectral profile signal obtained from the detection light 1100. FIG. 81 illustrates the example of this situation. A kind of proteins, sugars, lipids, or nucleotides may correspond to the constituents ζ 1092 that constitute some organism (living organism). However, since the water molecule corresponding to the other constituent ξ 1096 that constitutes the organism (living organism) is overwhelmingly large, the spectral profile signal information corresponding to the constituent ξ 1092 is buried in the spectral profile information of pure water. In this case, it is desirable to remove the absorbance characteristic component of the water molecule (spectral profile signal corresponding to the first extracted information 1004) from the spectral profile signal obtained from the measurer 8 (or signal receptor 40).

In the field of life science, many methods of culturing cells in a culture medium are employed. In order to monitor the cell culture status in vivo and in real time, cell status monitoring in the culture medium is desirable. In order to respond tp this expectation, an example of the present embodiment may perform the signal processing (data processing) shown in FIG. 46 by the procedure of:

1. performing information extraction 1004 on a spectral profile signal (first extracted information) of the culture medium alone in advance;
2. measuring the spectral profile signal obtained from both of cells in culture and the culture medium; and
3. extracting the second information 1000 (obtaining the spectral profile signal indicating the culturing cell status) based on a signal processing between two kinds of spectral profile signals measured above.

The present embodiment may define an extended concept of "solvent". For example, for cultured cells in a culture medium as described above, the present embodiment may define the culture medium as an extended type of "solvent" for the sake of convenience. Moreover, the present embodiment may define the cultured cells as an extended type of solute. Furthermore, proteins, sugars, lipids, and nucleotides, which are constituents of living organisms, are considered as an extended type of solute. And the water system contained in living organisms is also defined as the "solvent containing water" for the sake of convenience.

Therefore, according to FIG. 46, the extracted first information 1004 may correspond to a spectral profile signal of the "solvent containing water".

The measurer 8 or the signal receptor 40 obtains the spectral profile signal from the detection light 1100. Here, a format of the spectral profile signal shows a series of detection intensity (detected light intensity) data for each measurement wavelength. The signal processor 42 converts this spectral profile signal into a light intensity loss characteristic signal for each measurement wavelength.

The signal processor 42 calculates a divisional operation for each measurement wavelength to obtain the light intensity loss characteristic signal. With respect to the divisional operation, a denominator is "the spectral profile signal for each measurement wavelength when the measured object 22 is removed from the light propagation path 6". And a numerator is a differential value obtained by subtracting "the spectral profile signal for each measurement wavelength when the measured object 22 is inserted into the light propagation path 6" from "the spectral profile signal for each measurement wavelength when the measured object 22 is removed from the light propagation path 6".

The divisional operation result for each measurement wavelength is expressed in linear scale generally. The present embodiment calls the "divisional operation result expressed in linear scale" as the "linear absorption ratio". Not limited to the linear scale, the present embodiment may express the divisional operation result in a common logarithmic scale, which relates to "absorbance".

In the step of first information extraction 1004, the light intensity loss characteristic signal of the "solvent containing water" is obtained in advance. And then, with respect to the second information extraction 1000, the signal receptor 40 removes the disturbance noise of the "solvent containing water" from the light intensity loss characteristic signal including both the constituent ζ 1092 and the "solvent containing water". Here, the signal receptor 40 estimates a content value of the "solvent containing water" in the measured object 22 by percentage. And the signal receptor 40 may multiply the light intensity loss characteristic signal of the "solvent containing water" (the first extracted information 1004) by the content value. And then, for each measurement wavelength, the signal receptor 40 may subtract the multiplied values from the light intensity loss characteristic signal including both the constituent 1092 and the "solvent containing water" to extract the second information 1000.

The present embodiment explains how to estimate the content value of the "solvent containing water". As shown in profile (a) in FIG. 30, the absorbance (light intensity loss characteristic signal) of the pure water has a maximum value when the measurement wavelength is 1.45 μm at normal (room) temperature. Then, the absorbance (linear absorption ratio) at measurement wavelengths deviating from 1.45 μm decreases drastically. In other words, the profile of the light intensity loss signal of the pure water shows an upward convex shape around a wavelength of 1.45 μm.

This characteristic may be utilized to calculate an optimum value of the content values during the subtraction processing described above. In other words, in a case where the content value exceeds the optimum value, the amount of light intensity loss at wavelengths deviating from 1.45 μm decreases as a result of the above subtraction processing, and the profile of the subtracted light intensity loss signal (the second extracted information 1000) shows a downward convex shape around a wavelength of 1.45 μm. Conversely, in a case where the content value does not reach the optimum value, the amount of light intensity loss at wavelengths deviating from 1.45 μm increases as a result of the above subtraction processing, and the profile of the subtracted light intensity loss signal (the second extracted information 1000) shows an upward convex shape around a wavelength of 1.45 μm. In this manner, an optimum value of the content value can be automatically calculated.

After optimizing the content value, the light application device 10 (or the measurement device 12) may output the absorbance (linear absorption ratio) characteristic of the measured constituent ζ 1092 as the second extracted information 1000. The light application device 10 (or the measurement device 12) may not only apply the output information 1000 in the applications area but also send the output information 1000 to the external (internet) system or display 18 the output information 1000.

As explained above, the absorbance (linear absorption ratio) value of the measured constituent ζ 1092 at the measurement wavelength of 1.45 μm is small enough in comparison with the maximum absorbance (linear absorption ratio) value. Therefore, it may be considered that the light application device 10 (or the measurement device 12) achieves the present method explained above when the output information (the extracted second information after reducing the disturbance noise) 1000 includes the absorbance (linear absorption ratio) value of the measured constituent ζ 1092 at the measurement wavelength of 1.45 μm is less than a half value of the maximum absorbance (linear absorption ratio) value regarding the measurement wavelength variation. Moreover, it may be also considered that the light application device 10 (or the measurement device 12) achieves the present method when the output information 1000 includes the absorbance (linear absorption ratio) value at the measurement wavelength of 1.45 μm is less than a quarter value of the maximum absorbance (linear absorption ratio).

After removing the influence of the water molecule (or the solvent), the other optical disturbance noise components shown in FIGS. 82 and 83 remain in the light intensity loss characteristic signal. Therefore, it is desirable to perform further signal processing (data processing) to remove these optical disturbance noise components.

FIG. 85 shows a list of wavelength-dependent characteristic formulae of some kinds of the other optical disturbance noise components. Each of the formulae indicates each of different analytical models of different optical interactions 292 in the measured object 22. Here, each symbol 290 in FIG. 85 coincides with each symbol 290 shown in FIGS. 47 and 48.

The phenomena shown in FIG. 82 representing the symbol "αb2" may generate an optical phase difference distribution after each part of detection light 1100 passes each different path. Equation 14 may express the corresponding phenomena when the optical phase difference distribution has a continuously flat profile (a rectangular distribution). Here, $\lambda_0$ represents the measurement wavelength, and $\Delta\chi_0$ represents a generated phase difference range. FIG. 85 expresses the light intensity loss formula into which Equation 14 is transformed.

The phenomenon shown in FIG. 83 representing the symbol "αa3" may generate an optical interference characteristic. An interference model between the twice-reflected light and the straight traveling light inside the constituent ξ 1096 may be used. The third term of the right side in Equation 11 expresses the intensity variation of the light interfering. Here $\chi_0$ represents the phase difference between interference lights. FIG. 85 expresses the light intensity loss formula into which the third term of the right side in Equation 11 is transformed.

The phenomenon shown in FIG. 83 represented by the symbol "αa2" may generate Rayleigh scattering. According to Rayleigh scattering, the scattered intensity varies in proportion to the "−4th power" of the measurement wavelength $\lambda_0$.

In the example of the present embodiment, it is modeled that the optical disturbance noise (light intensity loss dependent on the wavelength of the detection light 1100) is generated by the above three types of interactions. The baseline correction curve of the light intensity loss profile is then approximated by the additive characteristics of the above three types of calculation formulas. In the calculation model, five parameters (coefficient values) are set: $E_0$, $\Delta\chi_0$, $\Delta_0$, $\chi_0$, and $S_0$. Then, optimization processing of the five parameters (coefficient values) is performed to extract an appropriate correction curve. This correction curve is then used to remove optical disturbance noise components (baseline correction) from the light intensity loss characteristic signal.

That is, in the signal processing (data processing) to remove optical disturbance noise components performed in the example of the present embodiment, the processing of extracting an appropriate correction curve by performing optimization processing on the above five parameters (coefficient values) corresponds to information extraction 1004 to obtain the first extracted information (correction curve). The absorbance (linear absorption ratio) information after optical disturbance noise component removal corresponds to the second extracted information 1000. The signal processing (data processing) that performs baseline correction using the optimal correction curve here corresponds to information extraction 1004 to obtain the second extracted information 1000.

As described in FIG. 84, the absorbance (or linear absorption ratio) characteristics in the near-infrared area have the following features:

A. The light absorption intensity within the first overtone area is bigger than that within the combination area and the second overtone area; and
B. Each wavelength width (spectral bandwidth) of each absorption band belonging to different atomic group is relatively narrow.

In contrast, as shown in FIG. 85, there is a characteristic difference in that:

C. The influence of optical disturbance noise appears broadly in the light intensity loss spectral profile to deform the baseline profile.

The above five coefficient values (parameters) may be set so that the correction curve can fit since the optical disturbance noise components deform the baseline profile in the light intensity loss spectral profile. It is difficult to measure the individual occurrences of the various interactions with the light described in FIGS. 82 and 83. However, by estimating the correction curve from the light intensity loss spectral profile derived from the signal processor 42, information on the overall optical disturbance noise component (first extracted information) can be extracted 1004. Then, by subtracting the correction curve from the above light intensity loss spectral profile, the optical disturbance noise component can be removed, and information on the absorbance (or linear absorption ratio) of the constituent ζ 1092 corresponding to the second extracted information 1000 can be extracted.

FIG. 86 shows the difference in signal processing (data processing) methods for optical disturbance noise reduction. Signal processing (data processing) methods differ depending on the location where the optical disturbance noise occurs within the measured object 22. As an interaction range 288 that interacts with light within the measured object 22, interaction with light may occur within a local area or the frequency (intensity) of interaction with light may be different for each local area. In this case, as a spectral profile correction 294, subtraction processing on a linear scale is performed. As a specific profile correction procedure 296, the components of the correction curve are subtracted on a linear scale from the light intensity loss spectral profile obtained from the measured object 22.

As the interaction range 288 that interacts with light within the measured object 22, interaction with light may occur uniformly over the entire area within the measured object 22. An example of where this phenomenon may occur is when the interaction with light affects the light transfer function on the way from the light source 2 through the light propagation path 6 to the measurer 8. In this case, as the spectral profile correction 294, division processing is performed on a linear scale. As this signal processing (data processing) method, instead of performing the division processing on a linear scale, logarithmic values of the light intensity loss spectral profile and the correction curve may be calculated in advance, and subtraction processing may be performed on a logarithmic scale. That is, as the profile correction procedure 296, components of the correction curve are subtracted on the logarithmic scale from the light intensity loss spectral profile obtained from the measured object 22.

Figure 87:
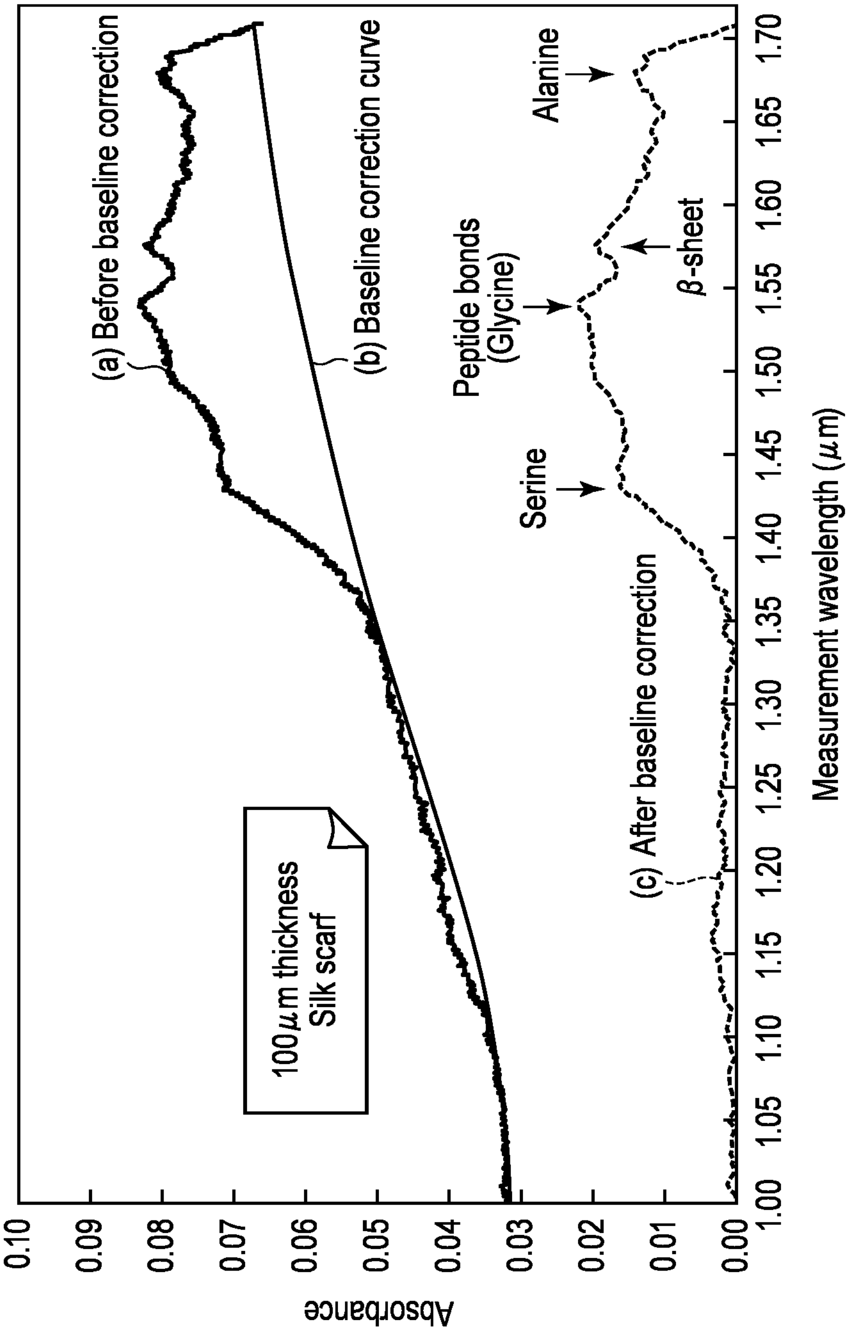
FIG. 87 represents the difference in absorbance before and after baseline correction obtained from a 100 μm thick silk scarf.
Figure 88:
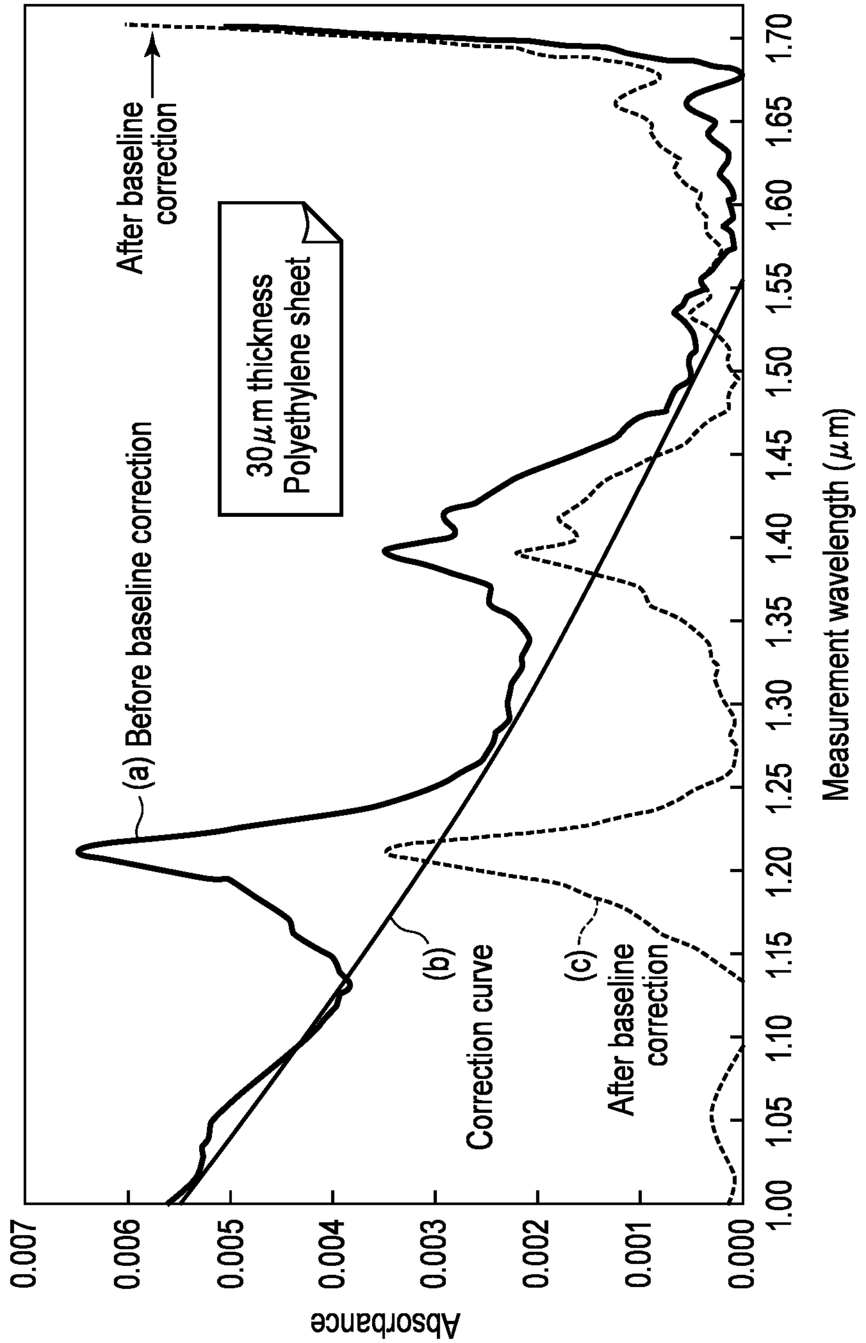
FIG. 88 represents the difference in absorbance before and after baseline correction obtained from a 30 μm thick transparent polyethylene sheet.

FIGS. 87 and 88 show examples of changes in absorbance characteristics before and after baseline correction for a silk scarf of 100 μm thickness and a transparent polyethylene sheet of 30 μm thickness. Profile (a) of FIG. 87 and profile (a) of FIG. 88 both represent values of the light intensity loss characteristic signal for each wavelength on a logarithmic scale. The correction curves in profile (b) of FIG. 87 and profile (b) of FIG. 88 are also expressed on a logarithmic scale. Profile (c) of FIG. 87 and profile (c) of FIG. 88 represent results of subtracting profile (a) of FIG. 87 from profiles (b) and (a) of FIG. 87 from profile (b) of FIG. 87 on the logarithmic scale.

The silk scarf is a kind of latticed fabric woven from Fibroin strings having a uniform thickness (diameter). And the silk scarf microscopically has many chink areas between the Fibroin strings. Therefore, the detection light 1100 may have a uniform optical path length difference between a part of irradiated light 1190 passing through the chink areas and another part of irradiated light 1190 traveling inside the Fibroin string having a uniform thickness (diameter). In addition, not limited to it, the detection light 1100 may have another uniform optical path length difference between a part of irradiated light 1190 traveling straight through the Fibroin string and another part of irradiated light 1190 doubly reflected inside the Fibroin string having a uniform thickness (diameter). The uniform optical path length difference account for the optical disturbance noise representing the symbol "αa3" or "αb2" shown in FIGS. 26B and 31C.

The kind of the optical disturbance noise resulting from the uniform optical path length difference tends to form the original baseline profile (baseline correction curve) (b) expressing the formula "$\{1-\cos(2\pi\chi_0/\lambda_0)\}$". Under the condition of appropriate optical path length difference value $\chi_0$, the absorbance of the original baseline profile (baseline correction curve) (b) increases when the measurement wavelength increases.

According to the profile (c) after baseline correction in FIG. 87, the absorbance values (or the values of linear absorption ratio) in the first overtone area are obviously bigger than the absorbance values (or the values of linear absorption ratio) in both of the combination area and the second overtone area. And profile (c) after baseline correction shows that all minimum absorbance values (or all minimum values of linear absorption ratio) in both of the combination area and the second overtone area are small enough or are nearly equal to "0". Moreover, all maximum absorbance values (or all minimum values of linear absorption ratio) in both of the combination area and the second overtone area are less than the averaged absorbance value in the first overtone area.

With respect to the central wavelength values of the absorption bands shown in profile (c) of FIG. 87, the absorption band at wavelength 1.43 μm is considered to correspond to a hydroxyl group vibration within Serine, and the absorption band at wavelength 1.68 μm is considered to correspond to a methyl group vibration within Alanine. In addition, many areas in silk (Fibroin) have a β-sheet structure, which is one of protein secondary structures. Therefore, the absorption band at the wavelength of 1.57 μm is considered to correspond to a vibration of hydrogen bond in the β-sheet structure, and the absorption band at the wavelength of 1.54 μm is considered to correspond to a vibration of hydrogen atom involved in peptide bond.

Local thickness values of polyethylene sheet vary at different positions though the comprehensive thickness of the polyethylene sheet is 30 μm. Therefore, the optical path length values of the detection light 1100 after passing through the polyethylene sheet vary in response to the different positions through which different parts of the irradiated light 1190 pass. The randomized optical path length may form (generate) another kind of disturbance noise representing the symbol "αb2" shown in FIGS. 26B and 31C. When it is presumed that an optical path length difference distribution is a rectangular distribution (a uniform flat within a phase difference range $\Delta\chi_0$), this kind of disturbance noise tends to form the original baseline profile (baseline correction curve) (b) expressing the formula "$\{1-\mathrm{sinc}^2(\pi\Delta\chi_0/\lambda_0)\}$". Under the condition of appropriate phase difference range $\Delta\chi_0$, the absorbance of the original baseline profile (baseline correction curve) (b) increases when a value of the measurement wavelength decreases.

According to profile (c) after baseline correction in FIG. 88, the absorption band at wavelength 1.21 μm is considered to correspond to a methylene group vibration in the second overtone area. And the absorption band around wavelength 1.40 μm is considered to correspond to the methylene group vibration in the combination area. The central wavelength value corresponding to the methylene group vibration in the first overtone area is considered to be greater than 1.70 μm. The maximum absorbance value of the absorption band in the first overtone area is greater than the maximum absorbance value in the second overtone area though the maximum absorbance value in the second overtone area is relatively big. And all minimum absorbance values (or all minimum values of linear absorption ratio) in the second overtone area are small enough and are nearly equal to "0".

The profiles (a) in FIGS. 87 and 88 suggest that the original baseline profile (the correction curve (b)) shows the kinds of the constituent structure.

Both absorbance characteristics after baseline correction (after optical disturbance noise reduction) in the profiles (c) of FIGS. 87 and 88 are such that:

A] The maximum absorbance in the first overtone area (1.35 μm to 1.8 μm wavelength range) is greater than the maximum absorbance in the 0.90 μm to 1.35 μm wavelength range (or 0.95 μm to 1.25 μm wavelength range); and B] In the 0.90 μm to 1.35 μm wavelength range (or 0.95 μm to 1.25 μm wavelength range), one of the minimum absorbance values (or one of minimum values of linear absorption ratio) is less than a half value of the maximum absorbance value (or the maximum value of linear absorption ratio) in the 1.35 μm to 1.80 μm wavelength range.

C] It is desirable that one of the minimum absorbance values (or one of minimum values of linear absorption ratio) in the 0.95 μm to 1.25 μm wavelength range is less than a "1/10" value of the maximum absorbance value (or the maximum value of linear absorption ratio) in the 1.35 μm to 1.80 μm wavelength range.

D] In the 0.90 μm to 1.25 μm wavelength range, one of the minimum absorbance values (or one of minimum values of linear absorption ratio) is less than "80%" (or a half value) of the maximum absorbance value (or the maximum value of linear absorption ratio).

In the case where the absorbance (linear absorption ratio) characteristics after baseline correction (after optical disturbance noise reduction) meet the conditions described in [A] or [B] ([A], [B], [C], or [D]) above, it can be considered that the signal processing (data processing) corresponding to the example of the present embodiment described above has been performed. As explained above, the light application device 10 (the measurement device 12) may substantially output the absorbance profile information (or the linear absorption ratio profile information) as the second extracted information 1000 reducing the disturbance noise. Therefore, when a light application device 10 (or a measurement device 12) substantially outputs the information having the substantial conditions described in [A] or [B] (or [C]) above, the light application device 10 (or the measurement device 12) is to be considered to use the present embodiment.

Figure 89:
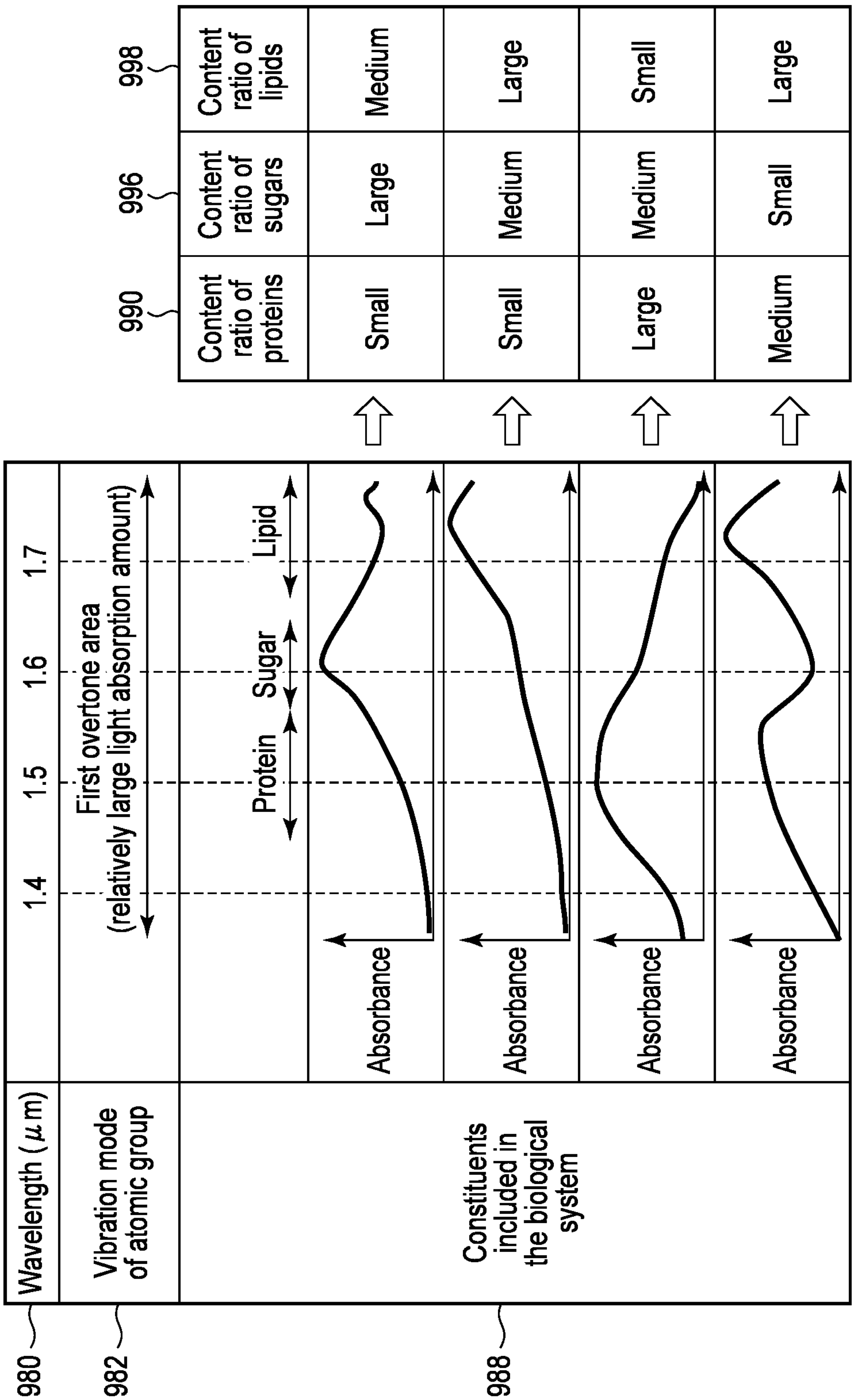
FIG. 89 is an explanatory diagram of a method of predicting a content ratio between constituents from the absorbance after correction.

FIG. 89 shows an application example utilizing absorbance (linear absorption ratio) characteristics after optical disturbance noise reduction. For example, in the case of monitoring the culture status of cultured cells in the culture medium in real time, some life science researchers desire a simpler display (expression) of the culture status changes than absorbance information. In addition, if any in vivo state (or state change), not limited to the culture status, can be easily known, the user's convenience will be improved.

As an example of the present embodiment, not limited to absorbance information or linear absorption ratio information, feature information may be extracted 1004 from spectral information whose value changes with each wavelength, and the relationship between the extracted feature information may be displayed 1008 to the user. Here, the feature information may be extracted 1004 according to a predetermined criterion of interest to the user or the characteristics/contents/types of the measured object 22.

For example, an example in which an organism is selected as the type/content of the measured object 22 will be described. As the characteristics of this organism, many organisms are composed of proteins, sugars, lipids, and nucleotides. Therefore, a case in which the state in the cultured cell or the state change in the organism can be grasped from the change in, for example, the content ratio (composition ratio) δa4 of proteins, sugars, and lipids will be considered.

FIG. 89 focuses on proteins, sugars, and lipids as the feature information contained in the absorbance information obtained by the above signal processing, and shows a display example 1008 of the information extraction 1004 results of these feature information. As explained in FIG. 84, the amount of light absorption in the first overtone area is relatively large, and the absorption wavelengths are separated between proteins, sugars, and lipids. Utilizing this feature, the difference in the amount of light absorption (magnitude of absorbance) at each absorption wavelength between protein, sugar, and lipid may be used to express the magnitude between the content ratio of proteins 990, the content ratio of sugars 996, and the content ratio of lipids 998.

FIG. 89 shows an example of the difference between each of the constituent content ratios 990, 996, and 998 obtained by information extraction 1004 from four different types of absorbance information. An example of the information extraction 1004 method from the absorbance information listed in the top row thereof is described below. When the amount of light absorption in the measured object 22 is large, the absorbance value becomes large. Therefore, in the absorbance information listed in the top row, the content ratio of sugars 996 is the largest, followed by the content ratio of lipids 998 and the content ratio of proteins 990. In FIG. 89, the relationships between each of the constituent content ratios 990, 996, and 998 are indicated by the letters "large", "medium", and "small". However, it is not limited to this, and can be displayed in any way that is easy for the user to see. For example, in the case of using color representation for display 1008, the content ratio of proteins 990 may be expressed by "red density", the content ratio of sugars 996 by "green density", and the content ratio of lipids 998 by "yellow density", and the status of each of the constituent content ratios 990, 996, and 998 may be expressed by mixed colors.

As other methods of feature information extraction 1004 in addition to the content ratio between protein, sugar, and lipid in FIG. 89, feature information extraction 1004 may be performed for such as the degree of non-saturation δa6 of fatty acids, the ratio of amino acids forming a protein structure, or the ratio of secondary structure within the protein structure (such as α-helix composition ratio and β-sheet composition ratio) δa5. Furthermore, in the example of the present embodiment, the measured object 22 is not limited to organisms, and any substance can be measured. Therefore, for example, other feature information extraction 1004 may be utilized to determine δa1 whether the substance is organic or inorganic.

Figure 90:
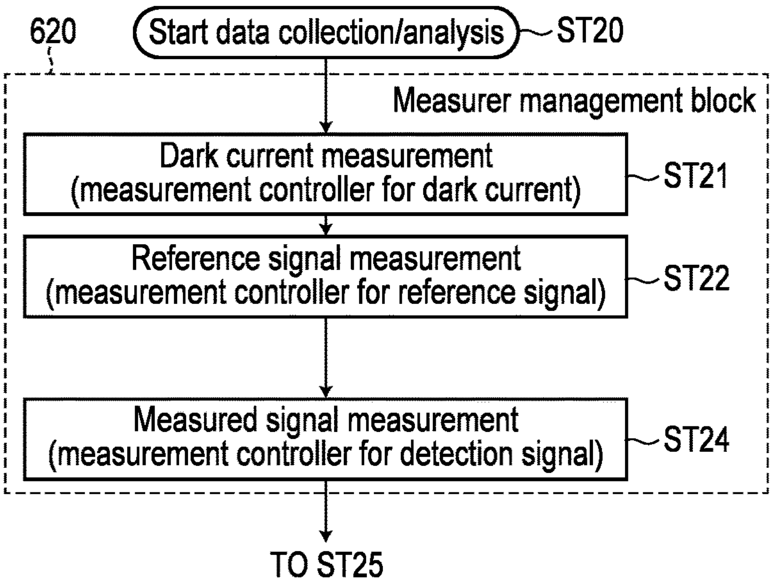
FIG. 90 shows a basic processing method leading to information extraction on spectral data in the present embodiment.
Figure 91:
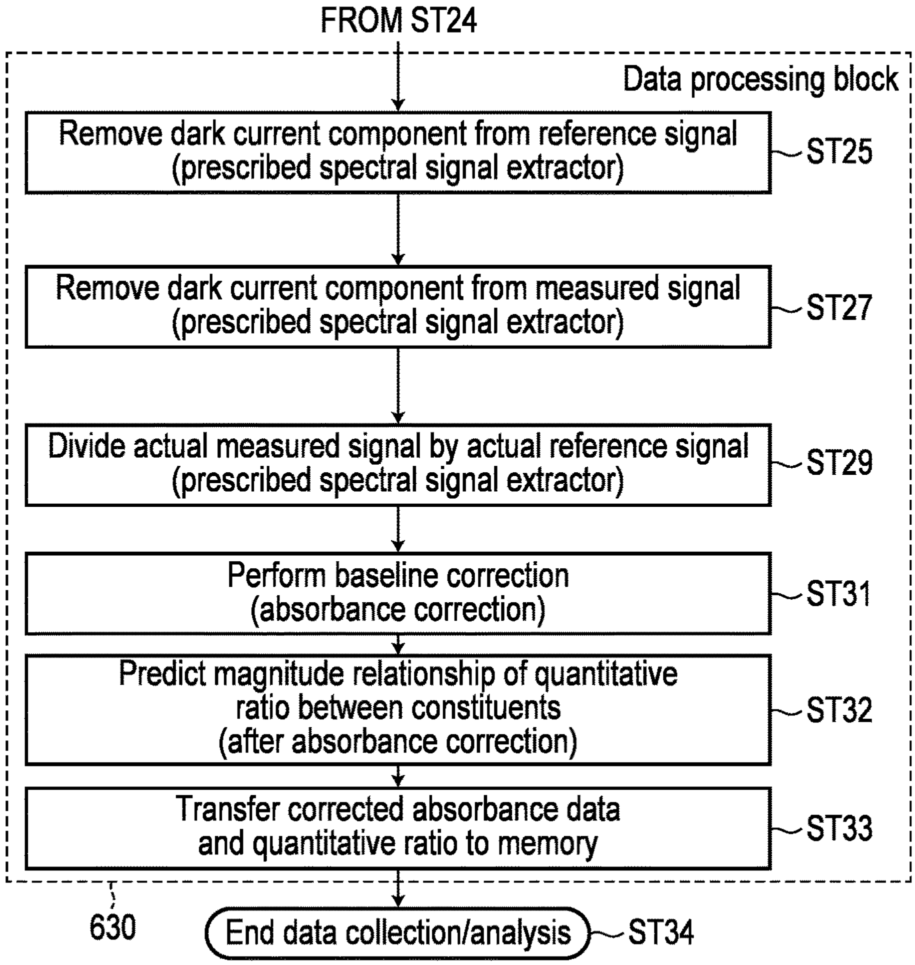
FIG. 91 shows a basic processing method leading to information extraction on spectral data in the present embodiment.

FIGS. 90 and 91 show a series of processing procedures from the start of measurement to spectral information extraction 1004 using the light application device 10. When the user starts the data processing/processing (ST20), the measurer 8 management block 620 (FIG. 39) starts the measurement control. In the first step 21, the measurement controller for dark current 642 measures a dark current in the measurer 8. This dark current measurement method may, for example, use a light-shielding shutter to shield the light between the exit of the optical fiber 330 that guides the irradiated light 1190 emitted by the light source 2 and the holder case 1080 (FIG. 76) of the measured object 22. The value obtained from the measurer 8 (or signal receptor 40) at the time of light shielding is then measured as the dark current.

The next step 22 performed by the measurer management block 620 causes the measurement controller for reference signal 646 to measure a reference signal. In this step 22, for example, the optical transparent plate 1054 having a prescribed thickness (FIG. 67 or 75) for reference data measurement may be placed in the holder case 1080 of the measured object 22 to measure the reference signal.

The next step 24 performed by the measurer management block 620 causes the measurement controller for detection signal 648 to measure a measured signal. In this step 24, for example, the holder case 1080 in which the measured object 22 is placed within the measured object setting area 1052 (FIGS. 65 to 67 or FIGS. 73 to 75) may be used. The measurement itself performed within the measurer 8 is ended in step 24, and the data processing block 630 in the signal processor 42 starts signal processing (data processing).

In the first step of signal processing (data processing), the prescribed spectral signal extractor 680 (FIGS. 40 and 41) removes dark current components to extract real signals that do not contain the dark current, and then performs division processing to extract light intensity loss signals.

That is, using the reference signal measured in step 22 and the dark current signal measured in step 21, in step 25, subtraction processing is performed between them to remove the dark current component from the reference signal and extract a real reference signal. Next, using the measured signal measured in step 24 and the dark current signal measured in step 21, in step 27, subtraction processing is performed between them to remove the dark current component from the measured signal and extract an actual measured signal. Then, in step 29, the actual reference signal is divided by the actual measured signal to extract the light intensity loss signal.

Then, the quantitative predictor of each content ratio for each constituent (absorbance correction) in FIGS. 40 and 41 performs processing of step 31 and step 32. That is, in step 31, baseline correction is performed by the method described above. In step 32, as illustrated in FIG. 89, the magnitude relationship of the quantitative ratio (content ratio) between constituents is predicted.

Finally, the corrected absorbance information and quantitative ratio (content ratio) are transferred to the collected information manager 74 in the light application device 10 (ST33), and the data collection/analysis processing is ended (ST34). Here, the prediction results of the magnitude relationship of the quantitative ratio (content ratio) between the constituents may be displayed on the display 18.

Figure 92:
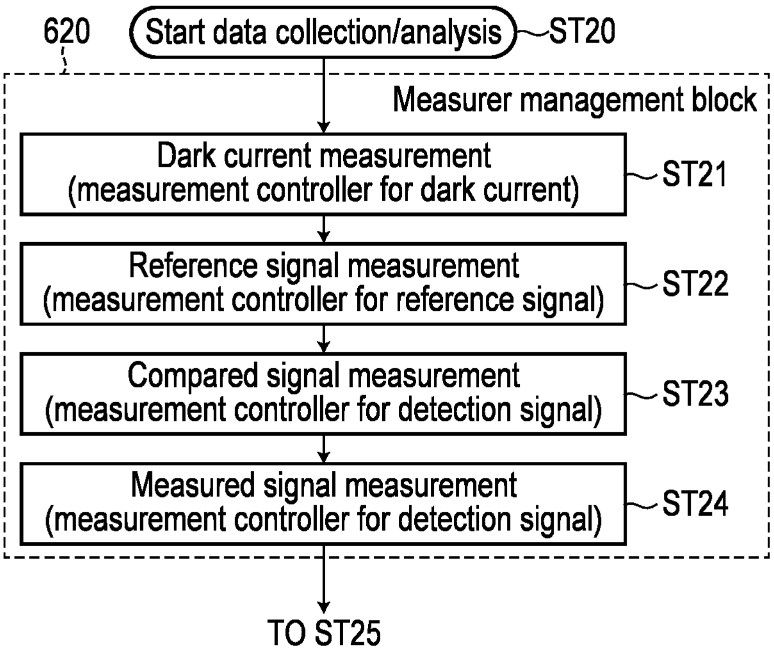
FIG. 92 shows a basic processing method leading to information extraction on spectral data in the present embodiment.
Figure 93:
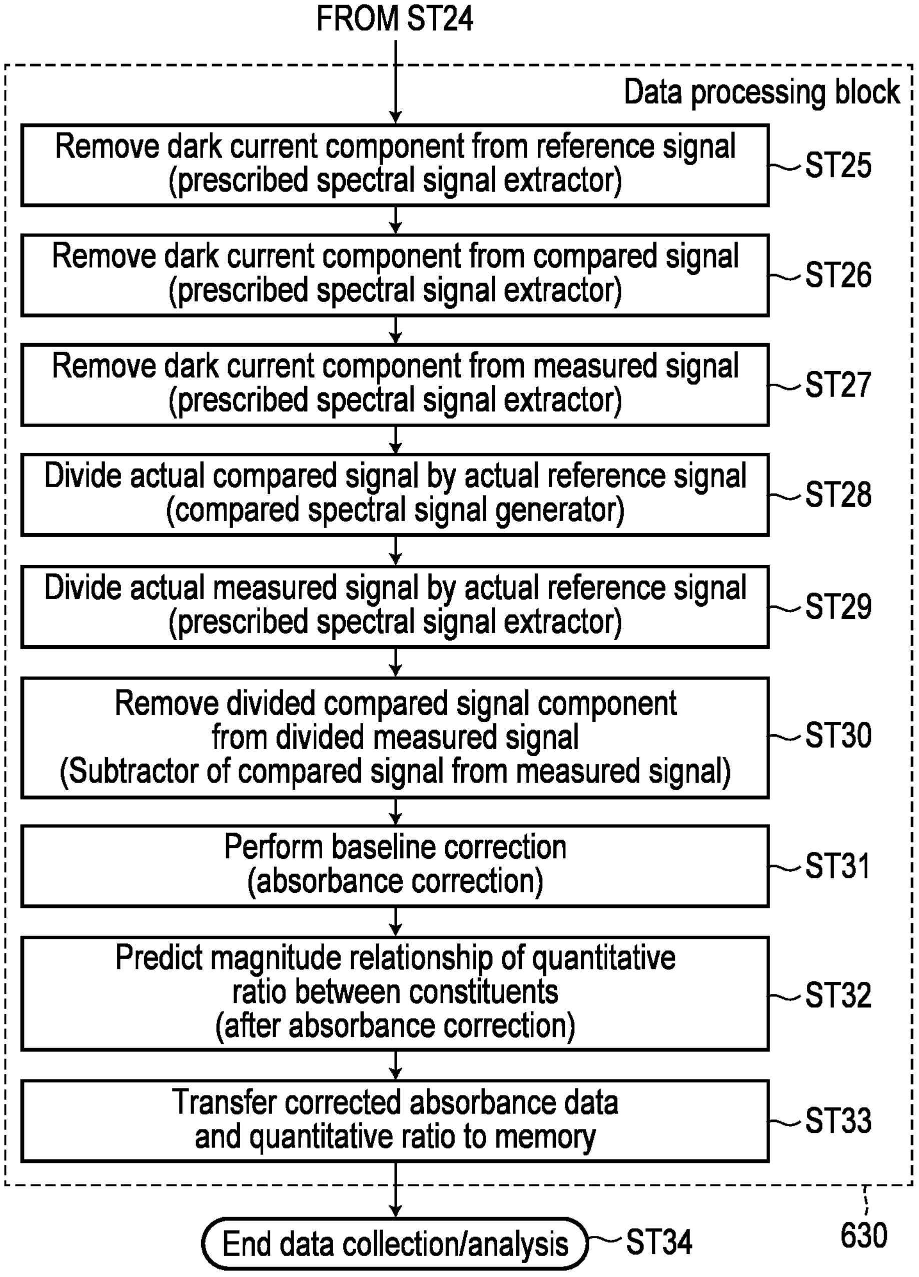
FIG. 93 shows a basic processing method leading to information extraction on spectral data in the present embodiment.

FIGS. 92 and 93 show a method for measuring/extracting high-precision information while removing the effect of optical disturbance noise from a broadly defined solvent. FIGS. 90 and 91 show a measurement/analysis method for the measured object 22 that do not contain water. However, in the case of being significantly affected by the light absorption characteristics of the broadly defined solvent, it is necessary to measure the light absorption characteristics of the broadly defined solvent as a compared signal in advance and remove the effect of the optical disturbance noise generated thereby. In this case, it is necessary to add a processing step to the series of processing procedures shown in FIG. 91 to remove the effect of optical disturbance noise from the broadly defined solvent.

For example, it is necessary to measure in advance the effect of optical disturbance noise from the broadly defined solvent, such as the light absorption characteristics of pure water. When measuring the compared signal shown in step 23, a holder case with a broadly defined solvent in the setting area of compared signal providing object 1058 (FIG. 65 or 66) may be used. The spectral profile signal of the detection light 1100 obtained from the setting area of compared signal providing object 1058 is then measured.

Then, by dividing the actual compared signal by an actual reference signal (ST28) obtained by removing the dark current component from the compared signal obtained here (ST26), linear absorption ratio (or absorbance) information relating to the broadly defined solvent can be extracted 1004. Then, in step 30, the subtracter between measured spectral signal and compared spectral signal 684 (FIGS. 40 and 41) performs the removal processing of the compared signal component after the division from the measured signal after the division. In this signal processing (data processing) of step 30, the effect of optical disturbance noise due to the broadly defined solvent is removed from the first light intensity loss signal (measured signal after division). In this signal processing (data processing) of step 30, the linear absorption ratio (or absorbance) information relating to the broadly defined solvent corresponds to the first extracted information, and the light intensity loss signal obtained by utilizing this first extracted information to remove the effect of only the optical disturbance noise from the broadly defined solvent corresponds to tentative second extracted information.

In the explanation of the processing flow in FIGS. 92 and 93, for convenience of explanation, the method of removing the effect of optical disturbance noise from the broadly defined solvent was taken as an example. However, the compared signal is not limited to the broadly defined solvent, and the spectral profile signal obtained from any other constituent 1096 contained in the measured object 22 may correspond to the compared signal, as explained in FIG. 81.

Although FIGS. 92 and 93 describe the processing flow in a case where the compared signal can be measured in advance, there are many cases in which the compared signal cannot be measured in advance in general. For example, as explained in FIG. 32, this applies to the case where the spectral profile signal obtained from the blood vessel area 500 of a living human being is measured, and the effect of pure water included in the blood is removed from the measurement results. In such a case where it is difficult to measure the compared signal at the same time as the measured signal, the compared signal stored in advance in the data base of compared spectral signal 698 (FIGS. 40 and 41) may be utilized.

Figure 94:
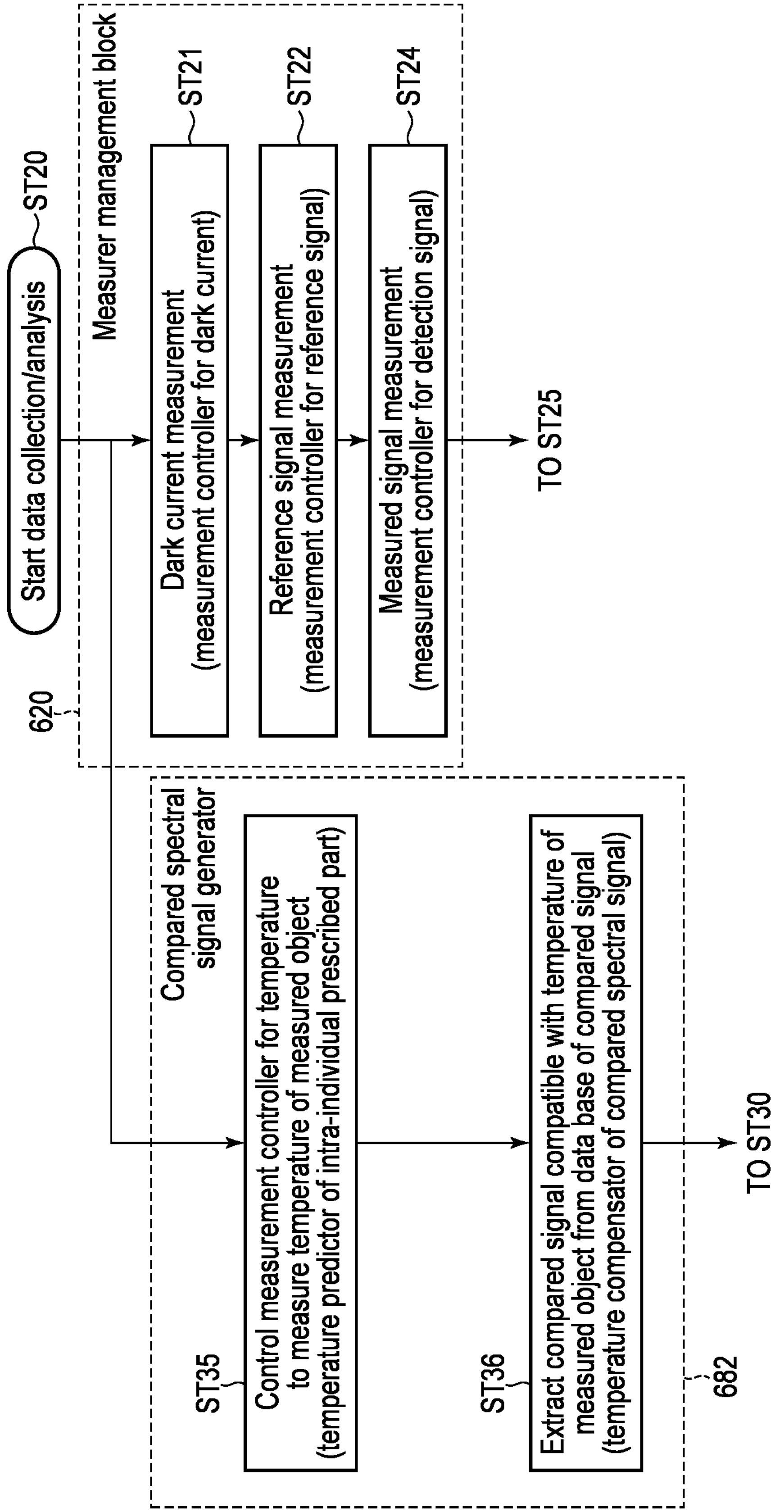
FIG. 94 shows another processing method leading to information extraction on spectral data in the present embodiment.
Figure 95:
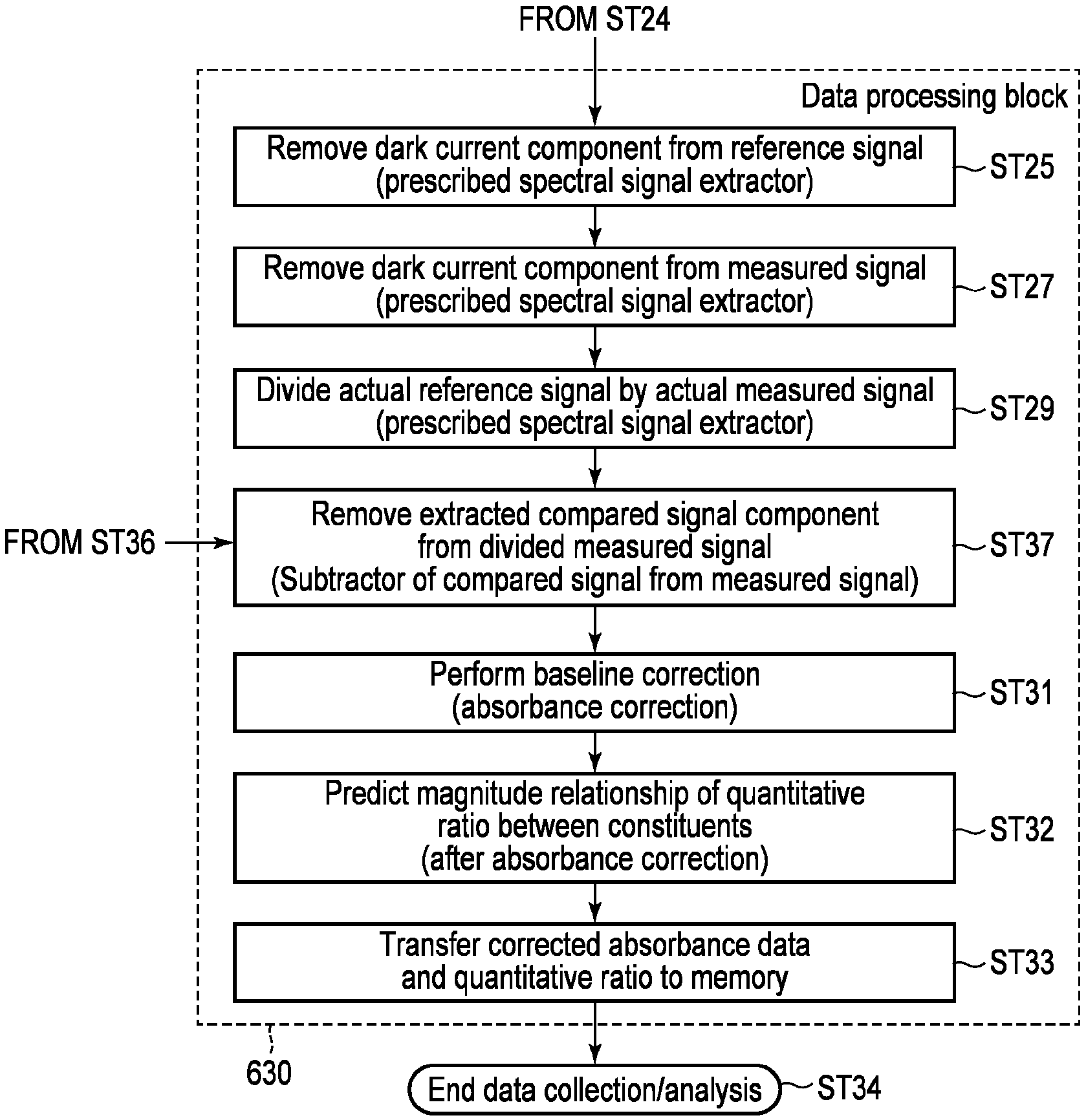
FIG. 95 shows another processing method leading to information extraction on spectral data in the present embodiment.

FIGS. 94 and 95 show an example of a method of removing the effect of optical disturbance noise by utilizing the compared signal stored in advance. FIGS. 94 and 95 basically utilize the common steps already described in FIGS. 90 and 91. Only the signal processing (data processing) steps that are added to the common steps already described in FIGS. 90 and 91 are described below. The compared spectral signal generator 682 (FIGS. 40 and 41) performs signal processing (data processing) utilizing this previously stored compared signal.

The absorbance information of pure water changes its characteristics based on the measured temperature. In the bodies of humans (and thermostatic animals), the body temperature is maintained at a constant level. However, as exemplified in FIG. 32, the temperature in the vicinity of the epidermis varies greatly depending on the environmental temperature. Therefore, the temperature predictor of intra-individual prescribed part 692 controls the measurement controller for temperature with far-infrared light (ex. thermography) 660 to measure the epidermis temperature to be measured in advance (ST35).

Then, in step 36, the temperature compensator of compared spectral signal 696 extracts a compared signal that is compatible with the measured temperature (epidermal temperature) from the data base of compared spectral signal 698. Then, in step 37, the subtracter between measured spectral signal and compared spectral signal 684 utilizes this extracted compared signal to remove the effect of optical disturbance noise from the measured signal after division.

Figure 96:
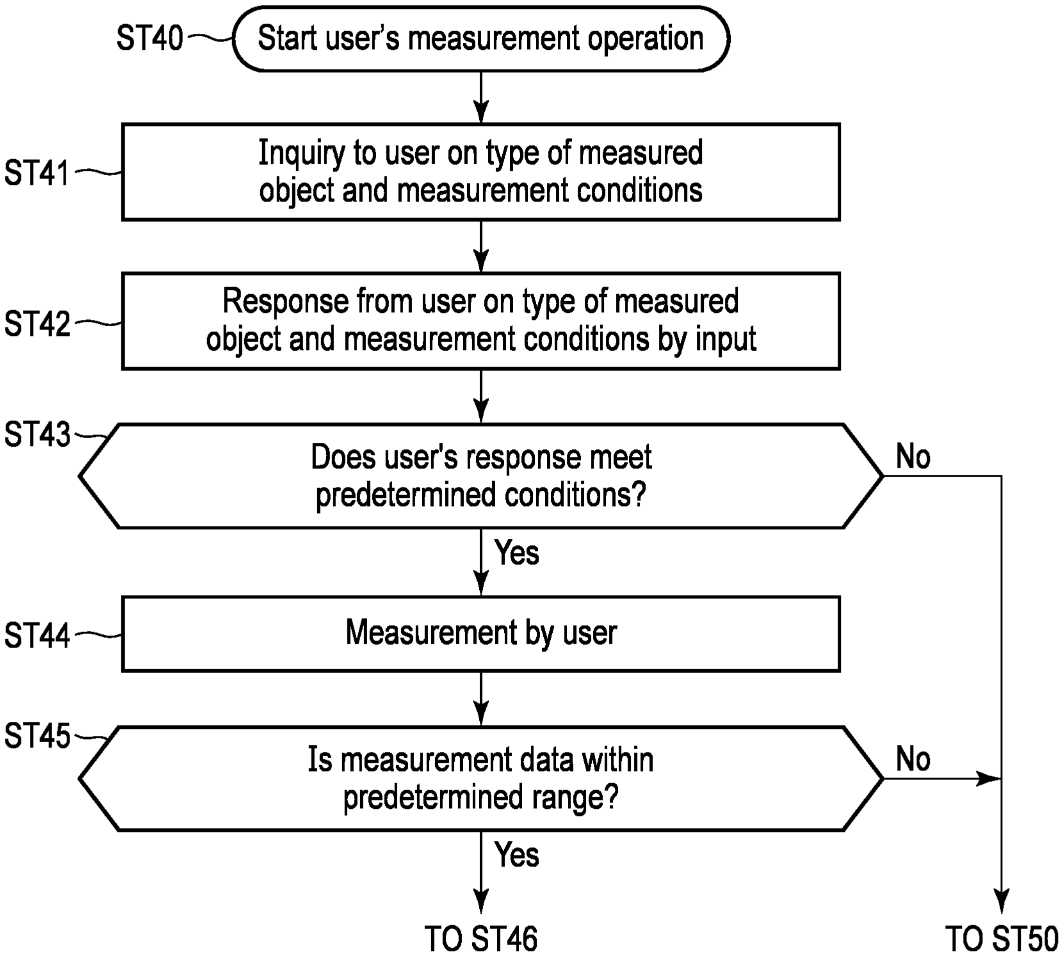
FIG. 96 shows a series of processing flows from a start of user's operation to notification of measurement/analysis/result in the present embodiment.
Figure 97:
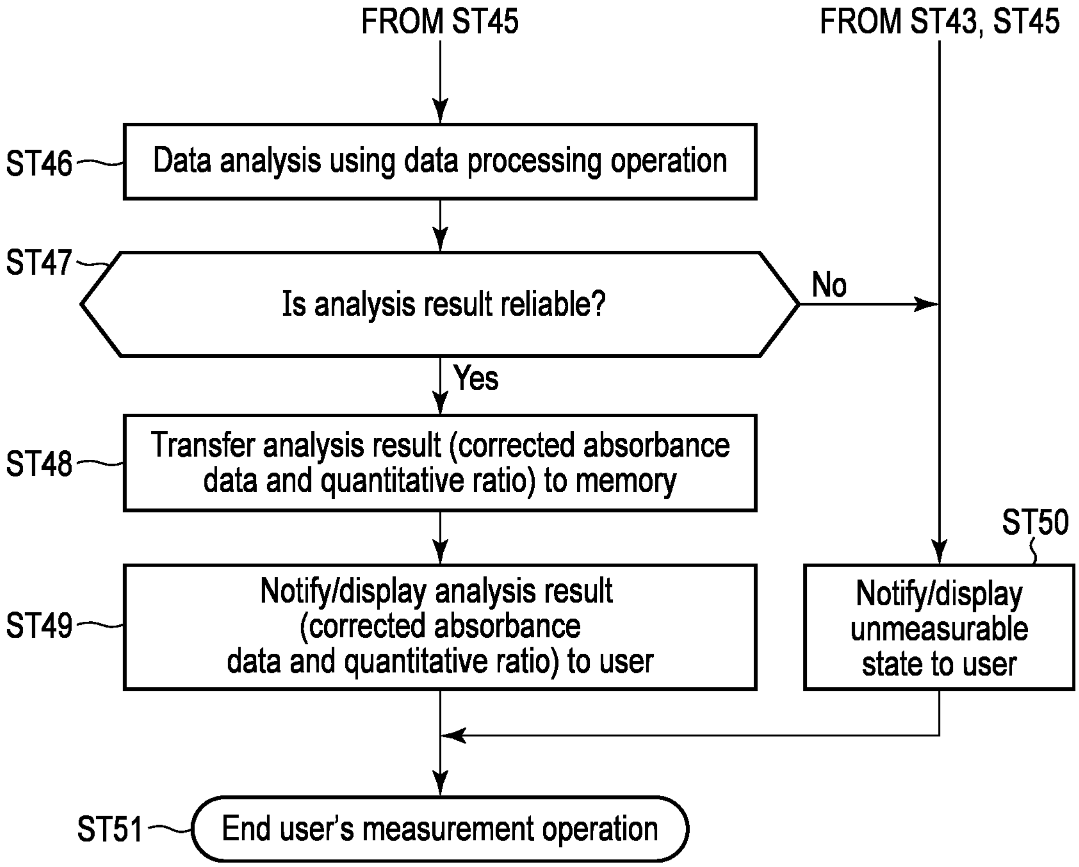
FIG. 97 shows a series of processing flows from a start of user's operation to notification of measurement/analysis/result in the present embodiment.

FIGS. 96 and 97 show an example of a user interface when measuring the measured object 22 and implementing the signal processing (data processing) described above. When the user starts the measurement operation in step 40, the light application device 10 asks the user for the type of measured object 22 and measurement conditions (ST41).

After the user's response regarding the type of the measured object 22 and the measurement conditions is input in step 42, the light application device 10 determines whether or not the user's response meets the predetermined conditions (ST43). Here, in the case where the predetermined conditions are not met, the user is notified of the unmeasurable state or notified thereof by display on the display 18 (ST50), and the measurement is ended (ST51). The calculation formulae described in FIG. 85 are set in accordance with a certain calculation model. Therefore, they are not universally applicable to all measurement environments. In a case where the signal processing (data processing) is forced in an inappropriate measurement environment, the accuracy of the absorbance (linear absorption ratio) information obtained will be greatly reduced. Thus, by determining the type of the measured object 22 and the measurement conditions before measurement, high accuracy of absorbance (linear absorption ratio) information can be guaranteed.

After the user's measurement data is obtained in step 44, it is determined whether or not the measurement data is within a predetermined range (ST45). In the case where it is not within the predetermined range, the user is notified of the impossibility of measurement or is notified by display on the display 18 (ST50), and the measurement is ended (ST51). In the case where the light intensity of the detection light 1100 obtained from the measured object 22 is significantly reduced, the measurement accuracy is reduced. By determining the content of the measurement data (magnitude and characteristics of the measurement data) in this manner, high accuracy of absorbance (linear absorption ratio) information can be guaranteed.

In the next step 46, data analysis (signal analysis) is performed using the signal processing (data processing) operations described in FIGS. 90 to 93 or FIGS. 94 and 95. The information (processing or analysis results) obtained here is then evaluated to determine whether the analysis results are reliable or not (ST47).

After removal of the effect of optical disturbance noise of the broadly defined solvent, features such as:

A] changes in the amount of light intensity loss near the measurement wavelength of 1.45 μm are small; and B] the amount of light intensity loss at the measurement wavelength of 1.45 μm is in the vicinity of the "smooth curve" described above can be observed.

After the baseline correction, features such as:

A] the maximum value of absorbance in the first overtone area (1.35 μm to 1.8 μm wavelength range) is larger than the maximum value of absorbance in the 0.90 μm to 1.35 μm wavelength range (or 0.95 μm to 1.25 μm wavelength range); and B] in the 0.90 μm to 1.35 μm wavelength range (or the 0.95 μm to 1.25 μm wavelength range), the corrected baseline is almost uniform can also be observed.

Therefore, the reliability of the analysis results can be evaluated by the presence or absence of the above features. Therefore, in the case where the above features do not appear in the results of each signal processing (data processing/data analysis), it is considered that the "analysis results are unreliable", and the user is notified of the impossibility of measurement or is notified by display on the display 18 (ST50), thereby ending the measurement (ST51). By addition of this determination, high accuracy of the analysis results can be guaranteed.

In a case where the analysis results is determined to have high reliability, the analysis results are transferred to the collected information manager 74 (ST48), and the results are displayed or notified to the user using the display 18. As the contents of this information to be displayed/notified to the user, a graph of absorbance (linear absorption ratio) described on the left side of FIG. 89 may be displayed, or a large/small relationship of the content ratio for each constituent on the left side of FIG. 89 may be displayed (including the color display described above).

[Chapter 15: Electrical Disturbance Noise Reduction Method]

The previous chapters have described methods for reducing the effects of optical disturbance noise. However, in the case of aiming for high-precision measurement, it is also important to reduce electrical disturbance noise. In this Chapter 15, methods of reducing electrical disturbance noise will be mainly described. The electrical disturbance noise reduction method described in this Chapter 15 may be used alone or in combination with the optical disturbance noise reduction method described in the previous chapters. Higher precision measurements are possible when the electrical disturbance noise reduction method is used in combination with the optical disturbance noise reduction method.

The electrical disturbance noise reduction method described in this Chapter 15 basically performs the "second information extraction 1000 by utilizing the extracted first information to reduce the disturbance noise" described in FIG. 46. Here, the disturbance noise to be reduced utilizing the first information may be the optical disturbance noise or the electrical disturbance noise, as shown in FIG. 49.

As already explained in FIG. 49, the method of reducing electrical disturbance noise is not limited to bandwidth control E1 of the detected signal, but also includes various methods such as lock-in amplification E2 and digitized error correction E3. Among them, this Chapter 15 focuses on lock-in amplification E2. However, the example of the present embodiment is not limited thereto, and any other method of performing the "second information extraction 1000 by utilizing the extracted first information to reduce the disturbance noise" may be adopted. As an implementation form of the method of reducing electrical disturbance noise described in this Chapter 15, it may be configured only by hardware (electronic circuits), or may be realized at least in part by software (programs). Alternatively, it may be a combination of hardware and software, or hardware and software (program) may each be assigned for each function.

In addition, as the signal form obtained by the measurer 8 or the signal receptor 40 in the example of the present embodiment, spectral profile signals with data for each measurement wavelength or image signals with data for each pixel in the imaging sensor 300, and data cubes with individual spectral profile signals for each pixel in the imaging sensor 300 will be mainly described. However, it is not limited thereto, and may be applied to any signal, for example, time-series (time-varying) data obtained from a photodetector configured only by one photodetector cell.

Figure 98:
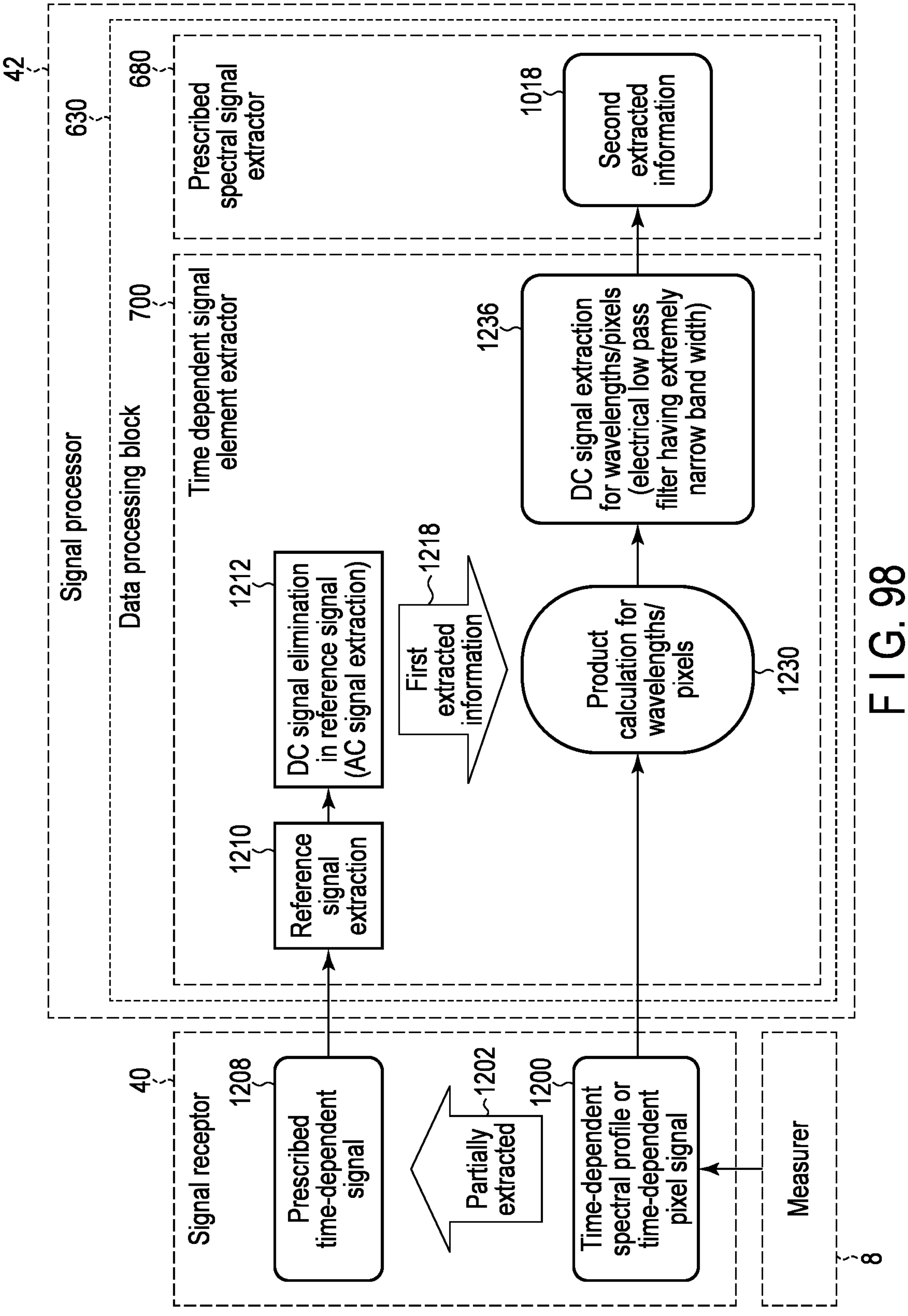
FIG. 98 shows a basic data processing method in the present embodiment for spectral profiles or image signals that change in time series.

FIG. 98 shows an example of the present embodiment. In the example of the embodiment in FIG. 98, first extracted information 1218 is extracted from the measured signal obtained from the measurer 8 (or signal receptor 40). A time-dependent spectral profile or time-dependent pixel signal 1200 and data cube signals obtained from the measurer 8 in the light application device 10 are transferred to the signal receptor 40. As information extraction 1004 within the signal receptor 40, a prescribed time-dependent signal 1208 is partially extracted (prescribed selection) 1202 from this input signal.

The prescribed time-dependent signal 1208 partially extracted (prescribed selection) 1202 in the signal receptor 40 is transferred to the signal processor 42. In the signal processor 42, reference signal extraction 1210 is performed utilizing the above prescribed time-dependent signal 1208. Furthermore, a DC signal included in this reference signal is eliminated 1212, and only the form of an AC component is utilized as the first extracted information 1218.

In parallel, the time-dependent spectral profile or time-dependent pixel signal 1200 and data cube signals transferred from the signal receptor 40 to the signal processor 42 are multiplied 1230 with the above first extracted information 1218. Here, in a case where the signal transferred to the signal processor 42 is a time-dependent spectral profile signal, multiplication is performed for each measurement wavelength. In a case where the signal transferred to the signal processor 42 is a time-dependent pixel signal, multiplication is performed for each pixel. In a case where a data cube signal is transferred, multiplication is performed for each measurement wavelength in each pixel.

As a result of this multiplication, a time-dependent DC signal extraction for each wavelength or each pixel 1236 is performed by a low pass filter having an extremely narrow bandwidth, and the second information extraction 1018 is generated in the prescribed spectral signal extractor 680. As another method of processing the result of this multiplication, bandwidth control may be performed to extract only carrier components E1 corresponding to the first extracted information 1218. However, if only the DC signal is extracted by the lock-in amplification E2 rather than by the carrier component extraction E1 based on bandwidth control, the DC signal extraction effect becomes higher and the accuracy of the second extraction information 1018 improves.

The basic principle of the lock-in amplification E2 in the example of the present embodiment is explained below. When a reference signal waveform F(t) after DC signal removal, which is the first extracted information 1218 in FIG. 98, is Fourier sine expanded, it can be described as follows.

$$F(t)=\frac{1}{\sqrt{2\pi}}\int_{v\neq 0} f(v)\sin\{2\pi v[t+\alpha(v)]\}dv \qquad \text{Equation 30}$$

α(ν) in the Equation 30 represents a phase component for each frequency ν. From the features of the first extracted information 1218, the relationships of Equations 31 and 32 are established.

$$f(0)=0 \qquad \text{Equation 31}$$

$$\frac{1}{T}\int_{-T/2}^{T/2} F(t)dt=0 \qquad \text{Equation 32}$$

Time-series data for each measurement wavelength in the time-dependent spectral profile signal 1200, or time-series data for each pixel in the time-dependent pixel signal 1200 and time-series data for each measurement wavelength in each pixel in the data cube signal 1200 transferred from the signal receptor 40 to the signal processor 42 are described as follows.

$$K(t)=kF(t)+\frac{1}{\sqrt{2\pi}}\int_{v\neq 0} N(v)\{2\pi v[t+\beta(v)]\}dv+P \qquad \text{Equation 33}$$

As shown in Equation 33, each time-series data contains an electrical disturbance noise component N(ν) and a DC signal P. Here, the unknown coefficient k in Equation 33 corresponds to the measurement information to be calculated by data analysis. Then, when utilizing the sum-of-products formula for trigonometric functions, $$\sin A\times\sin B=\cos(A-B)-\cos(A+B) \qquad \text{Equation 34}$$

the result of multiplication 1230 between each time-series data and the reference signal waveform F(t) after removing the DC signal is calculated as follows.

$$F(t)\times K(t)=k\int_{v\neq 0} f^2(v)dv+PE(t) \qquad \text{Equation 35}$$

Then, the result of extracting only the time-series DC signal for each wavelength or each pixel from the multiplication result 1230 is given as follows.

$$\frac{1}{T}\int_{-T/2}^{T/2} F(t)\times K(t)dt=k\int_{v\neq 0} f^2(v)dv \qquad \text{Equation 36}$$

This allows the value of the unknown coefficient k corresponding to the measurement information to be obtained with high accuracy.

As an example of the first extracted information 1218 or the second extracted information 1018 obtained in FIG. 98, a wide variety of information described in specific example 1024 in FIGS. 47 and 48 can be extracted 1004. Since it is easier to understand the measurement example by focusing on specific examples, for the sake of convenience, the first extracted information 1218 will be described as corresponding to pulse rate (respiratory rate) ε1, and the second extracted information 1018 will be described as corresponding to blood-sugar level (sugar content rate in urine) δb1 and specific substance content rate in blood δb2. However, the example of the present embodiment is not limited thereto, and can be adapted to any technique that utilizes the first extracted information 1218 to obtain the second extracted information 1018.

Blood flow value in the body varies over time according to pulse rate ε1. An example of changes in normal blood flow value in response to a heartbeat is shown in the upper part of FIG. 99. In the case where this waveform of changes in blood flow value shows a different waveform than that of the upper part of FIG. 99, it indicates an irregular pulse and shows that there is some abnormal tendency in the circulatory system.

Blood contains a large amount of water. As explained in FIG. 30, the absorbance of pure water shows a maximum value near the wavelength of 1.45 μm. Therefore, as the blood flow value in the body increases or decreases, the amount of light absorbed at the wavelength near 1.45 μm within the blood vessel area 500 changes. From this time-series change in the amount of light absorption, changes in the blood flow value in response to a heartbeat can be measured. However, in order to measure blood flow value changes with high precision, it is necessary to eliminate the effects of optical disturbance noise described in the previous chapters. If blood flow value changes can be measured with high accuracy, signs of abnormalities in the circulatory system, such as an irregular pulse, can be detected at an early stage.

Furthermore, a constituent signal in the blood (after removing the effect of water) in response to the pulse rate change ε1 is obtained as a time-varying signal. Therefore, temporal changes in the amount of light absorption near the wavelength of 1.45 μm (time-dependent signal) is utilized for the first extracted information 1218 as pulse rate information ε1, and the second extracted information 1018 is obtained by lock-in amplification E2 according to the frequency and phase of this first extracted information 1218.

By performing baseline correction on this second extracted information 1018 after removing the effect of optical disturbance noise caused by water as explained in the previous chapter, absorbance information corresponding to the constituents 988 in blood is obtained. Furthermore, necessary feature information can be extracted 1004 from this absorbance information. For example, if only the sugar content ratio 996 shown in FIG. 89 is extracted, blood-sugar level δb1 can be predicted. At the same time, the user's psychological state (degree of tension or excitement) can also be predicted to some extent from the temporal changes of the other specific substance content rate in blood δb2. Here, the prediction of the user's psychological state from the temporal changes of the specific substance content rate in blood δb2 is performed by the property analyzer and data processor 62 in the light application device 10. The results may then be processed at an appropriate portion in the applications 60, leading to the provision of user-related services.

Figure 99:
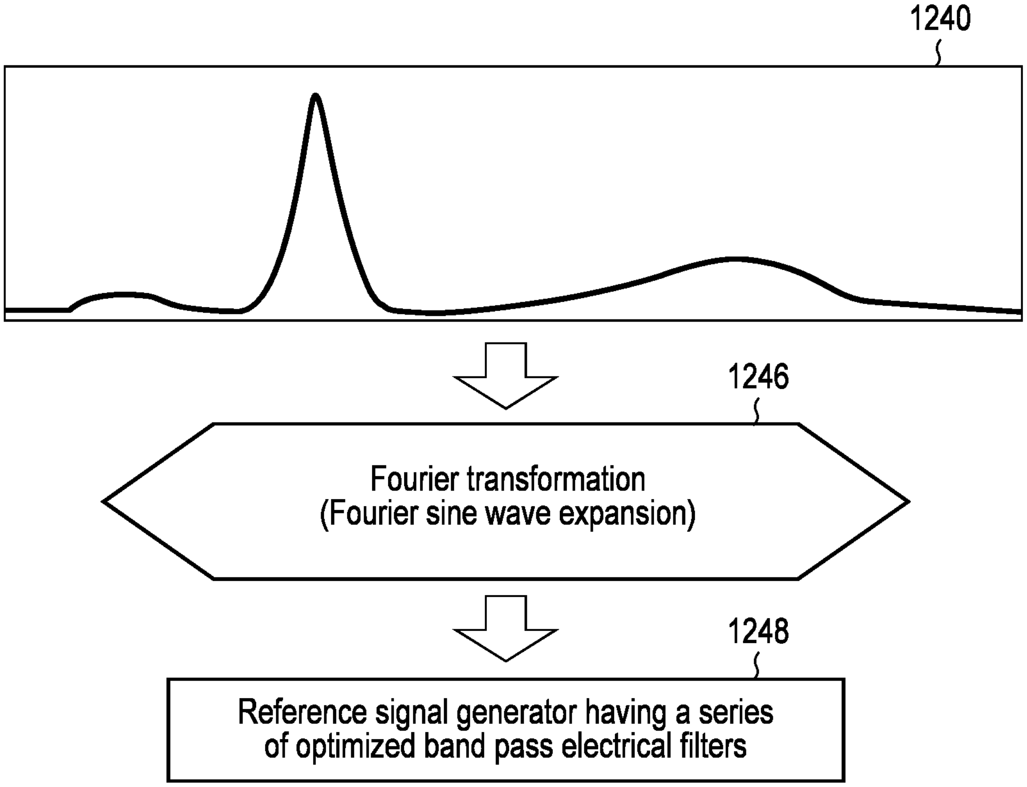
FIG. 99 is an explanatory diagram of a method for generating multiple parallel band-pass filters used for reference signal extraction.

FIG. 99 shows an example of the extraction method of the first extracted information 1218 corresponding to the pulse rate ε1 as an example of the present embodiment. As shown in the upper part of FIG. 99, a time-series variation signal of the blood flow value corresponding to a heartbeat is measured in advance. This time-series variation signal of the blood flow value is then Fourier transformed (Fourier sine wave expansion) 1246, and the Fourier coefficients for each frequency ν are calculated. The results of this Fourier coefficient calculation are then utilized to design a reference signal generator having a series of optimized band pass electrical filters 1248. Next, the results of the reference signal generator having a series of optimized band pass electrical filters 1248 are fed back to a section that eliminates the DC signal included in the reference signal 1212 (FIG. 98).

By performing this presetting, the first extracted information 1218 can be extracted 1004 in real time from the signal obtained from the measurer 8 with high accuracy. The second extracted information 1018 can then be extracted 1004 in accordance with the frequency and phase of this first extracted information 1218.

The reference signal generator having a series of optimized band pass electrical filters 1248 in FIG. 99 is not limited to one type, and multiple types may be switched according to the measurement conditions. That is, by flexibly switching the reference signal generator having a series of optimized band pass electrical filters to be used according to the light intensity of the detection light 1100 obtained from the measured object 22 (that is, according to the length of one measuring period 1258 described below), the accuracy of information extraction 1004 relating to the first extracted information is improved (details are described below).

Figure 100:
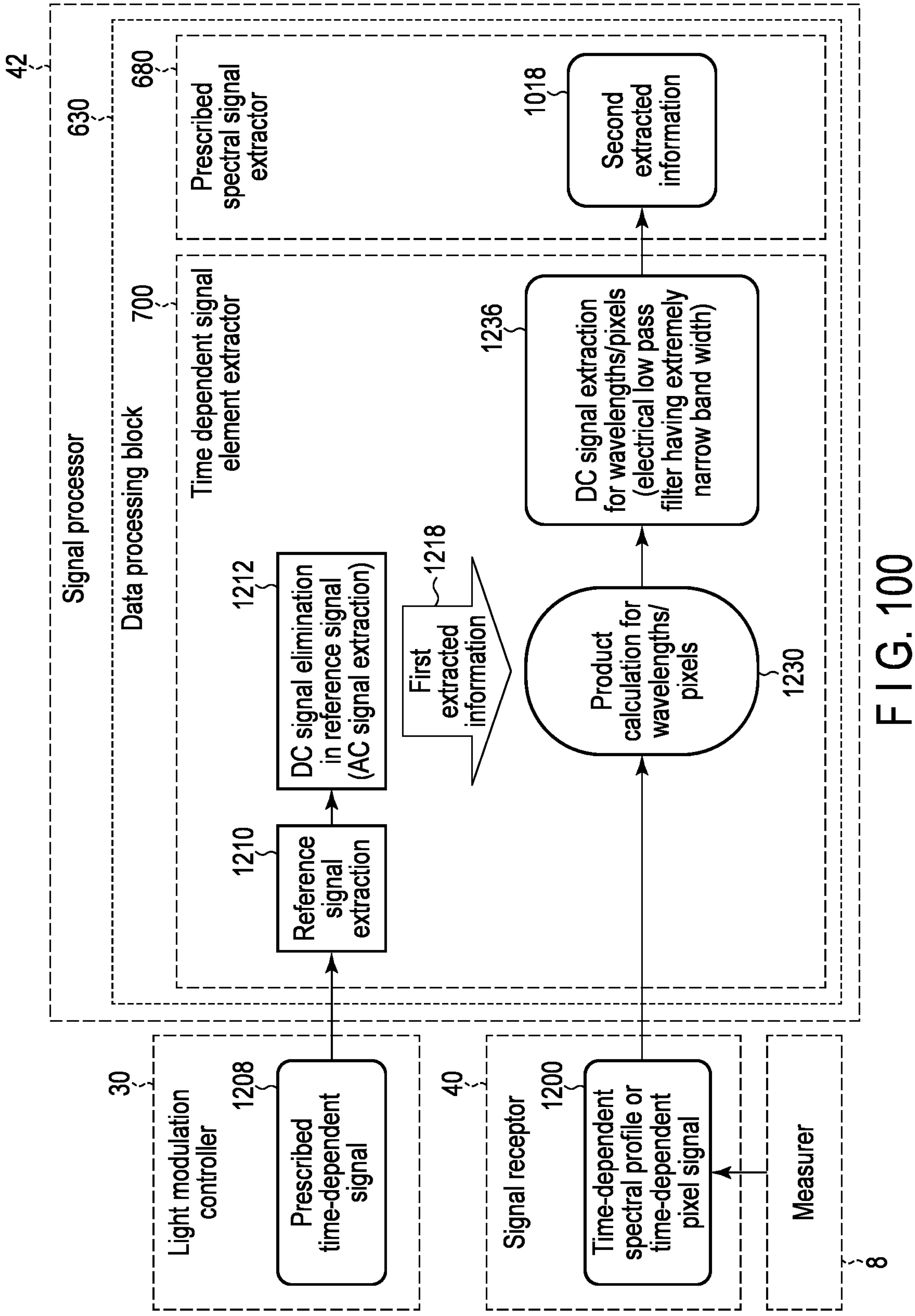
FIG. 100 shows another embodiment relating to a data processing method for spectral profiles or image signals that change in time series.

FIG. 100 shows another example of the present embodiment that is capable of reducing electrical disturbance noise. In FIG. 98, the first extracted information 1218 was extracted 1004 from the measured signal from the measurer 8. In comparison, in the other embodiment example of FIG. 100, the first extracted information 1218 is extracted 1004 from the prescribed time-dependent signal 1208 obtained from a light modulation controller 30.

For example, in a case where the lamp 472 such as a halogen lamp is used as the light emitter 470 in the light source 2, it is difficult to switch the emitted light intensity from the lamp 472 in a pulsed manner at high speed. Therefore, in this case, a relatively slow waveform, such as a sine wave with a reference frequency in the range of 70 Hz to 800 kHz, for example, may be used to modulate the emitted light intensity. When the emitted light intensity is modulated with a non-rectangular waveform (smooth waveform) within the above frequency range, waveform distortion is less likely to occur and accurate first extracted information 1218 is easier to obtain.

The optical interference noise, which is one of the disturbance noise mechanism 1036, is also generated by causes other than inside the measured object 22 or the light propagation path 6. In Chapter 12 and earlier, an example of a method for generating irradiated light 1190 in which optical interference noise is less likely to occur was explained. However, if highly interfering light such as laser light is mixed into the irradiated light 1190, the optical interference noise will increase due to the effect of the light.

For example, in a case where measurement is performed in an environment where disturbance light is likely to mix as shown in FIG. 31, the measurement accuracy is greatly reduced due to the influence of the disturbance light. In this case, by adding modulation in the manner described above to the light intensity of the synthesized light 230, which is emitted from the light source 2 and is unlikely to generate optical interference noise, and extracting 1004 only the signal component corresponding to the modulated light as the second extracted information 1018 as shown in FIG. 100, the measurement accuracy is greatly improved. In this manner, the modulated light, which can reduce optical interference noise, may be irradiated to the measured object 22 to remove the effect of disturbance noise from conventional light that is mixed in as disturbance light.

Figure 101:
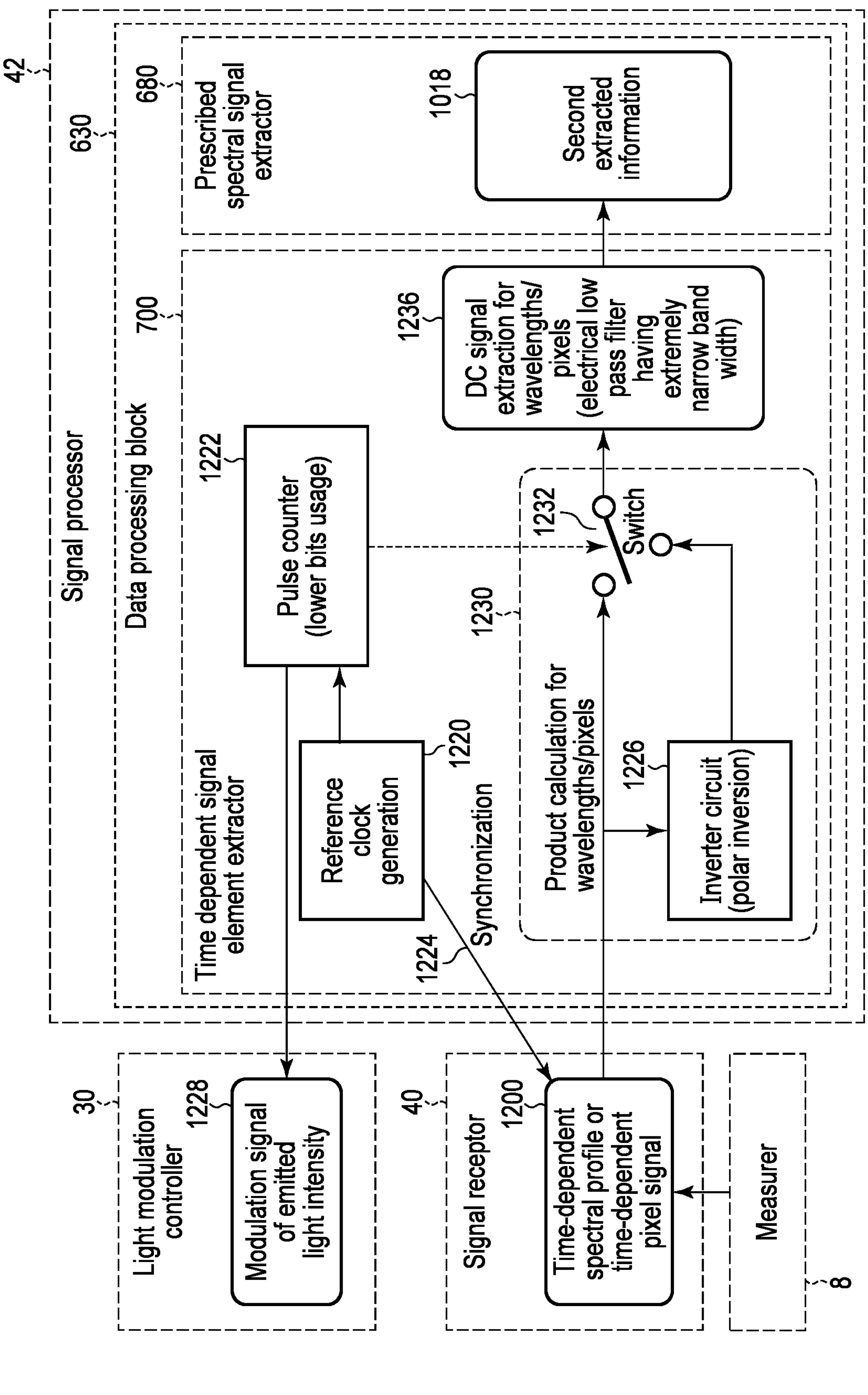
FIG. 101 shows an application example relating to the data processing method for spectral profiles or image signals utilizing exposure by pulse light emission.

As an example of an applied embodiment of FIG. 100, FIG. 101 shows a method of reducing electrical disturbance noise by irradiating the measured object 22 with pulsed light. As the light emitter 470 of this pulsed light, an LED light emitter 452 capable of a high-speed response may be used, as described below in FIG. 110. A modulation signal of emitted light intensity 1228 transmitted from the signal processor 42 to the light modulation controller is a rectangular pulse waveform.

In the example of the applied embodiment shown in FIG. 101, a reference clock is generated 1220 at the extractor of time dependent signal element 700 in the data processing block 630. In a pulse counter 1222, one pulse is generated each time a predetermined pulse of the above-described reference clock 1220 is generated. The pulse output by the pulse counter 1222 is utilized as the first extracted information 1218. This first extracted information 1218 is used as the modulation signal of emitted light intensity 1228 in the light modulation controller 30, and the light intensity of the irradiated light 1190 to the measured object 22 changes to a rectangular pulse shape according to this modulation signal of emitted light intensity 1228. This first extracted information 1218 (output pulse of the pulse counter 1222) is also simultaneously transferred to a multiplication circuit for wavelengths/pixels 1230. Thus, in the example of the applied embodiment in FIG. 101, the same first extracted information 1218 is used for multiple purposes simultaneously.

The time-dependent spectral profile or time-dependent pixel signal 1200 and data cube signals obtained from the measurer 8 are detected in synchronization 1224 with the reference clock 1220 generated in the extractor of time dependent signal element 700, and are transferred to the multiplication circuit for wavelengths/pixels 1230 in the extractor of time dependent signal element 700.

The first extracted information 1218 in the examples of embodiments described in FIG. 100 and earlier all had non-rectangular (not pulse waveforms, but relatively continuous and smoothly changing) waveforms. Therefore, a complex multiplication operation shown in Equation 35 was necessary. In contrast, in the case where the first extracted information 1218 has a pulsed rectangular waveform as in FIG. 101, the multiplication circuit for wavelengths/pixels 1230 can be configured by a very simple circuit.

This multiplication circuit for wavelengths/pixels 1230 is configured only by an inverter (polar inversion) circuit 1226 and a switch 1232. The signal polarity sent to a time-dependent DC signal extraction circuit for wavelengths/pixels (low pass filter having an extremely narrow bandwidth) 1236 is switched according to the first extracted information 1218 provided by the pulse counter 1222 (signal polarity switching synchronized with the first extracted information 1218 is described below).

Note that, the example of the applied embodiment shown in FIG. 101 may be used for length measurement and 3D image measurement (3D video measurement). Since light propagates through air at a speed of approximately $3\times10^8$ m/s, the light travels approximately 30 cm in a 1 nS pulse width period. The distance to the measured object 22 can be measured by measuring the time it takes for the light reflected from the surface of the measured object 22 located far away to return. For example, if a pulse with a pulse width of 1 nS and a duty ratio of 50% is used as the reference clock 1220, and the change in reflected light intensity according to a pulse count value 1222 is measured, length can be measured with a spatial distance resolution of 30 cm. Furthermore, if the reflected light from the measured object 22 is measured as an image signal with the imaging sensor 300, 3D image measurement (3D video measurement) becomes possible.

Specifically, the above reference clock 1220 is fixed, and a pulse light intensity (modulation signal of emitted light intensity) 1223 from the light modulation controller 30 is controlled at intermittent timing according to the pulse count value 1222. At the same time, the output signal 1200 for each pixel from the imaging sensor 300 is synchronized with the above reference clock 1220 and transmitted to the extractor of time dependent signal element 700.

The length measurement method itself using laser pulses has been applied to light detection and ranging (RiDAR), which is used for automatic driving of cars. However, when conventional technology is used for image measurement, the speckle noise caused by the coherence of the laser beam greatly reduces the measurement accuracy. However, by using the spatial interference noise reduction method described in Chapter 12, highly accurate length measurement and 3D image (video) measurement become possible.

Figure 102:
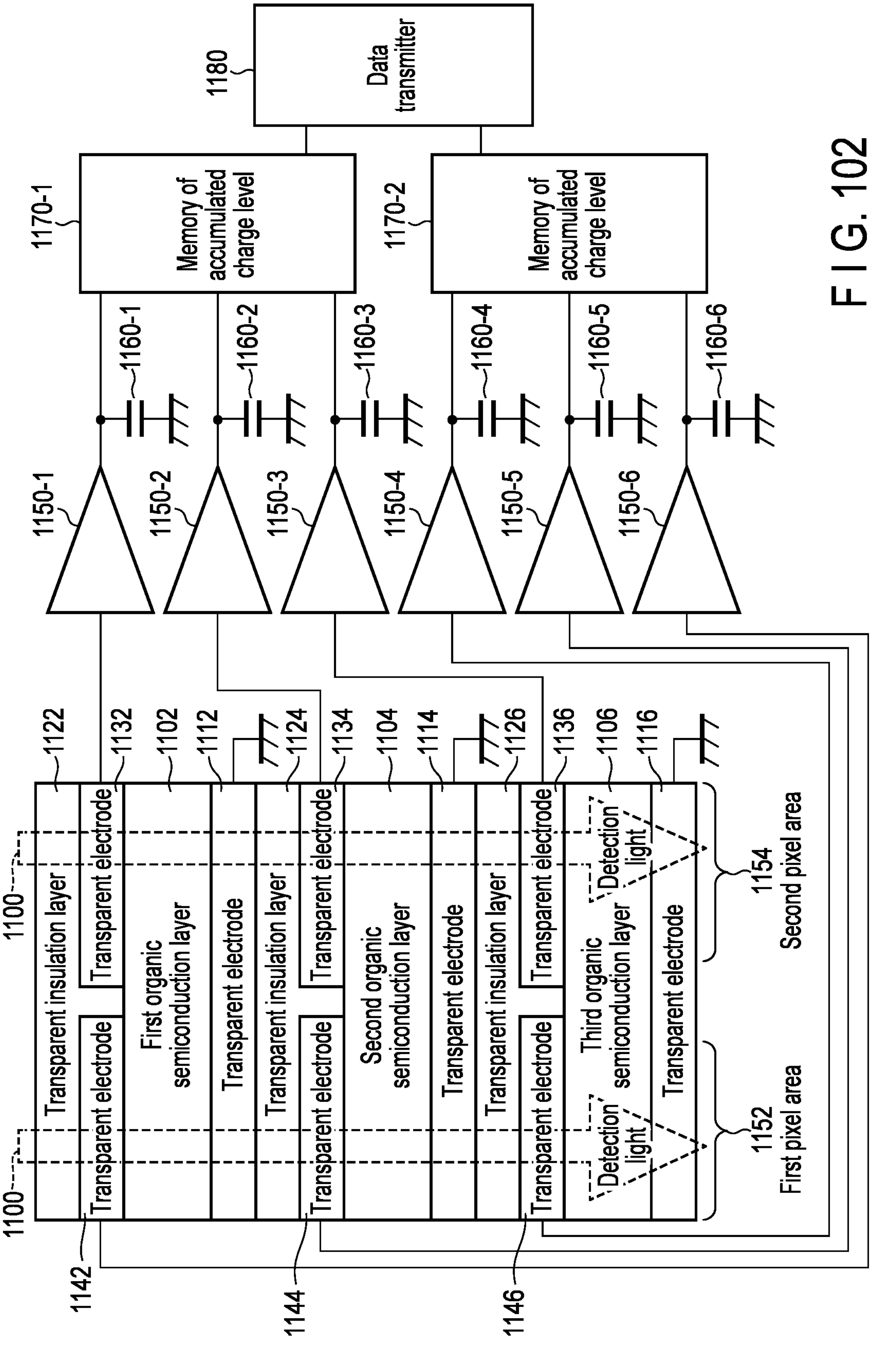
FIG. 102 is an explanatory diagram of features of a charge-storage type signal receptor.

FIG. 102 illustrates the features of a charge-storage type signal receptor 40. Most of the spectral profile signals, image signals, and data cube signals cannot be obtained continuously in time series, and are time-divided into measuring periods 1258 and data transmission periods 1254. That is, in the measuring period 1258, the measurement data is stored in a memory of accumulated charge level 1170. Then, in the data transmission period 1254, the accumulated data is transferred to the signal processor 42 via a data transmitter 1180.

FIG. 102 shows an example of the principle of generating spectral profile signals using organic semiconductors. Each organic semiconductor layer 1102, 1104, and 1106 has a different absorption wavelength for each detection light 1100. In other words, in the first organic semiconductor layer 1102, which is closest to the incident side of the detection light 1100, only the detection light 1100 in a certain wavelength range is absorbed. Only the detection light 1100 including light of other wavelengths that has escaped absorption in the first organic semiconductor layer 1102 passes through the first organic semiconductor layer 1102. The second organic semiconductor layer 1104 then absorbs the detection light 1100 in other wavelength ranges among the other wavelength light that escaped absorption by the first organic semiconductor layer 1102.

The organic semiconductor layers 1102, 1104, and 1106 are sandwiched between a pair of transparent electrodes, respectively, and transparent insulation layers 1124 and 1126 further partition between the transparent electrodes. Furthermore, the arrangement of the transparent electrodes defines pixel areas 1152 and 1154. That is, in the left drawing of FIG. 102, the left side forms the first pixel area 1152, and the right side forms the second pixel area 1154.

When detection light 1100 in a predetermined wavelength range is absorbed within the organic semiconductor layers 1102, 1104, and 1106, an electric charge is generated within the organic semiconductor layers 1102, 1104, and 1106, which is used as a detected signal. For example, when the detection light 1100 enters the left side within the first organic semiconductor layer 1102 and is absorbed within the first organic semiconductor layer 1102, an electric charge is generated within the first organic semiconductor layer 1102. Since a lower transparent electrode 1112 adjacent within the first organic semiconductor layer 1102 is connected to a ground line, the electric charge generated within the first organic semiconductor layer 1102 enters a preamplifier 1150-6 via a transparent electrode 1142.

The electric charge entering the preamplifier 1150-6 is stored in a capacitor 1160-6 for a predetermined period (during the measuring period 1258). Thus, as a feature of the charge-storage type signal receptor 40, electric charge is continuously stored in the capacitor 1160-6 within the predetermined period (during the measuring period 1258).

The charge level in the capacitor 1160-6 is transferred to a memory of accumulated charge level 1170-2 at the end of the predetermined period, and then is discharged. Thereafter, the charge is again stored in the capacitor 1160-6 during the next predetermined period (during the measuring period 1258).

For example, in a case where the detection light 1100 is separated for each measurement wavelength using a spectral component (brazed grating) 320 as in FIG. 7, 37, or 80, a line sensor or a two-dimensional array sensor is used for the imaging sensor 300. Even in this case, as in FIG. 102, the measured signal is output by time division into the measuring period 1258 and the data transmission period 1254.

Therefore, in the example of the present embodiment, a detection signal bandwidth control method E1, a lock-in amplification method E2, and an error correction method for digitized signals E3, which are suitable for measured signals that are time-divided into the measuring period 1258 and the data transmission period 1254 are provided. Especially, in the case of performing measurement using weak detection light 1100, the measuring period 1258 becomes relatively long, and the measurement accuracy using bandwidth control E1 or lock-in amplification E2 is easily degraded. In particular, in the case of extracting information 1004 of the first extracted information 1218 from the time-dependent spectral profile or time-dependent pixel signal 1200 and data cube signals obtained from the measurer 8 as illustrated in FIG. 98, the extraction accuracy of the first extracted information 1218 is easily degraded when the measuring period 1258 becomes relatively long.

Figure 103:
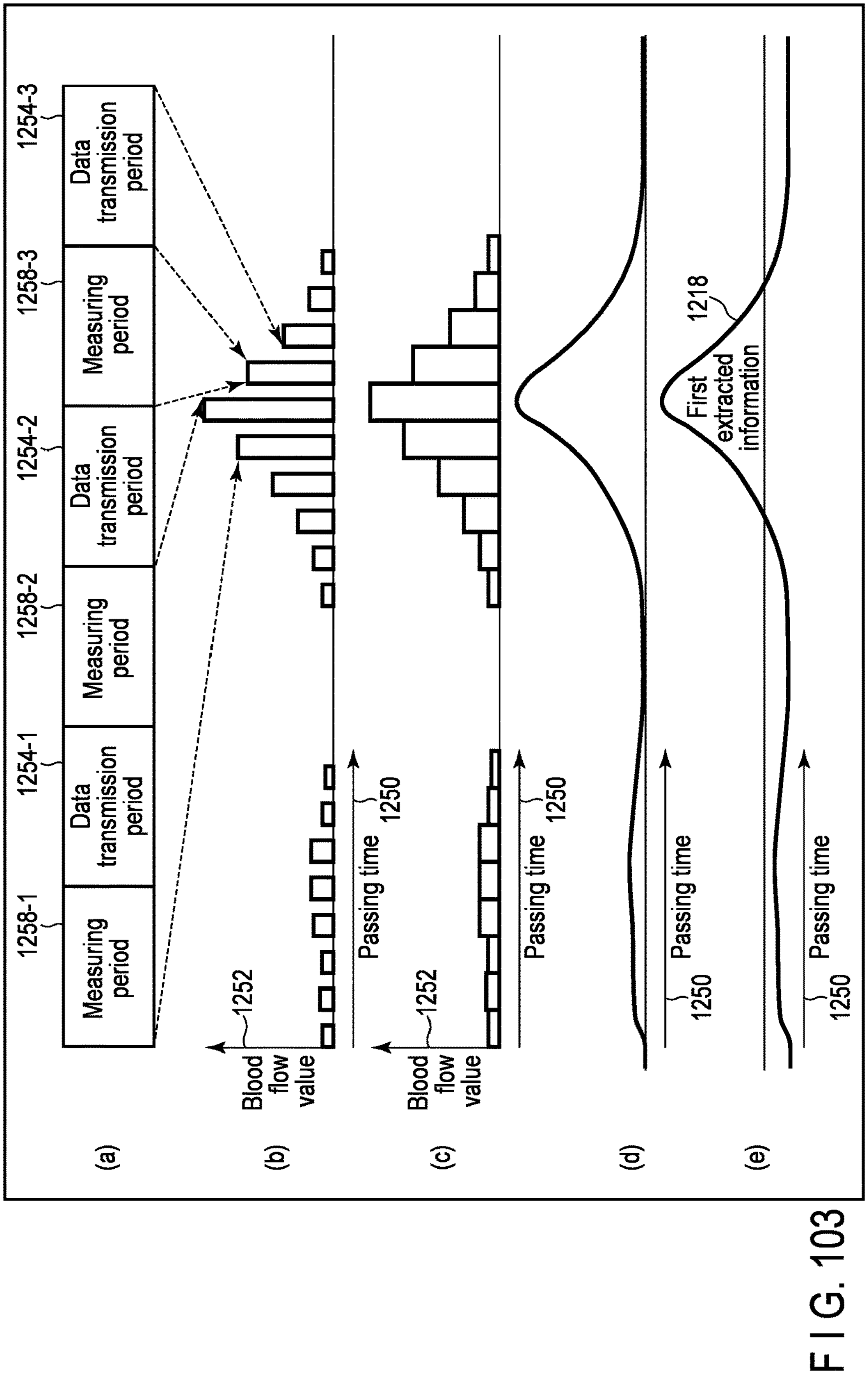
FIG. 103 is an explanatory diagram of an example of signal processing (data processing) leading to reference signal generation after DC component removal.

FIG. 103 shows a method of extracting information 1004 of the first extracted information 1218 with good accuracy for a relatively long measuring period 1258. As shown in portion (a) in FIG. 103, a measured signal in which the measuring period 1258 and the data transmission period 1254 are time-divided enters the signal processor 42. Portion (b) in FIG. 103 shows an example of a time-divided measured signal form sent from signal receptor 40. In portion (b) in FIG. 103, an example of the detected light intensity (blood flow value 1252) at a wavelength near 1.45 μm is taken on the vertical axis to match the upper part of FIG. 99.

As shown in portion (b) in FIG. 103, within the data transmission period 1254, no measured signal can be obtained at the charge-storage type signal receptor 40. Therefore, portion (b) in FIG. 103, only a staircase-shaped measured signal is intermittently obtained. For this intermittently staircase-shaped measured signal, the signal processor 42 serializes the intermittent measured signal using a sample-and-hold method, as shown in portion (c) in FIG. 103. At this stage, although the measured signal is continuous, it changes discontinuously in a staircase-shaped manner as shown in portion (c) in FIG. 103.

The reference signal generator having a series of optimized band pass electrical filters described in FIG. 99 is used to smooth the measured signal that changes discontinuously in a staircase-shaped manner in portion (c) in FIG. 103. Portion (d) in FIG. 103 shows an example of the smoothed measured signal waveform. When the reference signal generator having a series of optimized band pass electrical filters 1248 is optimally designed as explained in FIG. 99, the information extraction 1004 accuracy of the first extracted information 1218 is improved. In particular, as the light intensity of the detection light 1100 obtained from the measured object 22 decreases, the temporal length of the measuring period 1258 increases accordingly. Then, the amount of step difference between adjacent flat portions of the staircase-shaped measured signal after the sample-and-hold shown in portion (c) in FIG. 103 becomes larger. As the amount of step difference between the flat portions increases, the information extraction 1004 accuracy of the first extracted information 1218 decreases. In order to prevent this decrease in information extraction 1004 accuracy, in the example of the present embodiment, the reference signal generator having a series of optimized band pass electrical filters 1248 to be used may be appropriately switched according to the temporal length of the measuring period 1258. By flexibly switching the reference signal generator having a series of optimized band pass electrical filters 1248 according to the temporal length of the measuring period 1258 in this manner, a decrease in the information extraction 1004 accuracy of the first extracted information 1218 can be prevented.

Furthermore, as shown in portion (e) in FIG. 103, the DC signal in the waveform of portion (d) in FIG. 103 is removed to generate the first extracted information 1218. As can be seen from Equation 35, the DC signal removal accuracy within the first extracted information 1218 affects the accuracy of the second extracted information 1018.

For the sake of relevance to FIG. 99, the vertical axis in portion (b) in FIG. 103 and portion (c) in FIG. 103 was described as the blood flow value 1252. However, it is not limited thereto, and the first extracted information 1218 may be information extracted 1004 from any other measured signal.

Figure 104:
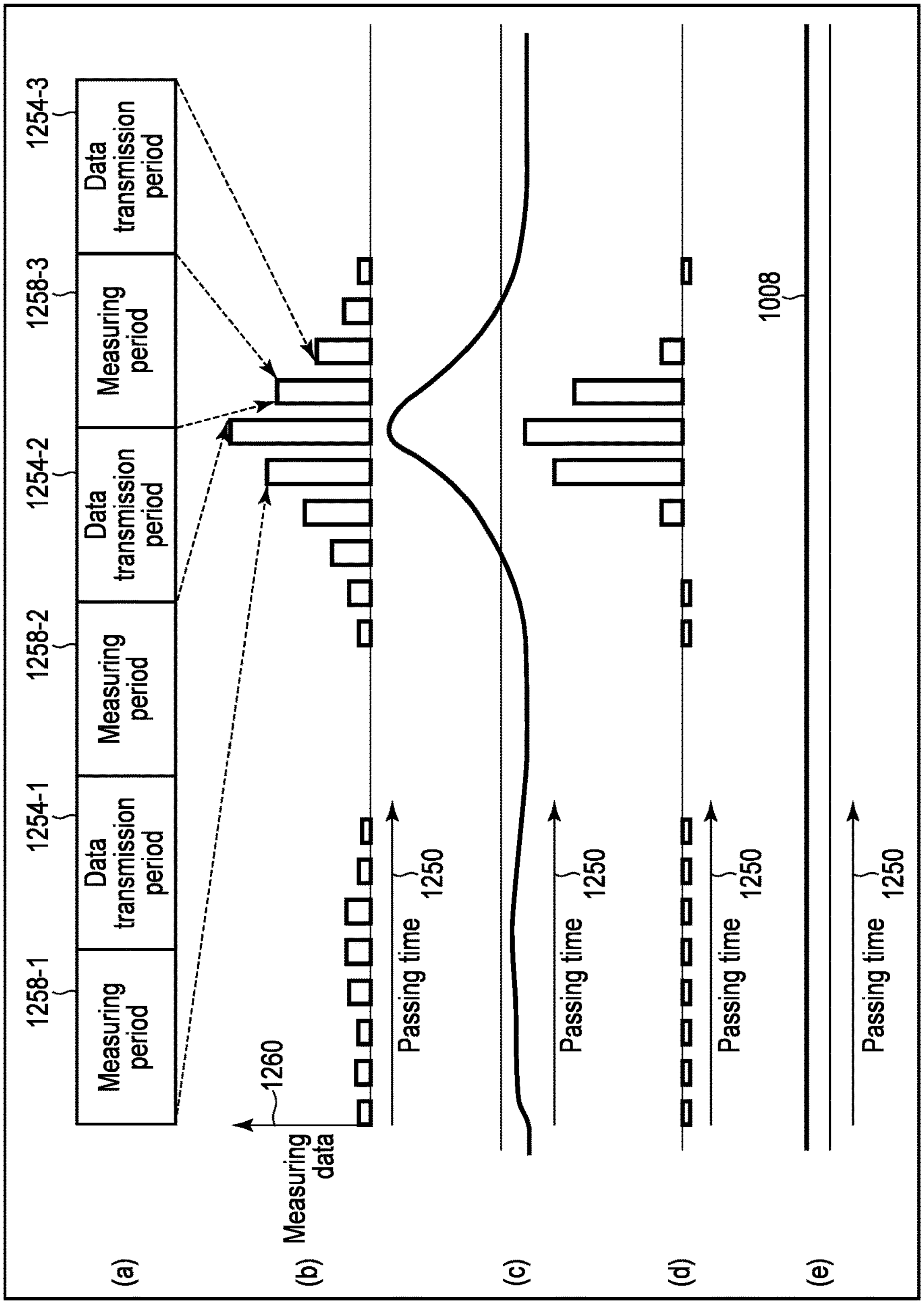
FIG. 104 is an explanatory diagram of an example of a second information extraction method for each wavelength or for each pixel.

FIG. 104 shows the signal processing (data processing) process leading to information extraction 1004 of the second extracted information 1018 using the signal processing (data processing) method of FIG. 98. Portion (a) in FIG. 104 shows an example of the form of the measured signal sent from the signal receptor 40. The measuring period 1258 and the data transmission period 1254 are transferred in a time-divided manner. Portion (b) in FIG. 104 shows time-dependent data for each measurement wavelength within the spectral profile signal or time-dependent data for each pixel in the imaging sensor 300 and time-dependent data 1200 for each measurement wavelength within the spectral profile signal for each pixel in the imaging sensor 300 contained in the data cube. Since measurement is not performed during the data transmission period 1254, data is sent as intermittent rectangular (pulse-like) time-dependent data.

Portion (c) in FIG. 104 shows the waveform of the first extracted information 1218 that was information extracted 1004 in portion (e) in FIG. 103. Portion (d) in FIG. 104 shows the result of multiplication for each time series of portion (b) in FIG. 104 and portion (c) in FIG. 104. The waveform of portion (d) in FIG. 104 matches the output waveform of the multiplication circuit for wavelengths/pixels 1230. Since there are periods of "negative" values in portion (c) in FIG. 104, there are also periods of "negative" values in the waveform in portion (d) in FIG. 104.

Portion (e) in FIG. 104 shows the result of the second extracted information 1018 that was extracted 1004 in FIG. 98. Alternatively, it can be said that this second extracted information 1018 represents the coefficient value "k" in Equation 36. By utilizing the action of the time-dependent DC signal extraction circuit for wavelengths/pixels (low pass filter having an extremely narrow bandwidth) 1236 in FIG. 98 to extract the DC signal of the discrete signals in portion (d) in FIG. 104, a constant value that is independent of passing time 1250 as shown in portion (e) in FIG. 104 can be obtained.

As a method of extracting 1004 the first extracted information in FIG. 98, the method of using the reference signal generator having a series of optimized band pass electrical filters 1248 using FIG. 99 is described above. Other methods of extracting 1004 the first extracted information 1218 using measured signals obtained from the measurer 8 (or the signal receptor 40) will be described below. In a case where the time-series variation characteristics of the reference signal 1210 to be partially extracted 1202 from the time-dependent spectral profile signal or the time-dependent pixel signal, which is the measured signal obtained from the measurer (or the signal receptor 40), are known in advance, the first extracted information 1218 is extracted 1004 by synchronization using a pattern matching technique, and the locked-in amplification E2 can be performed.

Figure 105:
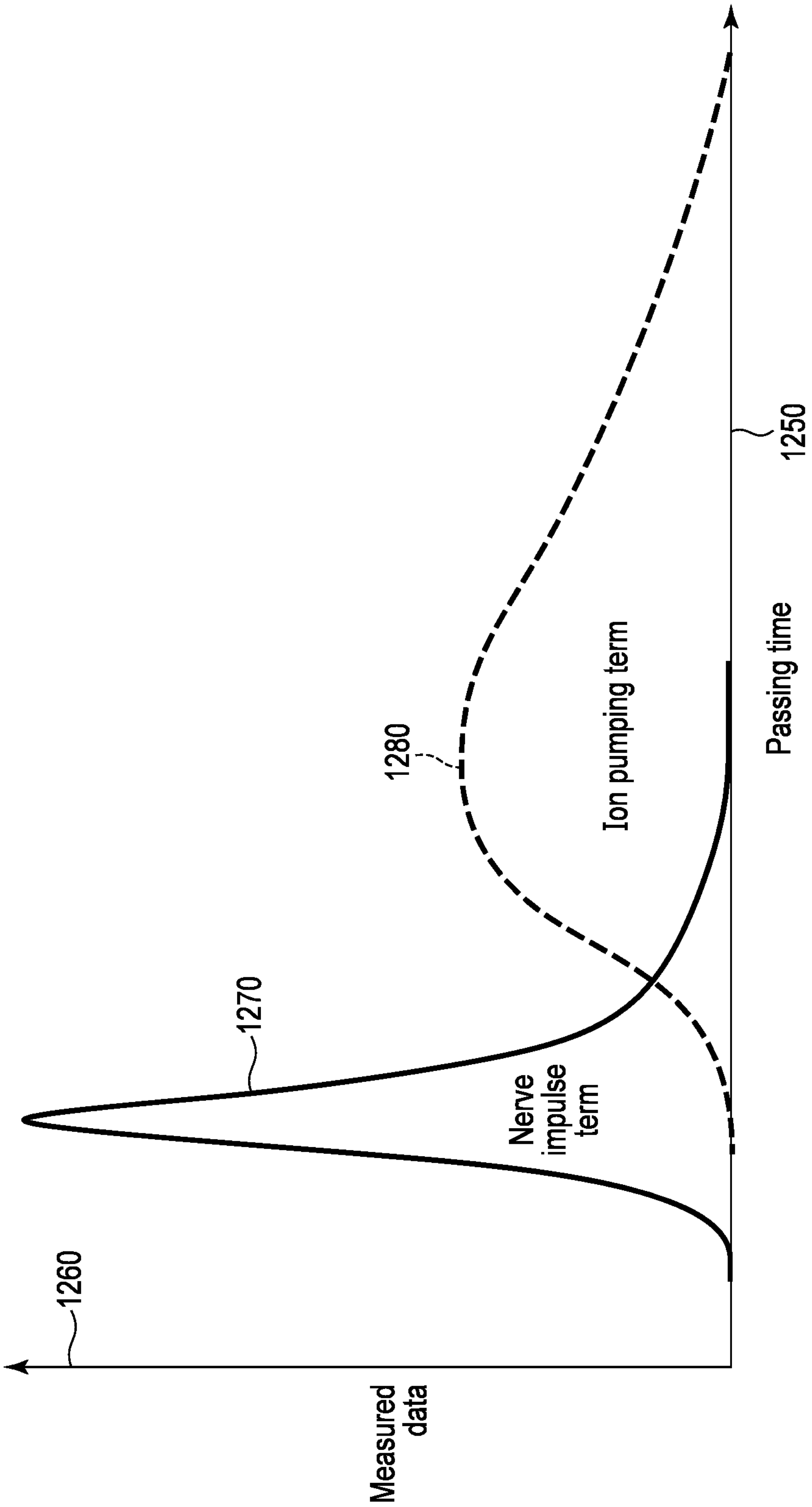
FIG. 105 shows a state of change in spectral profiles during and immediately after nerve impulse.

FIG. 105 shows an example of activity timing within a neuron. This time-series variation characteristic relating to activity within a neuron is widely known. The horizontal axis in FIG. 105 represents passing time 1250, and the vertical axis represents the amount of change in spectral profile corresponding to measured data 1260. A nerve impulse term 1270 is said to be approximately 0.5 ms. Immediately after that, an ion pumping term 1280 follows. This ion pumping term 1280 is much longer than the nerve impulse term 1270. Since the nerve impulse term 1270 is very short, it is difficult to extract the first extracted information 1218 from it. On the other hand, the ion pumping term 1280 is relatively long. Therefore, the nerve impulse timing may be extracted by synchronization with this ion pumping term 1280, and the first extracted information 1218 synchronized with this nerve impulse term 1270 may be extracted 1004.

Figure 106:
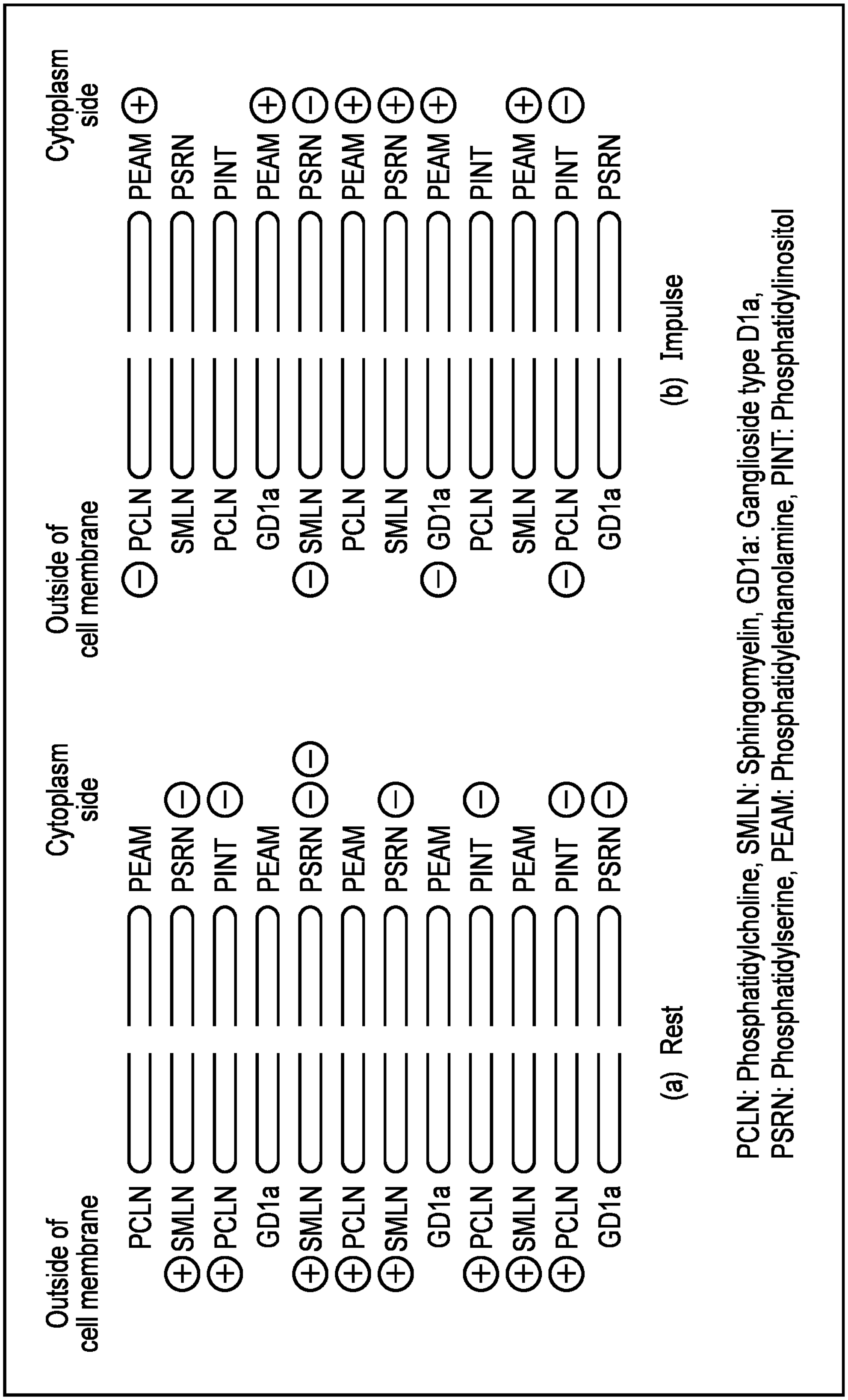
FIG. 106 shows a mechanism estimation diagram of nerve impulse.

FIG. 106 shows the expected nerve impulse mechanism and its effect on spectral profiles. In both portions (a) and (b) in FIG. 106), the left side shows the outer side of a cell membrane, and the right side shows a cytoplasm side. Cells are configured by a lipid bilayer.

Among the polymers that configure this lipid bilayer, phosphatidylserine (PSRN) and phosphatidylinositol (PINT) alone carry a negative charge. As shown in FIG. 106, since both are abundant on the cytoplasm side, at the time of rest (a), many negative charges are on the cytoplasm side. Sodium ions are then localized on the outside of the cell membrane and are considered to be electrically neutralizing them.

At the time of impulse (b), some of the sodium ions that entered the neuron in large quantities are considered to localize on the cytoplasm side. Chlorine ions are then considered to be localized on the outer side of the cell membrane to electrically neutralize them. Hydrogen bonding between the chlorine ions and methyl groups in the lipid bilayer is expected to locally change the spectral profiles. Since the absorption band center wavelength of the methyl group is near 1.68 μm (the same absorption band attributed to alanine in FIG. 87), hydrogen bonding with chlorine ions during impulse shifts the absorption band to the longer wavelength side.

Figure 107:
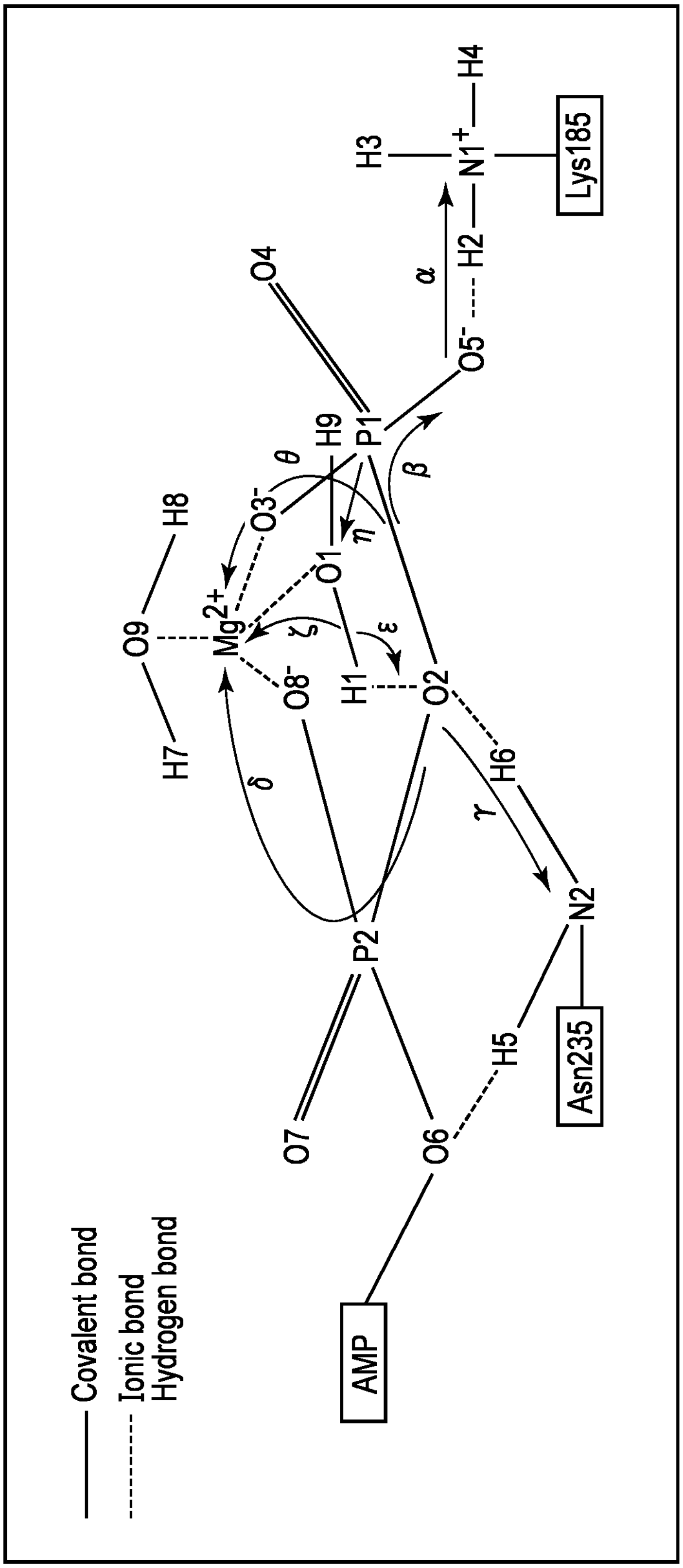
FIG. 107 shows a mechanism estimation diagram of ATP hydrolysis during ion pump operation.
Figure 108:
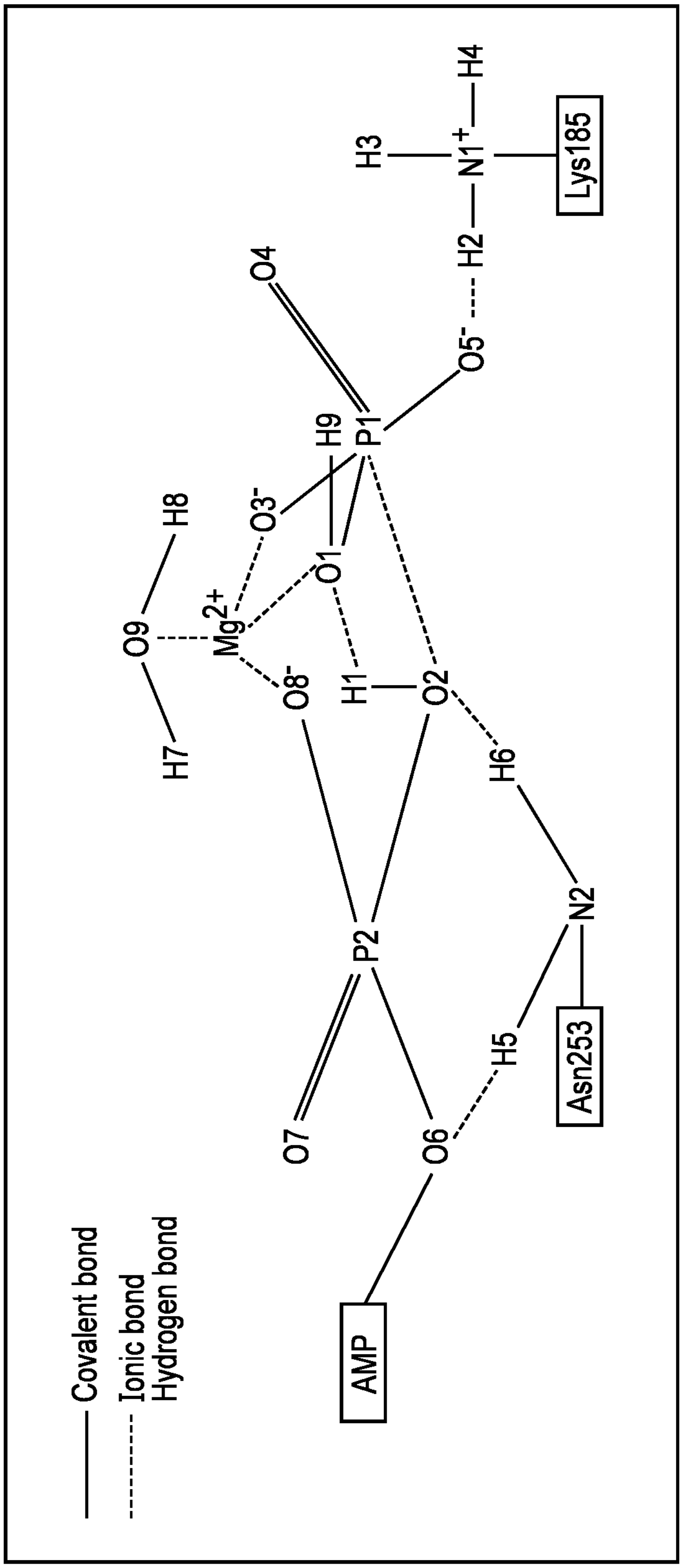
FIG. 108 shows a mechanism estimation diagram of ATP hydrolysis during ion pump operation.

FIGS. 107 and 108 show a hydrolysis mechanism model of adenosine triphosphate (ATP) generated during an ion pumping operation. At this time, a γ phosphate group in ATP is considered to form a hydrogen bond with lysine. As described in FIG. 84, the central wavelength of the absorption band attributed to lysine also appears near 1.48 μm. Therefore, the central wavelength of the absorption band when the γ phosphate group is hydrogen-bonded to lysine is slightly longer than that.

Figure 109:
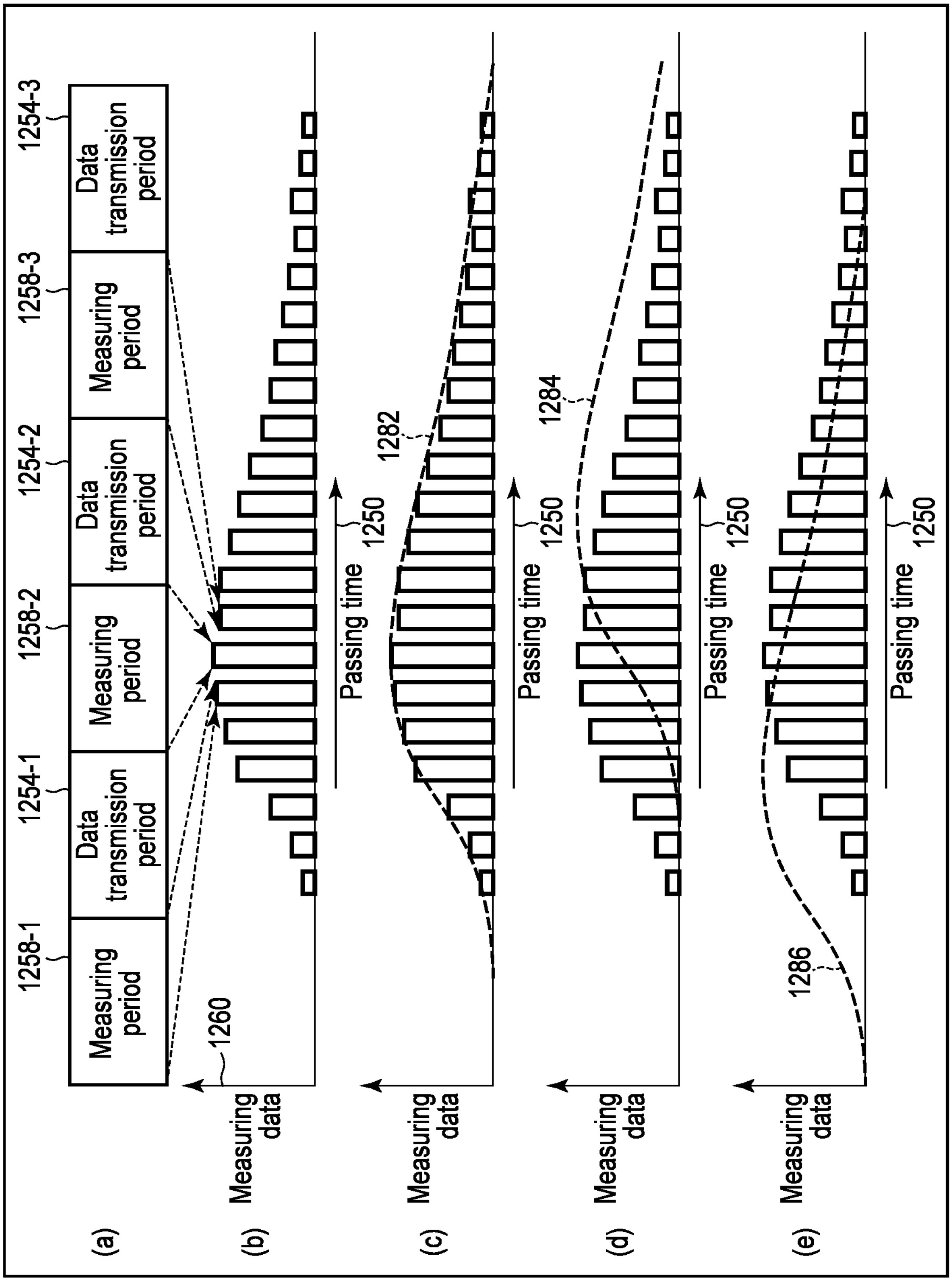
FIG. 109 shows a method of synchronous phase adjustment of a reference signal with respect to a time-dependent measured signal.

FIG. 109 shows an example of a synchronization method for the first extracted information 1218 using a pattern matching method. A measured value represented by the vertical axis in FIG. 109 shows the shift amount of the center wavelength of the absorption band in the vicinity of 1.48 μm. Instead of the actual shift amount of the wavelength, signal processing (analysis) may be performed with the amount of change in absorbance of multiple wavelength lights in the vicinity of 1.48 μm.

The measured data 1260 obtained for each measuring period 1258 in portion (a) in FIG. 109 show the characteristics of portion (b) in FIG. 109 according to the passing time 1250. In a case where time dependent characteristics of the measured data 1260 in the ion pumping term 1280 are known in advance, they can be synchronized using the pattern matching method.

Portions (c), (d), and (e) in FIG. 109 show examples of pattern matching statuses between the expected first extracted information 1218. In portions (d) and (e) in FIG. 109, the pattern matching degree is low. In comparison, since the pattern matching degree in portion (c) in FIG. 109 is the highest, the timing (synchronization) of the first extracted information 1218 to be 1004 extracted is determined.

As shown in FIG. 105, since the temporal shift amount between the impulse term 1270 and the ion pumping term 1280 is fixed, the timing of the first extracted information 1218 corresponding to the impulse term 1270 is determined (synchronization becomes possible) utilizing this timing of the ion pumping term 1280. The first extracted information 1218 matched with this impulse term 1270 may then be utilized to perform the lock-in amplification E2 with respect to the shift in the absorption band center wavelength around 1.68 μm (or the change in absorbance of multiple wavelength lights in the vicinity of 1.68 μm). In this manner, when pattern matching is utilized to extract 1004 the first extracted information 1218 necessary for the lock-in amplification E2, the second extracted information can be obtained with high accuracy even for extremely narrow signals.

For convenience of explanation, the above description took the measurement of nerve impulse as an example. However, it is not limited thereto, and may be applied to any signal processing (data processing) that utilizes the measured signal to perform lock-in amplification E2 or bandwidth control E1.

Figure 110:
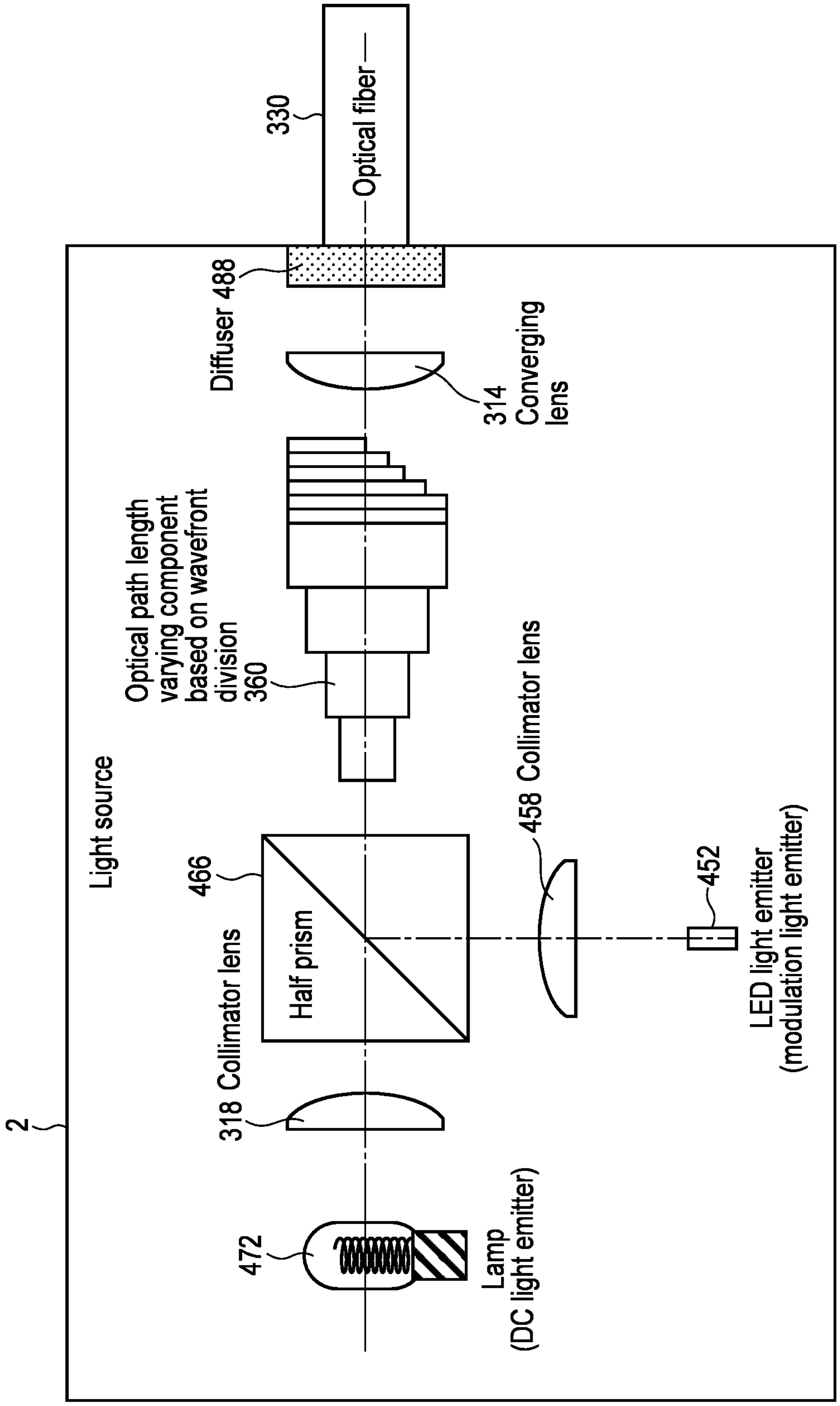
FIG. 110 shows an explanatory diagram of a structure inside a light source configured by combining a DC light emitter and a modulation light emitter.

FIG. 110 shows an example of the structure of the light source 2 capable of emitting pulsed light. FIG. 101 is used to explain the method of information extraction 1004 of the second extracted information 1018 with high accuracy by emitting pulsed light of the irradiated light 1190 emitted from the light source 2. The light source 2 in FIG. 110 can be utilized for the signal processing (data processing) described in FIG. 101.

Before explaining FIG. 110, an example of a usage scenario will be explained in which a DC light emitter (such as a lamp) 472 having a wide light emitting wavelength range and a modulation light emitter (such as an LED light emitter) 452 having a relatively narrow light emitting wavelength range can be used together in the same light source 2.

The absorption band of sugar (glucose) appears in the vicinity of the measurement wavelength of 1.6 μm (FIG. 84). Therefore, for example, it would be more convenient for the user if the glucose content in the blood in the blood vessel area 500 could be measured without contact for a simple prediction of the presence or absence of diabetes tendency. In the absorbance information obtained as a result of this case, high measurement accuracy is required especially in the vicinity of the measurement wavelength of 1.6 μm. At the same time, the baseline correction described in Chapter 14 requires a wide light emitting wavelength range for the irradiated light 1190 irradiated on the measured object 22.

There is a user demand for high measurement accuracy not only for sugars, but also for specific constituents 988 (for example, protein-based and lipid-based). In this manner, in a case where a particularly high measurement accuracy is required in a wavelength range where optical disturbance noise is reduced (baseline correction signal processing is performed) and which corresponds to a specific constituent 988, a combination of the light source 2 in FIG. 110 and the signal processing method (lock-in amplification E1) in FIG. 101 can be utilized.

In the light source 2 of FIG. 110, various lamps 472 such as halogen lamps, xenon lamps, mercury lamps can be used for direct current emission with a wide range of light emitting wavelengths. Then, the LED light emitter 452 is combined with a modulation light emitter that has a narrow wavelength range and can emit pulsed lights (or arbitrarily modulate the amount of emission) to match the wavelength absorbed by the specific constituent 988 that is to be measured with high precision. A semiconductor laser may be used here instead of LEDs.

The light emitted from both are synthesized by a half prism 466. The synthesized light emits light of constant intensity over a wide range of light emitting wavelengths, and then pulsed light is superposed only over a specific range of wavelengths. Here, the emission control of the LED light emitter (modulation light emitter) 452 is performed by the light modulation controller 30 (FIG. 101). The modulation signal of emitted light intensity 1228 given to the light modulation controller 30 is sent from the pulse counter 1222 in the signal processor 42. Thus, highly accurate information (second extracted information 1018) is obtained using the lock-in amplification E2 with respect to the specific wavelength range in which the pulsed light is superposed.

The light emitted from the lamp (DC light emitter) 472 and the light emitted from the LED light emitter (modulation light emitter) 452 are both converted to parallel light by the collimator lenses 318 and 458. Then, the optical path length converting component 360 is placed in the middle of this parallel optical path. After passing through the optical path length converting component 360, all of the light is guided into the optical fiber 330 through the converging lens 314. Furthermore, the diffuser 488 is placed just before the optical fiber 330.

With the above optical arrangement, optical disturbance noise is reduced for both types of light. In other words, both lights have reduced interference noise related to temporal coherence for the reasons described in FIG. 16, and reduced interference noise related to spatial interference noise for the reasons described in FIG. 56.

Figure 111:
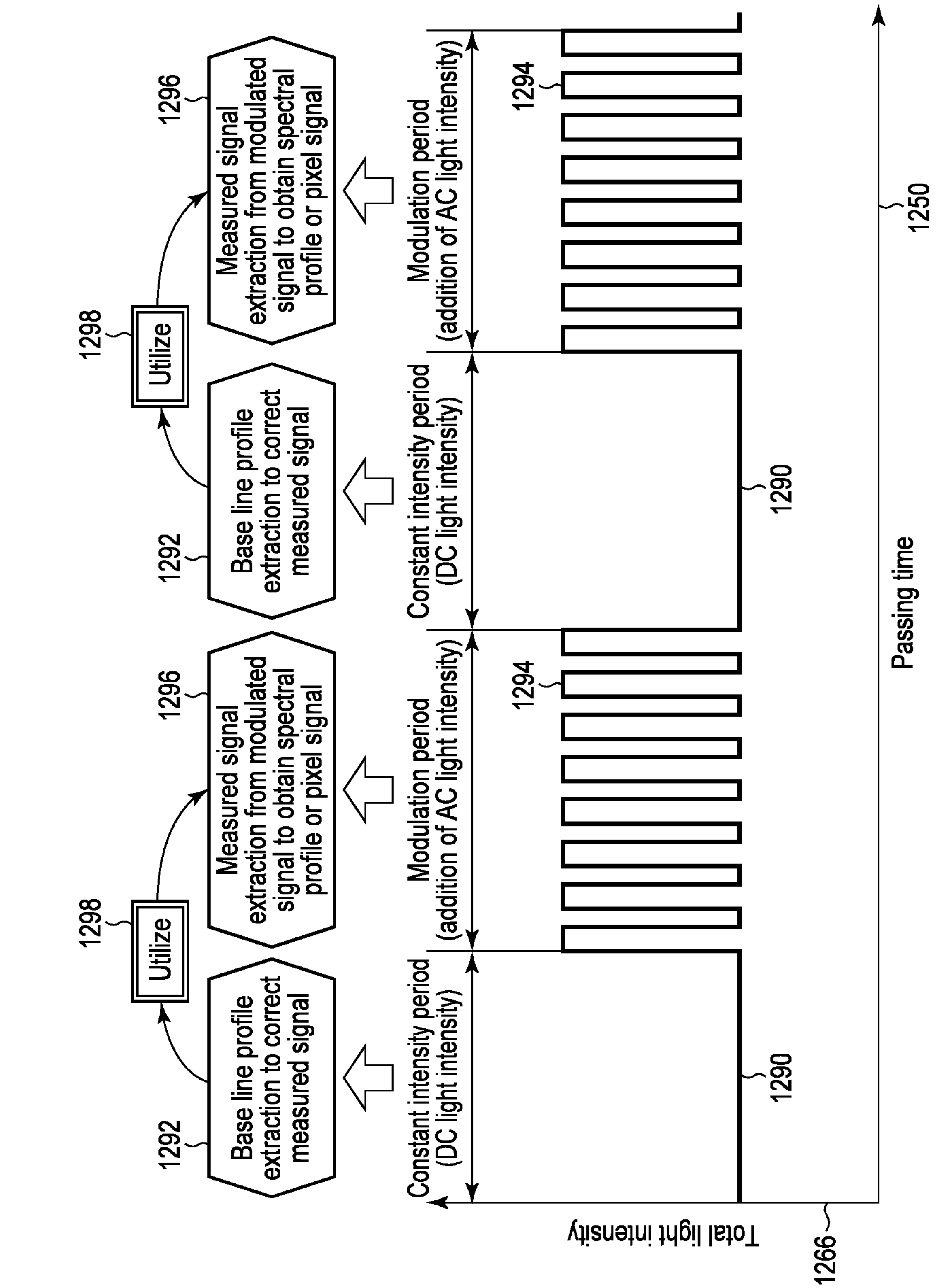
FIG. 111 is a diagram explaining the difference in the measurement contents between a DC light emission period and a modulation light emission period in the present embodiment.

FIG. 111 shows how the total light intensity 1266 from the light source 2 in FIG. 110 changes according to the passing time 1250. A constant intensity (DC light intensity) period, during which the LED light emitter (modulation light emitter) 452 stops emitting light, and a modulation (addition of AC light intensity) period in which the LED light emitter (modulation light emitter) 452 emits pulses appear alternately.

During the constant intensity (DC light intensity) period, the total light intensity for the bias light intensity 1290 becomes constant, and during this period, the baseline correction curve information is extracted 1004. During the modulation (addition of AC light intensity) period, the total light intensity alternates between the bias light intensity 1290 and peak light intensity 1294. The lock-in amplification E2 is then performed using the time-dependent measured signal (spectral profile signal/image signal) synchronized with the pulse emission during the modulation (addition of AC light intensity) period.

What is important here is that, for example, optical disturbance noise cannot be removed only by performing the signal processing (data processing) described in FIG. 101 and performing the lock-in amplification E2. Therefore, the baseline correction (removal of optical disturbance noise components) is performed from the spectral profile signal obtained during the modulation (addition of AC light intensity) period, utilizing 1298 the baseline correction curve information obtained during the constant intensity (DC light intensity) period.

The baseline correction curve information remains constant regardless of the light intensity of the irradiated light 1190 on the measured object 22. Therefore, from the above correction curve information, the portion corresponding to the specific wavelength range of the LED light emitter 452 is extracted and multiplied by a predetermined coefficient. From the spectral profile signal obtained during the modulation (addition of AC light intensity) period, subtraction processing (or division processing) is performed with the information obtained after multiplying this predetermined coefficient. By performing such signal processing (data processing), optical disturbance noise can be removed from the spectral profile signal obtained during the modulation (addition of AC light intensity) period.

Figure 112:
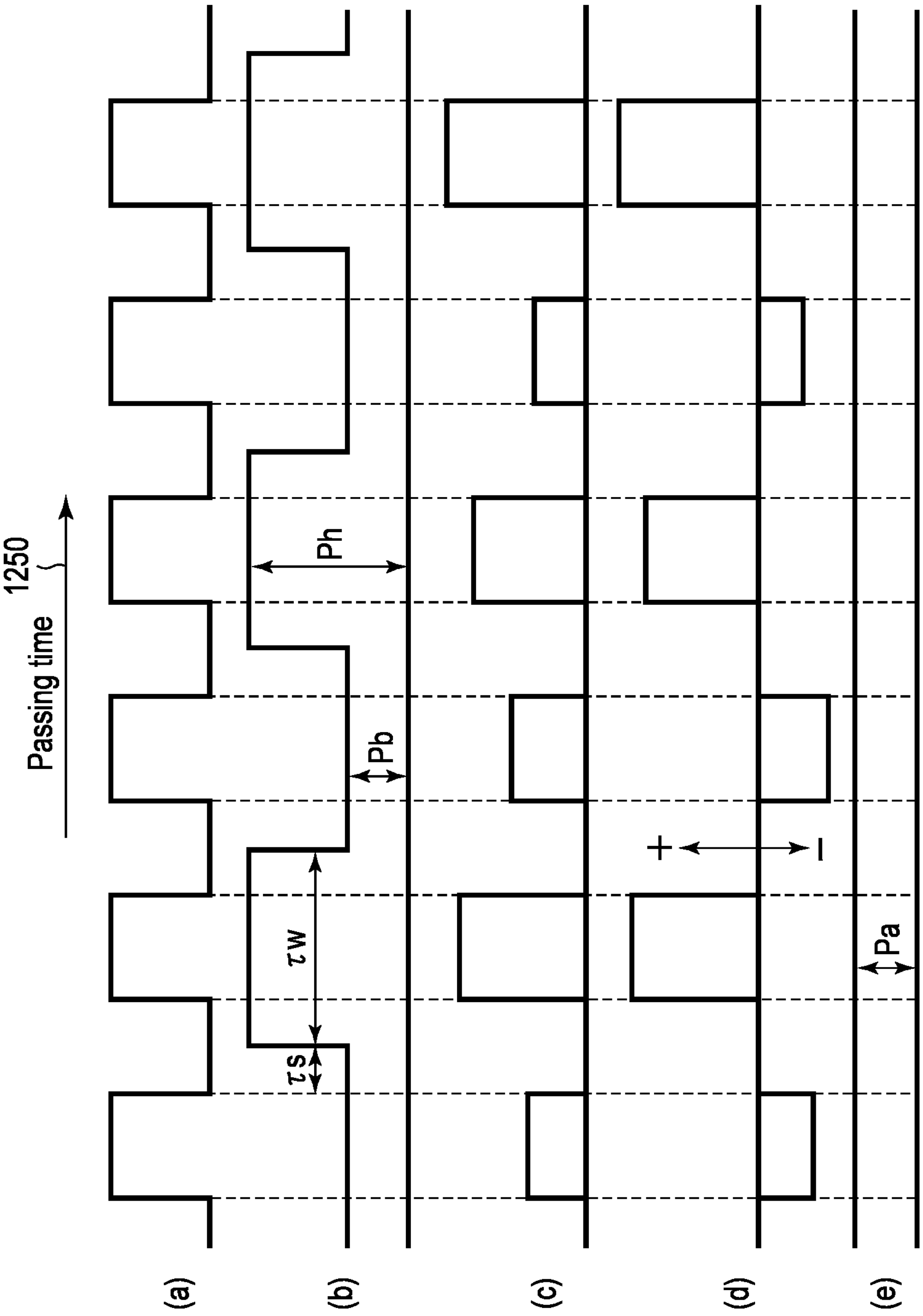
FIG. 112 is an explanatory diagram of an example of timing control during data processing of spectral profiles or image signals utilizing modulation light emission.

FIG. 112 shows the timing relationship during signal processing (data processing) in FIG. 101 within the modulation period (FIG. 111). Portion (a) in FIG. 112 represents an output signal from the reference clock generator 1220 in FIG. 101. Portion (b) in FIG. 112 shows the total light intensity during the modulation period (FIG. 111) generated by the light emitter 2 in FIG. 110. This is synchronized with the modulation signal of emitted light intensity 1228 sent from the pulse counter 1222 in FIG. 101. In portion (b) in FIG. 112, the bias light intensity 1290 is represented by "Pb", and the peak light intensity 1294 is represented by "Ph". In portion (b) in FIG. 112, the peak light intensity 1294 "Ph" is maintained for a period of "τw" at a timing delayed by "τs" from the fall timing of portion (a) in FIG. 112.

Portion (c) in FIG. 112 shows a collection timing of the time-dependent spectral profile or time-dependent pixel signal 1200. The signal receptor 40 collects the time-dependent spectral profile or time-dependent pixel signal 1200 in synchronization 1224 with the reference clock 1220. Also, a signal whose polarity is inverted with respect to this signal is generated in the inverter (polar inversion) circuit 1226.

Portion (d) in FIG. 112 shows a signal after switching by the switch 1232. The output signal of the pulse counter 1222 has a waveform of "Pb=0" in portion (b) in FIG. 112. Therefore, switch 1232 is switched in synchronization with the up and down movement of the pulse counter 1222 level.

Portion (e) in FIG. 112 shows the second extracted information 1018 obtained from the time-dependent DC signal extraction circuit for wavelengths/pixels (low pass filter having an extremely narrow bandwidth) 1236. A level of height "Pa" is obtained as the DC signal. Also, the value of "Pa" corresponds to the coefficient "k" in Equation 36.

[Chapter 16: Signal Processing and Transmission Format for Data Cubes]

Since the data size of a data cube containing spectral profile signals for each pixel in an image signal, such as a still image or a moving image, is enormous, it is currently difficult to handle in all aspects of signal processing (data processing), data transfer, and display. In the example of the present embodiment, only valid data may be extracted from the data cube, and signal processing (data processing), data transfer, display, etc., may be performed mainly on the valid data. By extracting valid data from the data cube and performing intensive processing in this manner, it is possible to handle the data cube without imposing a heavy burden on the existing technical infrastructure (technical level).

As examples of the processing methods for extracting only valid data from the data cube in the example of the present embodiment, one of the following methods or a combination thereof may be used:

1. Extract portions of the spectral profile information that are relevant to the wavelength range required by a user;
1A] narrow down the constituent ζ 1092 for which information is to be obtained and extract only the data in the wavelength range related thereto (or the relationship between the data in the narrowed wavelength range), and
1B] reduce the wavelength resolution of spectrum (decimate extracted wavelengths/adopt low-resolution optical semiconductors), and
2. Utilize image analysis technology to extract spectral profile information of only the necessary pixels;
2A] exclude signal processing for pixels that fall within a blank area, and
2B] extract only the spectral information of pixels included in the image area required (of interest) by the user.

First of all, a specific example regarding 2 will be described.

Figure 113:
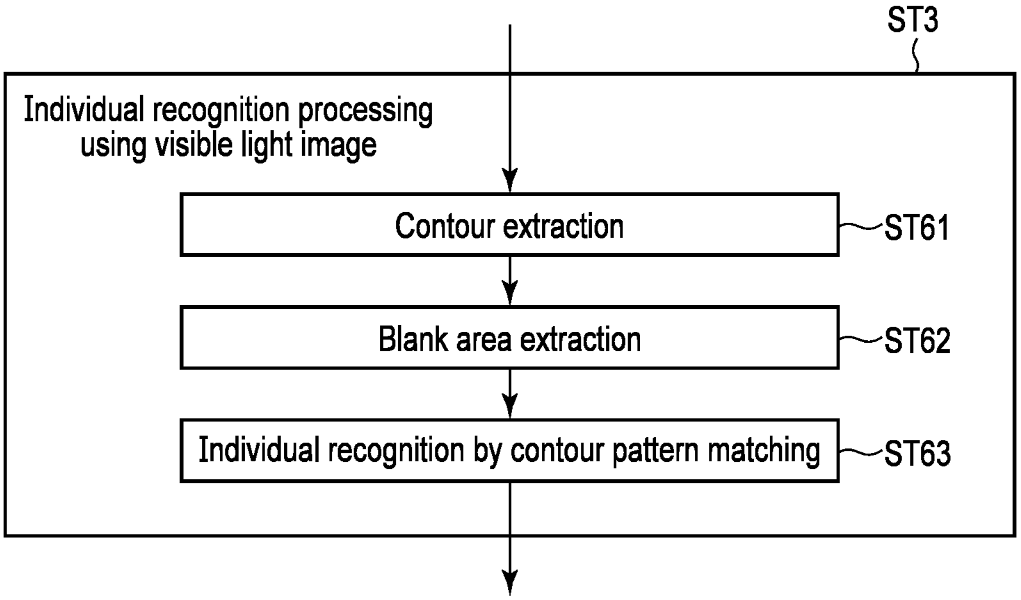
FIG. 113 is an explanatory diagram of a detailed procedure in individual identification processing using visible light.

FIG. 113 shows an example of detailed processing in step 3 of the data cube processing procedure described in FIGS. 42 and 43. In step 3 of FIG. 42, individual recognition processing is performed utilizing a visible light image. In the processing, first, contours are extracted (ST61) in the image, and area division is performed. In many cases, image areas that are useful (valuable) to the user are concentrated in the center of the image. In step 62, using this feature, blank areas are extracted from the four corners of the visible light image after the area division, sequentially toward the center.

Next, in step 63, contour pattern matching is performed for each divided area of the visible light image after area division, and individual identification is performed for each divided area.

Figure 114:
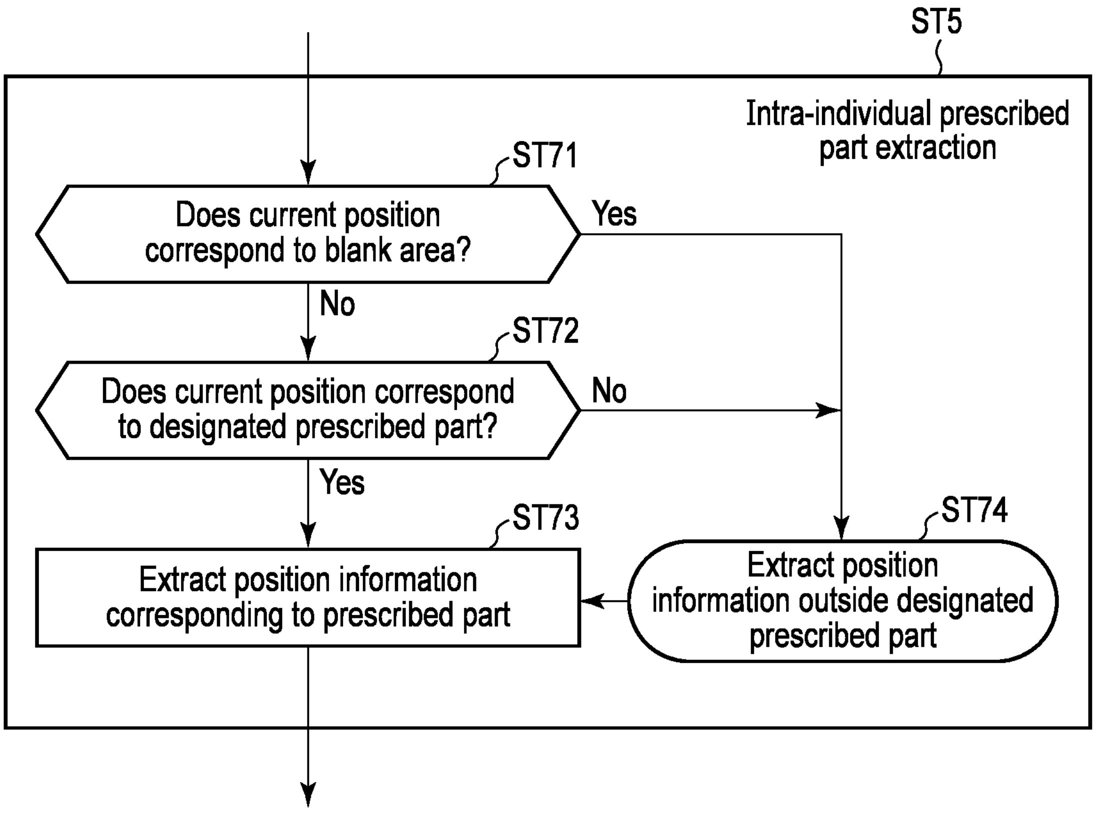
FIG. 114 is an explanatory diagram of a detailed procedure for extracting a predetermined area within a distinguished object.

FIG. 114 shows an example of detailed processing in step 5 in the data cube processing procedure described in FIGS. 42 and 43. In step 5 of FIG. 42, extraction processing for an intra-individual prescribed part is performed by utilizing a near-infrared light image. In the first step 71 therein, it is determined whether or not the current pixel that is the target of prescribed part extraction corresponds to the blank area. If the current pixel corresponds to the blank area, it is excluded from the target of intra-individual prescribed part extraction (ST74).

In step 72, in the case where the current target pixel is not the blank area, it is determined whether or not the pixel corresponds to a prescribed part of interest to the user (valuable to the user). For this determination, the results of individual recognition by pattern matching of contours performed in step 63 in FIG. 113 are utilized. Then, in step 73, position information of the pixel contained in the prescribed part of interest (of value to the user) is extracted.

By performing the above procedure, spectral profile analysis (the signal processing described so far) limited to only pixels included in a prescribed part of interest to the user (having value to the user) is performed. In addition, as a method of displaying or notifying the user in relation to the above, the results of the analysis (signal processing) of spectral profile (predetermined signals) from only the area excluding the blank area are notified or displayed to the user.

Figure 115:
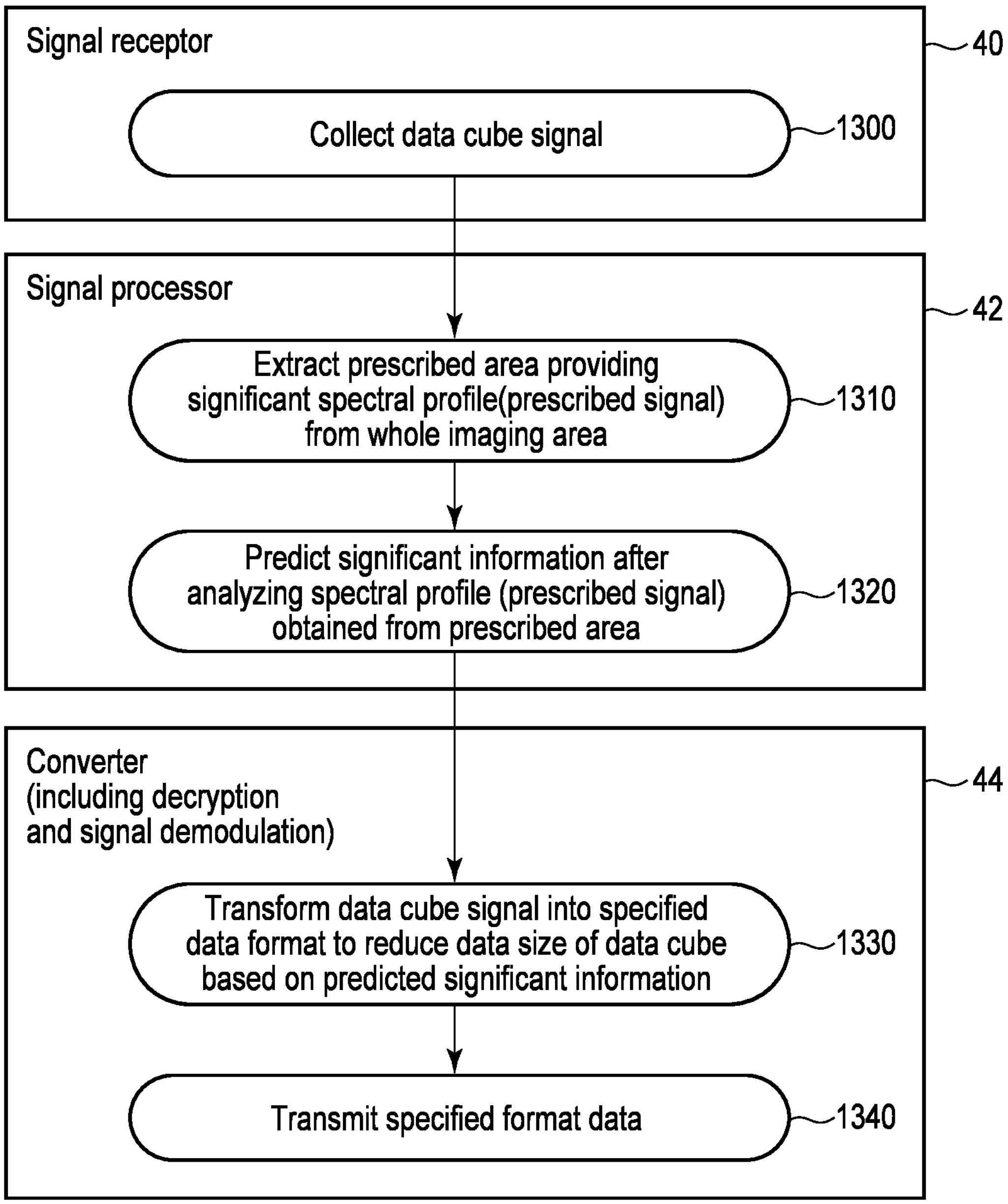
FIG. 115 is an explanatory diagram of a method of output-transferring compressed data cube information after spectral profile analysis in the present embodiment.

FIG. 115 shows the processing assignment for each block in the light application device 10. FIGS. 113 and 114 mainly described the processing procedure. Here, description will be provided focusing on the processing assignment for each block that executes this processing procedure. Once the data cube signal is collected 1300 within the signal processor 40, this data cube signal is transferred to the signal processor 42.

In the signal processor 42, the pixels included in the prescribed part where the predetermined signal (spectral profile signal) necessary for spectral profile analysis should be collected are extracted 1320 from the entire image area. The spectral profile signal (predetermined signal) is then signal processed (data processed or analyzed) for each pixel included in the prescribed part, and information obtained after the signal processing (data processing) is predicted 1320.

The converter 44 reduces the data size of the data cube signal utilizing the above predicted information and converts it to a specified format 1330. Then, data is transferred in the converted specified format 1340. Here, as described above, 1. in the spectral profile information, the data size of the data cube signal is reduced utilizing the extraction of the portion relevant to the wavelength range required by the user.

FIG. 116 shows an example of the transmission format of the data cube signal after the data size reduction conversion has been applied. As the data format type 1332, the following three types of examples are shown in the example of the present embodiment. However, any format may be used as long as the data size of the data cube signal can be reduced and transferred.

A description of data format 1334 in the case of diverting an existing format representing color pixel image 1342 as the data format type 1332 will be described. In this method, each constituent may be expressed as "red density", "green density", or "blue density" according to its content ratio. For example, in relation to the description example of FIG. 89, the content ratio of proteins 990 is expressed by "red density", the content ratio of sugars 996 by "blue density", and the content ratio of lipids 998 by "green density", where they are expressed by the mixing ratio of three colors. When transferring data, the same format as the existing color image (or color video) is utilized. Also, depending on the water content ratio, "gray concentration" may be layered.

Also, the content ratio is not limited to the content ratio of proteins 990, the content ratio of sugars 996, and the content ratio of lipids 998, and the content ratio of any constituent 988 may be displayed in color. For example, color display may be used to determine δa2 whether the object is an animal, plant, or an artificial object or to determine δa1 whether the substance is organic or inorganic, or in a manner by changing the color or gray density in accordance with the degree of non-saturation δa6 of fatty acids. By converting the signal-processed information obtained from the data cube signal into a color video signal in this manner, compatibility with existing devices that handle color image signals (moving image signals) can be ensured.

The description 1334 of a multiplexing format including significant information 1344 is transferred by multiplexing the spectral profile (spectral signal) with the signal processing (data processing) information. For example, as standardized in MPEG, the conventional image information may be placed in a "video pack" and the information obtained after the above signal processing (data processing) may be placed in a "pack" and multiplexed. Here, a unique pack may be defined as a "pack" for storing the information obtained after the above signal processing (data processing), or the information may be stored in a "sub-picture pack" as in a DVD.

In the case of utilizing a hypertext format 1346, the information obtained after the above analysis is described in a "hypertext format". The conventional images may then be defined in a predetermined file format and linked from within the hypertext.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A measurement device, comprising:

a light modulation controller which uses a modulation signal;

a light source including a modulation light emitter, an optical characteristic converter, and an optical synthesizer, wherein:

the modulation light emitter emits initial modulation light, the optical characteristic converter divides the initial modulation light into a first light beam and a second light beam, the optical characteristic converter makes an optical path length difference between the first light beam and the second light beam larger than a coherence length, the optical synthesizer synthesizes the first light beam and the second light beam having the optical path length difference larger than the coherence length to form synthesized modulation light, the light source irradiates the synthesized modulation light to a measured object, and light intensity of the synthesized modulation light changes according to the modulation signal;

the measurement device further comprising:

a measurer receiving the synthesized modulation light obtained from the measured object to generate a time-dependent signal; and a signal receptor collecting the time-dependent signal, wherein:

the time-dependent signal is synchronized with the modulation signal, and the modulation signal has a timing shift compared with the collection timing of the time-dependent signal in the signal receptor.

2. A method of applying synthesized modulation light, comprising:

emitting the synthesized modulation light to irradiate to a measured object;

receiving the synthesized modulation light obtained from the measured object to generate a time-dependent signal;

collecting the time-dependent signal; and emitting, by a modulation light emitter, initial modulation light, wherein:

the initial modulation light is divided into a first light beam and a second light beam, the first light beam passes through a first optical path, the second light beam passes through a second optical path, the first optical path has a first optical path length, the second optical path has a second optical path length, an optical path length difference between the first optical path length and the second optical path length is larger than a coherence length, the synthesized modulation light includes the first light beam and the second light beam having the optical length difference larger than the coherence length, light intensity of the synthesized modulation light changes according to a modulation signal, the time-dependent signal is synchronized with the modulation signal, and the modulation signal has a timing shift compared with the collection timing of the time-dependent signal.

3. An optical measuring method, comprising:

irradiating a measured object with synthesized light;

detecting the synthesized light obtained from the measured object to generate time-dependent signals;

extracting a prescribed time-dependent signal from the time-dependent signals;

generating first extracted information from the prescribed time-dependent signal;

generating second extracted information from the time-dependent signals in accordance with a frequency and a phase of the first extracted information; and emitting initial light by a light emitter, wherein:

the initial light is divided into a first light beam and a second light beam, the first light beam passes through a first optical path, the second light beam passes through a second optical path, the first optical path has a first optical path length, the second optical path has a second optical path length, an optical path length difference between the first optical path length and the second optical path length is larger than a coherence length, the synthesized light includes the first light beam and the second light beam having the optical path length difference larger than the coherence length.

4. A measurement device, comprising:

a light source including a light emitter, an optical characteristic converter, and an optical synthesizer, wherein:

the light emitter emits initial light, the optical characteristic converter divides the initial light into a first light beam and a second light beam, the optical characteristic converter makes an optical path length difference between the first light beam and the second light beam larger than a coherence length, the optical synthesizer synthesizes the first light beam and the second light beam having the optical path length difference larger than the Coherence length to form synthesized light, and the light source irradiates the synthesized light to a measured object, the measurement device further comprising:

a measurer to receive the synthesized light obtained from the measured object to generate time-dependent signals;

a signal receptor to receive the time-dependent signals to extract a prescribed time-dependent signal; and a signal processor to generate first extracted information from the prescribed time-dependent signal, wherein the signal processor generates second extracted information from the time-dependent signals in accordance with a frequency and a phase of the first extracted information.

5. A service providing system, comprising:

a system controller;

a light modulation controller which uses a modulation signal;

a light source including a modulation light emitter, an optical characteristic converter, and an optical synthesizer, wherein:

the modulation light emitter emits initial modulation light, the optical characteristic converter divides the initial modulation light into a first light beam and a second light beam, the optical characteristic converter makes an optical path length difference between the first light beam and the second light beam larger than a coherence length, the optical synthesizer synthesizes the first light beam and the second light beam having the optical path length difference larger than the Coherence length to form synthesized modulation light, the light source irradiates the synthesized modulation light to a measured object, and a light intensity of the synthesized modulation light changes according to the modulation signal, the service providing system further comprising:

a measurer to receive the synthesized modulation light obtained from the measured object to generate a time-dependent signal; and a signal receptor to collect the time-dependent signal, wherein:

the time-dependent signal is synchronized with the modulation signal, the modulation signal has a timing shift compared with the collection timing the time-dependent signal in the signal receptor, and the system controller provides a user with a service based on the collected time-dependent signal.

6. A service providing method comprising:

emitting initial modulation light;

dividing the initial modulation light into a first light beam and a second light beam;

making an optical path length difference between the first light beam and the second light beam larger than a coherence length;

synthesizing the first light beam and the second light beam having the optical path length difference larger than the coherence length to form synthesized modulation light;

irradiating the synthesized modulation light to a measured object, a light intensity of the synthesized modulation light changes according to a modulation signal;

receiving the synthesized modulation light obtained from the measured object to generate a time-dependent signal;

collecting the time-dependent signal; and providing a user with a service based on the collected time-dependent signal, wherein:

the time-dependent signal is synchronized with the modulation signal, and the modulation signal has a timing shift compared with the collection timing of the time-dependent signal.

* * * * *